United States Patent
Habuto et al.

(10) Patent No.: US 8,351,447 B2
(45) Date of Patent: Jan. 8, 2013

(54) DATA COMMUNICATION SYSTEM, CRADLE APPARATUS, SERVER APPARATUS, DATA COMMUNICATION METHOD AND DATA COMMUNICATION PROGRAM

(75) Inventors: Reiko Habuto, Kanagawa (JP); Yoshiyasu Kubota, Kanagawa (JP); Nobuki Furue, Tokyo (JP)

(73) Assignee: Sony Corporation, Tokyo (JP)

( * ) Notice: Subject to any disclaimer, the term of this patent is extended or adjusted under 35 U.S.C. 154(b) by 733 days.

(21) Appl. No.: 12/106,804

(22) Filed: Apr. 21, 2008

(65) Prior Publication Data

US 2008/0263146 A1   Oct. 23, 2008

(30) Foreign Application Priority Data

Apr. 20, 2007   (JP) .................. P2007-111469
Apr. 4, 2008    (JP) .................. P2008-098483
Apr. 4, 2008    (JP) .................. P2008-098484
Apr. 4, 2008    (JP) .................. P2008-098485

(51) Int. Cl.
H04L 12/28   (2006.01)

(52) U.S. Cl. ............... 370/416; 379/242; 710/316
(58) Field of Classification Search ............... 370/419; 455/41.2, 556.1; 705/2; 709/206
See application file for complete search history.

(56) References Cited

U.S. PATENT DOCUMENTS

| | | | |
|---|---|---|---|
| 5,928,329 A | | 7/1999 | Clark et al. |
| 7,209,949 B2* | | 4/2007 | Mousseau et al. ............ 709/206 |
| 2004/0198430 A1* | | 10/2004 | Moriyama et al. ......... 455/556.1 |
| 2006/0224413 A1* | | 10/2006 | Kim et al. .................... 705/2 |
| 2007/0026799 A1* | | 2/2007 | Wang et al. ................. 455/41.2 |
| 2007/0038703 A1* | | 2/2007 | Tendjoukian et al. ....... 709/206 |

FOREIGN PATENT DOCUMENTS

| | | |
|---|---|---|
| JP | 7-509333 | 10/1995 |
| JP | 2002-135375 | 5/2002 |
| JP | 2003-289491 | 10/2003 |
| JP | 2004-304733 | 10/2004 |
| JP | 2005-159439 | 6/2005 |
| JP | 2006-114120 | 4/2006 |
| JP | 2006-148284 | 6/2006 |

OTHER PUBLICATIONS

U.S. Appl. No. 12/106,726, filed Apr. 21, 2008, Habuto, et al.
U.S. Appl. No. 12/106,761, filed Apr. 21, 2008, Habuto, et al.
Japanese Office Action issued Jan. 12, 2012 in patent application No. 2008-098485.
Japanese Office Action issued Aug. 21, 2012 in Japanese Application No. 2008-098483, 3 pages, No English translation.

* cited by examiner

*Primary Examiner* — Robert Wilson
*Assistant Examiner* — Lionel Preval
(74) *Attorney, Agent, or Firm* — Oblon, Spivak, McClelland, Maier & Neustadt, L.L.P.

(57) ABSTRACT

A data communication system includes a portable electronic apparatus, a server apparatus, a cradle apparatus, and a home apparatus. The portable electronic apparatus includes a communication section, a reception control section, a storage section, and a utilization control section. The cradle apparatus includes a first communication section, a second communication section, a connection detection section, a notification control section, and a relaying control section. The server apparatus includes a first communication section, a second communication section, a first transmission control section, and a relaying control section. The home apparatus includes a communication section, a preparation section, and a transmission control section.

15 Claims, 57 Drawing Sheets

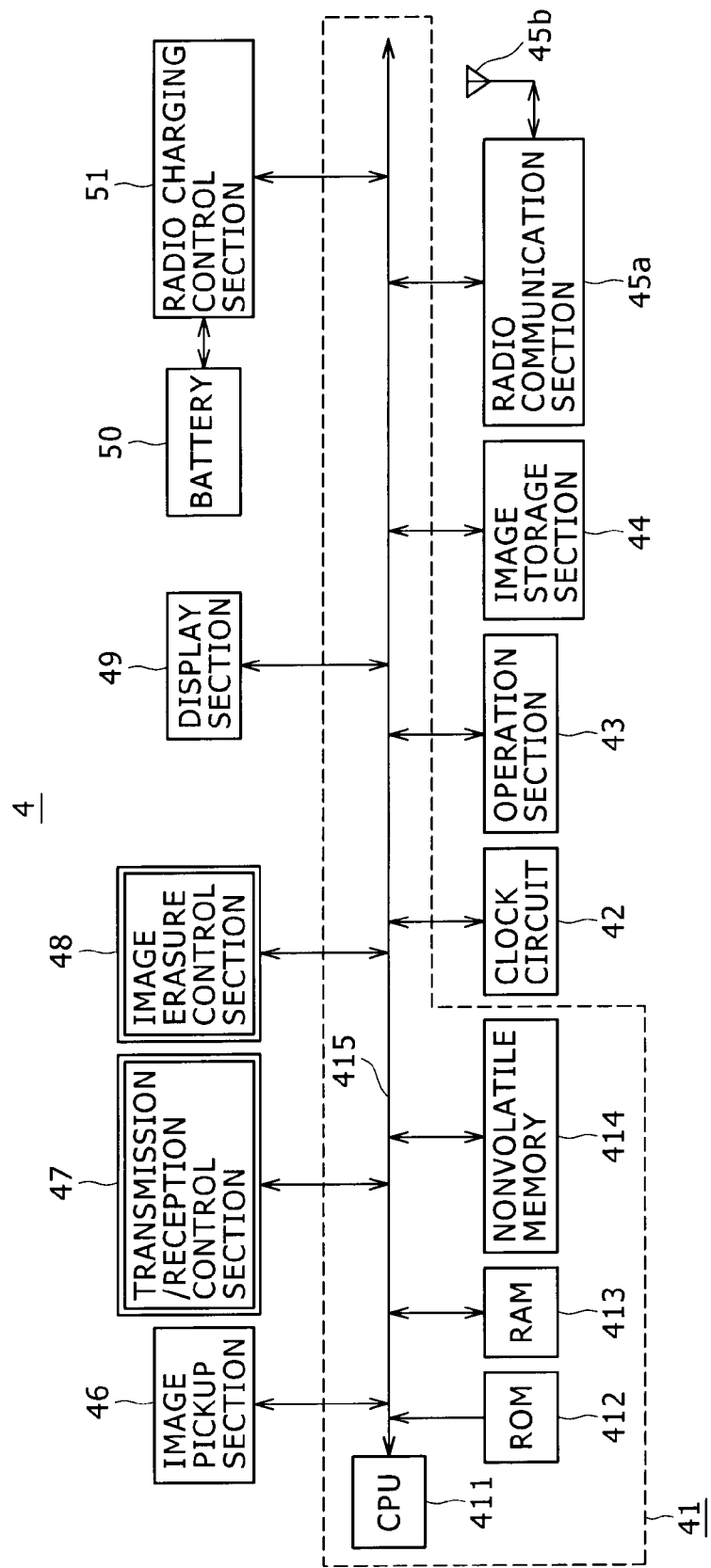

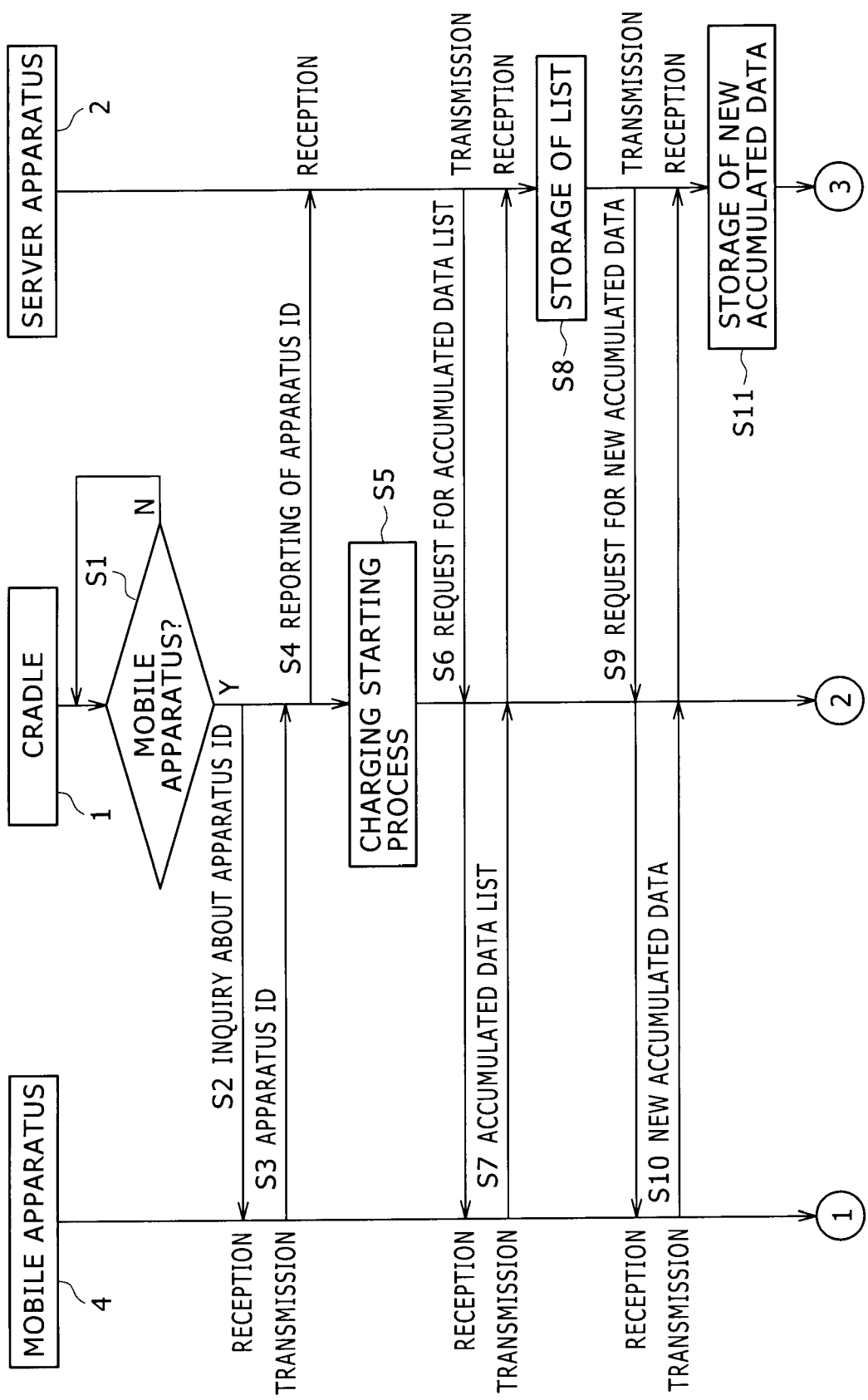

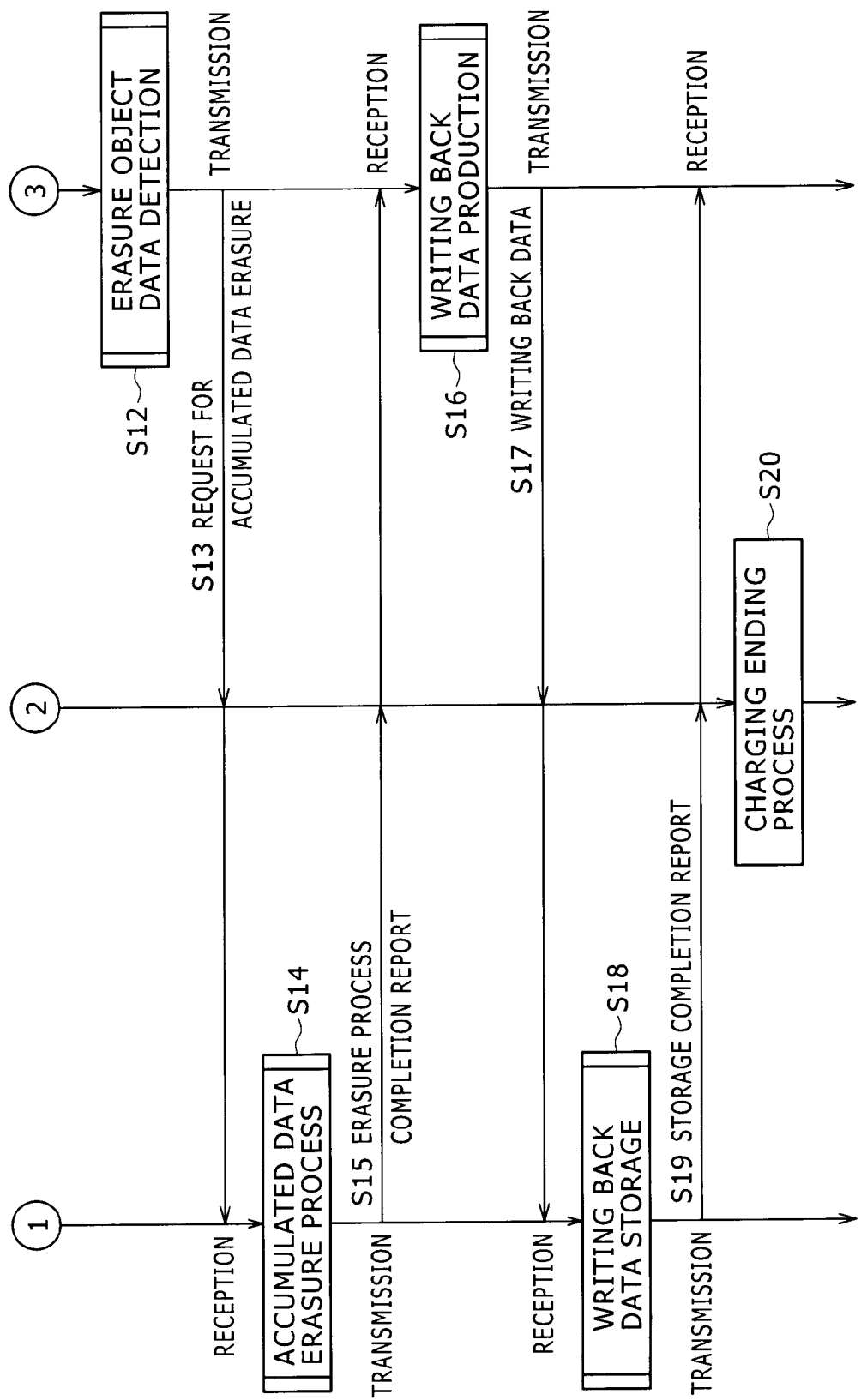

FIG. 7A

EXAMPLE OF LAYOUT OF COMMAND DATA

| TRANSMISSION DESTINATION | TRANSMISSION SOURCE | COMMAND | DATA |
|---|---|---|---|

FIG. 7B

INQUIRY ABOUT APPARATUS ID (FROM CRADLE TO NON-RESPONDING MOBILE APPARATUS)

| NON-RESPONDING APPARATUS | CRADLE | INQUIRY ABOUT APPARATUS ID |
|---|---|---|

FIG. 7C

APPARATUS ID RESPONSE (FROM NON-RESPONDING MOBILE APPARATUS TO CRADLE)

| CRADLE | MOBILE APPARATUS | APPARATUS ID RESPONSE | APPARATUS ID | APPARATUS ATTRIBUTE | OTHERS |
|---|---|---|---|---|---|

FIG. 8

EXAMPLE OF LAYOUT OF ACCUMULATED DATA LIST

| TRANSMISSION DESTINATION | TRANSMISSION SOURCE | DATA ATTRIBUTE | OTHERS | |
|---|---|---|---|---|
| DATA ID | DATA ATTRIBUTE | PRODUCTION DATE AND TIME | DATA SIZE | OTHERS |
| DATA ID | DATA ATTRIBUTE | PRODUCTION DATE AND TIME | DATA SIZE | OTHERS |
| DATA ID | DATA ATTRIBUTE | PRODUCTION DATE AND TIME | DATA SIZE | OTHERS |
| ... | | | | |

FIG. 9

EXAMPLE OF LAYOUT OF ACCUMULATED DATA (ex. INCASE OF IMAGE DATA)

| DATA ID | DATA ATTRIBUTE | PRODUCTION DATE AND TIME | PROTECT | PRINT MARK | DATA SIZE |
|---|---|---|---|---|---|
| APPARATUS ID | OTHERS | | | | |
| NUMBER OF TIMES OF USE | | | | | |
| WRITING BACK DATA | | | | | |

FIG.10

EXAMPLE OF LAYOUT OF WRITING BACK DATA (ex. INCASE OF IMAGE DATA)

| DATA ID | DATA ATTRIBUTE | PRODUCTION DATE AND TIME | DATA SIZE | PROVIDING DESTINATION | ORIGINAL DATA ID | ORIGINAL PRODUCTION DATE AND TIME |
|---|---|---|---|---|---|---|
| ORIGINAL DATA SIZE | OTHERS | | | | | |
| DATA | | | | | | |

FIG.11

EXAMPLE OF LAYOUT OF WRITING BACK HISTORY

| WRITING BACK DATE AND TIME | WRITING BACK DESTINATION | DATA ID | DATA ATTRIBUTE | PRODUCTION DATE AND TIME | DATA SIZE | OTHERS |
|---|---|---|---|---|---|---|
| ..... | ..... | ..... | ..... | ..... | ..... | ..... |

FIG. 32

EXECUTION PROCESS SPECIFICATION TABLE
(WHERE SUBSTANCE OF PROCESS IS REGISTERED INTO MOBILE APPARATUS TYPE)

| MOBILE APPARATUS TYPE | DELETION CONDITION OF ACCUMULATED DATA | TRANSFER DIRECTION | HOME APPARATUS OF OBJECT OF DATA EXCHANGE | TRANSFER CONDITION, ETC. |
|---|---|---|---|---|
| PORTABLE VIDEO PLAYER | DELETE ENJOYED ACCUMULATED DATA | HOME APPARATUS → MOBILE APPARATUS | HDD RECORDER | TRANSFER NON-TRANSFERRED RECORDING CONTENT UP TO FULL CAPACITY |
| PORTABLE AUDIO PLAYER | AUTOMATIC DELETION IS NOT PERFORMED | HOME APPARATUS → MOBILE APPARATUS | PC1 | SYNCHRONIZE SUBSTANCE OF PC1 AND SUBSTANCE OF MOBILE APPARATUS |
| DIGITAL STILL CAMERA | AUTOMATIC DELETION IS NOT PERFORMED | MOBILE APPARATUS → HOME APPARATUS | PC2 | TRANSFER NON-TRANSFERRED PHOTOGRAPH (IMAGE DATA) TO HOME APPARATUS |
| ... | ... | ... | ... | ... |

FIG.33A

EXECUTION PROCESS SPECIFICATION TABLE (DOWN)
(WHERE SUBSTANCE OF PROCESS IS REGISTERED FOR EACH MOBILE APPARATUS)

| MOBILE APPARATUS TYPE | DELETION CONDITION OF ACCUMULATED DATA | HOME APPARATUS OF TRANSFER SOURCE | TRANSFER CONDITION, ETC. |
|---|---|---|---|
| PORTABLE VIDEO PLAYER-1 | DELETE ENJOYED ACCUMULATED DATA | HDD RECORDER | TRANSFER NON-TRANSFERRED RECORDING CONTENT UP TO FULL CAPACITY |
| PORTABLE VIDEO PLAYER-2 | AUTOMATIC DELETION IS NOT PERFORMED | PC1 | TRANSFER NON-TRANSFERRED "COMEDY PROGRAM" IF ANY |
| ... | ... | ... | ... |

FIG.33B

EXECUTION PROCESS SPECIFICATION TABLE (UP)
(WHERE SUBSTANCE OF PROCESS IS REGISTERED FOR EACH MOBILE APPARATUS)

| MOBILE APPARATUS TYPE | DELETION CONDITION OF ACCUMULATED DATA | HOME APPARATUS OF TRANSFER DESTINATION | TRANSFER CONDITION, ETC. |
|---|---|---|---|
| DIGITAL STILL CAMERA | DELETE AFTER TRANSFER | PC2 | TRANSFER ALL STILL PICTURE DATA TO HOME APPARATUS |
| DIGITAL VIDEO CAMERA | AUTOMATIC DELETION IS NOT PERFORMED | NAS | TRANSFER NON-TRANSFERRED MOVING IMAGE DATA TO HOME APPARATUS |
| ... | ... | ... | ... |

FIG. 34

EXECUTION PROCESS SPECIFICATION TABLE
(WHERE SUBSTANCE OF PROCESS IS REGISTERED FOR EACH MOBILE APPARATUS TYPE: WITH CONTROL BASED ON FLAG)

| MOBILE APPARATUS TYPE | DELETION CONDITION OF ACCUMULATED DATA | TRANSFER DIRECTION | HOME APPARATUS OF OBJECT OF DIGITAL CONVERSION | TRANSFER CONDITION, ETC. |
|---|---|---|---|---|
| PORTABLE VIDEO PLAYER | DELETE ENJOYED ACCUMULATED DATA | HOME APPARATUS → MOBILE APPARATUS | HDD RECORDER | TRANSFER CONTENT WHOSE TRANSFER FLAG IS SET IN HDD RECORDER |
| DIGITAL STILL CAMERA | AUTOMATIC DELETION IS NOT PERFORMED | MOBILE APPARATUS → HOME APPARATUS | PHOTOGRAPH SHARING SERVICE OF INTERNET (URL: ---) | TRANSFER IMAGE DATA WHOSE SHARING FLAG IS SET IN CAMERA |
| ... | ... | ... | ... | ... |

FIG.35A

RECORDED PROGRAM INFORMATION TABLE IN HDD RECORDER

| DATA ID | PROGRAM NAME | RECORDING INFORMATION | TRANSFER FLAG |
|---|---|---|---|
| 1 | O× COMPREHENSIVE DICTIONARY | Ch4 08/02/12 8:00PM | NO |
| 2 | COMEDY DIAL 110 | Ch8 08/02/15 8:00PM | YES |
| 3 | NEWS | Ch1 08/02/15 7:00PM | NO |
| ... | ... | ... | ... |

FIG.35B

PICKED UP IMAGE INFORMATION TABLE IN DIGITAL STILL CAMERA

| DATA ID | DATA FORMAT | IMAGE PICKUP DATA AND TIME | SHARING FLAG |
|---|---|---|---|
| 250 | JPEG | Ch4 08/02/12 5:00PM | NO |
| 251 | JPEG | Ch8 08/02/15 5:01PM | YES |
| 252 | JPEG | Ch1 08/02/15 5:02PM | NO |
| ... | ... | ... | ... |

FIG. 36

EXECUTION PROCESS SPECIFICATION TABLE (TABLE USED IN EMBODIMENT)

| NO. | MOBILE APPARATUS TYPE | USER ID | DATA TYPE | DELETION CONDITION OF ACCUMULATED DATA | TRANSFER DIRECTION | HOME APPARATUS OF OBJECT OF DATA EXCHANGE | TRANSFER CONDITION, ETC. |
|---|---|---|---|---|---|---|---|
| 1 | PORTABLE VIDEO PLAYER | — | MOVING PICTURE | DELETE ENJOYED ACCUMULATED DATA | HOME APPARATUS → MOBILE APPARATUS | HDD RECORDER | TRANSFER NON-TRANSFERRED RECORDING CONTENT UP TO FULL CAPACITY |
| 2 | DIGITAL STILL CAMERA-1 | — | STILL PICTURE | DELETE AFTER TRANSFER | MOBILE APPARATUS → HOME APPARATUS | NAS | TRANSFER ALL PICKED UP IMAGE DATA TO NAS |
| 3 | PORTABLE TELEPHONE TERMINAL-1 | 001 | STILL PICTURE, MAIL | NOT DELETED | MOBILE APPARATUS → HOME APPARATUS | PC1 | TRANSFER PICKED UP IMAGE DATA AND MAIL DATA, AND UPDATE ADDRESS BOOK BASED ON OTHER MAIL DATA |
| 4 | PORTABLE TELEPHONE TERMINAL-2 | 002 | STILL PICTURE | DELETE AFTER TRANSFER | MOBILE APPARATUS → HOME APPARATUS | PC2 | TRANSFER PICKED UP IMAGE DATA |
| 5 | DIGITAL STILL CAMERA-2 | — | STILL PICTURE | NOT DELETED | MOBILE APPARATUS → HOME APPARATUS | PHOTOGRAPH SHARING SERVICE OF INTERNET (URL: ———) | TRANSFER PICKED UP IMAGE DATA |
| ... | ... | | | | ... | ... | ... |

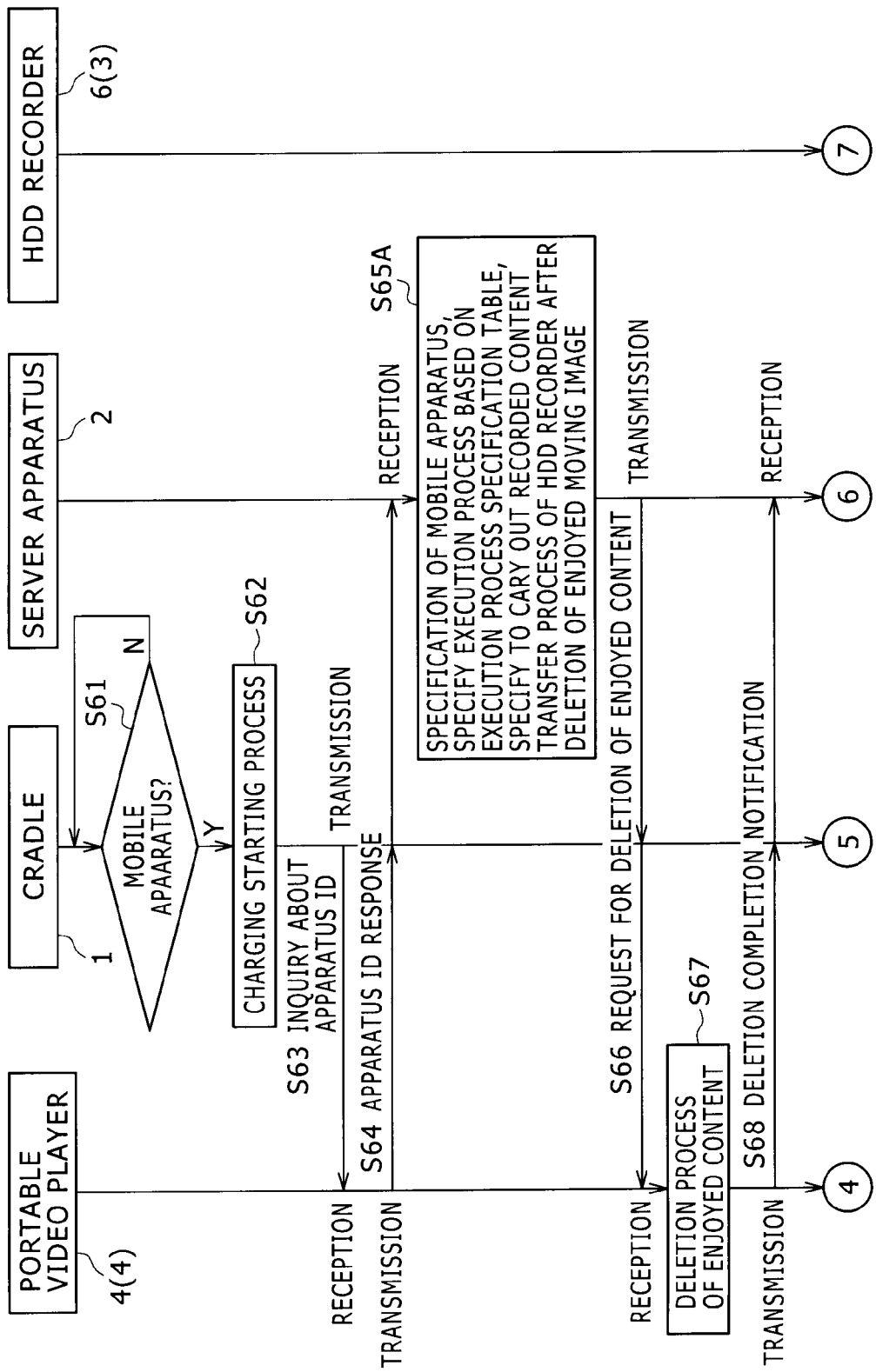

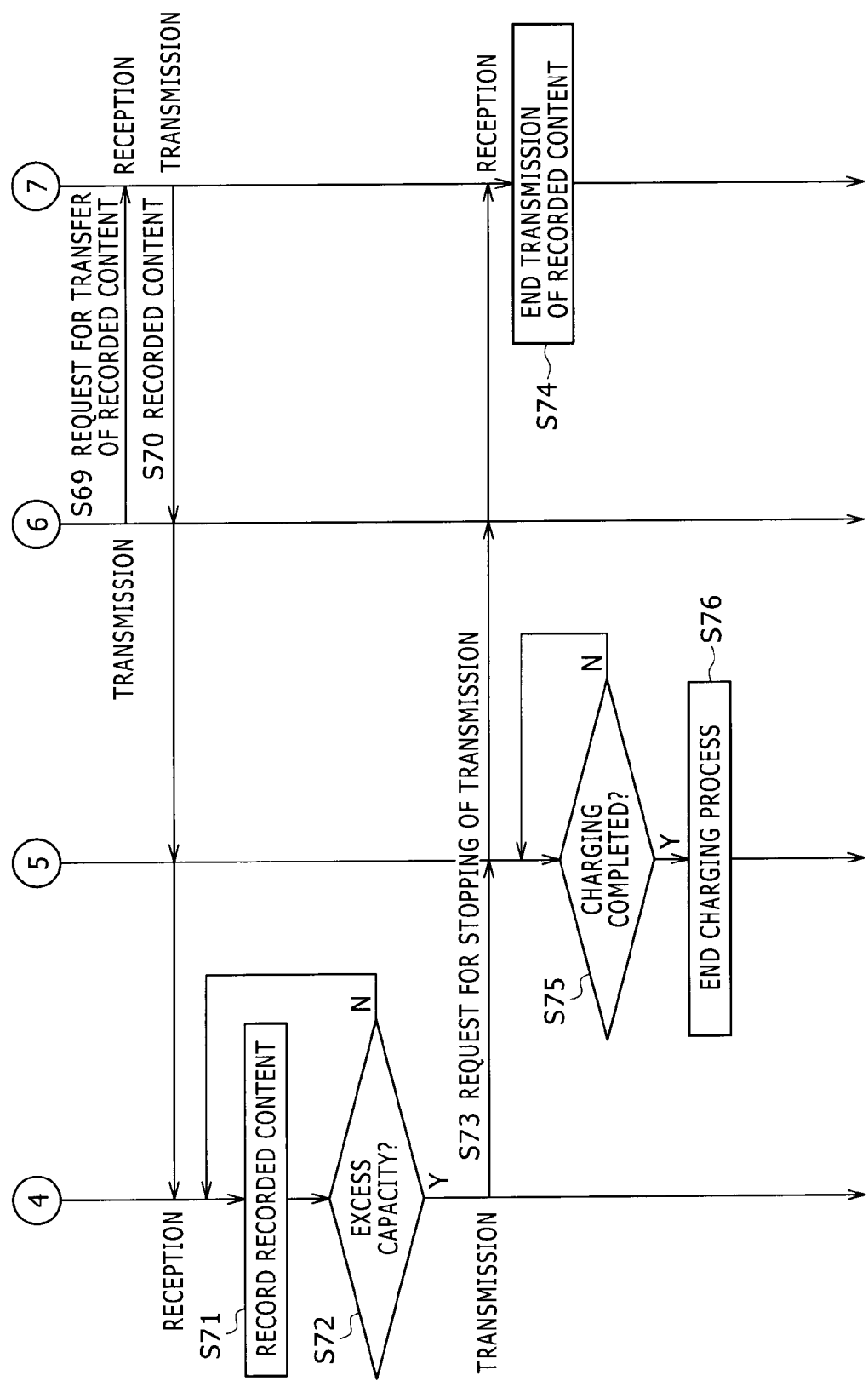

FIG.39

EXAMPLE OF LAYOUT OF ACCUMULATED DATA IN PORTABLE VIDEO PLAYER 4(4)

| APPARATUS ID | DATA ID | DATA ATTRIBUTE | PRODUCTION DATE AND TIME | PROTECT | DATA SIZE | ENJOYMENT FLAG |
|---|---|---|---|---|---|---|
| OTHERS | | | | | | |
| MOVING IMAGE DATA | | | | | | |

FIG. 40

EXAMPLE OF LAYOUT OF ACCUMULATED DATA OF HDD RECORDER 6(3)

| DATA ID | DATA ATTRIBUTE | PROGRAM NAME | RECORDING INFORMATION | TRANSFER COMPLETION FLAG |
|---|---|---|---|---|
| OTHERS | | | | |
| MOVING IMAGE DATA (RECORDED CONTENT) | | | | |

DATA COMMUNICATION SYSTEM, CRADLE APPARATUS, SERVER APPARATUS, DATA COMMUNICATION METHOD AND DATA COMMUNICATION PROGRAM

CROSS REFERENCES TO RELATED APPLICATIONS

The present invention contains subject matter related to Japanese Patent Application JP 2007-111469 filed in the Japan Patent Office on Apr. 20, 2007, and Japanese Patent Applications JP 2008-98484, JP 2008-98483 and JP 2008-98485 filed in the Japan Patent Office on Apr. 4, 2008, the entire contents of which are incorporated herein by reference.

BACKGROUND OF THE INVENTION

1. Field of the Invention

This invention relates to a system formed using a cradle apparatus to mediate transmission and reception of data between various portable electronic apparatus or mobile apparatus such as, for example, a portable telephone terminal, a digital camera and a portable music reproduction apparatus and a server apparatus such as a personal computer, and an apparatus, a method and a program for use with the system.

2. Description of the Related Art

As mobile apparatus which can be carried and used, portable music reproduction apparatus and portable video/audio reproduction apparatus are utilized. As portable music reproduction apparatus, an MD player wherein an MD (Mini Disc; trademark) is used as a recording medium, a memory player wherein a semiconductor memory is used as a recording medium, a hard disk recorder wherein a hard disk is used as a recording medium and so forth are available. Meanwhile, as portable video/audio reproduction apparatus, for example, a notebook type personal computer, a game machine and so forth are implemented, and also a portable video/audio reproduction apparatus for exclusive use is provided.

In such portable music reproduction apparatus and portable video/audio reproduction apparatus as described above, music data or AV data, which are data composed of video data and audio data to be reproduced in synchronism with each other, to be utilized must be recorded on a recording medium which can be utilized on such portable music reproduction apparatus and portable video/audio reproduction apparatus or in a recording medium built in such apparatus. In particular, in order to use a portable music reproduction apparatus or a portable video/audio reproduction apparatus to utilize object content data, prior preparations of recording the object content data on an object recording medium are required.

However, it is cumbersome for a user itself to separately carry out a work of recording content data, which the user wants to utilize on a portable music reproduction apparatus and portable video/audio reproduction apparatus, on an object recording medium. Further, where sufficient time is not available, the work of recording content data on an object recording medium may not be carried out.

SUMMARY OF THE INVENTION

Taking the foregoing into consideration, it is desirable to provide a data communication system, a cradle apparatus, a server apparatus, a data communication method and a data communication program by which a mobile apparatus or portable electronic apparatus can be linked to a different apparatus without any participation of a user to enhance the convenience in use of the mobile apparatus and so forth.

BRIEF DESCRIPTION OF THE DRAWINGS

FIG. 4 is a block diagram showing an example of a configuration of a digital still camera or a digital video camera which is an example of a mobile apparatus which is placed on the cradle used in the data communication system shown in FIG. 1;

FIGS. 5 and 6 are timing charts illustrating operation of the entire data communication system of FIG. 1;

FIGS. 7A, 7B and 7C are diagrammatic views illustrating examples of a layout of command data and particular example of the command data;

FIG. 8 is a diagrammatic view illustrating an example of a layout of an accumulated data list;

FIG. 9 is a diagrammatic view illustrating an example of a layout of accumulated data;

FIG. 10 is a diagrammatic view illustrating an example of a layout of writing back data;

FIG. 11 is a diagrammatic view illustrating an example of a layout of a writing back history;

FIG. 32 is a view illustrating an example of a configuration of an execution process specification table formed by registering the substances of processes for different mobile apparatus types;

FIGS. 33A and 33B are views illustrating different examples of a configuration of an execution process specification table formed by registering the substances of processes for different mobile apparatus;

FIG. 34 is a view illustrating an example of a configuration of an execution process specification table wherein the substances of processes are registered for different mobile apparatus types and use also flag information of accumulated data;

FIGS. 35A and 35B are views illustrating different examples of a layout of accumulated data having flag information;

FIG. 36 is a view illustrating an example of a configuration of an execution process specification table formed in a nonvolatile memory of the server apparatus;

FIGS. 37 and 38 are sequence diagrams illustrating general operation of a data communication system of a first example of the second embodiment of the present invention;

FIG. 39 is a view illustrating an example of a layout of moving image data as accumulated data stored and retained in a content storage section of a portable video player;

FIG. 40 is a view illustrating an example of a layout of a recorded content as accumulated data stored and retained in a hard disk drive of the HDD recorder;

DETAILED DESCRIPTION OF THE PREFERRED EMBODIMENTS

In the following, a system, an apparatus, a program and a method to which the present invention is applied are described.

First Embodiment

[Outline of the Data Communication System of the First Embodiment]

Figure 1:
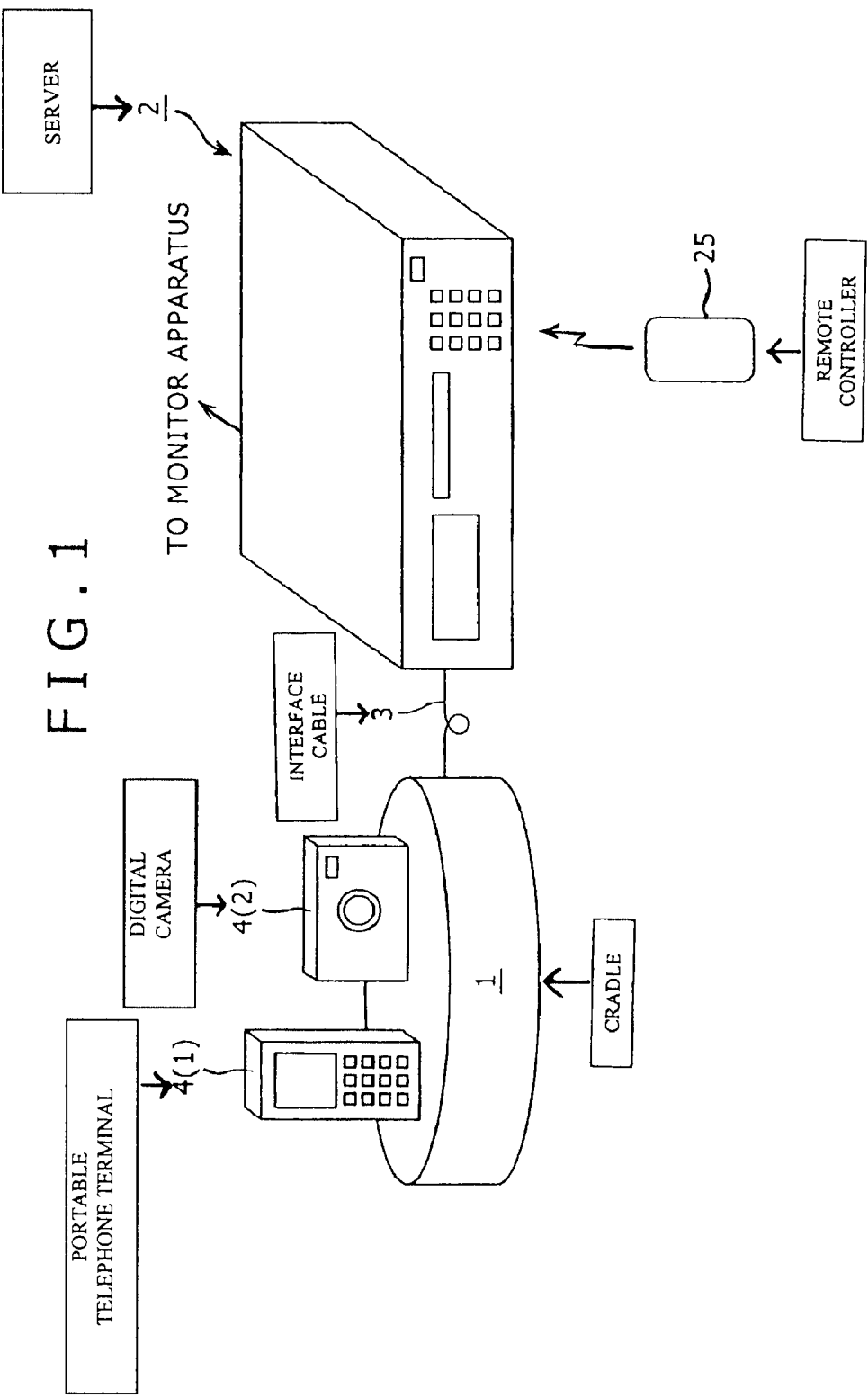
FIG. 1 is a schematic view showing a general configuration of a data communication system according to a first embodiment of the present invention.

FIG. 1 shows a general configuration of a data communication system to which the present invention is applied.

Referring to FIG. 1, the data communication system shown includes a cradle 1 and a server apparatus 2 connected to each other through an interface cable 3. While the cradle 1 and the server apparatus 2 are connected to each other by a wire, they may otherwise be connected to each other by radio in accordance with a predetermined radio interface.

The cradle 1 has a function of mediating transmission and reception of data carried out between various mobile apparatus mounted on the cradle 1 and a server apparatus 2. Further, the cradle 1 has also a function of charging a mobile apparatus placed thereon.

In the present embodiment, various mobile apparatus and the cradle 1 do not require direct connection between contacts for feeding or between contacts for communication. In particular, feeding is carried out by electromagnetic induction while transmission and reception of data are carried out by short distance wireless communication. However, different frequency bands are used so that the charging process and the communication process may not have an influence on each other.

It is to be noted that the cradle 1 can receive various mobile apparatus having a function of receiving supply of power from the cradle 1 to charge a battery therein or another function of communicating with the cradle 1 by short distance wireless communication of both of the functions such as, for example, a camera-equipped portable telephone terminal, a digital still camera, a digital video camera or a portable music reproduction apparatus such that the apparatus can receive supply of power from the cradle 1 or/and communicating with the cradle 1.

In particular, the cradle 1 is not for exclusive use with a predetermined mobile apparatus but for universal use such that various apparatus can be utilized on the cradle 1. Further, the cradle 1 can receive a plurality of mobile apparatus thereon at a time such that the mobile apparatus can receive supply of power from the cradle 1 and can individually communicate with the cradle 1.

The server apparatus 2 includes a recording apparatus of a large capacity and can receive, store and retain accumulation data transmitted from various mobile apparatus through the cradle 1. Further, the server apparatus 2 can issue an instruction to execute a process and provide necessary information to a mobile apparatus loaded on the cradle 1 through the cradle 1. The server apparatus 2 is implemented, for example, as a hard disk recorder or a personal computer or as a server apparatus for exclusive use where a home network system is constructed.

In the data communication system of the present embodiment, if, for example, a camera-equipped portable telephone terminal 4(1) is placed on the cradle 1, then still image data picked up newly and accumulated in the camera-equipped portable telephone terminal 4(1) are transmitted to the server apparatus 2 through the cradle 1 in response to a request from the server apparatus 2 transmitted through the cradle 1 so that the still image data can be recorded as backup data into the recording apparatus of the server apparatus 2.

Further, in response to an erasure instruction from the server apparatus 2, still image data accumulated in the camera-equipped portable telephone terminal 4(1) stored as backup data in the server apparatus 2 can be erased. In this instance, all of still image data stored as backup data are not erased, but those still image data which can be estimated as important still image data from incidental information to the still image data or the like can be left without being deleted. These incidental information indicate whether the data are protected, the printing marking are added to the data, or the like.

Further, as regards still image data erased as described above, a reduced image can be reproduced based on still image data whose backup data are stored in the server apparatus 2 and transferred from the server apparatus 2 to the camera-equipped portable telephone terminal 4(1) through the cradle 1. Consequently, it is possible to appropriately recognize it on the camera-equipped portable telephone terminal 4(1) what still image data are erased after backed up without wastefully using the memory of the camera-equipped portable telephone terminal 4(1).

It is to be noted that, while it is described above as an example that still image data accumulated in the camera-equipped portable telephone terminal 4(1) are handled, if a digital video camera is placed as a mobile apparatus on the cradle 1, then moving image data are determined as a processing object. Thus, moving image data picked up newly are erased in response to an erasure instruction from the server apparatus 2 after they are backed up into the server apparatus 2.

Where moving image data is the processing object, the server apparatus 2 produces moving image data for digest reproduction to be used for digest reproduction of the moving image data and returns the moving image data to the digital video camera as the mobile apparatus. Consequently, a digest version of the moving image data backed up in the server apparatus 2 can be confirmed at any time.

On the other hand, where the mobile apparatus is a portable music reproduction apparatus, music data accumulated in the portable music reproduction apparatus may not necessarily be backed up because they are backed up in a server apparatus already or stored and retained in a recording medium such as a CD (Compact Disk). In such an instance, for example, only music data of a trial version which allows trial enjoyment of part of music data which have become available newly can be provided to the portable music reproduction apparatus without carrying out backup storage of the storage data.

That is, in the case that the mobile apparatus is a portable music reproduction apparatus, the server apparatus 2 can select music data which have not provided before to the portable music reproduction apparatus among the music data stored in the server apparatus 2 and provide the selected music data to the portable music reproduction apparatus, and the server apparatus 2 can fetch the music data which can newly be provided from a server on the Internet to provide it or a part of it to the portable music reproduction apparatus.

In this instance, information to be returned to the mobile apparatus, that is, data for the mobile apparatus, differs depending upon the apparatus of the opposite party of communication, data of the processing object and so forth. Therefore, the server apparatus 2 can specify what data should be prepared and returned as data for the mobile apparatus based on an apparatus attribute transferred from the mobile apparatus, based on a transmission history in the past to the object mobile apparatus managed by the server apparatus 2, based on a data attribute of the data accumulated in the object mobile apparatus or based on an instruction input from a user accepted by the server apparatus 2.

Here, the apparatus attribute indicates a type or kind of an apparatus such as a digital still camera, a digital video camera or a portable telephone terminal. Meanwhile, the data attribute indicates a type or kind of data such as still image data, moving image data or sound data.

In this manner, in the data communication system of the present embodiment, only if any mobile apparatus is placed on the cradle 1, then (1) backup storage of data accumulated in the mobile apparatus, (2) erasure or management of data accumulated in the mobile apparatus and (3) provision of necessary data to the mobile apparatus can be carried out so that a normally appropriate utilization state of the portable electronic apparatus can be maintained without bothering the user thereby to improve the convenience in use of the portable electronic apparatus.

[Example of a Configuration of Apparatus which Construct the Data Communication System]

Now, an example of a configuration of the apparatus which construct the data communication system according to the present embodiment is described. In the following description, an example of a configuration of the cradle 1 and the server apparatus 2 and an example of a configuration of a digital still camera or a digital video camera as an example of the mobile apparatus to be placed on the cradle 1 are described.

[Example of a Configuration of the Cradle 1]

Figure 2:
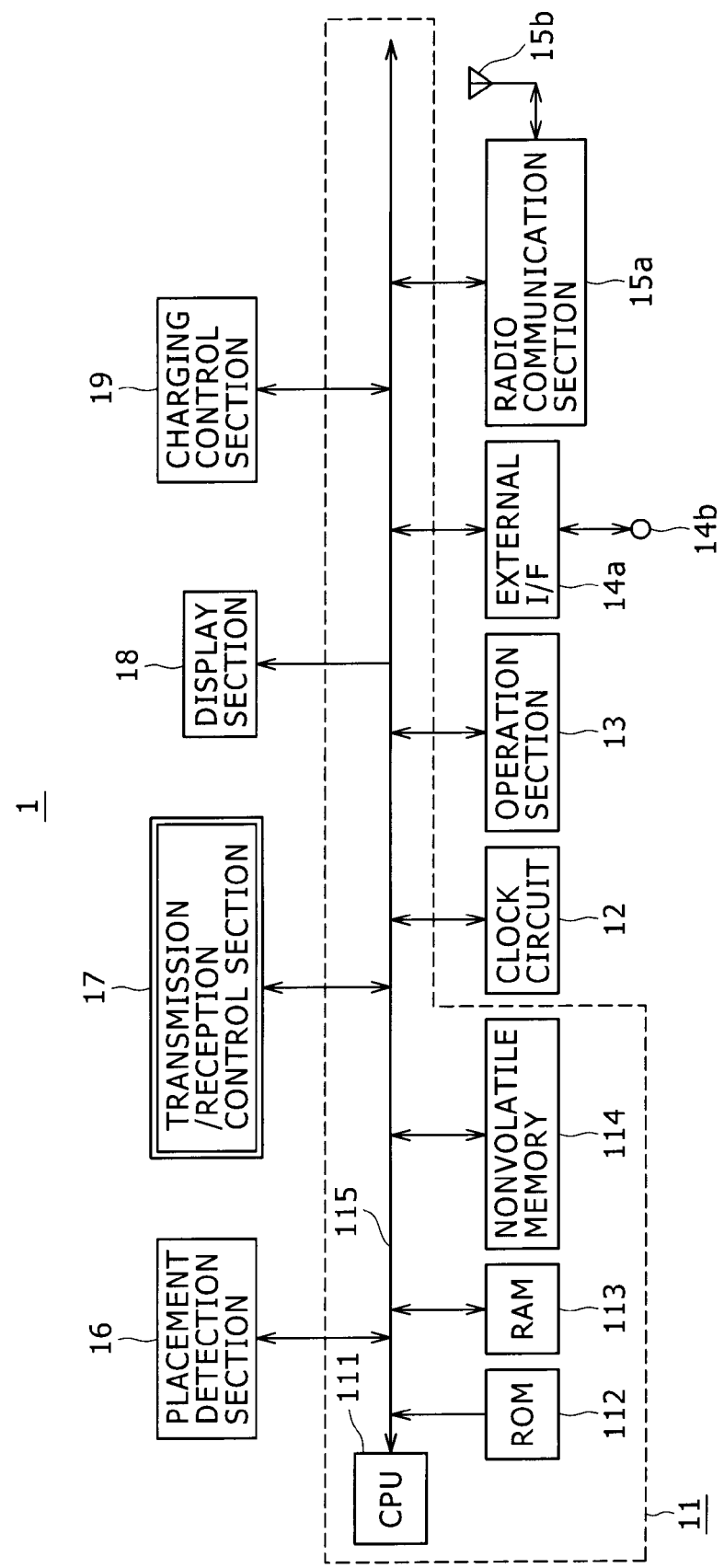
FIG. 2 is a block diagram showing an example of a configuration of a cradle used in the data communication system shown in FIG. 1.

FIG. 2 shows an example of a configuration of the cradle 1 used in the data communication system according to the present embodiment. Referring to FIG. 2, the cradle 1 shown includes a control section 11, a clock circuit 12, an operation section 13, an external interface (I/F) 14a, an input/output terminal 14b, a radio communication section 15a, and a transmission/reception antenna 15b. The cradle 1 further includes a placement detection section 16, a transmission/reception control section 17, a display section 18, and a charging control section 19.

The control section 11 controls the components of the cradle 1 and is formed as a microcomputer including a CPU (Central Processing Unit) 111, a ROM (Read Only Memory) 112, a RAM (Random Access Memory) 113 and a nonvolatile memory 114 such as an EEPROM (Electrically Erasable and Programmable ROM) or a flash memory which are connected to each other by a CPU bus 115.

The CPU 111 serves as a core of control which executes a program stored and retained in the ROM 112 to form control signals and supplies the control signals to the appropriate components of the cradle 1 to control the components. The ROM 112 stores programs to be executed by the CPU 111 and further stores data and so forth in advance which are required in various processes.

The RAM 113 is used as a working area principally for temporarily storing midway results of processing. The nonvolatile memory 114 stores and retains data to be retained even if power supply to the cradle 1 is turned off such as, for example, various setting parameters and additional programs for additional provision of functions.

The clock circuit 12 includes a calendar function and provides the year, month and day at present, a day of the week at present and the time at present. The operation section 13 has operation keys such as, for example, numeral keys and various function keys and can accept an operation input from a user, convert the operation input into an electric signal and send the electric signal to the control section 11. Consequently, an instruction input accepted through the operation section 13 is supplied as an electric signal to the control section 11, and the control section 11 can control the components of the cradle 1 in response to an instruction from the user to carry out a process in accordance with the instruction of the user.

The input/output terminal 14b forms a connection terminal portion to an external apparatus, and, in the present embodiment, the server apparatus 2 is connected to the input/output terminal 14b through the interface cable 3. The external interface 14a has a function of converting data to be signaled from the cradle 1 into data of a format for signaling and a function of converting data supplied from the outside into data of a format which can be processed in the cradle 1. The radio communication section 15a and the transmission/reception antenna 15b carry out data communication by short distance wireless communication to the mobile apparatus placed on the cradle 1.

It is to be noted that, for the short distance wireless communication, a radio technique for transmitting and receiving data using a radio wave in a wide frequency band such as several GHz (Giga Hertz) called UWB (Ultra Wide Band), a short distance radio communication technique called Bluetooth and other various short distance radio communication techniques can be used.

The placement detection section 16 detects whether or not a mobile apparatus which can communicate data or can be charged is placed on the cradle 1. The placement detection section 16 can electrically detect placement of a mobile apparatus on the cradle 1. For example, if the radio communication section 15a is controlled to signal a request for response at predetermined intervals and a mobile apparatus which responds to the request for response is detected, then the placement detection section 16 can detect that a mobile apparatus is placed on the cradle 1.

Alternatively, a sensor such as a piezoelectric sensor may be provided. In this instance, if it is detected through the piezoelectric sensor that some article is placed on a receiving portion of the cradle 1 which receives a mobile apparatus, that is, that a pressure is applied to the receiving portion, then the radio communication section 15a is controlled to signal a response request. Then, if some mobile apparatus responds to the response request, then it can be detected that a mobile apparatus is placed on the cradle 1. In this instance, there is no necessity to normally transmit a response request at predetermined intervals, but when it is detected that some article is placed on the cradle 1, it may be detected whether or not the article placed is a mobile apparatus which can communicate. Therefore, addition of the radio communication section 15a and so forth can be moderated.

The transmission/reception control section 17 controls transmission and reception to and from a mobile apparatus via the radio communication section 15a and the transmission/reception antenna 15b, and transmission and reception to and from the server apparatus 2 through the external interface 14a and the input/output terminal 14b. In particular, the transmission/reception control section 17 controls a process of transmitting information from a mobile apparatus received through the radio communication section 15a and the transmission/reception antenna 15b to the server apparatus 2 through the external interface 14a and the input/output terminal 14b. The transmission/reception control section 17 further controls a process of conversely transmitting information from the server apparatus 2 received through the external interface 14a and the input/output terminal 14b to the mobile apparatus through the radio communication section 15a and the transmission/reception antenna 15b.

In this manner, the transmission/reception control section 17 can implement a function as a relay control section for repeating communication between the mobile apparatus and the server apparatus 2. Naturally, the transmission/reception control section 17 can control a communication process carried out between the mobile apparatus and the cradle 1 merely through the radio communication section 15a and the transmission/reception antenna 15b and a communication process carried out between the server apparatus 2 and the cradle 1 through the external interface 14a and the input/output terminal 14b.

It is to be noted that the functions of the transmission/reception control section 17 indicated by double lines in FIG. 2 can be implemented also as functions of the control section 11 by a program or software executed by the CPU 111. Further, where a piezoelectric sensor or the like is not used for the placement detection section 16, it can carry out detection of placement of a mobile apparatus through communication through the radio communication section 15a and the transmission/reception antenna 15b. Therefore, it is possible to implement the function of the placement detection section 16 also as a function of the control section 11 by a program or software executed by the CPU 111.

The display section 18 includes a display device such as, for example, an LCD (Liquid Crystal Display) apparatus or an organic EL panel (Organic Electroluminescence panel) and a control circuit for the display device. The display section 18 can display various kinds of display information such as characters, symbols and pictures to display guidance messages, alarming messages and indications representative of operation states under the control of the control section 11.

The charging control section 19 supplies power by electromagnetic induction to a mobile apparatus placed on the cradle 1 to charge the battery incorporated in the mobile apparatus as described above.

If the cradle 1 detects that a mobile apparatus is placed thereon through the placement detection section 16, then it uses the function of the transmission/reception control section 17 to control the external interface 14a to notify the server apparatus 2 of such placement of the mobile apparatus connected to the cradle 1 through the input/output terminal 14b.

Further, the cradle 1 receives accumulated data provided from the mobile apparatus placed thereon through the radio communication section 15a and the transmission/reception antenna 15b under the control of the transmission/reception control section 17 in accordance with an instruction provided from the server apparatus 2 through the input/output terminal 14b and the external interface 14a. Further, the cradle 1 controls the external interface 14a to provide the received accumulated data to the server apparatus 2 connected to the cradle 1 through the input/output terminal 14b.

Furthermore, the cradle 1 can receive a data erasure instruction or rewinding data provided from the server apparatus 2 through the input/output terminal 14b and the external interface 14a and transmit such erasure instruction or rewinding data to the mobile apparatus placed on the cradle 1 through the radio communication section 15a and the transmission/reception antenna 15b under the control of the transmission/reception control section 17.

In this manner, in the cradle 1, the radio communication section 15a and the transmission/reception antenna 15b implement a function as a first communication section for communicating with a mobile apparatus, and the external interface 14a and the input/output terminal 14b implement a function as a second communication section for communicating with a server apparatus.

Further, the placement detection section 16 implements a function as a placement detection section, and the transmission/reception control section 17 implements a function as a communication control section for notifying, when the transmission/reception control section 17 detects that a mobile apparatus is placed on the cradle 1, a server apparatus of such placement and a function as a relay control section for controlling communication between the mobile apparatus placed on the cradle 1 and the server apparatus.

[Example of a Configuration of the Server Apparatus 2]

Figure 3:
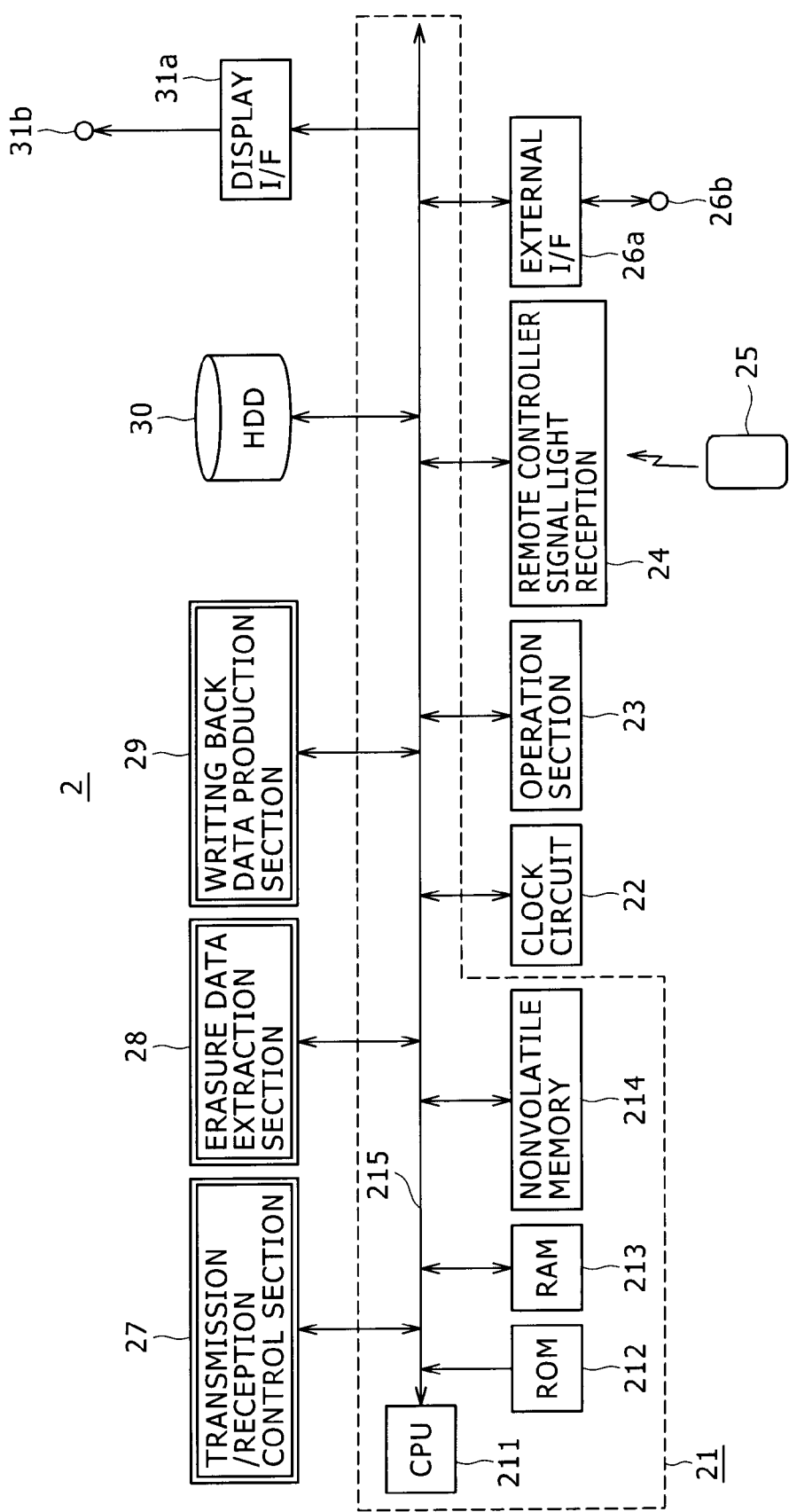
FIG. 3 is a block diagram showing an example of a configuration of a server apparatus used in the data communication system shown in FIG. 1.

FIG. 3 shows an example of a configuration of the server apparatus 2 used in the data communication system. Referring to FIG. 3, the server apparatus 2 shown includes a control section 21, a clock circuit 22, an operation section 23, a remote controller signal light reception section 24, an external interface (I/F) 26a, and an input/output terminal 26b. The server apparatus 2 further includes a transmission/reception control section 27, an erasure data extraction section 28, a writing back data production section 29, a hard disk driver 30, a display interface (I/F) 31a, and an output terminal 31b for an image signal. A remote controller 25 for exclusive use is provided for the server apparatus 2.

The control section 21 controls the components of the server apparatus 2 and is formed from a microcomputer including a CPU 211, a ROM 212, a RAM 213 and a nonvolatile memory 214 connected to each other by a CPU bus 215.

The CPU 211 serves as a core of control which executes a program stored and retained in the ROM 212 to form and supply control signals to pertaining components of the server apparatus 2 to control the components of the server apparatus 2. The ROM 212 stores programs to be executed by the CPU 211 and data and so forth required in various processes in advance therein.

The RAM 213 is used as a working area principally for temporarily storing midway results of processing and so forth. The nonvolatile memory 214 may be formed from an EEPROM, a flash memory or the like and stores and retains data to be retained even if power supply to the server apparatus 2 is turned off such as, for example, various setting parameters and additional programs for additional provision of functions.

The clock circuit 22 includes a calendar function and provides the year, month and day at present, a day of the week at present and the time at present. The operation section 23 has operation keys such as, for example, numeral keys and various function keys and can accept an operation input from a user, convert the operation input into an electric signal and send the electric signal to the control section 21. Consequently, an instruction input accepted through the operation section 23 is supplied as an electric signal to the control section 21, and the control section 21 can control the components of the server apparatus 2 in response to an instruction from the user to carry out a process in accordance with the instruction of the user.

It is to be noted that the operation section 23 may be provided on the body of the server apparatus 2 or may otherwise be provided as a keyboard apparatus having numeral keys, alphabet keys, function keys and so forth separate from the server apparatus 2. Or the operation section 23 may be provided as a pointing device such as a mouse or may include a plurality of such devices.

The remote controller signal light reception section 24 receives a remote control signal in the form of an infrared ray from the remote controller 25, converts the remote control signal into an electric signal and signals the electric signal to the control section 21. The remote controller 25 includes various operation keys, and can accept an operation input from a user, form a remote control signal of an infrared ray in accordance with the accepted operation input and signal the remote control signal.

Thus, even if the user is at a remote place from the server apparatus 2, if it is within a range within which a remote control signal can be communicated, then the user can use the remote controller signal light reception section 24 and the remote controller 25 to issue an instruction to the server apparatus 2 to remotely control the server apparatus 2.

The input/output terminal 26b forms a connection terminal portion to an external apparatus such that the cradle 1 is connected thereto through the interface cable 3. The external interface 26a has a function of converting data to be signaled from the server apparatus 2 into data of a format for signaling and a function of converting data supplied from the outside into data of a format in which the data can be processed in the server apparatus 2.

The transmission/reception control section 27 controls a communication process with the cradle 1 connected to the server apparatus 2 through the external interface 26a and the input/output terminal 26b. In particular, the transmission/reception control section 27 controls a process of transmitting information from the server apparatus 2 to the cradle 1 or a mobile apparatus 4 placed on the cradle 1 through the cradle 1 and a process of receiving information transmitted from the cradle 1 or the mobile apparatus 4 placed on the cradle 1 through the cradle 1.

The erasure data extraction section 28 receives, from a mobile apparatus placed on the cradle 1, provision of data accumulated in the mobile apparatus, that is, accumulated data, and backup records the data on a hard disk of the hard disk driver 30. Further, the erasure data extraction section 28 detects and specifies data to be erased from the mobile apparatus from among the backed up accumulation data.

Although a detailed extraction process is hereinafter described, where accumulated data are estimated to be significant since, for example, protect information or printing marking is added thereto, they are specified as accumulated data to be maintained, but those accumulated data which are not estimated to be significant are specified as erasure data to be erased.

Those data specified as data to be erased by the erasure data extraction section 28 are conveyed to the mobile apparatus through the cradle 1 so that they may be erased from the mobile apparatus thereby to assure a storage capacity of the memory of the mobile apparatus 4.

The writing back data production section 29 compresses erasure data to produce compressed data and returns the compressed data to the mobile apparatus 4 in order to allow the mobile apparatus 4 to recognize, for example, what accumulated data have been extracted and specified by the erasure data extraction section 28 and erased from the memory of the mobile apparatus 4.

Naturally, writing back data are not restrictively formed based on erasure data and used for such writing back as described above, but writing back data or provision data here may be formed from various data to be provided to the mobile apparatus 4 and then provided to the mobile apparatus 4. It is to be noted that, in the following description, it is described that writing back data are produced from accumulated data to be erased from the mobile apparatus 4 for simplified description.

For example, where accumulated data to be erased are still image data, the writing back data production section 29 may produce and prepare a reduced image of the still image data as writing back data. Where accumulated data to be erased are moving image data, the writing back data production section 29 may produce and prepare moving image data of a digest version for reproducing a digest image of the moving image data. Where accumulated data to be erased are music data, the writing back data production section 29 may produce and prepare music data of a reduction version including, for example, only a top portion of the music data for several to approximately 10 seconds.

It is to be noted that, in the data communication system, since the mobile apparatus 4 handles still image data or moving image data, for example, like a camera-equipped portable telephone terminal, a digital still camera or a digital video camera, production of writing back data based on data of an erasure object is described above. However, production of writing back data is not limited to this.

As described above, for example, where the mobile apparatus is a portable music reproduction apparatus, a portable image and sound reproduction apparatus or the like, music data or AV data which have newly become applicable to such apparatus may be prepared, or notification data for the notification of the substance of such music data or AV data may be prepared. In other words, the writing back data production section 29 has a function of preparing not only data formed in response to data of an erasure object but also data and so forth which have newly become available for a mobile apparatus.

It is to be noted that the functions of the transmission/reception control section 27, erasure data extraction section 28 and writing back data production section 29 which are each indicated by double lines in FIG. 3 can be implemented as functions of the control section 21 by a program or software executed by the CPU 211.

The hard disk driver includes a hard disk and a driver, and records data supplied thereto on the hard disk and reads out data recorded on the hard disk under the control of the control section 11.

The display interface 31a forms image data to be provided to an external display apparatus and outputs the image data to the output terminal 31b for an image signal under the control of the control section 11. Accordingly, an external display apparatus is connected to the output terminal 31b for an image signal.

Thus, the server apparatus 2 can receive a placement notification transmitted thereto through the input/output terminal 14b and the external interface 14a from the cradle 1 or receive accumulated data from the mobile apparatus and accumulate the received information or data on the hard disk of the hard disk driver 30.

Further, the server apparatus 2 can transmit an erasure instruction of erasure data extracted and specified by the erasure data extraction section 28 or writing back data produced and prepared by the writing back data production section 29 through the external interface 14a and the input/output terminal 14b under the control of the transmission/reception control section 27 to be transmitted to the mobile apparatus placed on the cradle 1 through the cradle 1.

In this manner, in the server apparatus 2, the external interface 26a and the input/output terminal 26b implement a function as a communication section, and the writing back data production section 29 implements a function as a data preparation section. Further, the transmission/reception control section 27 implements a function as a communication control section.

Further, the hard disk driver 30 implements a function as a transmission history storage section and a function as a storage section for storing and retaining accumulated data from a mobile apparatus. The erasure data extraction section 28 and the control section 21 cooperate to implement a function as an erasure instruction formation section.

[Example of a Configuration of a Mobile Apparatus]

FIG. 4 shows an example of a configuration of a mobile apparatus 4 which can be placed on the cradle 1 of the data communication system and can communicate with and be charged by the cradle 1. The mobile apparatus 4 may have various forms such as a camera-equipped portable telephone terminal, a digital still camera or a portable music reproduction apparatus as described above. However, in the following description, it is assumed that the mobile apparatus 4 is a digital still camera or a digital video camera for simplified description.

Referring to FIG. 4, the mobile apparatus 4 shown includes a control section 41, a clock circuit 42, an operation section 43, an image storage section 44, a radio communication section 45a, a transmission/reception antenna 45b, and an image pickup section 46. The mobile apparatus 4 further includes a transmission/reception control section 47, an image erasure control section 48, a display section 49, a battery 50, and a radio charging control section 51.

The control section 41 controls the components of the mobile apparatus 4 and is a microcomputer including a CPU 411, a ROM 412, a RAM 413 and a nonvolatile memory 414 connected to each other by a CPU bus 415.

The CPU 411 serves as a core of control which executes a program stored and retained in the ROM 412 to produce and supply control signals to pertaining components of the mobile apparatus 4 to control the components. The ROM 412 stores programs to be executed by the CPU 411 as described above and data and so forth required for various processes in advance therein.

The RAM 413 is used as a working area principally for temporarily storing midway results of processing and so forth. The nonvolatile memory 414 may be formed from an EEPROM, a flash memory or the like and stores and retains data to be retained even if power supply to the mobile apparatus 4 is turned off such as, for example, various setting parameters and additional programs for additional provision of functions.

The clock circuit 42 includes a calendar function and provides the year, month and day at present, a day of the week at present and the time at present. The operation section 43 has various operation keys, operation dials and operation levers, and can accept an operation input from a user, convert the operation input into an electric signal and send the electric signal to the control section 41. Consequently, an instruction input accepted through the operation section 43 is supplied as an electric signal to the control section 41, and the control section 41 can control the components of the mobile apparatus 4 in response to an instruction from the user to carry out a process in accordance with the instruction of the user.

The image storage section 44 includes a recording medium, a driver section and so forth and receives supply of and stores and retains still image data or moving image data obtained by image pickup through the image pickup section 46 under the control of the control section 41. The recording medium may have various forms such as a hard disk, a semiconductor memory, an optical disk such as a DVD and so forth, and may be built in the image storage section 44 or may be removably loaded into the image storage section 44. It is assumed that, in the mobile apparatus 4, the image storage section 44 includes a built-in hard disk as a recording medium.

The radio communication section 45a and the transmission/reception antenna 45b, as well as the radio communication section 15a and the transmission/reception antenna 15b of the cradle 1, carry out data communication by short distance wireless communication with the cradle 1. Accordingly, the radio communication section 45a and the transmission/reception antenna 45b can use a wireless communication technique such as, for example, the UWB (Ultra Wide Band) or the Bluetooth or various other short distance wireless communication techniques to carry out radio communication with the cradle 1.

The image pickup section 46 includes image pickup devices such as an objective lens, an iris mechanism, a shutter mechanism, a CCD (Charge Coupled Device), a CMOS (Complementary Metal Oxide Semiconductor) image sensor and so forth, a mathematical operation circuit, and so forth. The image pickup section 46 can fetch an image of an image pickup object as an electric signal and convert the electric signal into a digital signal. Still image data or moving image data converted into a digital signal by the image pickup section 46 are recorded on a recording medium of the image storage section 44 through the control section 41 as described above.

The transmission/reception control section 47 controls communication with the cradle 1 through the radio communication section 45a and the transmission/reception antenna 45b. In particular, the transmission/reception control section 47 receives information from the cradle 1 through the radio communication section 45a and the transmission/reception antenna 45b and transmits transmission information produced by the control section 41 to the cradle 1 through the radio communication section 45a and the transmission/reception antenna 45b. In other words, the transmission/reception control section 47 controls communication of data between the mobile apparatus 4 and the cradle 1.

The image erasure control section 48 controls a process of erasing, when it receives a data erasure request from the server apparatus 2 transmitted through the transmission/reception antenna 45b and the radio communication section 45a and further through the cradle 1, still image data or moving image data designated to be erased from among still image data or moving image data recorded on the recording medium of the image storage section 44 from the recording medium of the image storage section 44 in accordance with the received data erasure request.

It is to be noted that the functions of the transmission/reception control section 47 and the image erasure control section 48 indicated by double solid lines in FIG. 4 can be implemented also as functions of the control section 41 by a program or software executed by the CPU 411 of the control section 41.

The battery 50 accumulates power to be supplied to the components of the mobile apparatus 4. The radio charging control section 51 supplies power supplied thereto through the charging control section 19 of the cradle 1 to the battery 50 to control a charging process of the battery 50. The radio charging control section 51 and the battery 50 can cooperate with each other to receive supply of power from the cradle 1 to charge the battery 50.

The mobile apparatus 4 can record still image data or moving image data picked up through the image pickup section 46 into the image storage section 44. Various image data recorded in the image storage section 44 can be accumulated on the hard disk of the server apparatus 2, that is, backed up by the hard disk when the mobile apparatus 4 is placed on the cradle 1, whereupon the transmission/reception control section 47 and the radio communication section 45a function to transmit the image data to the server apparatus 2 through the cradle 1.

Further, if the mobile apparatus 4 receives an erasure request for image data from the server apparatus 2 transmitted thereto through the transmission/reception antenna 45b and the radio communication section 45a and further through the cradle 1, then the image erasure control section 48 functions to control the image storage section 44 to erase image data, which have become unnecessary for the mobile apparatus 4 as a result of backup thereof into the server apparatus 2, from the recording medium of the image storage section 44 so that the storage capacity of the recording medium of the image storage section 44 may be assured.

On the other hand, if writing back data from the server apparatus 2 transmitted through the cradle 1 are received through the transmission/reception antenna 45b and the radio communication section 45a, then the transmission/reception control section 47 can control the image storage section 44 to record the writing back data from the server apparatus 2 on the storage medium of the image storage section 44.

In this manner, only if the mobile apparatus 4 is placed on the cradle 1, then if it carries out data communication through the cradle 1, then backup of data into the server apparatus 2, an erasure process of data stored and retained in the image storage section 44 in accordance with an instruction from the server apparatus 2 and a recording process of writing back data from the server apparatus 2 into the image storage section 44 can be carried out. Besides, also charging of the battery 50 of the mobile apparatus 4 can be carried out through the cradle 1.

[Operation of the Data Communication System]

Now, general operation of the data communication system is described with reference to timing charts of FIGS. 5 and 6. As described above with reference to FIG. 1, the cradle 1 and the server apparatus 2 are connected by wire connection using the interface cable 3. Meanwhile, the cradle 1 is connected by wireless connection to the mobile apparatus 4 placed thereon using a short distance wireless communication technique.

Further, as described below, the mobile apparatus 4 placed on the cradle 1 and the server apparatus 2 connected by wire connection to the cradle 1 communicate with each other through the cradle 1.

While the power supply to the cradle 1 is on, the cradle 1 determines after every predetermined interval of time using the function of the placement detection section 16 whether or not a mobile apparatus 4 is placed thereon (step S1). As described above, the cradle 1 is configured such that a plurality of mobile apparatus can be placed at a time thereon, and every time a new mobile apparatus is placed on the cradle 1, the cradle 1 can determine that a mobile apparatus is placed thereon.

Then, if it is determined in the decision process at step S1 that no mobile apparatus 4 is placed, then the decision process at step S1 is repeated to wait that a mobile apparatus is placed. If it is determined in the decision process at step S1 that a mobile apparatus 4 is placed, then the transmission/reception control section 17 of the cradle 1 controls the radio communication section 15a to transmit a request for inquiry about an apparatus ID to the mobile apparatus 4 placed newly on the cradle 1 (step S2).

The mobile apparatus 4 receives the request for inquiry about an apparatus ID from the cradle 1 through the transmission/reception antenna 45b and the radio communication section 45a, and the transmission/reception control section 47 of the mobile apparatus 4 controls the radio communication section 45a to transmit the apparatus ID of the mobile apparatus 4 to the cradle 1 (step S3).

The cradle 1 receives the apparatus ID from the mobile apparatus 4 newly placed thereon through the transmission/reception antenna 15b and the radio communication section 15a, and the transmission/reception control section 17 of the cradle 1 controls the external interface 14a to report the apparatus ID from the mobile apparatus 4 to the server apparatus 2 (step S4). Consequently, the server apparatus 2 recognizes that a new mobile apparatus is placed on the cradle 1. Then, the cradle 1 executes a starting process for charging of the mobile apparatus 4 placed newly thereon.

Meanwhile, the server apparatus 2 receives the apparatus ID report from the mobile apparatus 4 placed newly on the cradle 1 through the input/output terminal 26b and the external interface 26a. Then, the transmission/reception control section 27 of the server apparatus 2 controls the external interface 26a to transmit a request for an accumulated data list, which is a request for provision of a list of accumulated data, to the mobile apparatus 4 which is specified from the received apparatus ID (step S6).

The request for an accumulated data list is received by the cradle 1 through the input/output terminal 14b and the external interface 14a and is transmitted to the mobile apparatus 4 through the radio communication section 15a and the transmission/reception antenna 15b under the control of the transmission/reception control section 17.

The mobile apparatus 4 receives the request for an accumulated data list from the server apparatus 2 through the transmission/reception antenna 45b and the radio communication section 45a. Thus, the control section 41 of the mobile apparatus 4 forms an accumulated data list based on image data stored and retained in the image storage section 44, and the transmission/reception control section 47 controls the radio communication section 45a to transmit the accumulated data list (step S7).

The accumulated data list is received by the cradle 1 through the transmission/reception antenna 15b and the radio communication section 15a and is transmitted to the server apparatus 2 through the external interface 14a and the input/output terminal 14b under the control of the transmission/reception control section 17.

The server apparatus 2 receives the accumulated data list from the mobile apparatus 4 through the input/output terminal 26b and the external interface 26a and stores the accumulated data list into a predetermined region of the hard disk of the HDD 30 (step S8). Then, the control section 21 of the server apparatus 2 forms a request for new accumulated data, which is a request for provision of data accumulated newly, based on the stored accumulated data list. Then, the transmission/reception control section 27 controls the external interface 26a to transmit the request for new accumulated data (step S9).

The request for new accumulated data is information for specifying data which has not been provided as yet and should be provided newly based on the date and time of production of the accumulated data list from the mobile apparatus 4 and the date and time of production of accumulated data provided already from the mobile apparatus 4 and requesting provision of the specified data to the mobile apparatus 4.

It is to be noted that the request for new accumulated data may be formed to request image data collectively, for example, like all of image data whose date and time of production is later than the ddth day of the mm month of the yy year or to specify and request image data which should be provided using a data ID added to each accumulated data.

The request for new accumulated data is received by the cradle 1 through the input/output terminal 14b and the external interface 14a and is then transmitted to the mobile apparatus 4 through the radio communication section 15a and the transmission/reception antenna 15b under the control of the transmission/reception control section 17.

The mobile apparatus 4 receives the request for new accumulated data from the server apparatus 2 through the transmission/reception antenna 45b and the radio communication section 45a. The control section 41 of the mobile apparatus 4 extracts requested new accumulated data from among image data stored and retained in the image storage section 44, and the transmission/reception control section 47 controls the radio communication section 45a to transmit the extracted new accumulated data (step S10).

The new accumulated data is received by the cradle 1 through the transmission/reception antenna 15b and the radio communication section 15a and then transmitted to the server apparatus 2 through the external interface 14a and the input/output terminal 14b under the control of the transmission/reception control section 17.

The server apparatus 2 receives the new accumulated data from the mobile apparatus 4 through the input/output terminal 26b and the external interface 26a, and the control section 21 of the server apparatus 2 stores the new accumulated data into a predetermined region of the hard disk of the HDD 30 (step S11). In this manner, accumulated data such as image data in the mobile apparatus 4 placed on the cradle 1 can be backed up into the HDD 30 of the server apparatus 2 through the cradle 1.

Referring now to FIG. 6, the server apparatus 2 detects data to be erased from among the image data stored in the image storage section 44 of the mobile apparatus 4 based on the acquired new accumulated data (step S12). While details of the erasure object data detection process are hereinafter described, the erasure object data process is a process of confirming additional information added to each of image data as new accumulated data and specifying all image data as an object of erasure except those image data which can be estimated as important image data based on the confirmed additional information. In this instance, such estimation may be carried out such that, if the additional information indicates that a deletion protect for preventing deletion is applied to the image data, if printing marking which indicates that it is necessary to print the information is applied to the image data or if the number of times of use should be updated, then the image data is estimated as important image data.

Therefore, the server apparatus 2 forms a request for erasure of accumulated data indicative of erasure of image data specified as erasable image data based on the detection process at step S12. Further, the transmission/reception control section 27 of the server apparatus 2 controls the external interface 26a to transmit the request for accumulated data erasure (step S13).

The request for accumulated data erasure is received by the cradle 1 through the input/output terminal 14b and the external interface 14a and is then transmitted to the mobile apparatus 4 through the radio communication section 15a and the transmission/reception antenna 15b under the control of the transmission/reception control section 17.

The mobile apparatus 4 receives the request for accumulated data erasure from the server apparatus 2 through the transmission/reception antenna 45b and the radio communication section 45a. Then, the image erasure control section 48 of the mobile apparatus 4 controls the image storage section 44 to execute a process of erasing image data whose erasure is designated from the image storage section 44 (step S14).

After the designated erasure of the image data ends, the control section 41 of the mobile apparatus 4 forms an erasure process completion report and transmits the erasure process completion report through the radio communication section 45a and the transmission/reception antenna 45b under the control of the transmission/reception control section 47 (step S15).

The erasure process completion report is received by the cradle 1 through the transmission/reception antenna 15b and the radio communication section 15a and is then transmitted to the server apparatus 2 through the external interface 14a and the input/output terminal 14b under the control of the transmission/reception control section 17.

The server apparatus 2 receives the erasure completion report from the mobile apparatus 4 through the input/output terminal 26b and the external interface 26a. Then, the writing back data production section 29 functions to produce writing back data based on the image data to be erased from the image storage section 44 of the mobile apparatus 4. In this instance, the writing back data production section 29 of the server apparatus 2 determines what writing back data should be produced in response to an apparatus attribute of the mobile apparatus 4, a type of accumulated data of a processing object, an accumulation history of accumulated data stored and retained in the mobile apparatus 4 itself or an instruction input from the user.

Here, it is assumed that an apparatus attribute indicating that the mobile apparatus 4 is a digital still camera is reported upon reporting of an apparatus ID at step S4. In this instance, since it can be recognized from an apparatus attribute that accumulated data of an erasure object are still image data, image data of accumulated data of an object of erasure is subjected to a reduction process to produce writing back data to be written back into the mobile apparatus 4 (step S16). In this instance, the writing back data production section 29 forms image data of a size equal to several fractions to several tens fractions of original image data as writing back data.

Then, the transmission/reception control section 27 of the server apparatus 2 controls the external interface 26a to transmit the writing back data to the mobile apparatus 4 (step S17). The writing back data are received by the cradle 1 through the input/output terminal 14b and the external interface 14a and then transmitted to the mobile apparatus 4 through the radio communication section 15a and the transmission/reception antenna 15b under the control of the transmission/reception control section 17.

The mobile apparatus 4 receives the writing back data through the transmission/reception antenna 45b and the radio communication section 45a, and the control section 41 of the mobile apparatus 4 stores the received writing back data into the image storage section 44 (step S18). This writing back data is image data which has been accumulated in the mobile apparatus 4 and indicates a reduced image of the image data to be erased after backed up into the HDD 30 of the server apparatus 2.

Accordingly, the reduced image of the writing back data from the server apparatus 2 is displayed on the display screen of the display section 49 so that it can be confirmed what image is erased after backed up into the server apparatus 2. Then, if necessary, the image data backed up in the server apparatus 2 can be utilized, or can be recorded into the image storage section 44 of the mobile apparatus 4 such that it can be utilized again on the mobile apparatus 4.

After the storage of the writing back data at step S18 ends, the control section 41 of the control section 41 forms a storage completion report and transmits the storage completion report through the radio communication section 45a and the transmission/reception antenna 45b under the control of the transmission/reception control section 47 (step 19).

The storage completion report is received by the cradle 1 through the transmission/reception antenna 15b and the radio communication section 15a, and transmitted by control of the transmission/reception control section 17 to the server apparatus 2 through the external interface 14a and the input/output terminal 14b.

The server apparatus 2 receives the storage completion report through the input/output terminal 26b and the external interface 26a. Consequently, the control section 21 of the server apparatus 2 can recognize that transmission and reception of data to and from the mobile apparatus 4 placed newly on the cradle 1 is completed appropriately.

Thereafter, the cradle 1 executes a charging ending process (step S20). Then, if the battery of the mobile apparatus 4 is placed into an overcharged state and the charging process is completed, then the series of processes where a new mobile apparatus is placed on the cradle 1 in the data communication system described above with reference to FIGS. 5 and 6 is completed.

In this manner, in the data communication system, only if a mobile apparatus 4 is placed on the cradle 1 connected to the server apparatus 2, then accumulated data accumulated in the mobile apparatus 4 can be transmitted to the server apparatus 2 through the cradle 1 and stored as backup data into the HDD 30 of the server apparatus 2.

Further, if the functions of the server apparatus 2 are used such that erasure object data which can be erased from among accumulated data backed up from the mobile apparatus 4 is detected and a request for accumulated data erasure is provided from the server apparatus 2 to the mobile apparatus 4, then the storage area of the image storage section 44 of the mobile apparatus 4 can be arranged thereby to achieve efficient utilization of the image storage section 44 of the mobile apparatus 4.

Furthermore, writing back data for being written back into the mobile apparatus 4 is produced based on accumulated data backed up from the mobile apparatus 4 into the server apparatus 2 and to be erased from the mobile apparatus 4 such that it can be written back into the mobile apparatus 4. This writing back data is, as described above, where the accumulated data is still image data, a reduced image as described above, and is information having a data amount compressed from that of the original image data. Consequently, the mobile apparatus 4 can manage what accumulated data is determined to be erased after backed up into the server apparatus 2 without wastefully using the storage capacity of the image storage section 44.

It is to be noted that, if the mobile apparatus 4 placed on the cradle 1 does not include data to be backed up into the server apparatus 2, then the processing advances to step S16 illustrated in FIG. 6, at which a process of forming information which has newly become able to be provided and providing the formed information to the mobile apparatus 4 is carried out. In particular, if the mobile apparatus 4 placed on the cradle 1 does not include data to be backed up into the server apparatus 2, then a charging process and a writing back data providing process can be executed.

[Examples of a Layout of Data to be Transmitted/Received]

Now, examples of a layout of data to be communicated between different apparatus in the data communication system described above with reference to FIGS. 5 and 6 are described.

[Example of a Layout of Command Data]

FIGS. 7A to 7C illustrate an example of a layout of command data and a particular example of the layout. Referring first to FIG. 7A, command data to be communicated between different apparatus include "transmission designation ID", "transmission source ID", "command information indicative of the substance and so forth of a command or an instruction" and "data necessary for execution of the command or instruction and data to be advised", and so forth.

FIG. 7B illustrates an example of command data for inquiry about an apparatus ID to be transmitted from the cradle 1 to a mobile apparatus 4 placed newly at step S2 of the sequence diagram illustrated in FIG. 5. As seen in FIG. 7B, in response to an inquiry about an apparatus ID, "information representative of a non-responding apparatus" is inputted to the transmission destination ID; an "apparatus ID of the cradle 1" is inputted to the transmission source ID; and "information representative of an inquiry about an apparatus ID" is inputted to the information representative of a command.

Here, the "information representative of a non-responding apparatus" is information indicative of an apparatus which has not yet communicated with the cradle 1. For example, if the apparatus ID is represented by five alphanumeric characters, then the "information representative of a non-responding apparatus" is determined in advance like "00000". Then, it is determined that, from among mobile apparatus which receive the "information representative of a non-responding apparatus" as the transmission destination ID, any mobile apparatus which does not have a communication history with the cradle 1 is determined as a non-responding apparatus. Then, a process in accordance with the command information received, in the present case, notification of an apparatus ID, is carried out.

FIG. 7C illustrates an example of an apparatus ID response transmitted from a mobile apparatus 4, which is newly placed on the cradle 1 at step S3 of the sequence diagram shown in FIG. 5 but does not yet carry out communication, to the cradle 1 when the mobile apparatus 4 receives the apparatus ID inquiry command illustrated in FIG. 7B.

As seen in FIG. 7C, in the apparatus ID response, an "apparatus ID of the cradle 1" is inputted to the transmission destination ID, an "apparatus ID of the mobile apparatus 4" is inputted to the transmission source ID, and "information representing that this is a response of an apparatus ID" is inputted to the information indicative of the command. Consequently, the cradle 1 can recognize the apparatus ID of the mobile apparatus 4 from the transmission source ID.

Then, in the example described, also an apparatus attribute and other information are conveyed from the mobile apparatus 4 to the cradle 1 through the apparatus ID response. The apparatus attribute represents a type or kind of an apparatus such as whether the mobile apparatus 4 is a digital still camera, a digital video camera, a portable telephone terminal or the like. From the apparatus attribute, the cradle 1 can recognize what mobile apparatus the mobile apparatus 4 is and what data is handled by the mobile apparatus 4.

It is to be noted that command information regarding (1) the "apparatus ID report" transmitted from the cradle 1 to the server apparatus 2 at step S4, (2) the "accumulated data list request" transmitted from the server apparatus 2 to the mobile apparatus 4 at step S6, (3) the "new accumulated data request" transmitted from the server apparatus 2 to the mobile apparatus 4 at step S9, (4) the "accumulated data erasure request" transmitted from the server apparatus 2 to the mobile apparatus 4 at step S13, (5) the "erasure process end report" transmitted from the mobile apparatus 4 to the server apparatus 2 at step S15 and (6) the "storage completion report" transmitted from the mobile apparatus 4 to the server apparatus 2 at step S19 in the sequence diagrams of FIGS. 5 and 6 is communicated in a form illustrated in FIG. 7A, that is, in the form of the transmission destination ID, transmission source ID, command information and other data.

[Example of a Layout of an Accumulated Data List]

FIG. 8 illustrates an example of a layout of an accumulated data list produced by the mobile apparatus 4 and transmitted from the mobile apparatus 4 to the server apparatus 2 at step S7 described above with reference to FIG. 5.

Referring to FIG. 8, the accumulated data list illustrated has a transmission destination ID, a transmission source ID, a data attribute and other information as header information of the overall accumulated data list. The transmission destination ID is an apparatus ID of an apparatus which is a transmission destination of the accumulated data list. The transmission source ID is an apparatus ID of a mobile apparatus 4 which transmits the accumulated data list. The data attribute indicates that the overall information forms the accumulated data list. The other information may include date information such as the date and time of production and the date and time of transmission of the accumulated data list and other information.

Further, for each of pieces of information accumulated in the mobile apparatus 4, information including a data ID, a data attribute, a production date and time, a data size and other information is formed, and an accumulated data list is formed from such information. Here, the data ID is information for specifying each data and particularly corresponds to the file name of each data. The data attribute is information representative of whether the data is still image data, moving image data, sound data, text data or the like.

The production date and time represents a date and time at which the accumulated data was produced and includes also the date and time at which the accumulated data was acquired by the mobile apparatus. Further, the data size represents the size or capacity of the accumulated data. The other information may be additional information and may include various kinds of information such as text data of memory information incidental to each accumulated data.

Such an accumulated data list as described above is produced by the mobile apparatus 4 in accordance with a request for an accumulated data list from the server apparatus 2 and is transmitted from the mobile apparatus 4 to the server apparatus 2 at step S7 described above with reference to FIG. 5.

Consequently, the server apparatus 2 can accurately recognize what information is accumulated in the mobile apparatus 4. Then, the server apparatus 2 can specify accumulated data to be provided newly from the mobile apparatus 4 based on the information of the production date and time of each data of the accumulated data which have already accumulated in the server apparatus 2 supplied from the mobile apparatus 4 and the accumulated data list provided newly from the mobile apparatus 4.

[Example of a Layout of Accumulated Data]

FIG. 9 illustrates an example of a layout of accumulated data. Referring to FIG. 9, the accumulated data includes a header information part and an actual data part. In the example illustrated, the header information of the accumulated data includes an apparatus ID, a data ID, a data attribute, a production date and time, protect information, a print mark, a data size, the number of times of use and other information. Here, the apparatus ID is information which specifies an apparatus in which the accumulated data is accumulated. The data ID can uniquely specify the accumulated data.

The data attribute is information indicative of a type of data such as whether the accumulated data is still image data, moving image data or sound data. The production date and time is information representative of a date and time at which the accumulated data was produced. The protect information is flag information indicative of whether or not the accumulated data should be deleted, and is set to "on" where the accumulated data should be protected so as not to be deleted but is set to "off" where the accumulated data may be deleted as occasion demands.

The print mark is information corresponding to the printing marking described above and designating in advance that the accumulated information requires printing. The data size indicates the size of the accumulated data, and the number of times of use indicates a number of times by which the accumulated information is used in the mobile apparatus 4. The other information may be information such as comment information regarding the accumulated data.

In this manner, the data accumulated in the mobile apparatus 4 has such a format that actual data is added to the head information. Here, the actual data is main data which becomes an object of accumulation such as still image data, moving image data, sound data and text data. In the present embodiment, the actual data is, for example, still image data.

Such accumulated data as described above is transmitted from the mobile apparatus 4 to the server apparatus 2 in response to a request for new accumulated data at step S9 of FIG. 5. The request for new accumulated data transmitted from the server apparatus 2 to the mobile apparatus 4 at step S9 of FIG. 5 has, as described above with reference to FIG. 7, a transmission destination ID, a transmission source ID and command information representing that the request is a request for new accumulated data. The request for new accumulated data further includes, as the other data, a data ID of accumulated data desired to be provided, information indicative of the date and time of production of the accumulated data to be provided, and so forth.

It is to be noted that, where accumulated data to be provided are designated using a data ID and besides a plurality of accumulated data are desired to be provided, command data including data IDs of all of accumulated data desired to be provided may be transmitted to the mobile apparatus 4. Further, information which designates a date and time of production of accumulated data desired to be provided may designate only one particular day or may designate a date and time through a range like "a starting date and time to an ending date and time".

In response to such a request for new accumulated data from the server apparatus 2 to the mobile apparatus 4 as described above, the mobile apparatus 4 extracts accumulated data desired to be provided from among the data accumulated in a form illustrated in FIG. 9 in the image storage section 44 of the mobile apparatus 4 or the like, and transmits the extracted accumulated data to the server apparatus 2 at step S10 illustrated in FIG. 5.

[Example of a Layout of Writing Back Data]

FIG. 10 illustrates an example of a layout of writing back data produced at step S16 of the sequence diagram shown in FIG. 6 and transmitted from the server apparatus 2 to the mobile apparatus 4 at step S17. As seen in FIG. 10, the writing back data illustrated includes a header information part and a writing back data part.

In the example illustrated in FIG. 10, the header information of the writing back data includes a data ID, a data attribute, a date and time of reproduction, a data size, a providing destination, an original data ID, an original production date and time, an original data size and other information. Here, the data ID can be used to uniquely specify the writing back data. The data attribute is information representative of a type of the writing back data such as whether the writing back data is still image data, moving image data, sound data or the like. The production date and time is information indicative of the date and time at which the writing back data was produced in the server apparatus 2.

The data size represents the size of the writing back data, and the providing destination represents an apparatus ID of an apparatus to which the writing back data is to be provided. In the present embodiment, the writing back data is data to be returned to the mobile apparatus 4 from which the accumulated data has been provided to the server apparatus 2. The original data ID is data for specifying the original data of the writing back data, and the original production date and time is data representative of a date and time of reproduction of the original data. In addition, the original data size is data representative of the size of the original data. Further, the other information may be information such as comment data regarding the writing back data.

In this manner, in the present embodiment, writing back data formed by the server apparatus 2 and returned to the mobile apparatus 4 has a form wherein the writing back data is added to the header information having various kinds of information. Here, the writing back data is formed in response to various accumulated data provided from the mobile apparatus 4 to the server apparatus 2.

Further, in the present embodiment, accumulated data provided from the mobile apparatus 4 to the server apparatus 2 is still image data, and in the server apparatus 2, reduced image data of still image data provided is formed and returned as the writing back data to be provided to the mobile apparatus 4.

Consequently, as described above, accumulated data or still image data transmitted to and backed up by the server apparatus 2 is erased in response to a request for erasure of accumulated data supplied from the server apparatus 2 to the mobile apparatus 4 at step S13 illustrated in FIG. 6.

However, still image data erased after backed up into the server apparatus 2 is returned as reduced image data from the server apparatus 2 to the mobile apparatus 4. Consequently, the mobile apparatus 4 can manage what accumulated is erased after backed up into the server apparatus 2 without wastefully using the storage capacity of the image storage section 44.

[Example of a Layout of a Writing Back History]

FIG. 11 illustrates an example of a layout of a writing back history formed, for example, on the HDD 30 of the server apparatus 2 when the server apparatus 2 produces writing back data described above with reference to FIG. 10 and writes the writing back data into the mobile apparatus 4. As seen in FIG. 11, the writing back history illustrated includes a writing back date and time, a writing back destination, a data ID, a data attribute, a production date and time, a data size and other information.

The writing back date and time is information indicative of the date and time at which writing back data is produced and provided to an object electronic apparatus. The writing back destination is information including an apparatus ID or the like which specifies an electronic apparatus of the opposite party to which the produced writing back data is provided. The data ID is a data ID of the writing back data provided, and the data attribute is information representative of a type of the writing back data, that is, whether the writing back data is still image data, moving image data, sound data or the like.

The production date and time is information representative of a date and time at which the writing data was produced, and the data size is information representative of the size of the writing back data. Further, the other information may be information such as comment information regarding the accumulated data.

Then, such a writing back history as illustrated in FIG. 11 is stored into and retained in the server apparatus 2 so that the server apparatus 2 can accurately recognize time of production of writing back data, an attribute of the writing back data, time of writing back of the writing back data and an electronic apparatus of a destination of the writing back.

[Operation of the Component Apparatus of the Data Communication System]

Now, operation of each of the component apparatus of the data communication system described above with reference to FIGS. 1 to 11 is described in detail. In the following, operations of the cradle 1 positioned at the center of the data communication system, the server apparatus 2 which manages data through the cradle 1 and a mobile apparatus 4 placed on the cradle 1 are described in detail in this order. It is to be noted that the mobile apparatus 4 is a digital still camera as described above.

[Processing of the Cradle 1]

Figure 12:
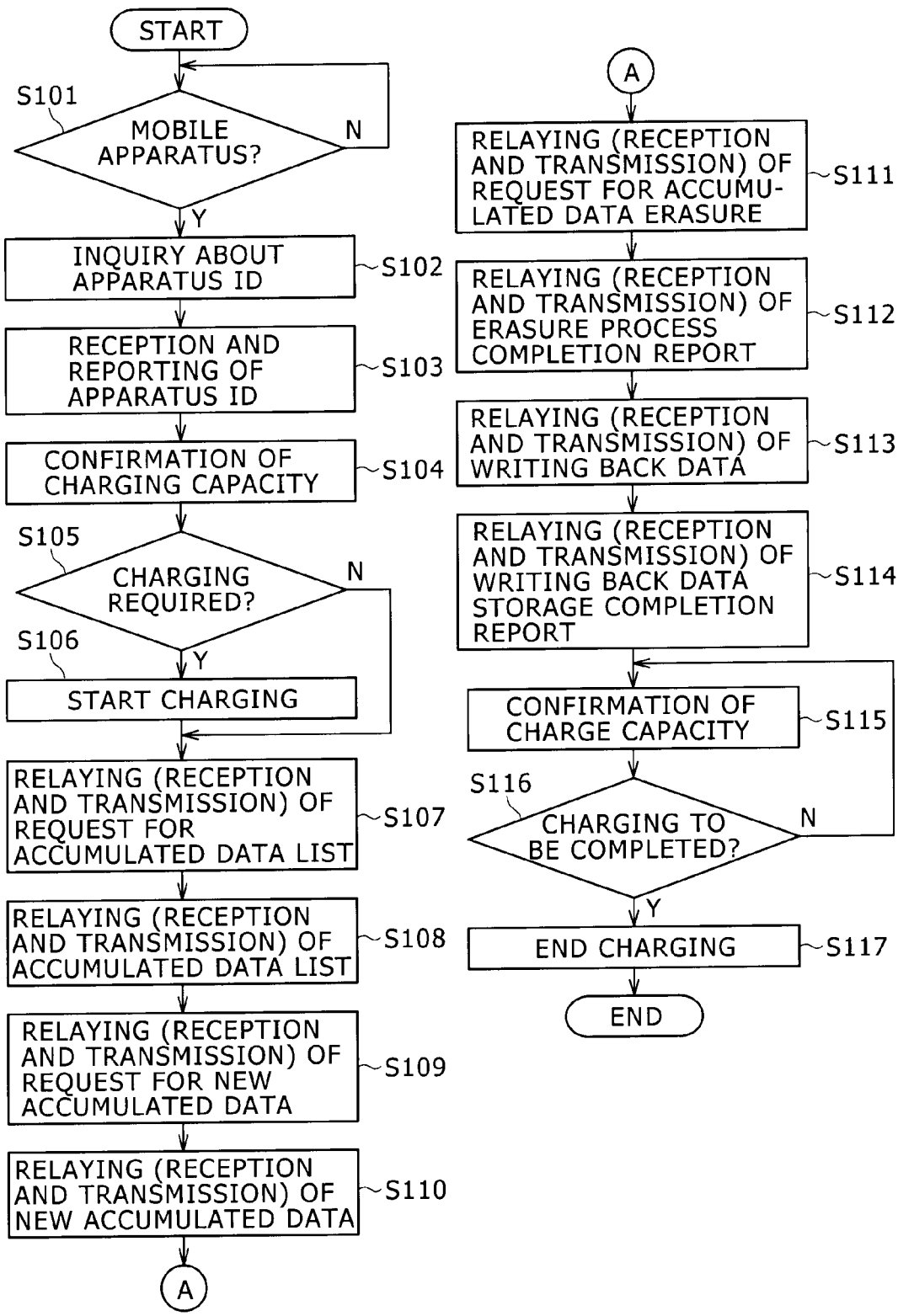
FIG. 12 is a flow chart illustrating a process carried out by the cradle.

FIG. 12 is a flowchart which illustrates a process executed by the cradle 1 of the data communication system. The process illustrated in FIG. 12 is executed principally by the control section 11 and the transmission/reception control section 17 when the cradle 1 is in a state wherein the power supply thereto is on. It is to be noted that, as described above, the cradle 1 allows placement of a plurality of mobile apparatus at a time thereon and can execute the process illustrated in FIG. 12 in a multi-task fashion for a maximum number of mobile apparatus which can be placed on the cradle 1.

If the power supply is turned on, then the control section 11 controls the placement detection section 16 to start placement detection of a mobile apparatus and determines whether or not a mobile apparatus is placed on the cradle 1 (step S101). If it is determined at step S101 that no mobile apparatus is placed, the placement detection of a mobile apparatus is repeated until a mobile apparatus is placed on the cradle 1.

If it is determined by the decision process at step S101 that a mobile apparatus is placed on the cradle 1, the control section 11 forms command data for inquiry about an apparatus ID described above with reference to FIG. 7B. Then, the transmission/reception control section 17 controls the radio communication section 15a and the transmission/reception antenna 15b to transmit the command data to the mobile apparatus 4 newly placed on the cradle 1 (step S102).

Then, the transmission/reception control section 17 receives an apparatus ID response described above with reference to FIG. 7C from the mobile apparatus 4 through the transmission/reception antenna 15b and the radio communication section 15a and then reports the apparatus ID response to the server apparatus 2 through the external interface 14a and the input/output terminal 14b (step S103).

Then, the control section 11 controls the charging control section 19 to confirm a charging capacity of the newly placed mobile apparatus 4 (step S104). The process at step S104 can be implemented by an electric detection process such as detection of a voltage of the battery of the mobile apparatus 4.

Then, the control section 11 determines based on a result of the confirmation at step S104 whether or not the newly placed mobile apparatus 4 requires charging (step S105). If it is determined that the mobile apparatus 4 requires charging, then the control section 11 controls the charging control section 19 to start charging of the battery of the newly placed mobile apparatus 4 (step S106). On the other hand, if it is determined by the decision process at step S105 that the mobile apparatus 4 does not require charging, then the processing advances to step S107.

After the process at step S106 or after it is determined by the decision process at step S105 that the mobile apparatus 4 does not require charging, a series of relaying processes described below is executed. In particular, the transmission/reception control section 17 first receives a request for an accumulated data list from the server apparatus 2 through the input/output terminal 14b and the external interface 14a and transmits the request for an accumulated data list to the mobile apparatus 4 through the radio communication section 15a and the transmission/reception antenna 15b (step S107).

Thus, the transmission/reception control section 17 receives an accumulated data list from the mobile apparatus 4 through the transmission/reception antenna 15b and the radio communication section 15a and transmits the accumulated data list to the server apparatus 2 through the external interface 14a and the input/output terminal 14b (step S108). Then, the transmission/reception control section 17 receives a request for new accumulated data from the server apparatus 2 through the input/output terminal 14b and the external interface 14a and transmits the request for new accumulated data to the mobile apparatus 4 through the radio communication section 15a and the transmission/reception antenna 15b (step S109).

Thereafter, the transmission/reception control section 17 receives new accumulated data from the mobile apparatus 4 through the transmission/reception antenna 15b and the radio communication section 15a and transmits the new accumulated data to the server apparatus 2 through the external interface 14a and the input/output terminal 14b (step S110). Then, the transmission/reception control section 17 receives a request for erasure of accumulated data from the server apparatus 2 through the input/output terminal 14b and the external interface 14a and transmits the request for accumulated data erasure to the mobile apparatus 4 through the radio communication section 15a and the transmission/reception antenna 15b (step S111).

Then, the transmission/reception control section 17 receives an erasure process completion report from the mobile apparatus 4 through the transmission/reception antenna 15b and the radio communication section 15a and transmits the erasure process completion report to the server apparatus 2 through the external interface 14a and the input/output terminal 14b (step S112). Then, the transmission/reception control section 17 receives writing back data from the server apparatus 2 through the input/output terminal 14b and the external interface 14a and transmits the writing back data to the mobile apparatus 4 through the radio communication section 15a and the transmission/reception antenna 15b (step S113).

Then, the transmission/reception control section 17 receives a writing data storage completion report from the mobile apparatus 4 through the transmission/reception antenna 15b and the radio communication section 15a and transmits the writing back data storage completion report to the server apparatus 2 through the external interface 14a and the input/output terminal 14b (step S114). In this manner, a series of relaying processes between the server apparatus 2 and the mobile apparatus 4 is carried out by the processes at steps S107 to S114.

It is to be noted that, in the relaying process of accumulated data at step S108 or in the relaying process of writing back data at step S113, a large number of accumulated data or writing back data to be relayed may exist, and a transfer process for such a large number of data may naturally be executed at step S113.

Then, the control section 11 of the cradle 1 controls the charging control section 19 to confirm the charging capacity of the battery of the mobile apparatus 4 (step S115) and confirms whether or not the charging of the mobile apparatus 4 is completed (step S116). If it is determined by the confirmation process at step S116 that the charging is not yet completed, then the processes beginning with step S115 are repeated to continue the charging process. If it is determined by the decision process at step S116 that the charging of the mobile apparatus 4 is completed, then a predetermined process for ending the charging of the mobile apparatus 4 is executed (step S117), thereby ending the process illustrated in FIG. 12.

It is to be noted that, while, in the example illustrated in FIG. 12, the charging capacity is confirmed at step S115 and it is determined at step S116 whether or not the charging is completed, such decision is not limited to this. In particular, since it is determined whether or not charging is required in the decision process at step S105 and the charging process is not carried out where charging is not required, it is otherwise possible to determine, before the conformation of the charging capacity at step S115, whether or not charging is being executed, that is, whether or not power is being supplied to the mobile apparatus 4, and end, when it is determined that charging is not being executed, the process illustrated in FIG. 12 without carrying out the processes at steps S115 to S117.

[Processing of the Cradle 1]

Figure 13:
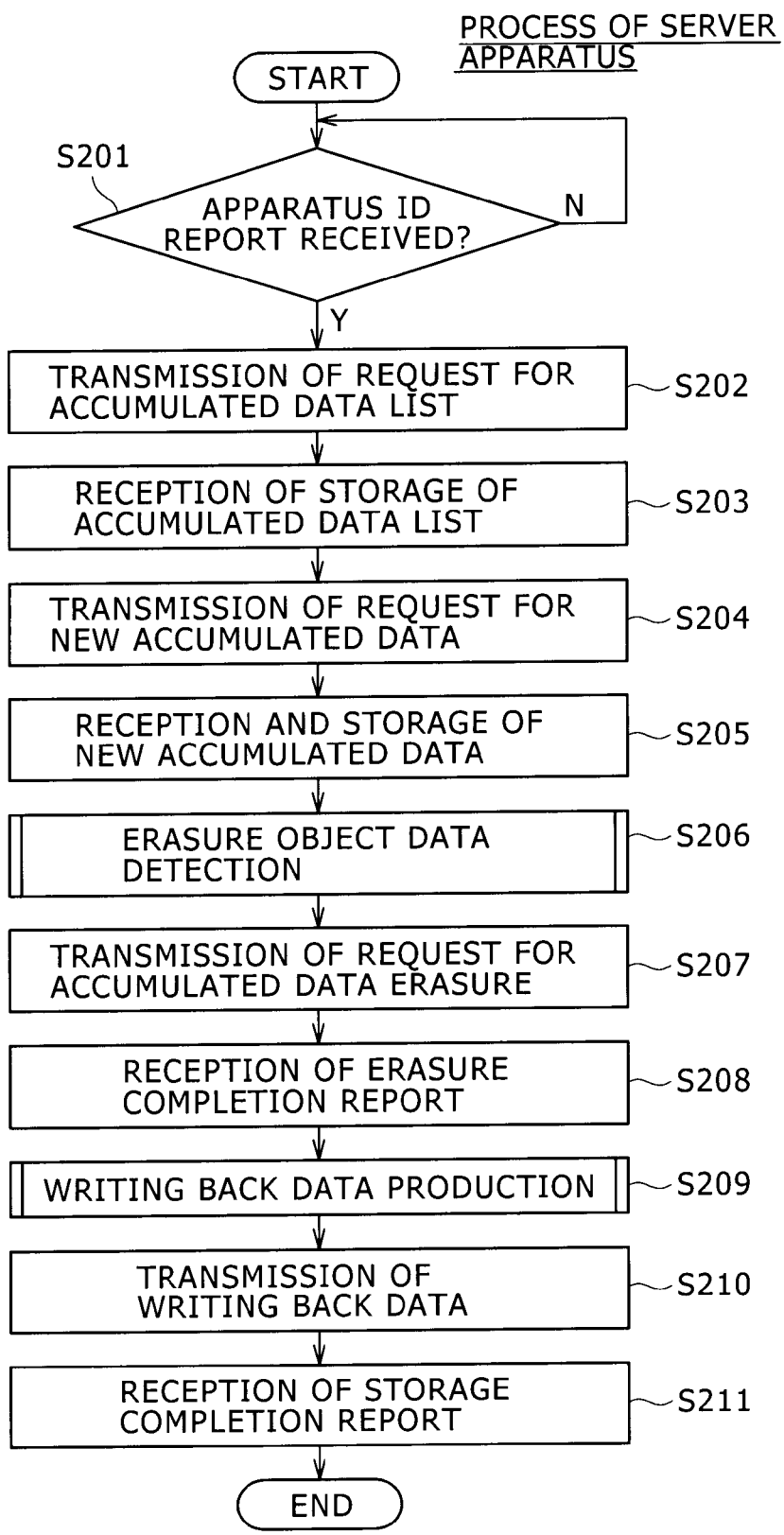
FIG. 13 is a flow chart illustrating a process carried out by the server apparatus.

FIG. 13 illustrates a process executed by the server apparatus 2 of the data communication system. The process illustrated in FIG. 13 is executed principally by the control section 21 and the transmission/reception control section 27 when the server apparatus 2 is in a state wherein the power supply is on.

If the power supply is connected, then the transmission/reception control section 27 of the server apparatus 2 determines whether or not an apparatus ID of a mobile apparatus 4 placed on the cradle 1 is received from the cradle 1 through the input/output terminal 26b and the external interface 26a (step S201). If it is determined by the decision process at step S201 that no apparatus ID is received as yet, then the process at step S201 is repeated to wait that an apparatus ID of a mobile apparatus 4 placed on the cradle 1 is received.

If it is determined by the decision process at step S201 that an apparatus ID is received from the cradle 1, then since it can be recognized that a mobile apparatus 4 is placed newly on the cradle 1, the control section 11 produces a request for an accumulated data list. Thus, the transmission/reception control section 27 transmits the request for an accumulated data list through the external interface 26a and the input/output terminal 26b to be transmitted to the mobile apparatus 4 newly placed on the cradle 1 through the cradle 1 (step S202).

Thereafter, the transmission/reception control section 27 receives an accumulated data list transmitted through the cradle 1 through the input/output terminal 26b and the external interface 26a and stores the accumulated data list, for example, into a predetermined area of the HDD 30 (step S203). Then, the control section 21 specifies those accumulated data which are not provided from the mobile apparatus 4 as yet based on the accumulated data list stored at step S203 and the accumulated data provided from the mobile apparatus 4 in the past and stored therein and the control section 21 forms a request for new accumulated data for requesting provision of the specified accumulated data. Thus, the transmission/reception control section 27 transmits the request for new accumulated data through the external interface 26a to be transmitted to the mobile apparatus 4 placed on the cradle 1 through the cradle 1 (step S204).

Then, the transmission/reception control section 27 receives new accumulated data transmitted through the cradle 1 through the input/output terminal 26b and the external interface 26a and stores the new accumulated data, for example, into a predetermined area of the HDD 30 (step S205). It is to be noted that a plurality of new accumulated data may be transmitted from the mobile apparatus 4, and at step S205, such new accumulated data from the mobile apparatus 4 can be successively received and stored into the predetermined region of the HDD 30.

Then, the control section 21 of the server apparatus 2 executes a process of detecting erasure object data which are accumulated data which can be erased from the mobile apparatus 4 from among the accumulated data from the mobile apparatus 4 stored in the predetermined region of the HDD 30 (step S206). Although the erasure object data detection process at step S206 is hereinafter described in detail, it is carried out such that it is estimated based on information added to the stored accumulated data of an object of detection or through an analysis of the accumulated data whether or not the accumulated data of the object of detection is important accumulated data. Then, if the accumulated data is estimated as important data, then it is not determined as an object of erasure, but if the accumulated data is not estimated as important data, then it is determined as an object of erasure.

Then, the control section 21 of the server apparatus 2 forms a request for accumulated data erasure for erasing the erasure object data detected at step S205 from the image storage section 44 of the mobile apparatus 4. Then, the control section 21 transmits the request for accumulated data erasure through the external interface 26a and the input/output terminal 26b under the control of the transmission/reception control section 27 to be transmitted to the mobile apparatus 4 through the cradle 1 (step S207).

Then, the transmission/reception control section 27 of the server apparatus 2 receives an erasure completion report transmitted from the mobile apparatus 4 of the opposite part, to which the request for accumulated data erasure has been transmitted, through the input/output terminal 26b and the external interface 26a (step S208). Thereafter, although details are hereinafter described, the control section 21 of the server apparatus 2 produces, from the accumulated data provided from the mobile apparatus 4 and stored in the HDD 30 and then erased from the mobile apparatus 4, writing back data to be written back in an arranged format into the mobile apparatus 4 (step S209).

Then, the transmission/reception control section 27 of the server apparatus 2 transmits the writing back data produced at step S209 through the external interface 26a and the input/output terminal 26b to be transmitted to the mobile apparatus 4 through the cradle 1 (step S210). Thereafter, the transmission/reception control section 27 of the server apparatus 2 receives a storage completion request of the writing back data transmitted from the mobile apparatus 4 through the cradle 1 through the input/output terminal 26b and the external interface 26a (step S211). The process illustrated in FIG. 13 ends therewith.

It is to be noted here that, although the process described above is an example wherein a communication process is carried out without a trouble, for example, in such an instance that no response is received when some request is transmitted from the server apparatus 2 to the mobile apparatus 4, transmission of the request may be carried out again or a request for response may be transmitted.

For example, if an erasure completion report is not received within a predetermined period of time at step S208, then a request for confirmation regarding whether or not an erasure process for accumulated data has been carried out may be transmitted. Alternatively, if a storage completion report is not received within a predetermined period of time at step S211, then a request for confirmation regarding whether or not writing back data is stored may be transmitted. Then, in response to the request, a suitable process may be carried out such as to transmit the original request again.

Further, if there exists no accumulated data to be backed up, then the series of processes may be ended, or content data which has newly become available may be provided, then the series of processes is ended.

[Erasure Object Data Detection Process]

Figure 14:
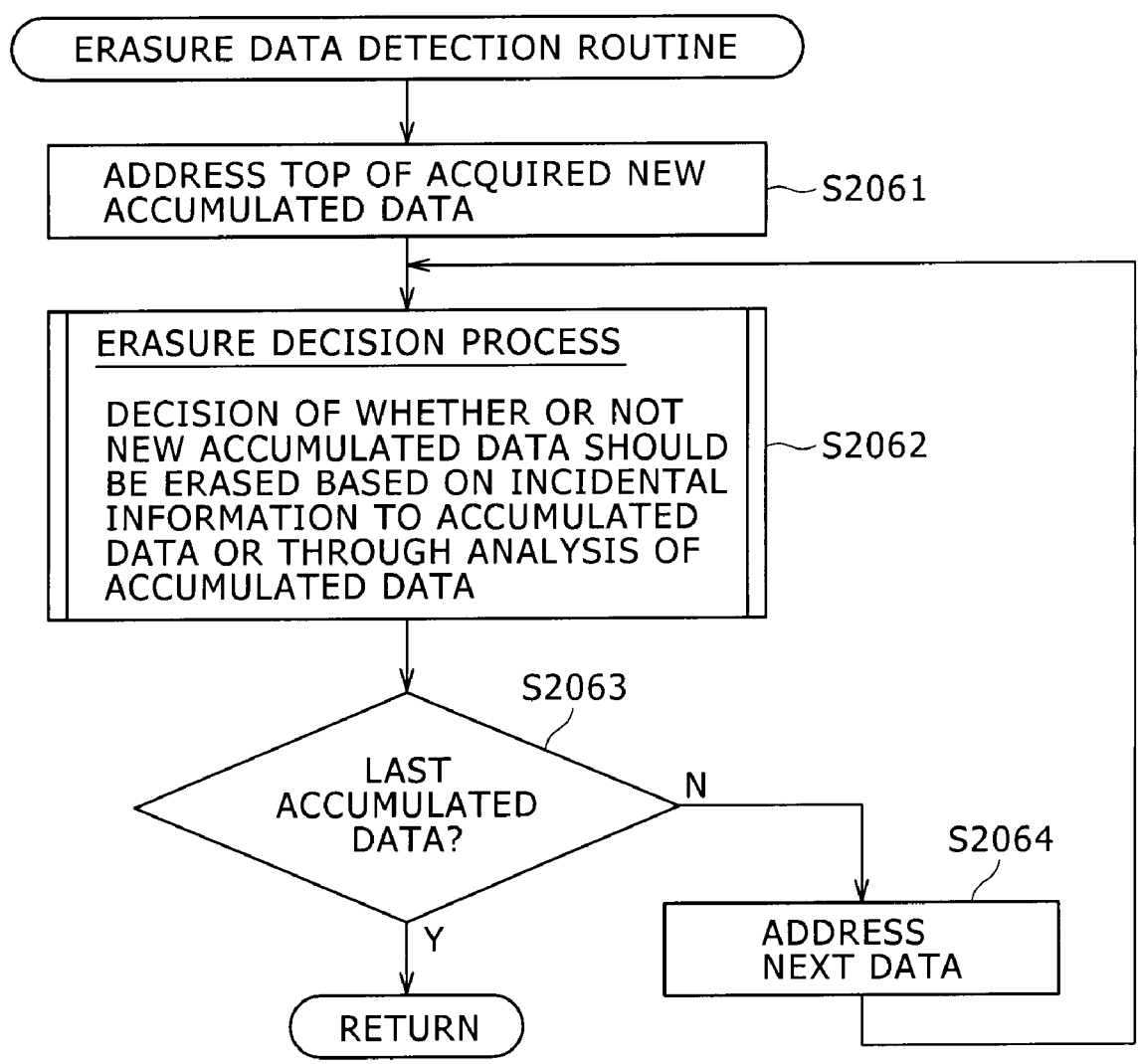
FIG. 14 is a flow chart illustrating an erasure data detection routine carried out in the process illustrated in FIG. 13.

Now, the detection process of erasure object data carried out at step S206 in the process illustrated in FIG. 13 is described. FIG. 14 illustrates the detection process of erasure object data carried out at step S206 of FIG. 13. The process illustrated in FIG. 14 executed by the control section 21 of the server apparatus 2.

First, the control section 21 addresses the top of a series of new accumulated data acquired at step S205 described above with reference to FIG. 13 (step S2061). Then, the control section 21 carries out a decision process of whether or not the addressed new accumulated data becomes an erasure object (step S2062). Although the process at step S2062 is hereinafter described in detail, it is a process of deciding it based on incidental information to each of new accumulated data or through an analysis of the new accumulated data whether or not the new accumulated data becomes an erasure object.

Thereafter, the control section 21 determines whether or not the new accumulated data determined as an object of an erasure decision process in the present cycle is the last one of the new accumulated data acquired and stored at step S205 (step S2063). In other words, the decision process at step S2063 is a process of deciding whether or not the erasure decision process is completed for all of the new accumulated data acquired at step S205.

If it is determined in the decision process at step S2063 that the erasure decision process is not completed for all of the new accumulated data as yet, then the control section 21 addresses next one of the new accumulated data, that is, determines the next new accumulated data as a processing object (step S2064). Then, the processes at the steps beginning with step S2602 are repeated. However, if it is determined in the decision process at step S2063 that the erasure decision process is completed for all of the new accumulated data, then the control section 21 ends the process illustrated in FIG. 14 and returns the processing to the process illustrated in FIG. 13 and executes the processes at the steps beginning with step S207.

Figure 15:
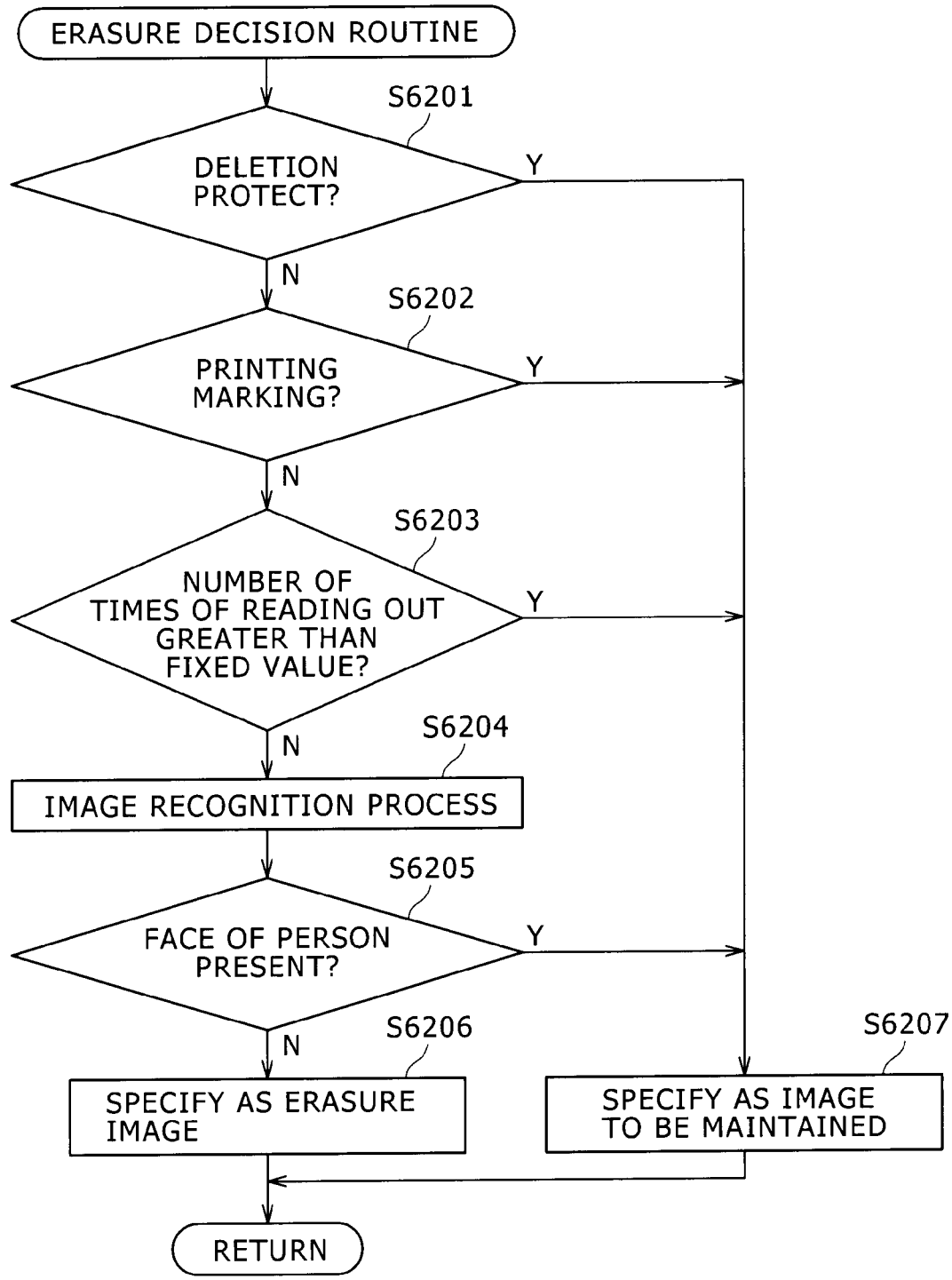
FIG. 15 is a flow chart illustrating an erasure decision routine for new accumulated data carried out in the erasure data detection routine illustrated in FIG. 14.

Now, the erasure decision process carried out at step S2062 of FIG. 14 is described in detail. FIG. 15 illustrates the erasure decision process for each new accumulated data carried out at step S2062 illustrated in FIG. 14. Also as described above, in the following description, it is assumed that a mobile apparatus 4 placed on the cradle 1 is a digital still camera as described above and accumulated data provided from the mobile apparatus 4 to the server apparatus 2 is still image data.

The control section 21 of the server apparatus 2 carries out a process of confirming information of the header part of new accumulated data of a decision object. In particular, accumulated data in the form of still image data supplied from the mobile apparatus 4 to the server apparatus 2 is data of the layout described above with reference to FIG. 9. Thus, the control section 21 confirms protect information of the header part and determines whether or not the accumulated data is protected against deletion, that is, whether or not the protect information is on (step S6201).

If it is determined by the decision process at step S6201 that the accumulated data is not protected against deletion, then the control section 21 confirms a print mark of the header part to determine whether or not the header part has printing marking (step S6202). If it is determined by the decision process at step S6202 that the header part does not include header marking, then the control section 21 confirms the number of times of use of the header part to determine whether or not the number of times of reading out, that is, the number of times of use, is greater than a fixed number of times determined in advance (step S6203).

If it is determined by the decision process at step S6203 that the number of times of reading out is not greater than the fixed number of times, then the control section 21 carries out an image recognition process for the still image data of the accumulated data (step S6204). The image recognition process at step S6204 is a process of carrying out contour recognition, color recognition and so forth with regard to the still image data of the processing object such that it can be determined whether or not an image of a person is included in the still image data.

Then, the control section 21 determines based on a result of the image recognition at step S6204 whether or not the still image data of the processing object is still image data which includes the face of a person (step S6205). If it is determined by the decision process at step S6205 that the accumulated data or still image data of the processing object does not include the face of a person, then the control section 21 estimates that the accumulated data or still image data is not important information and specifies the still image data as an erasure image (step S6206). Thereafter, the control section 21 ends the process illustrated in FIG. 15 and then executes the process described above with reference to FIG. 14 beginning with the process at step S2063.

In addition, the new accumulated data of the processing object is estimated as important data in the cases that the decision process at step S6201 determines the processing object is protected against erasure, the decision process at step S6202 determines the processing object has a printing marking, the decision process at step S6203 determines the number of times of reading out indicates more than a fixed number, and the decision process at step S6205 determines the accumulated data or still image data includes a face of a person. Then the new accumulated data is specified as the data to be maintained (step S6207), and the procedure shown in FIG. 15 is ended to execute the procedure shown in FIG. 14 from the step S2063.

In short, if the new accumulated data of the processing object is protected against erasure, then it can be determined that the accumulated data is so important that it is not desirable to delete the same. Further, it can be determined that also new accumulated data to which printing marking is applied so that the accumulated data may be printed without fail is so important that it is necessary to print the same without fail.

Further, if the number of times of use indicates that the accumulated data has been used by more than a fixed number of times determined in advance, then it can be determined that the accumulated data is used in a high frequency and is important accumulated data. In the case of still image data, such data are in most cases obtained by picking up an image of a person for the object of keeping the image for remembrance. Therefore, it can be determined that, if it is determined that, when an image recognition process is carried out for still image data as accumulated data, the still image data includes the face of a person, then also the still image data is important data.

Therefore, if it can be estimated that the accumulated data of the processing object is important in any of the decision processes illustrated in FIG. 15, then the accumulated data is specified as data to be maintained. However, if it cannot be estimated that the accumulated data of the processing object is important in all of the decision processes illustrated in FIG. 15, then the accumulated data is specified as data to be erased.

In this manner, at step S206 of FIG. 13, erasure object data is detected through the process described above with reference to the flow charts of FIGS. 14 and 15, and the detected erasure object data can be deleted from the mobile apparatus 4 to use the storage capacity of the image storage section 44 of the mobile apparatus 4 efficiently.

[Writing Back Data Production Process]

Figure 16:
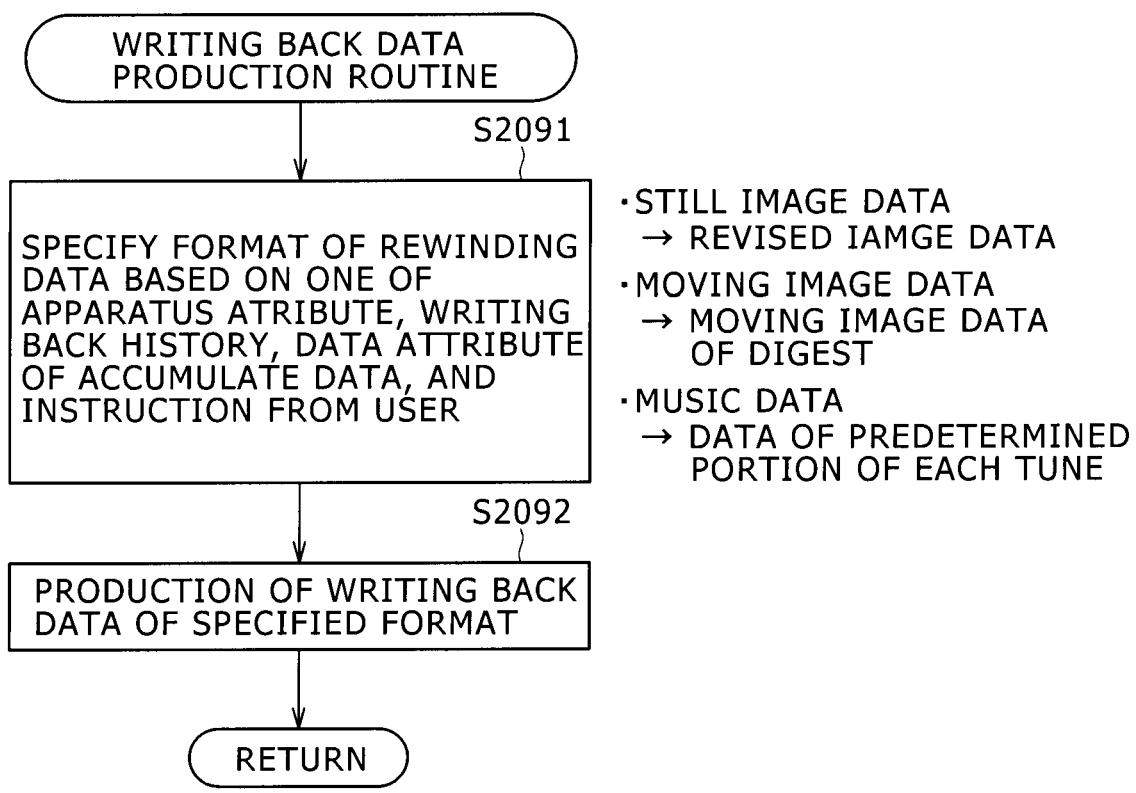
FIG. 16 is a flow chart illustrating a writing back data production routine carried out in the process illustrated in FIG. 13.

Now, the writing back data production process carried out at step S209 of the process described above with reference to FIG. 13 is described. FIG. 16 illustrates the production process of writing back data executed at step S209 of FIG. 13.

As described above, at step S209 illustrated in FIG. 13, it must be determined of what format writing back data should be produced. Therefore, at step S209 illustrated in FIG. 13, the control section 21 of the server apparatus 2 executes the process illustrated in FIG. 16 and first executes a process of specifying the format of writing back data (step S2091).

Here, as shown in FIG. 16, the control section 21 of the server apparatus 2 specifies the format of the data to be writing back based on the apparatus attribute included in the apparatus ID response transmitted through the cradle 1, based on the writing back history formed as shown in FIG. 11, based on the data attribute of the provided new accumulated data, or based on the instruction input from a user.

In particular, the apparatus attribute is information representative of the type of the mobile apparatus 4, that is, representative of whether the mobile apparatus 4 placed on the cradle 1 is a digital still camera, a digital video camera, a portable music reproduction apparatus or the like as described above. Therefore, where the apparatus attribute of the mobile apparatus 4 indicates that the mobile apparatus 4 is a digital still camera, the format of the writing back data can be specified such that a reduced image of still image data is determined as the writing back data.

Meanwhile, where the apparatus attribute of the mobile apparatus 4 represents that the mobile apparatus 4 is a digital video camera; the format of the writing back data can be specified such that data of a digest version of moving picture data is determined as the writing back data. On the other hand, where the apparatus attribute of the mobile apparatus 4 represents that the mobile apparatus 4 is a portable music reproduction apparatus, the format of the writing back data can be specified such that data extracted from music data is determined as the writing back data.

Naturally, such an apparatus as a portable telephone terminal which can store and retain all of still image data, moving image data and sound data as accumulated data is available, and also an apparatus which is a digital still camera but can handle moving image data and an apparatus which is a digital video camera but can handle still image data are available.

Therefore, where writing back data is transferred already to and rewritten in a mobile apparatus 4 of the destination to which the writing back data is to be provided, since a writing back history is produced already as seen in FIG. 11, it is possible to specify the format of the writing back data based on the data attribute of the writing back history.

In particular, since the writing back history information is information which represents writing back data and a destination mobile apparatus of the writing back, if the mobile apparatus of the writing back destination is specified, it is possible to specify the format of the writing back data based on the data attribute of the writing back history.

Accordingly, if the data attribute of the writing back history indicates that the writing back data is still image data, the format of the writing back data can be specified such that a reduced image of still image data is determined as the writing back data. Meanwhile, if the data attribute of the writing back data is moving picture data, then the format of the writing back data can be specified such that data of a digest version of the moving picture data is determined as the moving picture data. However, where the data attribute of the writing back history indicates that the writing back data is music data, the format of the writing back data can be specified such that partial data extracted from the music data is determined as the writing back data.

Also it is possible to specify the format of the writing back data from the data attribute of accumulated data accumulated in the mobile apparatus 4. In particular, where the accumulated data attribute indicates still image data, the format of the writing back data can be specified such that a reduced image of still image data is determined as the writing back data. Meanwhile, where the accumulated data attribute indicates moving image data, the format of the writing back data can be specified such that data of a digest version of moving image data is determined as the writing back data. Further, where the accumulated data attribute indicates music data, the format of the writing back data can be specified such that partial data extracted from music data is determined as the writing back data.

In this instance, the data attribute of accumulated data accumulated in the mobile apparatus 4 may be acquired through inquiry from the server apparatus 2 to the mobile apparatus 4 through the cradle 1, or the data attribute of new accumulated data provided already from the mobile apparatus 4 may be used.

Also it is possible to specify the format of the writing back data based on an operation input from the user accepted by the server apparatus 2 through the operation section 23 or the remote controller 25. In particular, the operation section 23 or the remote controller 25 is operated so that a selective input screen image for the format of writing back data is displayed on a monitor receiver connected to the server apparatus 2 such that a format of writing back data is selectively inputted through the selective input screen image for the format of writing back data and the operation section 23 or the remote controller 25. Based on the format of writing back data inputted in this manner, the control section 21 may specify the format of the writing back data.

Then, after the format of the writing back data is specified at step S2091, the control section 21 produces writing back data of the format specified at step S2091 (step S2092). In the present embodiment, the writing back data is produced by changing the format of accumulated data supplied from the mobile apparatus 4 and stored in the HDD 30 and then erased from the mobile apparatus 4 as described above.

[Other Example of Writing Back Data]

It is to be noted that, in the foregoing description, it is described that writing back data is formed from accumulated data supplied from the mobile apparatus 4, stored in the HDD 30 and then removed from the mobile apparatus 4. However, the formation of writing back data is not limited to this. The mobile apparatus 4 may include no accumulated data at all therein, or where the mobile apparatus is a portable music reproduction apparatus or the like, since the accumulated data originally exists in the server apparatus, no backup data of the accumulated data may be stored.

In such instances, the writing back data cannot be formed from the accumulated data provided from the mobile apparatus 4 to the server apparatus 2. Therefore, for example, a thumbnail image of content data, moving image data of a digest version, music data of a trial version or the like which newly becomes available in the mobile apparatus 4 may be provided as writing back data.

In particular, where the server apparatus 2 does not receive provision of accumulated data from the mobile apparatus 4, it is possible to specify the format of provision data to be provided to the mobile apparatus 4 in accordance with the format of the writing back data specified at step S2091 and then provide the provision data of the specified format as writing back data.

For example, if the format of writing back data to be provided to the mobile apparatus 4 is specified as resized image data by the process at step S2091, then it is possible to form a reduced image of still image data acquired newly through the Internet or the like and provide the reduced image to the mobile apparatus 4. On the other hand, where the format of the writing back data to be provided to the mobile apparatus 4 is moving image data of a digest version, it is possible to form a digest version of the moving image data acquired newly through the Internet or the like and provide the digest version of the moving image data to the mobile apparatus 4. Further, where the format of the writing back data to be provided to the mobile apparatus 4 is a part of music data, that is, music data of a trial version, it is possible to provide music data of a trial version acquired newly through the Internet or the like to the mobile apparatus 4.

In this manner, writing back data from the server apparatus 2 to the mobile apparatus 4 may not only be formed based on accumulated data provided from the mobile apparatus 4, but data which can be provided, data formed from such data which can be provided or like data may be provided as writing back data to the mobile apparatus 4.

[Processing of the Mobile Apparatus 4]

Figure 17:
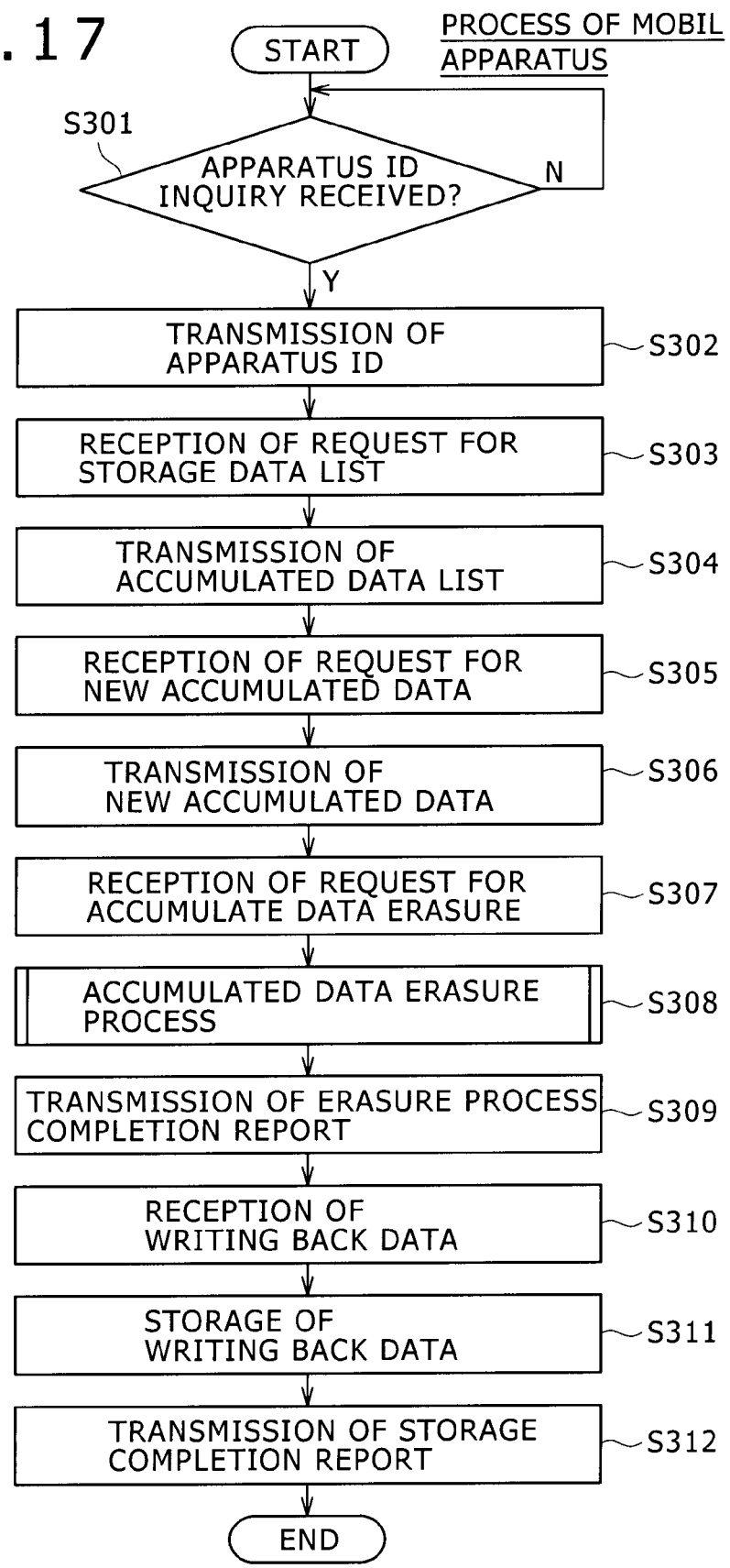
FIG. 17 is a flow chart illustrating a process carried out by the mobile apparatus.

FIG. 17 illustrates a process executed by the mobile apparatus 4 of the data communication system. The process illustrated in FIG. 17 is executed principally by the control section 41, transmission/reception control section 47 and image erasure control section 48 of a mobile apparatus 4 when the mobile apparatus 4 is placed into a predetermined mode in which it is placed on and cooperates with the cradle 1 to carry out data communication and a charging process such as, for example, a charging mode.

First, if the mobile apparatus 4 is placed into the predetermined mode, then the transmission/reception control section 47 thereof determines whether or not an inquiry about an apparatus ID is received from the cradle 1 through the transmission/reception antenna 45b and the radio communication section 45a (step S301). If it is determined by the decision process at step S301 that an inquiry about an apparatus ID is not received, then the process at step S301 is repeated to wait that an inquiry about an apparatus ID is received.

If it is determined by the decision process at step S301 that an inquiry about an apparatus ID is received from the cradle 1, then the control section 41 acquires necessary information such as an apparatus ID and an apparatus attribute stored and retained, for example, in the ROM 412 of the mobile apparatus 4. Then, the control section 41 forms such an apparatus ID response as illustrated in FIG. 7C based on the acquired information, and the transmission/reception control section 47 transmits the apparatus ID response to the cradle 1 through the radio communication section 45a and the transmission/reception antenna 45b (step S302).

Then, the transmission/reception control section 47 receives a request for an accumulated data list transmitted thereto from the server apparatus 2 through the cradle 1 through the transmission/reception antenna 45b and the transmission/reception antenna 45b (step S303). Then, the control section 41 forms such an accumulated data list as described above with reference to FIG. 8, and the transmission/reception control section 47 transmits the accumulated data list through the radio communication section 45a and the transmission/reception antenna 45b to be transmitted to the server apparatus 2 through the cradle 1 (step S304).

Thereafter, the transmission/reception control section 47 receives a request for new accumulated data transmitted thereto from the server apparatus 2 through the cradle 1 through the transmission/reception antenna 45b and the radio communication section 45a (step S305). Then, the control section 41 extracts new accumulated data of such a format as described above with reference to FIG. 8 from the image storage section 44 of the mobile apparatus 4 in accordance with the request for new accumulated data. Then, the transmission/reception control section 47 transmits the extracted new accumulated data through the radio communication section 45a and the transmission/reception antenna 45b to be transmitted to the server apparatus 2 through the cradle 1 (step S306).

Then, the transmission/reception control section 47 receives a request for erasure of accumulated data transmitted thereto from the server apparatus 2 through the cradle 1 through the transmission/reception antenna 45b and the radio communication section 45a (step S307). Then, the control section 41 executes a process of erasing accumulated data whose erasure is designated from among the accumulated data stored and retained in the image storage section 44 of the mobile apparatus 4 (step S308). Thereafter, the control section 41 forms an erasure process completion report, and the transmission/reception control section 47 transmits the erasure process completion report through the radio communication section 45a and the transmission/reception antenna 45b to be transmitted to the server apparatus 2 through the cradle 1 (step S309).

Then, the transmission/reception control section 47 receives writing back data transmitted from the server apparatus 2 through the cradle 1 through the transmission/reception antenna 45b and the radio communication section 45a (step S310) and stores the writing back data into the image storage section 44 of the mobile apparatus 4 (step S311). Thereafter, the control section 41 forms a storage completion report, and the transmission/reception control section 47 transmits the storage completion report through the radio communication section 45a and the transmission/reception antenna 45b to be transmitted to the server apparatus 2 through the cradle 1 (step S312), thereby ending the process illustrated in FIG. 17.

[Image Erasure Process]

Figure 18:
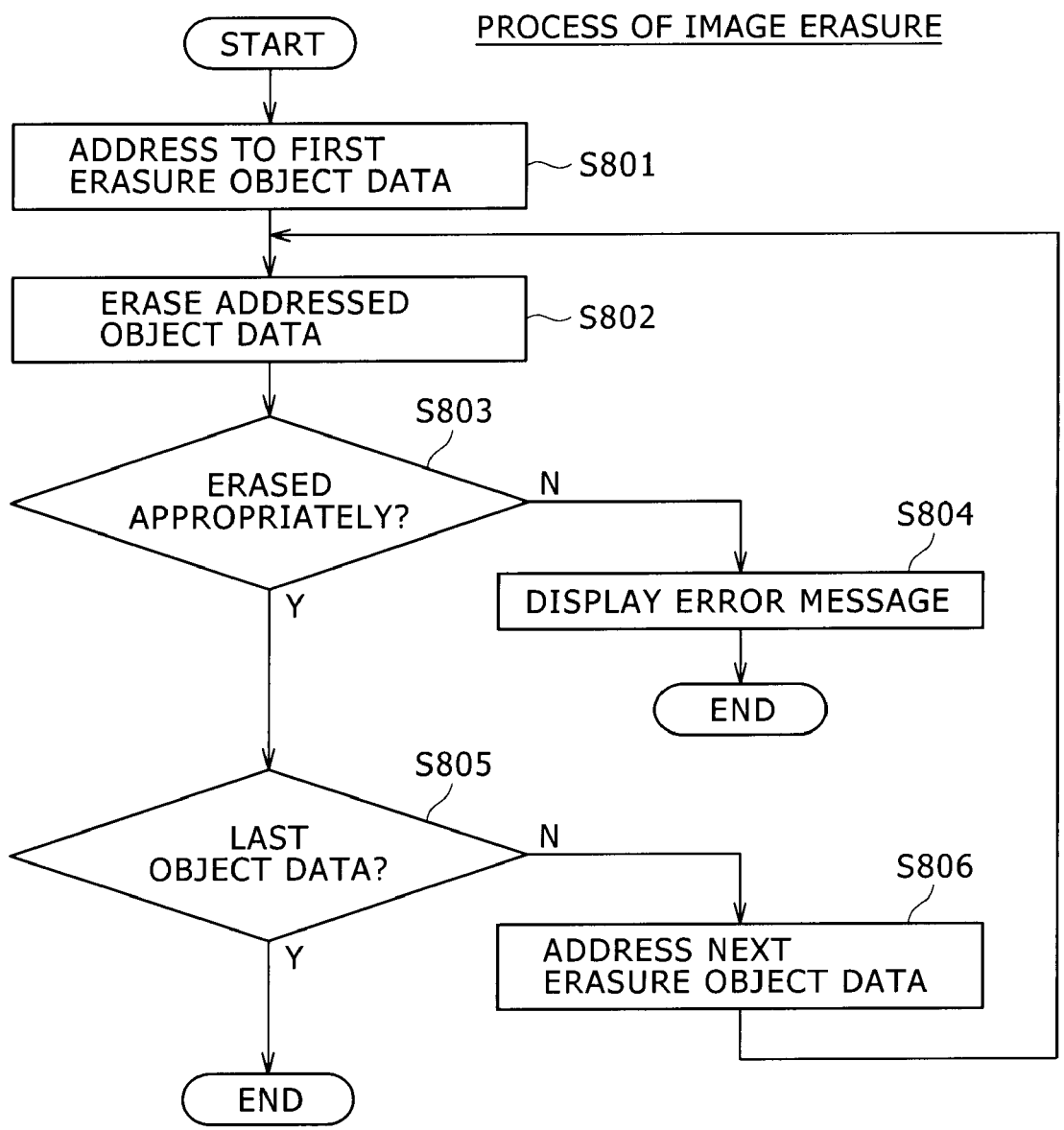
FIG. 18 is a flow chart illustrating an image data erasure process or accumulated data erasure process carried out in the process illustrated in FIG. 17.

FIG. 18 illustrates the image data erasure process or accumulated data erasure process executed at step S308 in the process described above with reference to FIG. 17. Since a request for accumulated data erasure may designate a plurality of accumulated data to be erased, the control section 41 addresses, from among image data or accumulated data stored in the image storage section 44, the first erasure object data designated by the request for accumulated data erasure (step S801). Then, the control section 41 erases the addressed erasure object data (step S802).

Then, the control section 41 determines whether or not the erasure object data determined to be erased at step S802 has been erased appropriately (step S803). This decision process can be made based on a status representative of a processing state which is updated in the RAN 413 of the control section 41.

If it is determined by the decision process at step S803 that the erasure object data has not been erased successfully because it is protected against deletion, then the control section 41 controls the display section 49 to display an error message representing such failure in erasure on the display screen of the display section 49 (step S804). Thereafter, the process illustrated in FIG. 18 is ended.

On the other hand, if it is determined by the decision process at step S803 that the erasure object data has been erased appropriately, then the control section 41 determines whether or not the erased erasure object data is the last erasure object data (step S805). If it is determined by the decision process at step S805 that the erasure object data erased in the present cycle is not the last erasure object data, the control section 41 addresses the next erasure object data to determine the same as an erasure object in response to the request for accumulated data erasure (step S806). Thereafter, the processes at the steps beginning with step S802 are repeated.

On the other hand, if it is determined by the decision process at step S805 that the erasure object data erased in the present cycle is the last erasure object data, then the control section 41 ends the process illustrated in FIG. 18 and returns the processing to the process illustrated in FIG. 17 so that the processes at the steps beginning with the step S308 are carried out subsequently.

Summary of the Embodiment

In the data communication system described above with reference to FIGS. 1 to 18, only if a mobile apparatus 4 is placed on the cradle 1 connected to the server apparatus 2, then the server apparatus 2 accesses the mobile apparatus 4 through the cradle 1 and stores accumulated data accumulated in the mobile apparatus 4 as backup data into the server apparatus 2. Further, the server apparatus 2 specifies, from among the backed up accumulated data, those accumulated data which can be erased from the storage section of the mobile apparatus 4 and then erases the specified erasable accumulated data from the storage section of the mobile apparatus 4. Consequently, effective utilization of the storage section can be achieved, and besides the server apparatus 2 can automatically provide information required by the mobile apparatus 4.

In particular, only if the mobile apparatus 4 is placed on the cradle 1, then the cradle 1 and the server apparatus 2 cooperate with each other to act upon the mobile apparatus 4 placed on the mobile apparatus 4 and automatically carry out data backup of the mobile apparatus 4, arrangement of the storage section or memory of the mobile apparatus 4 and provision of necessary information to the mobile apparatus 4. Accordingly, there is no necessity to use time and labor for backing up accumulated data accumulated in the mobile apparatus 4, but necessary data can be maintained in the mobile apparatus 4 or provided newly so that the mobile apparatus 4 can be used sufficiently or flexibly.

It is to be noted that provision of necessary information to the mobile apparatus 4 in the data communication system described above is carried out such that reduced image data formed from still image data backed up from the mobile apparatus 4 into the server apparatus 2 and then erased from the image storage section 44 of the mobile apparatus 4 is produced as writing back data and written back. However, the provision is not limited to this.

As described above, accumulated data to be backed up from the mobile apparatus 4 into the server apparatus 2 may not exist, or music data accumulated in a portable music reproduction apparatus may not necessarily be backed up because it already exists on the server apparatus 2.

Therefore, as described above in the [Other Example of Writing Back Data], it is possible to provide, for example, a thumbnail image of content data which has newly become available in the mobile apparatus 4, moving image data of a digest version, music data of a trial version or the like as writing back data to the mobile apparatus 4 to be stored into the storage section of the mobile apparatus 4 such that it can be utilized on the mobile apparatus 4.

Further, a type of data to be provided to the mobile apparatus 4 may be determined in the following manner. In particular, a format of data which can be utilized in the mobile apparatus 4 is specified in response to an apparatus attribute of the mobile apparatus 4, a writing back history of writing back data of the mobile apparatus 4, a data attribute of data accumulated in the mobile apparatus 4 or an instruction from the user as described above in the writing back data production process with reference to FIG. 16. Then, data of the specified format may be provided.

[Modifications to the Data Communication System]

In the data communication system of the embodiment described above, the decision of whether or not accumulated data to be backed up exists in the mobile apparatus 4 placed on the cradle 1 is carried out by the server apparatus 2 side based on an accumulated data list provided from the mobile apparatus 4 in response to a request from the server apparatus 2 as described above with reference to FIGS. 5 and 6. However, the decision is not limited to this. Also it is possible for the cradle 1 to carry out the decision of whether or not accumulated data to be back up exists in the mobile apparatus 4 placed on the cradle 1 thereby to reduce the load to the server apparatus 2 and achieve speeding up of processing.

Also the modified data communication system has the configuration described above with reference to FIG. 1 similarly to the data communication system described above, and the cradle 1, server apparatus 2 and mobile apparatus 4 have the configurations described above with reference to FIGS. 2, 3 and 4, respectively. Accordingly, it is assumed that, also in the present modification, the mobile apparatus 4 placed on the cradle 1 is a digital still camera. However the functions of the apparatus in the present modification are somewhat different from those in the embodiment described above.

Figure 19:
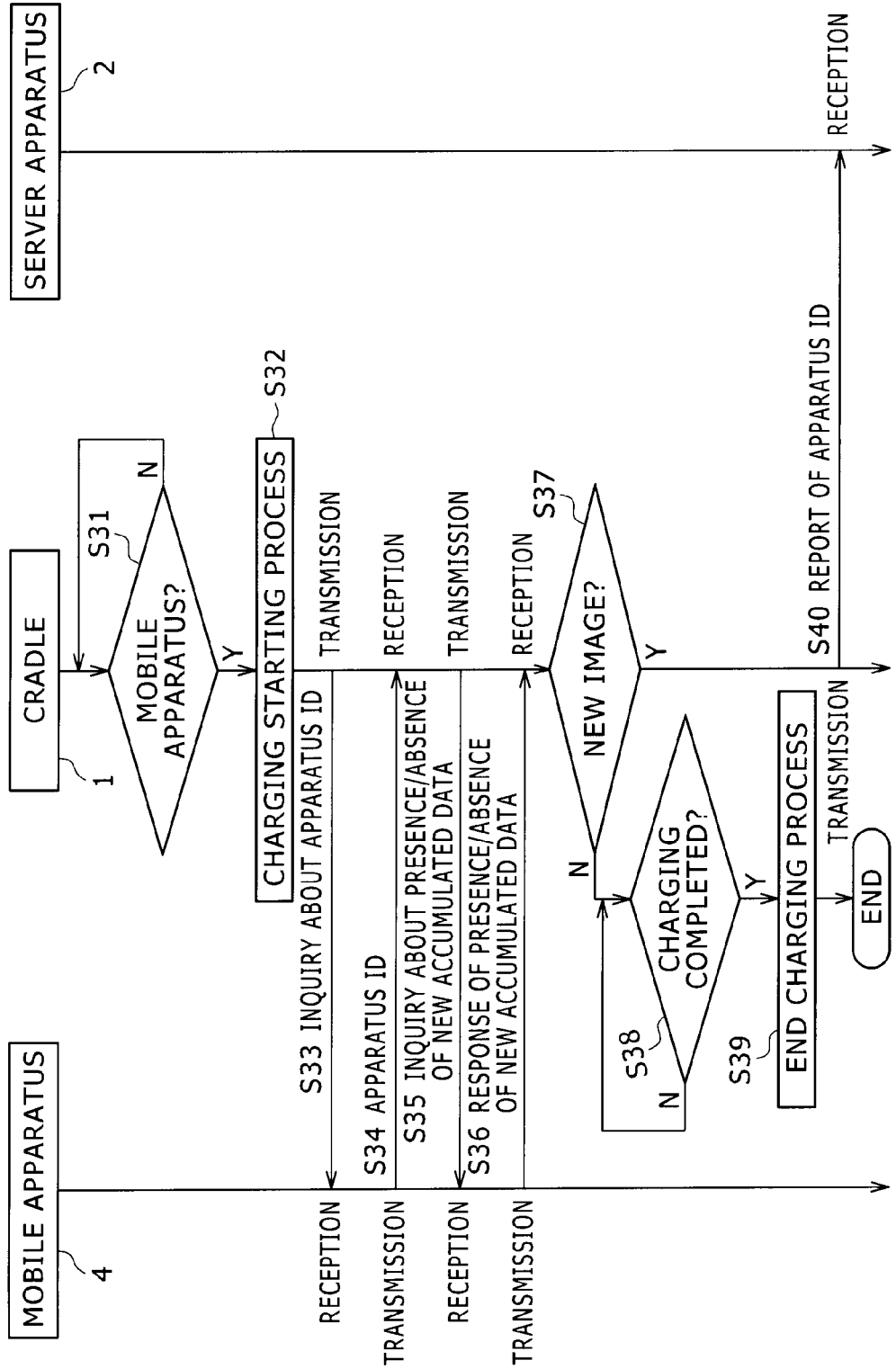
FIG. 19 is a sequence diagram illustrating operation of a modification to the data communication system of the first embodiment.

FIG. 19 illustrates operation of the modified data communication system. Also in the operation of the modified data communication system, when the cradle 1 is in a state wherein the power supply thereto is on, the cradle 1 uses the function of the placement detection section 16 to determine after every interval of time whether or not a mobile apparatus 4 is placed thereon (step S31). Also in the modified data communication system, the cradle 1 is configured such that a plurality of mobile apparatus can be placed thereon and can detect that a mobile apparatus is placed thereon every time a new mobile apparatus is placed thereon.

Then, if it is determined by the decision process at step S31 that a mobile apparatus 4 is not placed on the cradle 1, then the decision process at step S31 is repeated to wait that a mobile apparatus 4 is placed on the cradle 1. However, if it is determined by the decision process at step S31 that a mobile apparatus 4 is placed on the cradle 1, then the cradle 1 carries out a process for starting charging of the mobile apparatus 4 placed newly (step S32).

Thereafter, the transmission/reception control section 17 in the cradle 1 controls the radio communication section 15*a* to transmit a request for inquiry about an apparatus ID to the mobile apparatus 4 placed newly on the cradle 1 (step S33). The mobile apparatus 4 receives the request for inquiry about an apparatus ID from the cradle 1 through the transmission/reception antenna 45*b* and the radio communication section 45*a*. Then, the transmission/reception control section 47 of the mobile apparatus 4 controls the radio communication section 45*a* to transmit the apparatus ID of the mobile apparatus 4 to the cradle 1 (step S34).

The cradle 1 receives the apparatus ID from the mobile apparatus 4 placed newly through the transmission/reception antenna 15*b* and the radio communication section 15*a*, and the control section 11 thereof forms an inquiry about presence or absence of new accumulated data. Then, the inquiry about presence or absence of new accumulated data is transmitted to the mobile apparatus 4 through the radio communication section 15*a* and the transmission/reception antenna 15*b* under the control of the transmission/reception control section 17 (step S35).

The mobile apparatus 4 receives the inquiry about presence or absence of new accumulated data from the cradle 1 through the transmission/reception antenna 45*b* and the radio communication section 45*a*, and the control section 41 thereof confirms data stored and retained in the image storage section 44 to confirm whether or not new accumulated data which has not been backed up as yet exists. Then, the control section 41 forms a response about presence or absence of new accumulated data in accordance with a result of the confirmation, and the transmission/reception control section 47 controls the radio communication section 45*a* through the control section 41 to transmit the response about presence or absence of new accumulated data to the cradle 1 (step S36).

It is to be noted that, as described above, even if accumulated data is backed up, if it is important data, then it is maintained. Therefore, for still image data which is backed up already but is determined to be maintained, a backup flag is prepared in the header part such that the still image data can be distinguished from new accumulated data depending upon whether the backup flag is on.

Then, the control section 11 of the cradle 1 determines based on the received response about presence or absence of new accumulated data from the mobile apparatus 4 whether or not new accumulated data to be backed up, that is, new still image data, exists in the mobile apparatus 4 (step S37). If it is determined at step S37 that new accumulated data does not exist, then the cradle 1 places itself into and remains in a waiting state until the charging of the mobile apparatus 4 is completed without communicating with the server apparatus 2 (step S38). Then, if it is determined by the decision process at step S38 that the charging is completed, then the charging process for the mobile apparatus 4 is ended (step S39), thereby ending the series of data communication processes.

On the other hand, if it is determined by the decision process at step S37 that new accumulated data exists, then the transmission/reception control section 17 of the cradle 1 controls the external interface 14*a* to report the apparatus ID received from the mobile apparatus 4 placed newly on the cradle 1 through the transmission/reception antenna 15*b* and the radio communication section 15*a* to the mobile apparatus 4 (step S40). Consequently, the server apparatus 2 recognizes that a new mobile apparatus having accumulated data has been placed on the cradle 1.

After the reporting of the apparatus ID to the server apparatus 2 at step S40, the processes at steps S9 to S20 illustrated in FIGS. 5 and 6 are successively carried out. In this instance, if new accumulated data does not exist in the mobile apparatus 4 placed on the cradle 1, then since no communication is carried out between the cradle 1 and the server apparatus 2, the load to the server apparatus 2 can be moderated.

[Operation of the Component Apparatus of the Modified Data Communication System]

Now, operation of the individual component apparatus of the modified data communication system described above with reference to FIG. 19 is described. Also in this instance, operation of the cradle 1 positioned at the center of the modified data communication system, server apparatus 2 which carries out data management and mobile apparatus 4 placed on the cradle 1 is described particularly in order.

[Processing of the Cradle 1]

Figure 20:
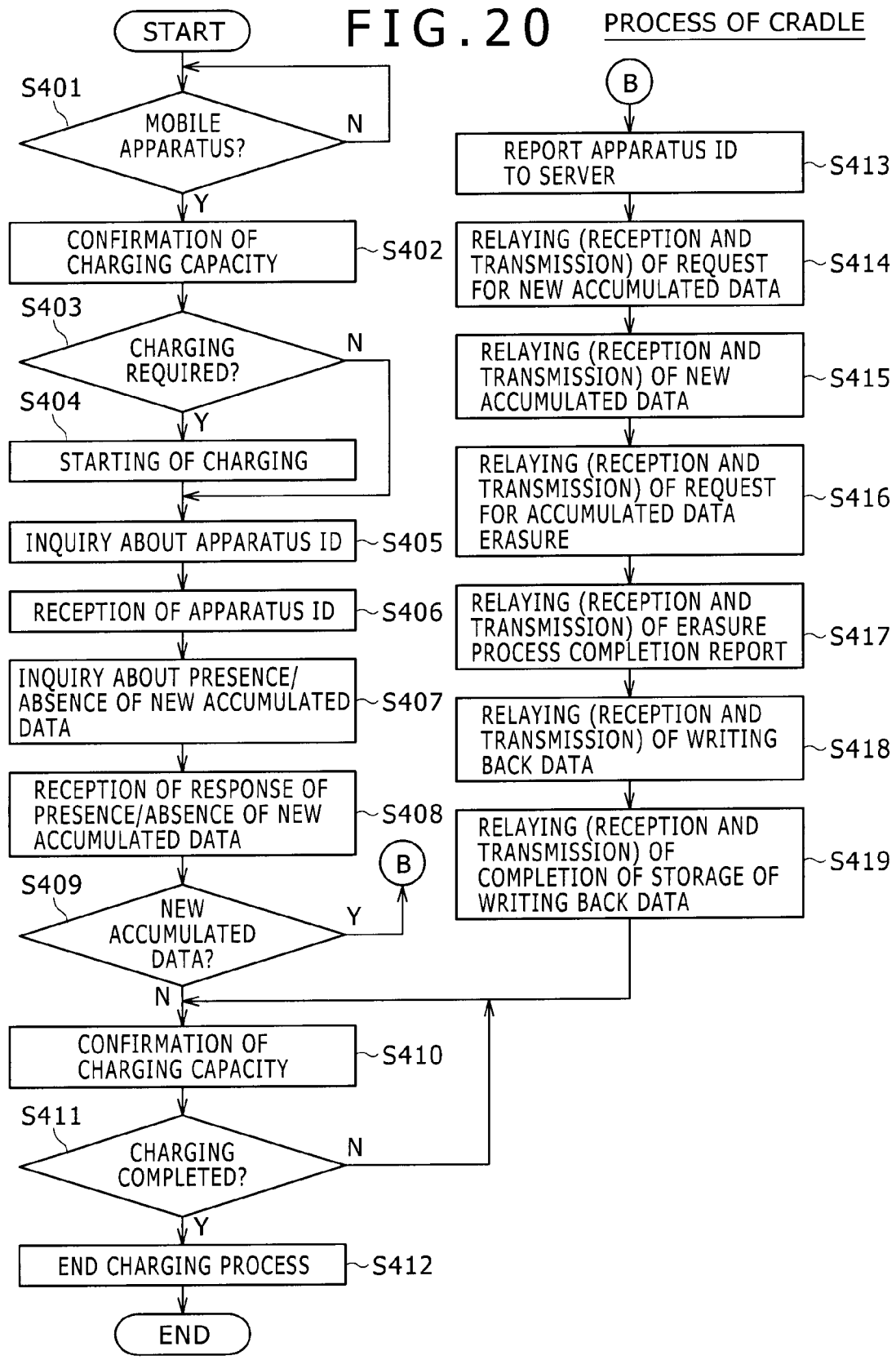
FIG. 20 is a flow chart illustrating a process carried out by the cradle of the modified data communication system.

FIG. 20 illustrates a process carried out by the cradle 1 of the modified data communication system. The process illustrated in FIG. 20 is executed principally by the control section 11 and the transmission/reception control section 17 when the cradle 1 is in a state wherein the power supply thereto is on. It is to be noted that, also in the present modification, a plurality of mobile apparatus can be placed at a time on the cradle 1 and the cradle 1 can execute the process illustrated in FIG. 20 in a multi-task fashion for a maximum number of mobile apparatus which can be placed on the cradle 1.

If the power supply to the cradle 1 is turned on, then the control section 11 of the cradle 1 controls the placement detection section 16 to start placement detection of a mobile apparatus to determine whether or not a mobile apparatus is placed on the cradle 1 (step S401). If it is determined by the decision process at step S401 that a mobile apparatus is not placed on the cradle 1, then the placement detection of a mobile apparatus is repeated to wait that a mobile apparatus is placed on the cradle 1.

If it is determined by the decision process at step S401 that a mobile apparatus is placed on the cradle 1, then the control section 11 controls the charging control section 19 to confirm the charging capacity of the mobile apparatus 4 placed newly (step S402). The process at step S402 may be carried out as an electric detection process such as to detect a voltage of the battery of the mobile apparatus 4 or the like.

Then, the control section 11 determines whether or not the mobile apparatus 4 placed newly requires charging (step S403). If it is determined that the mobile apparatus 4 requires charging, then the control section 11 controls the charging control section 19 to start charging of the battery of the mobile apparatus 4 placed newly (step S404). On the other hand, if it is determined by the decision process at step S403 that the mobile apparatus 4 does not require charging, then the processing advances to step S405.

After the process at step S404 or when if it is determined by the decision process at step S403 that the mobile apparatus 4 does not require charging, the following series of relaying process is executed. In particular, the control section 11 of the cradle 1 forms command data for inquiry about an apparatus ID described above with reference to FIG. 7B. Then, the transmission/reception control section 17 controls the radio communication section 15*a* and the transmission/reception antenna 15*b* to transmit the command data for inquiry about an apparatus ID to the mobile apparatus 4 placed newly (step S405).

Thereafter, the transmission/reception control section 17 of the cradle 1 receives an apparatus ID response described above with reference to FIG. 7C from the mobile apparatus 4 through the transmission/reception antenna 15*b* and the radio communication section 15*a* (step S406). Thereafter, the control section 11 of the cradle 1 forms an inquiry about presence or absence of new accumulated data, and the transmission/reception control section 17 controls the radio communication section 15*a* to transmit the inquiry about presence or absence of new accumulated data to the mobile apparatus 4 (step S407).

Then, the transmission/reception control section 17 of the cradle 1 receives a response about presence or absence of new accumulated data transmitted from the mobile apparatus 4 in response to the inquiry about presence or absence of new accumulated data transmitted at step S407 through the transmission/reception antenna 15*b* and the radio communication section 15*a* (step S408). Thereafter, the control section 11 of the cradle 1 determines based on the response about presence or absence of new accumulated data received at step S408 whether or not new accumulated data exists in the mobile apparatus 4 placed newly on the cradle 1 (step S409).

If it is determined by the decision process at step S409 that new accumulated data does not exist, then since the cradle 1 need not carry out communication with the server apparatus 2, the control section 11 of the cradle 1 controls the charging control section 19 to confirm the charging capacity of the battery of the mobile apparatus 4 (step S410). Then, the control section 11 of the cradle 1 determines whether or not the charging of the mobile apparatus 4 is completed (step S411).

If it is determined by the decision process at step S411 that the charging is not completed as yet, then the processes at the steps beginning with step S410 are repeated to continue the charging process. On the other hand, if it is determined by the decision process at step S411 that the charging for the mobile apparatus 4 is completed, then the cradle 1 executes a predetermined process for ending the charging of the mobile apparatus 4 (step S412), thereby ending the process illustrated in FIG. 20.

On the other hand, if it is determined by the decision process at step S409 that new accumulated data does not exist, then the transmission/reception control section 17 of the cradle 1 reports the apparatus ID acquired from the mobile apparatus 4 to the server apparatus 2 through the external interface 14*a* and the input/output terminal 14*b* (step S413).

Thereafter, the transmission/reception control section 17 of the cradle 1 receives a request of new accumulated data from the server apparatus 2 through the external interface 14*a* and the input/output terminal 14*b*, and transmits the received request to the mobile apparatus 4 through the radio communication section 15*a* and the transmission/reception antenna 15*b* (step S414).

Then, the transmission/reception control section 17 receives the new accumulated data from the mobile apparatus 4 through the transmission/reception antenna 15*b* and the radio communication section 15*a* and transmits the received new accumulated data to the server apparatus 2 through the external interface 14*a* and the input/output terminal 14*b* (step S415). Next, the transmission/reception control section 17 receives a request for erasure of accumulated data from the server apparatus 2 through the input/output terminal 14*b* and the external interface 14*a* and transmits the received request for erasure of accumulated data to the mobile apparatus 4 through the radio communication section 15*a* and the transmission/reception antenna 15*b* (step S416).

Then, the transmission/reception control section 17 of the cradle 1 receives a report of erasure process completion from the mobile apparatus 4 through the transmission/reception antenna 15*b* and the radio communication section 15*a* and transmits the erasure process completion report to the server apparatus 2 through the external interface 14*a* and the input/output terminal 14*b* (step S417). Then, the transmission/reception control section 17 receives writing back data from the server apparatus 2 through the input/output terminal 14*b* and the external interface 14*a* and transmits the writing back data to the mobile apparatus 4 through the radio communication section 15*a* and the transmission/reception antenna 15*b* (step S418).

Then, the transmission/reception control section 17 of the cradle 1 receives a writing back data storage completion report from the mobile apparatus 4 through the transmission/reception antenna 15*b* and the radio communication section 15*a* and transmits the writing back data storage completion report to the server apparatus 2 through the external interface 14*a* and the input/output terminal 14*b* (step S419). In this manner, also in the present modified data communication system, the series of relaying processes between the server apparatus 2 and the mobile apparatus 4 is executed by the processes at steps S414 to S419.

It is to be noted that, in the relaying process of accumulated data at step S415 or in the relaying process of writing back data at step S418, a large number of accumulated data or writing back data to be relayed may exist, and at step S415 or S418, a transfer process of a large number of data may naturally be carried out.

Then, after the process at step S419, the control section 11 of the cradle 1 executes the processes at steps S410 to S412, and when the charging of the battery of the mobile apparatus 4 is completed, the predetermined process for ending the charging of the mobile apparatus 4 is executed, thereby ending the process illustrated in FIG. 20.

It is to be noted that, while, also in the example illustrated in FIG. 20, the charging capacity is confirmed at step S410 and it is determined at step S411 whether or not the charging is completed, the execution of the charging is not limited to this. As described above, it is determined by the decision process at step S403 whether or not charging is required, and when charging is not required, the charging process is not carried out. Therefore, it is possible to determine, before the confirmation of the charging capacity at step S410, whether or not the charging is being executed, that is, whether or not power is supplied to the mobile apparatus 4 and end, when it is determined that the charging is not being executed, the process illustrated in FIG. 20 without executing the processes at steps S410 to S412.

[Processing of the Server Apparatus 2]

Figure 21:
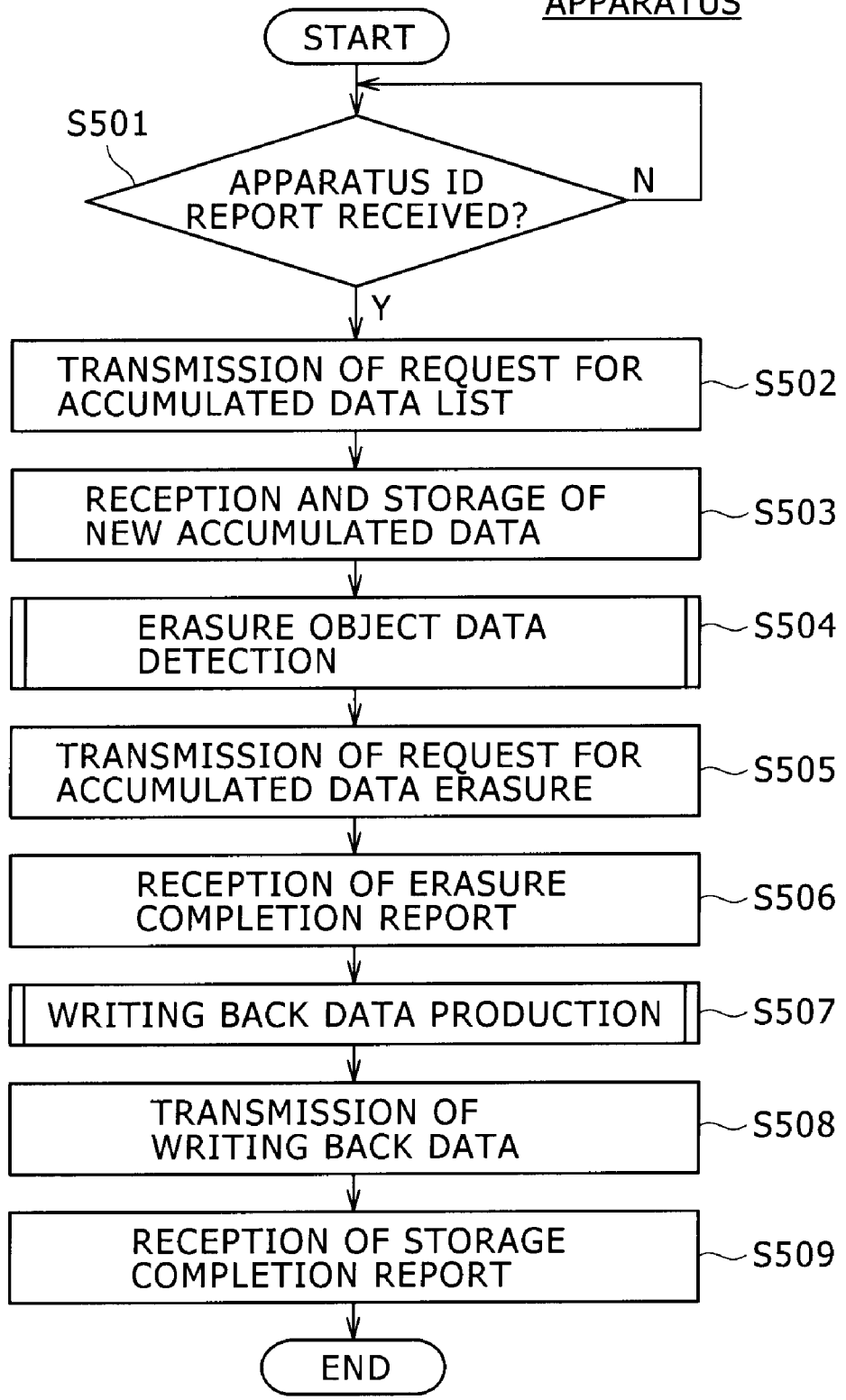
FIG. 21 is a flow chart illustrating a process carried out by the server of the modified data communication system.

FIG. 21 illustrates a process carried out by the server apparatus 2 of the modified data communication system. The process illustrated in FIG. 21 is executed principally by the control section 21 and the transmission/reception control section 27 when the server apparatus 2 is in a state wherein the power supply thereto is on.

If the power supply is turned on, then the transmission/reception control section 27 of the server apparatus 2 determines whether or not an apparatus ID of a mobile apparatus placed on the cradle 1 from the cradle 1 is received through the input/output terminal 26b and the external interface 26a (step S501). If it is determined by the decision process at step S501 that an apparatus ID is not received as yet, then the process at step S501 is repeated to wait that an apparatus ID of the mobile apparatus 4 placed on the cradle 1 is received.

If it is determined by the decision process at step S501 that an apparatus ID from the cradle 1 is received, then since it can be recognized that a new mobile apparatus 4 is placed on the cradle 1, the control section 11 forms a request for new accumulated data for requesting provision of new accumulated data. Then, the transmission/reception control section 27 transmits the request for new accumulate data through the external interface 26a to be transmitted to the mobile apparatus 4 placed on the cradle 1 through the cradle 1 (step S502).

Then, the transmission/reception control section 27 receives new accumulated data transmitted through the cradle 1 through the input/output terminal 26b and the external interface 26a and stores the new accumulated data, for example, into a predetermined region of the HDD 30 (step S503). It is to be noted that a plurality of new accumulated data may be transmitted from the mobile apparatus 4, and at step S503, such new accumulated data from the mobile apparatus 4 can be successively received and stored into the predetermined region of the HDD 30.

Then, the control section 21 of the server apparatus 2 executes a process of detecting erasure object data which are accumulated data which can be erased from the mobile apparatus 4 from among the accumulated data from the mobile apparatus 4 stored in the predetermined region of the HDD 30 (step S504). The erasure object data detection process at step S206 is same as the erasure data detection process described above with reference to FIGS. 14 and 15.

In particular, the control section 21 estimates, based on information added to the stored accumulated data of the detection object or through an analysis of the accumulated data, whether the accumulated data is important accumulated data. Then, if the accumulated data is estimated as important accumulated data, then it is not determined as an object of erasure, but if the accumulated data is not estimated as important accumulated data, then it is determined as an object of erasure.

Then, the control section 21 forms a request for erasure of accumulated data for erasing the erasure object data detected at step S504 from the image storage section 44 of the mobile apparatus 4. Then, the request for accumulated data erasure is transmitted through the external interface 26a and the input/output terminal 26b under the control of the transmission/reception control section 27 to be transmitted to the mobile apparatus 4 through the cradle 1 (step S505).

Thereafter, the transmission/reception control section 27 of the server apparatus 2 receives an erasure completion report transmitted from the mobile apparatus 4 of the opposite party, to which the request for accumulated data erasure has been transmitted, through the input/output terminal 26b and the external interface 26a (step S506). Thereafter, the control section 21 of the server apparatus 2 produces writing back data to be written back in a changed format into the mobile apparatus 4 from the accumulated data received from the mobile apparatus 4, stored in the HDD 30 and erased from the mobile apparatus 4 (step S507).

The production process of writing back data carried out at step S507 is same as the writing back data production process described above in detail with reference to FIG. 16. In particular, writing back data is produced after the format of the writing back data to be produced is specified. In the present modification, since the accumulated data backed up in the server apparatus 2 are still image data, it is specified that the format of the writing back data is reduced image data. Thus, reduced image data is formed from the backed up accumulated data and returned to the mobile apparatus 4.

Then, the transmission/reception control section 27 of the server apparatus 2 transmits the writing back data produced at step S507 through the external interface 26a and the input/output terminal 26b to be transmitted to the mobile apparatus 4 through the cradle 1 (step S508). Thereafter, the transmission/reception control section 27 of the server apparatus 2 receives a storage completion report of the writing back data transmitted from the mobile apparatus 4 through the cradle 1 and through the input/output terminal 26b and the external interface 26a (step S509), thereby ending the process illustrated in FIG. 21.

It is to be noted here that, although the process described above is an example wherein a communication process is carried out without a trouble, for example, in such an instance that no response is received when some request is transmitted from the server apparatus 2 to the mobile apparatus 4, transmission of the request may be carried out again or a request for response may be transmitted.

For example, if an erasure completion report is not received within a predetermined period of time at step S506, then a request for confirmation regarding whether or not an erasure process for accumulated data has been carried out may be transmitted. Alternatively, if a storage completion report is not received within a predetermined period of time at step S509, then a request for confirmation regarding whether or not writing back data is stored may be transmitted. Then, in response to the response, a suitable process may be carried out such as to transmit the original request again.

[Processing of the Mobile Apparatus 4]

Figure 22:
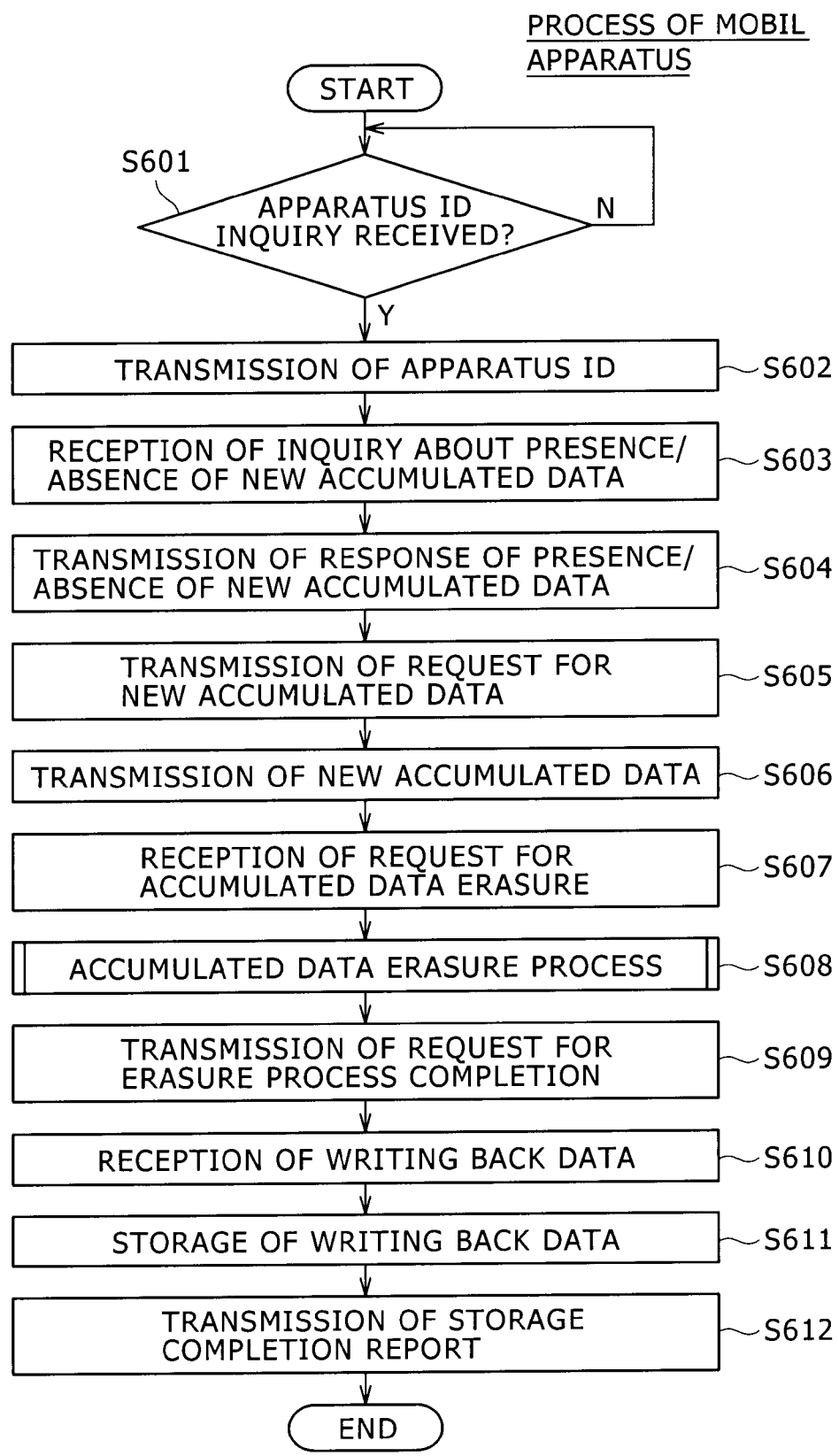
FIG. 22 is a flow chart illustrating a process carried out by the mobile apparatus of the modified data communication system.

FIG. 22 illustrates a process carried out by a mobile apparatus 4 of the modified data communication system. The process illustrated in FIG. 22 is executed principally by the control section 41, transmission/reception control section 47 and image erasure control section 48 of the mobile apparatus 4 when, while the mobile apparatus 4 is, for example, in the charging mode, it is placed on the cradle 1 and placed into a predetermined mode wherein data communication and a charging process are executed.

First, if the mobile apparatus 4 is placed into the predetermined mode, then the transmission/reception control section 47 determines whether or not an inquiry about an apparatus ID is received from the cradle 1 through the transmission/reception antenna 45b and the radio communication section 45a (step S601). If it is determined by the decision process at step S601 that an inquiry about an apparatus ID is not received, then the process at step S601 is repeated to wait that an inquiry abound an apparatus ID is received.

If it is determined by the decision process at step S601 that an inquiry about an apparatus ID is received from the cradle 1, then the control section 41 acquires necessary information such as an apparatus ID and an apparatus attribute stored and retained, for example, in the ROM 412 of the mobile apparatus 4 and forms such an apparatus ID response as described above with reference to FIG. 7C. Then, the transmission/reception control section 47 transmits the apparatus ID response to the cradle 1 through the radio communication section 45a and the transmission/reception antenna 45b (step S602).

Then, the transmission/reception control section 47 receives an inquiry about presence or absence of new accumulated data transmitted from the cradle 1 through the transmission/reception antenna 45b and the radio communication section 45a (step S603). Then, the control section 41 confirms stored data of the image storage section 44 of the mobile apparatus 4 and forms a response about presence or absence of new accumulated data. Then, the transmission/reception control section 47 transmits the response about presence or absence of new accumulated data through the radio communication section 45a and the transmission/reception antenna 45b to be transmitted to the server apparatus 2 through the cradle 1 (step S604).

Thereafter, the transmission/reception control section 47 receives a request for new accumulated data transmitted from the server apparatus 2 through the cradle 1 through the transmission/reception antenna 45b and the radio communication section 45a (step S605). The transmission/reception control section 47 extracts new accumulated data of such a format as described above with reference to FIG. 8 from the image storage section 44 of the mobile apparatus 4 in accordance with the received request for new accumulated data. Then, the transmission/reception control section 47 transmits the extracted new accumulated data through the radio communication section 45a and the transmission/reception antenna 45b to be transmitted to the server apparatus 2 through the cradle 1 (step S606).

Then, the transmission/reception control section 47 receives a request for erasure of accumulated data transmitted from the server apparatus 2 through the cradle 1 through the transmission/reception antenna 45b and the radio communication section 45a (step S607). Then, the control section 41 executes a process of erasing accumulated data whose erasure is designated from among the accumulated data stored and retained in the image storage section 44 of the mobile apparatus 4 in accordance with the received request for accumulated data erasure (step S608). The erasure process of accumulated data carried out at step S608 is same as the process described above with reference to FIG. 18.

Thereafter, the control section 41 forms an erasure process completion report, and the transmission/reception control section 47 transmits the erasure process completion report through the radio communication section 45a and the transmission/reception antenna 45b to be transmitted to the server apparatus 2 through the cradle 1 (step S609).

Then, the transmission/reception control section 47 receives writing back data transmitted from the server apparatus 2 through the cradle 1 and through the transmission/reception antenna 45b and the radio communication section 45a (step S610) and stores the writing back data into the image storage section 44 of the mobile apparatus 4 (step s611). Thereafter, the control section 41 forms a storage completion report, and the transmission/reception control section 47 transmits the storage completion report through the radio communication section 45a and the transmission/reception antenna 45b to be transmitted to the server apparatus 2 through the cradle 1 (step S612). The process illustrated in FIG. 22 is completed therewith.

In this manner, in the present modification, the cradle 1 confirms whether or not accumulated data which need be backed up into the server apparatus 2 exists in a mobile apparatus placed on the cradle 1. Then, if such accumulated data does not exist, then only a charging process is carried out for the mobile apparatus 4 without carrying out a communication process with the server apparatus 2.

[Others]

It is to be noted that, while, in the embodiment described above, one server apparatus 2 is connected to the cradle 1, the connection to the cradle 1 is not limited to this. For example, it is possible to connect the cradle 1 to a LAN (Local Area Network) or configure the cradle 1 to allow a plurality of server apparatus to be connected thereto such that the supplying destination of accumulated data can be changed in response to a mobile apparatus placed on the cradle 1.

In this instance, which one of the server apparatus should be used may be determined in response to the apparatus attribute or the like of the mobile apparatus by the cradle 1 or may be specified through an inquiry issued from the cradle 1 to the server apparatus to specify that one of the server apparatus into which accumulated data of the mobile apparatus was backed up using the apparatus ID or specified from an instruction inputted directly to the cradle 1 by the user.

Further, as a function of the cradle 1, setting of the time of the clock circuit of the mobile apparatus 4 or the server apparatus 2 may be carried out. For example, a radio-controlled clock or a clock circuit of a high performance may be used as the clock circuit 22 of the cradle 1 such that the time of the clock circuit 42 of the mobile apparatus 4 placed on the cradle 1 is set with reference to the time of the clock circuit 22 of the cradle 1 or the time of the clock circuit 22 of the server apparatus 2 is set. Further, also it is naturally possible for the reference time to be provided from the server apparatus 2 or some other apparatus.

Further, not only where a plurality of server apparatus are connected to the cradle 1 but also where only one server apparatus is connected to the cradle 1 as in the embodiment described above, since accumulated data are provided from various mobile apparatus to the server apparatus, the server apparatus may merge and manage such accumulated data from the various mobile apparatus in accordance with various conditions.

For example, it is possible to collectively manage accumulated data having the same production date and time although they are derived from different providing sources or collectively manage accumulated data for different types of data such as still images or moving images.

Further, the mobile apparatus is not limited to a portable telephone terminal, a digital still camera, a digital video camera or a portable music reproduction apparatus mentioned as an example above. For example, if the mobile apparatus 4 is an apparatus which picks up still image data such as a digital still camera or a portable telephone set with a camera as described above, then it is possible to supply still image data picked up and accumulated to the server apparatus 2 through the cradle 1 to be backed up into the server apparatus 2 and produce reduced image data formed from the backed up still image data as writing back data and then return the writing back data to the mobile apparatus 4 as described above.

On the other hand, where the mobile apparatus 4 is an apparatus which picks up moving image data such as a digital video camera or a camera-equipped portable telephone terminal, it is possible to supply moving image data picked up and accumulated to the server apparatus 2 through the cradle 1 to be backed up into the server apparatus 2 and produce moving picture data of a digest version formed from the backed up moving image data as writing back data and then return the writing back data to the mobile apparatus 4 as described above.

Further, where the mobile apparatus 4 has a reproduction function of music, it is possible for the server apparatus 2 to collect reproduction history information of music data by the apparatus through the cradle 1, analyze the liking of music of the user of the mobile apparatus and provide recommendable music data conforming to the music liking of the user to the mobile apparatus through the cradle 1. Naturally, it is possible to provide only music data designated to the server apparatus 2 by the user to the mobile apparatus.

Further, where the mobile apparatus 4 is an apparatus which can record and access individual pieces of information like an electronic notebook, it is possible to provide various kinds of information such as a schedule or a memorandum registered newly in the mobile apparatus to the server apparatus 2 to be stored into the server apparatus 2 and return only that data designated by the user. The designation in this instance may be provided in advance to the server apparatus 2 or may be selected by the user who observes data backed up in the server apparatus 2 at a point of time at which the data is backed up into the server apparatus 2.

Further, where the mobile apparatus 4 is of the type which has a function of carrying out communication such as a portable telephone terminal, it is possible to automatically back up address book data or the like into the server apparatus 2 through the cradle 1. Naturally, also it is possible to back up other communication information into the server apparatus 2 through the cradle 1. Also it is possible to provide new address book data registered in the server apparatus 2 to a mobile apparatus through the cradle 1 to be recorded into the mobile apparatus such that the address book data can be utilized on the mobile apparatus. Also the data communication between the server apparatus 2 and the mobile apparatus in this instance can be automatically carried out basically by placing the mobile apparatus 4 on the cradle 1.

Further, it is possible for the server apparatus 2 to provide the same information to a plurality of mobile apparatus determined in advance through the cradle 1 or provide the same information to those mobile apparatus which have the same apparatus attribute. In this instance, the plural mobile apparatus may be placed simultaneously on the cradle 1 or may be placed at different timings from each other.

Further, it is possible for the server apparatus 2 to lay various data acquired from the mobile apparatus 4 open through the cradle 1 or provide various data acquired from the mobile apparatus 4 to a different apparatus in the home or a recording and reproduction apparatus through the cradle 1 to be reproduced or recorded.

Furthermore, where the server apparatus 2 collects information from the mobile apparatus 4 or provides information to the mobile apparatus 4 through the cradle 1, it is possible for the server apparatus 2 to issue a notification of the collection or provision to a different server apparatus connected to the network to notify the user that such collection or provision is carried out through the different server apparatus.

Further, while, in the embodiment described above, the cradle 1 controls charging of the mobile apparatus 4, the charging control is not limited to this as the mobile apparatus 4 may control the charging process.

Further, while, in the embodiment described above, it is described that the cradle 1 and the server apparatus 2 are separate from each other, they may otherwise be formed as a unitary apparatus. Further, while, in the embodiment described above, the server apparatus 2 can be implemented, for example, as a personal computer or a server apparatus of a home network system, also it is possible to configure the server apparatus 2 as a control apparatus for the cradle 1.

Second Embodiment

[Outline of the Data Communication System of the Second Embodiment]

Figure 23:
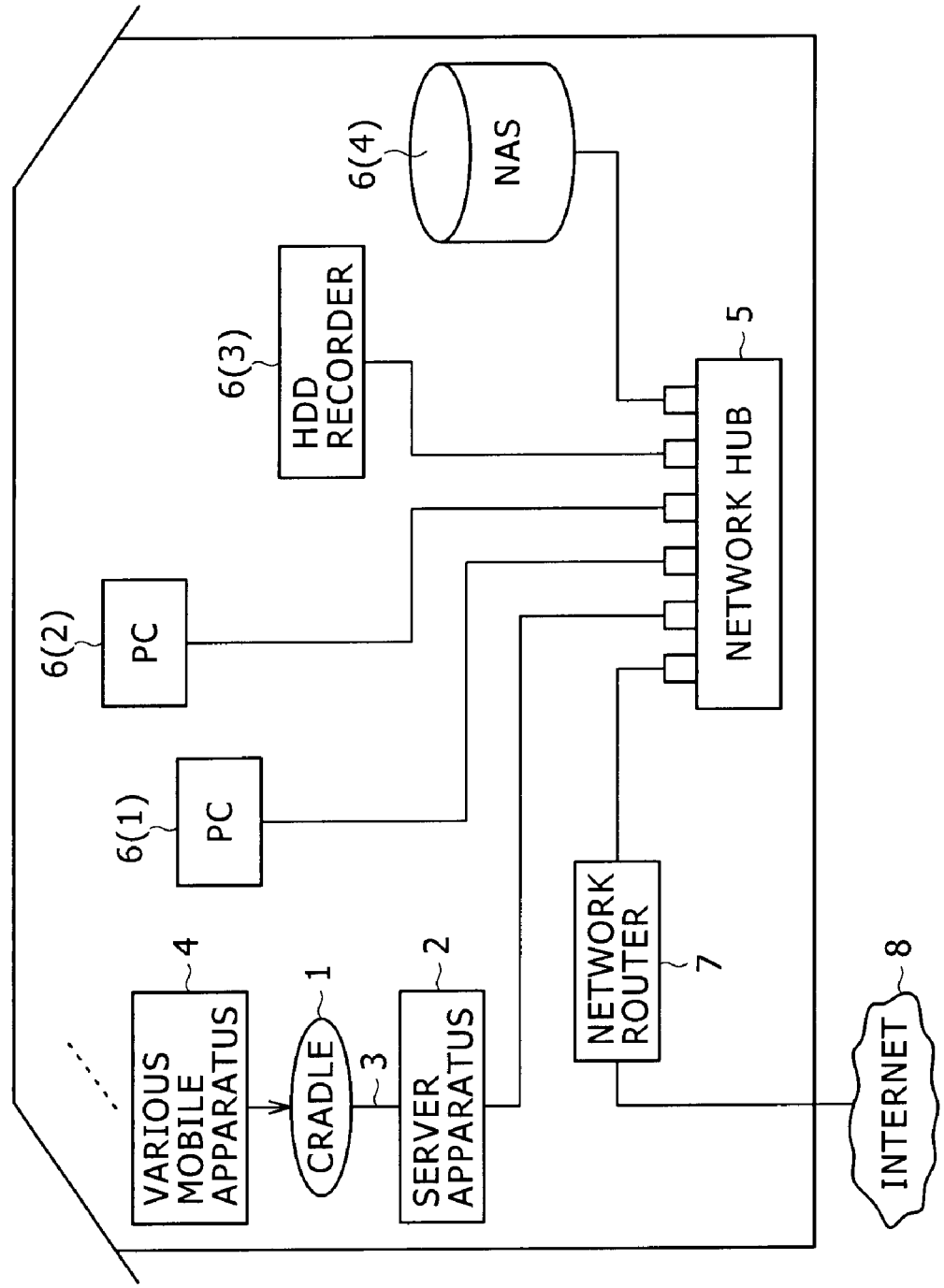
FIG. 23 is a schematic view showing a general configuration of a data communication system according to a second embodiment of the present invention.

Now, a data communication system of a second embodiment of the present invention is described. FIG. 23 shows a general configuration of the data communication system of the second embodiment. Referring to FIG. 23, the data communication system shown includes various mobile apparatus 4, a cradle 1 and a server apparatus 2 similarly to the data communication system of the first embodiment described above. However, the data communication system of the second embodiment is different from that of the first embodiment in that the server apparatus 2 is connected to a home network and can be connected also to a wide area network system such as the Internet.

In particular, also in the data communication system of the present embodiment, the cradle 1 on which the various mobile apparatus 4 can be placed and the server apparatus 2 are connected to each other through an interface cable 3 as seen in FIG. 23. However, in the data communication system of the present second embodiment, the server apparatus 2 can transmit and receive data and so forth to and from various home apparatus installed indoors such as, for example, personal computers personal computers 6(1) and 6(2), a hard disk drive (HDD) recorder 6(3), and a network attached storage (NAS) 6(4) through a network hub 5.

Further, the server apparatus 2 can establish connection to the Internet 8 as a wide area network system through the network hub 5 and a network router 7 installed indoors to access to various commercial server apparatus on the Internet 8 to browse various information or download or upload data.

As described above, the data communication system of the first embodiment is configured such that data is transmitted and received between a mobile apparatus 4 placed on the cradle 1 and the server apparatus 2 connected by wire connection to the cradle 1 or accumulated data in the mobile apparatus 4 is erased in response to an instruction from the server apparatus 2. However, the data communication system of the present second embodiment is configured such that data or the like can be transmitted and received between a mobile apparatus 4 placed on the cradle 1 and a home apparatus on the home network or a commercial server apparatus on the Internet 8.

In particular, in the data communication system of the present second embodiment, data or the like can be transmitted and received between a mobile apparatus 4 placed on the cradle 1 and various home apparatus such as the personal computers 6(1) and 6(2), HDD recorder 6(3) and network attached storage 6(4) installed indoors through the cradle 1 and the server apparatus 2. Further, data or the like can be transmitted and received between a mobile apparatus 4 placed on the cradle 1 and a commercial server apparatus on the Internet 8 through the cradle 1 and the server apparatus 2.

Further, in the present second embodiment, the server apparatus 2 issues an erasure instruction of accumulated data accumulated in a mobile apparatus 4 placed on the cradle 1 in response to information set in advance to re-arrange accumulated data accumulated in the mobile apparatus 4 similarly as in the case of the first example.

It is to be noted that the network hub 5 shown in FIG. 23 establishes connection between various apparatus in the home network so that a communication process can be carried out between object apparatus in the home network. Meanwhile, the network router 7 in the present example is installed between the Internet 8 as a wide area network system and the home network as a local area network and repeats data between the networks so that a signaled packet may be sent to a correction destination.

[Example of a Configuration of Apparatus which Construct the Data Communication System]

Now, an example of a configuration of the cradle 1, server apparatus 2, several mobile apparatus and several home apparatus used in the data communication system of the present second embodiment is described in detail.

[Example of a Configuration of the Cradle 1]

Also in the data communication system of the present second embodiment, the cradle 1 has the configuration described above with reference to FIG. 2 and has functions similar to those of the cradle 1 described above in connection with the first embodiment. In particular, the cradle 1 has a function of mediating transmission and reception of data between a mobile apparatus 4 placed on the cradle 1 and the server apparatus 2 and another function of carrying out charging for the mobile apparatus placed on the cradle 1.

Also in the second embodiment, there is no necessity to directly connect contacts for charging or contacts for communication between the various mobile apparatus and the cradle 1. In particular, charging is carried out by electromagnetic induction, and transmission and reception of data is carried out by short-distance wireless communication. However, different frequency bands are used so that the charging process and the communication process may not interfere with each other.

[Example of a Configuration of the Server Apparatus 2]

Figure 24:
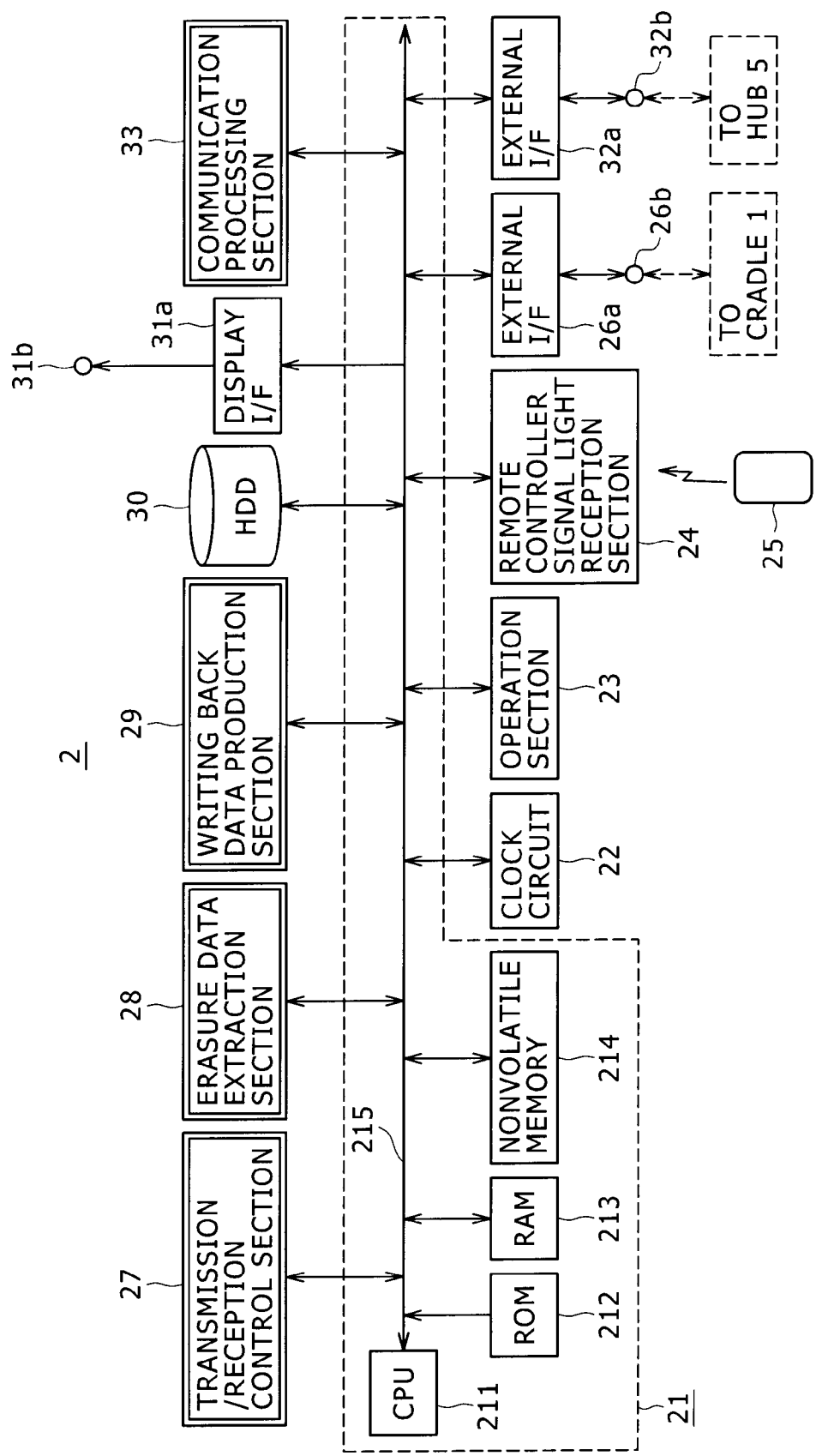
FIG. 24 is a block diagram showing an example of a configuration of the server apparatus used in the data communication system of the second embodiment.

FIG. 24 shows an example of a configuration of the server apparatus 2 used in the data communication system of the present second embodiment. Referring to FIG. 24, the server apparatus 2 in the second embodiment is configured similarly to the server apparatus 2 in the first embodiment described above with reference to FIG. 3 except that it includes an external interface 32a and an input/output terminal 32b as well as a communication processing section 33.

Therefore, in the server apparatus 2 in the second embodiment shown in FIG. 24, like components to those of the server apparatus 2 in the second embodiment shown in FIG. 3 are denoted by like reference characters, and overlapping description of them is omitted herein to avoid redundancy.

In the server apparatus 2 in the second embodiment shown in FIG. 24, the external interface 26a and the input/output terminal 26b form connecting terminal elements to the cradle 1 while the external interface 32a and the input/output terminal 32b form connecting terminal elements to the network hub 5. Consequently, between various mobile apparatus 4 placed on the cradle 1 connected through the external interface 26a and the input/output terminal 26b and various home apparatus 6 connected through the external interface 32a and the input/output terminal 32b, transmission and reception of data or the like can be repeated.

Meanwhile, the communication processing section 33 is a component which implements a connection function to the Internet 8. In particular, the communication processing section 33 establishes connection to the Internet 8 through a predetermined Internet provider through the external interface 32a and the input/output terminal 32b under the control of the control section 21 and forms and transmits data to be transmitted from the server apparatus 2 to a commercial server apparatus on the Internet 8. Or, the communication processing section 33 receives data destined for the server apparatus 2, converts the received data into data of a format which can be processed on the server apparatus 2 and supplies the resulting data, for example, to the control section 21 so that the data can be utilized by the control section 21.

Consequently, transmission and reception of data or the like can be repeated between various mobile apparatus 4 placed on the cradle 1 connected to the server apparatus 2 through the external interface 26a and the input/output terminal 26b and various commercial server apparatus on the Internet 8 connected to the server apparatus 2 through the communication processing section 33, external interface 32a and input/output terminal 32b.

[Example of a Configuration of a Mobile Apparatus 4]

Also in the data communication system of the present second embodiment, it is possible for the cradle 1 to receive thereon various mobile apparatus which have one or both of a function of receiving supply of power from the cradle 1 to charge the battery of the mobile apparatus and another function of communicating with the cradle 1 through short-distance wireless communication similarly as in the data communication system of the first embodiment.

The mobile apparatus 4 may assume various forms particularly including the digital still camera 4(2) described above with reference to FIG. 4 or a digital video camera is available. Also the camera-equipped portable telephone terminal 4(1), portable music reproduction apparatus or portable audio player 4(3) and portable visual and audio reproduction apparatus or portable video player 4(4) are available. In the following, an example of a configuration of the camera-equipped portable telephone terminal 4(1), portable music reproduction apparatus or portable audio player 4(3) and portable visual and audio reproduction apparatus or portable video player 4(4) is described.

[Example of a Configuration of the Portable Telephone Terminal 4(1) as a Mobile Apparatus]

Figure 25:
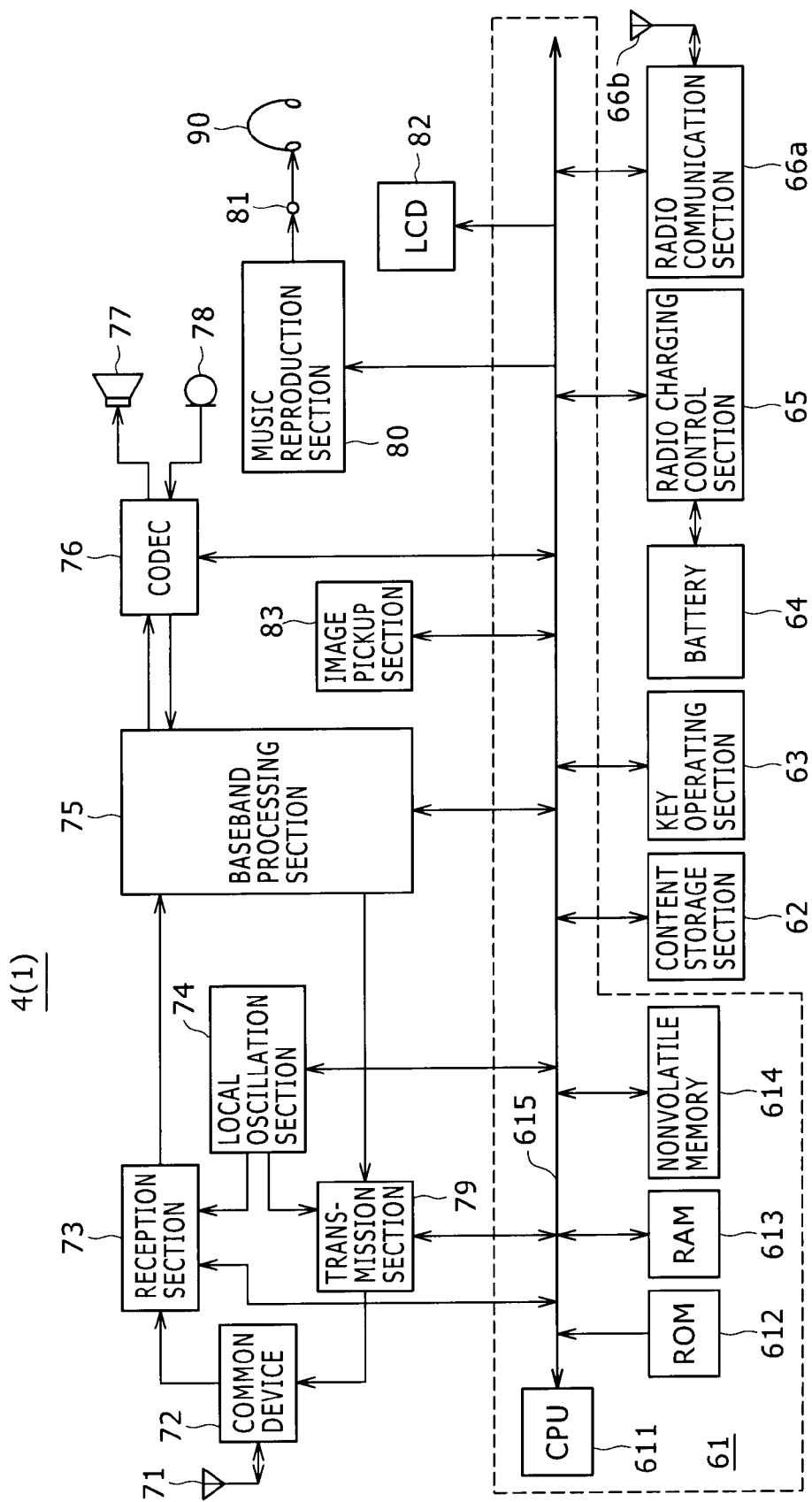
FIG. 25 is a block diagram showing an example of a configuration of the portable telephone terminal as a mobile apparatus used in the data communication system of the second embodiment.

FIG. 25 shows an example of a configuration of the portable telephone terminal 4(1) which is one of mobile apparatus used in the data communication system of the second embodiment. Referring to FIG. 25, the portable telephone terminal 4(1) used in the data communication system of the second embodiment includes a control section 61, a content storage section 62, a key operation section 63, a battery 64, a radio charging control section 65, a radio communication section 66a, and a transmission/reception antenna 66b. The portable telephone terminal 4(1) further includes a transmission/reception antenna 71, an antenna common device 72, a reception section 73, a local oscillation section 74, a baseband processing section 75, a codec 76, an earpiece (speaker) 77, a transmitter (microphone) 78, a transmission section 79, a music reproduction section 80, a sound output terminal 81, an LCD apparatus 82, and an image pickup section 83.

First, the control section 61 and the content storage section 62, key operation section 63, battery 64, radio charging control section 65, radio communication section 66a, transmission/reception antenna 66b, music reproduction section 80, LCD apparatus 82 and image pickup section 83 connected to the control section 61 are described.

The control section 61 controls the components of the portable telephone terminal 4(1) which is one of mobile apparatus used in the present second embodiment, and is a microcomputer formed from a CPU 611, a ROM 612, a RAM 613 and a nonvolatile memory 614 connected to each other through a CPU bus 615.

The CPU 611 serves as a core of control and executes a program stored and retained in the ROM 612 or the like to form control signals to be supplied to the components of the portable telephone terminal 4(1) and supply the produced control signals to the components or accept signals from the components and process the signals. The ROM 612 stores and retains various programs to be executed by the CPU 611 and various data necessary for the processes such as font data as described above.

The RAM 613 is used principally as a working area for temporarily storing midway results in the various processes. The nonvolatile memory 614 is formed from an EEPROM or a flash memory and stores and retains information to be maintained even if the power supply to the portable telephone terminal 4(1) is turned off such as, for example, various setting parameters, telephone directly data, electronic mail data, programs provided newly for addition of a function and so forth.

To the control section 61 configured in such a manner as described above, the content storage section 62 is connected as seen in FIG. 25. The content storage section 62 includes a semiconductor memory as a recording medium, and a memory controller for writing and reading out data into and from the semiconductor memory.

The recording medium of the content storage section 62 can store and retain music data or AV (Audio/Visual) data downloaded from a server apparatus on the wide area network such as the Internet using the wide area communication function of the portable telephone terminal 4(1) or still image data or moving image data provided from the server apparatus 2 or the like through the cradle 1 such that the received data can be utilized on the portable telephone terminal 4(1). Further, also image data of an image pickup object fetched by image pickup through the image pickup section 83 can be stored into the content storage section 62.

It is to be noted that the semiconductor memory of the content storage section 62 may be a card memory removably loadable into the portable telephone terminal 4(1) in the second embodiment. Alternatively, not the semiconductor memory but some other recording medium such as a small-sized hard disk may be used.

The key operation section 63 is connected to the control section 61 as seen in FIG. 25. Though not shown, the key operation section 63 includes a plurality of keys such as ten keys or numeral keys, various function keys and a jog dial key which allows turning operation and depression operation such that various operation inputs from the user are accepted.

An operation input from the user accepted through the key operation section 63 is converted into an electric signal and supplied to the control section 61. Consequently, the control section 61 controls the components of the portable telephone terminal 4(1) in response to an instruction from the user so that a process in accordance with the instruction of the user can be carried out.

Further, the radio charging control section 65 is connected to the control section 61. The radio charging control section 65 controls a charging process of the battery 64 such as to supply power, which is supplied thereto through the charging control section 19 of the cradle 1, to the battery 64 connected to the radio charging control section 65. The battery 64 is charged by the radio charging control section 65 and supplies power necessary for the components of the portable telephone terminal 4(1).

Further, the radio communication section 66a is connected to the control section 61. The radio communication section 66a includes the transmission/reception antenna 66b. The radio communication section 66a and the transmission/reception antenna 66b carry out data communication with the cradle 1 by short distance wireless communication.

Accordingly, the radio communication section 66a and the transmission/reception antenna 66b can carry out wireless communication with the cradle 1 using a radio communication technique such as the UWB (Ultra WideBand) or the Bluetooth or other various short distance wireless communication techniques or short distance wireless communication techniques similarly to the radio communication section 15a and the transmission/reception antenna 15b of the cradle 1 described above.

Further, as seen in FIG. 25, in the portable telephone terminal 4(1), the music reproduction section 80 is connected to the control section 61. To the music reproduction section 80, compressed music data read out from the content storage section 62 by the control section 61 is supplied. The music reproduction section 80 decompresses the compressed music data supplied thereto to restore original uncompressed music data, produces an analog music signal to be outputted from the restored music data and outputs the analog music signal through the sound output terminal 81. A headphone 90 or the like is connected to the sound output terminal 81 as seen in FIG. 25 such that the user can enjoy reproduction sound through the headphone 90 or the like.

It is to be noted here that, while it is described that the music reproduction section 80 carries out a reproduction process of music data, it can carry out a reproduction process not only of music data but also of various sound data such as voice. Further, the music reproduction section 80 carries out also various adjustment processes for music data or an analog music signal, an amplification process for an analog sound signal and so forth.

Further, the LCD apparatus 82 is connected to the control section 61 as seen in FIG. 25. The LCD apparatus 82 includes an LCD controller and can cause various display information to be displayed on the display screen of the LCD apparatus 82 under the control of a control signal from the control section 61. It is to be noted that AV data are demultiplexed into audio data and video data by the control section 61, and the audio data is supplied to the music reproduction section 80 while the video data is supplied to the LCD apparatus 82 such that they can be reproduced in a synchronized relationship with each other.

Further, also still image data or moving image data provided through the cradle 1 and stored and retained in the content storage section 62 can be read out and subjected to a predetermined process such as a decompression process by the control section 61 and resulting data is supplied to the LCD apparatus 82. Consequently, an image based on the thus supplied still image data or moving image data is displayed on the display screen of the LCD apparatus 82 so that it can be provided to the user. In other words, the present portable telephone terminal 4(1) has also a reproduction function of still image data or moving image data.

An image pickup section 83 implements a camera function and includes an objective lens, an iris mechanism, a shutter mechanism, an image pickup device such as a CCD (Charge Coupled Device) image sensor or a CMOS (Complementary Metal Oxide Semiconductor) image sensor, a preprocessor circuit and so forth. The image pickup section 83 can fetch an image of an image pickup object as an electric signal and convert the electric signal into a digital signal. Still image data or moving image data converted into a digital signal by the image pickup section 83 is recorded on the content storage section 62 through the control section 61 as described above.

It is to be noted that picked up image data stored in the content storage section 62 can be supplied to the LCD apparatus 82 through the control section 61 and displaced on the display screen of the LCD apparatus 82 to be confirmed. Further, the picked up image data can be outputted through the radio communication section 66a and the transmission/reception antenna 66b to be backed up into an external apparatus.

Further, though not shown in FIG. 25, also a ringer, a vibrator, a clock circuit and so forth are connected to the control section 61 such that the arrival of a signal or a warning can be conveyed in the form of sound or vibration to the user or it is possible to implement a calendar function, notify the user of the time at present or implement an alarm clock function.

Now, a reception system of the mobile apparatus 4(1) shown in FIG. 25 is described. A reception signal received through the transmission/reception antenna 71 is supplied to the reception section 73 through the antenna common device 72. The reception section 73 carries out necessary bandwidth limitation and AGC (Automatic Gain Control) so that the reception signal may have an appropriate level. The reception section 73 further carries out a process of adjusting the frequency of the reception signal to a fixed frequency based on a signal from the local oscillation section (or frequency synthesizer) 74 and supplies a signal after the process to the baseband processing section 75.

The baseband processing section 75 carries out A/D (Analog/Digital) conversion of the signal from the reception section 73 and further carries out removal of influence of fading and so forth, decision of the type of the received signal, deinterleave and error correction. Further, the baseband processing section 75 carries out an appropriate decoding process to separate conversation voice data and other communication data. Then, the conversation voice data is supplied to the codec 76 having a configuration of a DSP (Digital Signal Processor). Meanwhile, the other communication data such as, for example, various control information, character data, Web page data and music data (music content) are provided to the control section 61.

The codec 76 D/A (digital-to-analog) converts sound data from the baseband processing section 75 to form an analog sound signal and supplies the analog sound signal to the earpiece 77. The earpiece 77 is driven by the analog sound signal from the codec 76 to emit sound corresponding to the reception signal.

Meanwhile, the communication data supplied from the baseband processing section 75 to the control section 61 are temporarily stored, where they are control data or character data for a portable telephone terminal, for example, into the RAM 613 of the control section 61 and used in the portable telephone terminal 4(1). Further, the other content data such as music data are supplied to and stored and retained into the content storage section 62 such that they can be read out and utilized as occasion demands.

Now, a transmission system of the portable telephone terminal 4(1) shown in FIG. 25 is described. The microphone 78 converts collected sound into an analog sound signal and supplies the analog sound signal to the codec 76. The codec 76 A/D converts the analog sound signal received from the microphone 78 to form a digital sound signal and supplies the digital sound signal to the baseband processing section 75.

The baseband processing section 75 encodes and compresses the digital sound signal from the codec 76 in accordance with a predetermined encoding method and collects the resulting signal into predetermined blocks. Further, the baseband processing section 75 can collect also digital data for transmission and so forth supplied through the control section 61 and accepted through the key operation section 63 into predetermined blocks. The baseband processing section 75 collects the compressed digital sound signal and the digital data for transmission and supplies resulting data to the transmission section 79.

The transmission section 79 forms a modulation signal from the digital data received from the baseband processing section 75 and mixes the modulation signal and the signal for conversion from the local oscillation section 74 to form a transmission modulation signal in order to convert the frequency of the modulation signal into a predetermined transmission frequency. The transmission modulation signal formed by the transmission section 79 is transmitted from the transmission/reception antenna 71 past the antenna common device 72.

In the portable telephone terminal having such a reception system and a transmission system as described above, upon waiting reception or upon waiting, the control section 61 supervises the reception signal from the baseband processing section 75 to detect the arrival of a signal at the portable telephone terminal. Then, if the arrival of a signal is detected, then the control section 61 controls the ringer not shown to generate a ring or ringer sound or controls the vibrator not shown to generate vibration to notify the user of the portable telephone terminal 4(1) of the arrival of a signal at the portable telephone terminal 4(1).

Then, if the user of the portable telephone terminal 4(1) carries out an off-hook operation such as to depress a conversation starting key provided on the key operation section 63 provided on the portable telephone terminal 4(1) and having ten keys, various function keys and so forth to respond to the arrival of the signal, then the control section 61 may signal a connection response or the like through the transmission system to connect a communication circuit so that conversion can be carried out by operation of the reception system and the transmission system as described above.

Further, when a telephone call is to be originated from the portable telephone terminal 4(1) of the second embodiment, an off-hook operation such as to depress the conversion starting key of the key operation section 63 described above is carried out, then a telephone number of the other party is selected through the ten keys or dial key of the key operation section 63 or from telephone number data registered in advance to carry out a dialing operation.

Consequently, the control section 61 forms and transmits a call origination request through the transmission system to connect a communication circuit to a telephone terminal of the other opposite party. Then, if a call termination response from the opposite party is sent back and the connection of the communication circuit is confirmed, then telephone conversation can be carried out by operation of the reception system and the transmission system as described above.

Further, the portable telephone terminal 4(1) of the second embodiment can connect to the Internet. Consequently, by inputting and transmitting a URL (Uniform Resource Locator) through a provider function provided, for example, from a telephone company, it is possible to acquire information of a Web page or the like and display the information on the LCD apparatus 82 through the control section 61 or to download music data, that is, a music content, from an object server on the Internet and store and retain the music data into the content storage section 62 so that it can be utilized later.

Further, the portable telephone terminal 4(1) of the second embodiment can produce electronic mail data for transmission in the nonvolatile memory 614 based on information inputted through the key operation section 63 and/or the LCD apparatus 82 and transmit the electronic mail data to a mail server of the object opposite party through the Internet. Further, the portable telephone terminal 4(1) can receive an electronic mail from the mail server, store the electronic mail into the nonvolatile memory 614 and display and utilize the electronic mail on the LCD apparatus 82.

In this manner, the portable telephone terminal 4(1) used as one of mobile apparatus in the data communication system of the second embodiment can carry out telephone communication or data communication through a wide area network such as a portable telephone network or the Internet. Further, if the portable telephone terminal 4(1) is placed on the cradle 1, then it can receive supply of power from the cradle 1 and charge the battery 64 of the portable telephone terminal 4(1). Further, although details are hereinafter described, the portable telephone terminal 4(1) placed on the cradle 1 can transmit and receive data to and from a home apparatus on the home network or a commercial server apparatus on the Internet 8 through the cradle 1 or the server apparatus 2.

[Example of a Configuration of the Portable Audio Player 4(3)]

Figure 26:
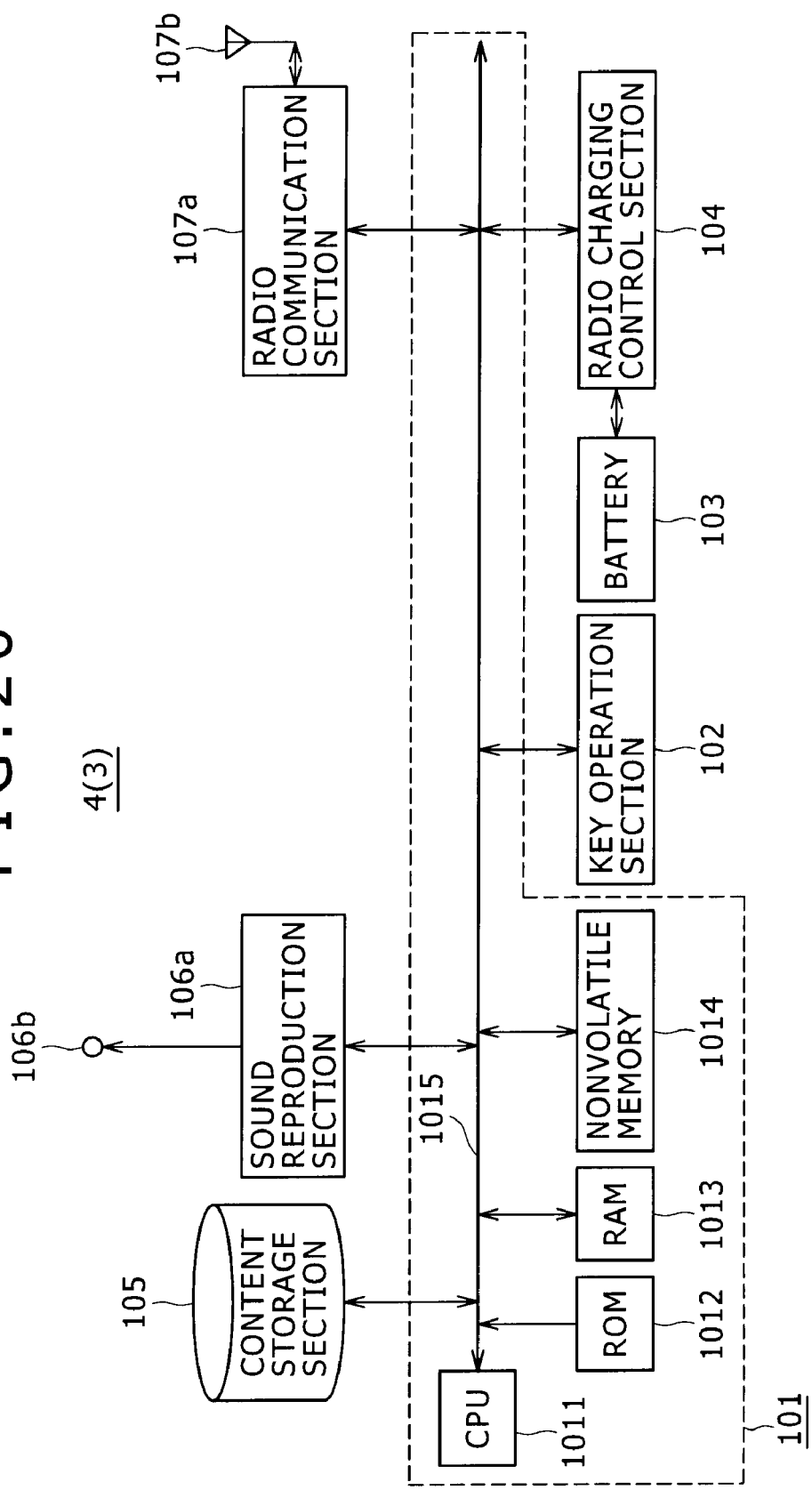
FIG. 26 is a block diagram showing an example of a configuration of a portable music reproduction apparatus as a mobile apparatus used in the data communication system of the second embodiment.

FIG. 26 shows an example of a configuration of the portable audio player 4(3) which is one of mobile apparatus used in the data communication system of the present second embodiment. Referring to FIG. 26, the portable audio player 4(3) used in the data communication system of the present second embodiment includes a control section 101, a key operation section 102, a battery 103, and a radio charging control section 104. The portable audio player 4(3) further includes a content storage section 105, a sound reproduction section 106a, a sound output terminal 106b, a radio communication section 107a and a transmission/reception antenna 107b.

The control section 101 controls the components of the portable audio player 4(3) and is a microcomputer including a CPU 1011, a ROM 1012, a RAM 1013 and a nonvolatile memory 1014 connected to each other by a CPU bus 1015.

The CPU 1011 serves as a core of control which executes a program stored and retained in the ROM 1012 or the like to form and supply control signals to components of the portable audio player 4(3) and accepts and processes signals from the components. The ROM 1012 stores and retains various programs to be executed by the CPU 1011 as described above and various data required for various processes therein.

The RAM 1013 is used as a working area principally for temporarily storing midway results of processing and so forth. The nonvolatile memory 1014 may be formed from an EEPROM, a flash memory or the like and stores and retains information to be retained even if power supply to the portable audio player 4(3) is turned off such as, for example, various setting parameters and additional programs for additional provision of functions.

The key operation section 102 is connected to the control section 101 as seen in FIG. 26. Though not shown, the key operation section 102 includes various operation keys such as a reproduction start key, a stop key, a pause key, a fast feed key, a rewind key, a sound volume adjustment key and a sound quality adjustment key such that various operation inputs from the user are accepted.

An operation input from the user accepted through the key operation section 102 is converted into an electric signal and supplied to the control section 101. Consequently, the control section 101 controls the components of the portable audio player 4(3) in response to an instruction from the user so that a process in accordance with the instruction of the user can be carried out.

Further, the radio charging control section 104 is connected to the control section 101. The radio charging control section 104 controls a charging process of the battery 103 such as to supply power, which is supplied thereto through the charging control section 19 of the cradle 1, to the battery 103 connected to the radio charging control section 104. The battery 103 is charged by the radio charging control section 104 and supplies power necessary for the components of the portable audio player 4(3).

Further, the content storage section 105 is connected to the control section 101. The content storage section 105 includes, for example, a semiconductor memory as a recording medium, and a memory controller for writing and reading out data into and from the semiconductor memory. Into the recording medium of the content storage section 105, music data or some other data from the cradle 1 received through the radio communication section 107a and the transmission/reception antenna 107b are recorded.

It is to be noted that a card memory may be used as the recording medium of the content storage section 105 such that it is removably loadable into the portable audio player 4(3) in the second embodiment. Or, also it is possible to use not the semiconductor memory but some other recording medium such as a small-sized hard disk, a magneto-optical disk such as an MD (Mini Disc; registered trademark) or a recordable optical disk such as a DVD (Digital Versatile Disc).

Further, the sound reproduction section 106a is connected to the control section 101. To the sound reproduction section 106a, compressed music data read out from the content storage section 105 by the control section 101 is supplied. The sound reproduction section 106a decompresses the compressed music data supplied thereto to restore original uncompressed music data, produces an analog music signal to be outputted from the restored music data and outputs the analog music signal through the sound output terminal 106b. A headphone or a speaker not shown is connected to the sound output terminal 106b such that the user can enjoy reproduction sound emitted the headphone or speaker.

It is to be noted here that, while it is described that the sound reproduction section 106a carries out a reproduction process of music data, it can carry out a reproduction process not only of music data but also of various sound data such as talking voice. Further, the sound reproduction section 106a carries out also various adjustment processes for music data or an analog music signal, an amplification process for an analog sound signal and so forth.

Further, the radio communication section 107a is connected to the control section 101. The radio communication section 107a includes the transmission/reception antenna 107b. The radio communication section 107a and the transmission/reception antenna 107b carry out data communication with the cradle 1 by short distance wireless communication.

Accordingly, the radio communication section 107a and the transmission/reception antenna 107b can carry out wireless communication with the cradle 1 using a radio communication technique such as, for example, the UWB (Ultra Wide Band) or the Bluetooth or other various short distance wireless communication techniques similarly to the radio communication section 15a and the transmission/reception antenna 15b of the cradle 1 described above with reference to FIG. 2.

In this manner, in the portable audio player 4(3) in the present second embodiment, music data stored and retained in the content storage section 105 can be reproduced to provide reproduction sound to the user. Where the portable audio player 4(3) is placed on the cradle 1, it can receive supply of power from the cradle 1 to charge the battery 103 therein. Further, although details are hereinafter described, where the portable audio player 4(3) is placed on the cradle 1, it can transmit and receive data to and from a home apparatus on the home network or a commercial server on the Internet through the cradle 1 and the server apparatus 2.

[Example of a Configuration of the Portable Visual and Audio Reproduction Apparatus or Portable Video Player 4(4)]

Figure 27:
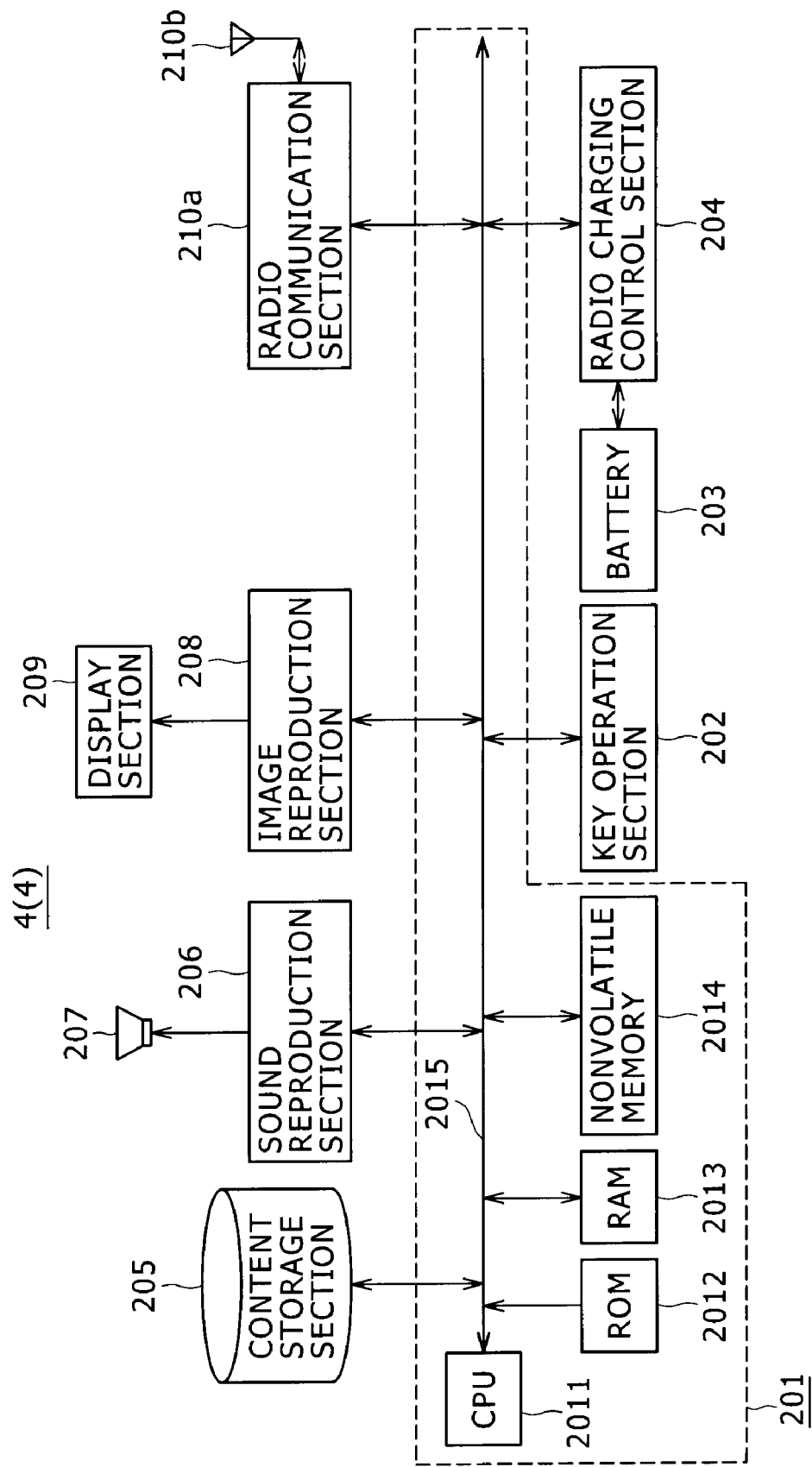
FIG. 27 is a block diagram showing an example of a configuration of a portable image and sound reproduction apparatus as a mobile apparatus used in the data communication system of the second embodiment.

FIG. 27 shows an example of a configuration of the portable video player 4(4) which is one of mobile apparatus used in the data communication system of the present second embodiment. Referring to FIG. 27, the portable video player 4(4) used in the present second embodiment includes a control section 201, a key operation section 202, a battery 203, and a radio charging control section 204. The portable video player 4(4) further includes a content storage section 205, a sound reproduction section 206, a speaker 207, an image reproduction section 208, a display section 209, a radio communication section 210a and a transmission/reception antenna 210b.

The control section 201 controls the components of the portable video player 4(4) which is one of mobile apparatus used in the present second embodiment. The control section 201 is a microcomputer including a CPU 2011, a ROM 2012, a RAM 2013 and a nonvolatile memory 2014 connected to each other by a CPU bus 2015.

The CPU 2011 serves as a core of control which executes a program stored and retained in the ROM 2012 or the like to form and supply control signals to pertaining components of the portable video player 4(4) and accepts and processes signals from the components. The ROM 2012 stores and retains various programs to be executed by the CPU 2011 as described above and various data required for various processes therein.

The RAM 2013 is used as a working area principally for temporarily storing midway results of processing and so forth. The nonvolatile memory 2014 may be formed from an EEPROM, a flash memory or the like and stores and retains information to be retained even if power supply to the portable video player 4(4) is turned off such as, for example, various setting parameters and additional programs for additional provision of functions.

The key operation section 202 is connected to the control section 201 as seen in FIG. 27. Though not shown, the key operation section 202 includes various operation keys such as a reproduction start key, a stop key, a pause key, a fast feed key, a rewind key, a sound volume adjustment key, a sound quality adjustment key and a picture quality adjustment key such that various operation inputs from the user are accepted.

An operation input from the user accepted through the key operation section 202 is converted into an electric signal and supplied to the control section 201. Consequently, the control section 201 controls the components of the portable video player 4(4) in response to an instruction from the user so that a process in accordance with the instruction of the user can be carried out.

Further, the radio charging control section 204 is connected to the control section 201. The radio charging control section 204 controls a charging process of the battery 203 such as to supply power, which is supplied thereto through the charging control section 19 of the cradle 1, to the battery 203 connected to the radio charging control section 204. The battery 203 is charged by the radio charging control section 204 and supplies power necessary for the components of the portable video player 4(4).

Further, the content storage section 205 is connected to the control section 201. The content storage section 205 includes, for example, a semiconductor memory as a recording medium, and a memory controller for writing and reading out data into and from the semiconductor memory. Into the recording medium of the content storage section 205, AV (Audio/Visual) data or some other data from the cradle 1 received through the transmission/reception antenna 210b are recorded.

It is to be noted that a card memory may be used as the recording medium of the content storage section 205 such that it is removably loadable into the portable video player 4(4) in the second embodiment. Or, also it is possible to use not the semiconductor memory but some other recording medium such as a small-sized hard disk, a magneto-optical disk such as an MD (Mini Disc; registered trademark) or a recordable optical disk such as a DVD (Digital Versatile Disc).

Further, the sound reproduction section 206 and the image reproduction section 208 are connected to the control section 201. The speaker 207 is connected to the sound reproduction section 206, and the display section 209 is connected to the image reproduction section 208. Here, the display section 209 includes a slim type display device such as, for example, an LCD (Liquid Crystal Display) panel or an organic EL panel (Organic Electroluminescence panel) and a controller circuit for the display device.

If the user issues an instruction to reproduce AV data through the key operation section 202, then the control section 201 reads out AV data whose reproduction is designated from the content storage section 205 and demultiplexes the AV data into sound data and image data. The sound data is supplied to the sound reproduction section 206 while the image data is supplied to the image reproduction section 208. It is to be noted that the AV data is in a form compressed using a predetermined compression method.

The sound reproduction section 206 decompresses the compressed music data supplied thereto to restore original uncompressed music data, forms an analog music signal to be outputted from the restored music data and supplies the analog music signal to the speaker 207. Consequently, reproduction sound is emitted from the speaker 207 such that the user can enjoy the reproduction sound.

Meanwhile, the image reproduction section 208 decompresses the compressed image data supplied thereto to restore original uncompressed image data, forms an analog image signal to be supplied to the display section 209 from the restored image data and supplies the analog image signal to the display section 209. Consequently, a reproduction image is displayed on the display screen of the display section 209 such that the user can enjoy the reproduction image.

In this instance, the sound reproduction section 206 and the image reproduction section 208 carry out respective reproduction such that the reproduction sound and the reproduction image are synchronized with each other under the control of the control section 201. Consequently, the user can reproduce and enjoy object AV data or AV content on the portable video player 4(4).

It is to be noted that, while it is shown in FIG. 27 that the speaker 207 is connected to the sound reproduction section 206 for simplified description, the manner of connection is not limited to this. It is otherwise possible to provide a sound output terminal for the sound reproduction section 206 such that, when a headphone or an earphone is connected to the sound output terminal, supply of a sound signal to the speaker 207 is stopped while reproduction sound can be emitted through the headphone or earphone connected to the sound output terminal.

Further, the sound reproduction section 206 carries out also various adjustment processes for music data or an analog music signal, an amplification process for an analog sound signal and so forth under the control of the control section 201 in accordance with an operation input from the user accepted through the key operation section 202. Meanwhile, the image reproduction section 208 carries out various adjustment processes and so forth for visual data or an analog visual signal under the control of the control section 201 in accordance with an operation input from the user accepted through the key operation section 202.

Further, the radio communication section 210*a* is connected to the control section 201. The radio communication section 210*a* includes the transmission/reception antenna 210*b*. The radio communication section 210*a* and the transmission/reception antenna 210*b* carry out data communication with the cradle 1 by short distance wireless communication.

Accordingly, the radio communication section 210*a* and the transmission/reception antenna 210*b* can carry out wireless communication with the cradle 1 using a radio communication technique such as, for example, the UWB (Ultra Wide Band) or the Bluetooth or other various short distance wireless communication techniques similarly to the radio communication section 15*a* and the transmission/reception antenna 15*b* of the cradle 1 described above with reference to FIG. 2.

In this manner, in the portable video player 4(4) in the present second embodiment, AV data stored and retained in the content storage section 205 can be reproduced to provide reproduction sound and a reproduction image to the user. Where the portable video player 4(4) is placed on the cradle 1, it can receive supply of power from the cradle 1 to charge the battery 203 therein. Further, although details are hereinafter described, the portable video player 4(4) can transmit and receive data to and from a home apparatus on the home network or a commercial server on the Internet through the cradle 1 and the server apparatus 2.

[Example of a Configuration of a Home Apparatus 6]

Now, an example of a configuration of a home apparatus 6 connected to the server apparatus 2 through the network hub 5 as seen in FIG. 23 in the data communication system of the present second embodiment is described. As described above, the personal computers 6(1) and 6(2), HDD recorder 6(3) and network attached storage 6(4) are connected to the network hub 5 in addition to the server apparatus 2. In the following, an example of a configuration of the personal computers 6(1) and 6(2), HDD recorder 6(3) and network attached storage 6(4) is described.

[Example of a Configuration of the Personal Computers 6(1) and 6(2)]

Figure 28:
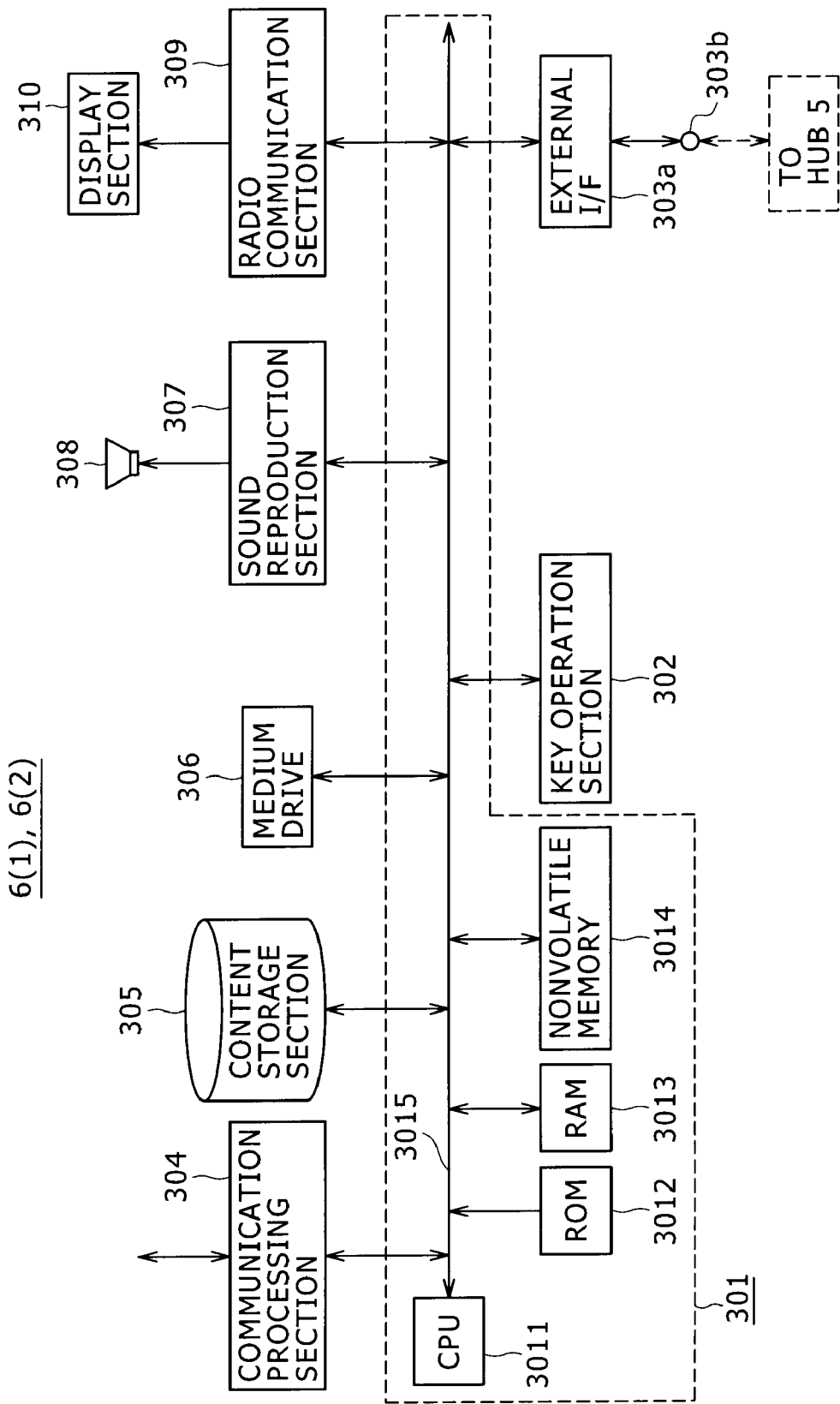
FIG. 28 is a block diagram showing an example of a configuration of a personal computer as a home apparatus used in the data communication system of the second embodiment.

FIG. 28 shows an example of a configuration of the personal computers 6(1) and 6(2) connected to the network hub 5 in the second embodiment of the present invention. Various personal computers (PCs) are available which have various configurations. However, in order to simplify the description, it is assumed that the personal computers 6(1) and 6(2) used in the data communication system of the present second embodiment have a configuration of a popular personal computer which has, as basic functions thereof, a high speed information processing function, a large capacity storage function, an information inputting function, an information outputting function, and an external apparatus connection function. Further, it is assumed that, while a configuration of the personal computer 6(1) is described, also the personal computer 6(2) has a similar configuration.

Referring to FIG. 28, the personal computer 6(1) used in the data communication system of the present second embodiment includes a control section 301, a key operation section 302, an external interface 303*a*, and an input/output terminal 303*b*. The personal computer 6(1) further includes a communication processing section 304, a hard disk drive (HDD) 305, a medium drive 306, a sound reproduction section 307, a speaker 308, an image reproduction section 309 and a display section 310.

The control section 301 controls the components of the personal computer 6(1) used in the present second embodiment and can carry out various mathematical operation processes at a high speed. The control section 301 is a microcomputer including a CPU 3011, a ROM 3012, a RAM 3013 and a nonvolatile memory 3014 connected to each other by a CPU bus 3015.

The CPU 3011 serves as a core of control which executes a program stored and retained in the ROM 3012 or the like to form and supply control signals to pertaining components of the personal computer 6(1) and accepts and processes signals from the components. The ROM 3012 stores and retains various programs to be executed by the CPU 3011 as described above and various data required for various processes therein.

The RAM 3013 is used as a working area principally for temporarily storing midway results of various processes and so forth. The nonvolatile memory 3014 may be formed from an EEPROM, a flash memory or the like and stores and retains information to be retained even if power supply to the personal computer 6(1) is turned off such as, for example, various setting parameters and additional programs for additional provision of functions.

The key operation section 302 is connected to the control section 301. The key operation section 302 includes alphabet keys, various symbol keys, ten keys (numeral keys), various function keys and so forth such that various operation inputs from the user are accepted. It is to be noted that, though not shown in FIG. 28, the key operation section 302 includes a pointing device such as a mouse and so forth.

An operation input from the user accepted through the key operation section 302 is converted into an electric signal and supplied to the control section 301. Consequently, the control section 301 controls the components of the personal computer 6(1) in response to an instruction from the user so that a process in accordance with the instruction of the user can be carried out.

The external interface 303*a* is connected to the control section 301. The external interface 303*a* includes the input/output terminal 303*b*. The external interface 303*a* and the input/output terminal 303*b* form a connection terminal portion to an external apparatus. In the present second embodiment, various external apparatus such as the server apparatus 2 can be connected to the external interface 303*a* and the input/output terminal 303*b* of the personal computer 6(1) through the network hub 5 as seen in FIG. 23.

Further, the communication processing section 304 is connected to the control section 301. The communication processing section 304 implements a connection function to the Internet 8. In particular, the communication processing section 304 establishes connection to the Internet 8 through a predetermined Internet provider through the external interface 303*a* and the input/output terminal 303*b* under the control of the control section 301. Then, the communication processing section 304 forms and transmits data to be transmitted from the personal computer 6(1) to the commercial server apparatus on the Internet 8 or receives. Further, the communication processing section 304 converts data destined for the personal computer 6(1) into data of a format which can be processed on the personal computer 6(1) and then supplies the data, for example, to the control section 301 so that the data can be utilized on the personal computer 6(1).

Further, the HDD 305 is connected to the control section 301. The HDD 305 includes a hard disk of a comparatively great capacity as a recording medium and a drive circuit which accesses the hard disk to record data on the hard disk or read out object data from the hard disk. It is possible, for example, to store and retain various information such as sound data, image data, AV data, midway results of processing, programs and so forth, for example, downloaded through the Internet 8 or provided from an external apparatus on the hard disk of the HDD 305.

The medium drive 306 is connected to the control section 301. The medium drive 306 allows removable loading thereon of a recording medium such as a DVD (Digital Versatile Disk), a CD (Compact Disk) and so forth. Then, the medium drive 306 reads out data from the recording medium loaded therein and supplies the data to the control section 301. Or, where a recordable recording medium is loaded in the medium drive 306, the medium drive 306 can record data from the control section 301 on the recordable recording medium.

Further, the sound reproduction section 307 and the image reproduction section 309 are connected to the control section 301. The speaker 308 is connected to the sound reproduction section 307, and the display section 310 is connected to the image reproduction section 309. Here, the display section 310 includes a display device such as an LCD (Liquid Crystal Display) panel, an organic EL panel (Organic Electroluminescence panel) or a CRT (Cathode Ray Tube), and a controller circuit for the display device.

The sound reproduction section 307 forms an analog sound signal to be supplied to the speaker 308 from sound data supplied thereto and supplies the formed analog sound signal to the speaker 308. Consequently, reproduction sound is emitted from the speaker 308 to be enjoyed by the user. It is to be noted that, if sound data supplied to the sound reproduction section 307 is in a compressed form, then the sound reproduction section 307 can carry out a decompression process to restore original uncompressed sound data and then convert the restored sound data into an analog sound signal.

Meanwhile, the image reproduction section 309 forms an analog image signal to be supplied to the display section 310 from image data supplied thereto and supplies the formed analog image signal to the display section 310. Consequently, a reproduced image is displayed on the display screen of the display section 310 to be enjoyed by the user. It is to be noted that, if image data supplied to the image reproduction section 309 is in a compressed form, then the image reproduction section 309 can carry out a decompression process to restore original uncompressed image data and then convert the restored image data into an analog image signal.

Also it is possible to restore only sound data through the sound reproduction section 307 or to reproduce only image data, that is, still image data or moving image data, through the image reproduction section 309. Further, where AV data is received, the control section 301 demultiplexes the AV data into sound data and image data, and supplies the sound data to the sound reproduction section 307 and supplies the image data to the image reproduction section 309. Then, the control section 301 controls the sound reproduction section 307 and the image reproduction section 309 so that the sound data and the image data can be reproduced in a synchronized relationship with each other.

In the case of the personal computer 6(1) shown in FIG. 28, the control section 301 implements a high speed information processing function; the HDD 305 or the medium drive 306 implements a large capacity storage function; the key operation section 302, external interface 303*a* and input/output terminal 303*b* implement an information inputting function; the sound reproduction section 307, speaker 308, image reproduction section 309, display section 310, external interface 303*a* and input/output terminal 303*b* implement an information outputting function; and the external interface 303*a* and the input/output terminal 303*b* implement an external apparatus connection function.

Consequently, in the personal computer 6(1) shown in FIG. 28, data inputted through the key operation section 302, external interface 303*a* and input/output terminal 303*b*, or communication processing section 304, external interface 303*a* and input/output terminal 303*b* can be processed by the control section 301. Thus, the processed data can be recorded on the hard disk of the HDD 305 or a recording medium loaded in the medium drive 306, or reproduced through the sound reproduction section 307 or the image reproduction section 309 to be provided to the user or else outputted through the communication processing section 304 and the external interface 303*a* and input/output terminal 303*b*.

Also it is possible for the control section 301 to read out data stored on the hard disk of the HDD 305 or a recording medium loaded in the medium drive 306 and carry out a required process such that the processed data is reproduced by the sound reproduction section 307 and/or the image reproduction section 309 to be provided to the user or is outputted through the communication processing section 304 or the external interface 303*a* and the input/output terminal 303*b*.

Then, the personal computer 6(1) shown in FIG. 28 can carry out transmission and reception of data to and from an external apparatus through the external interface 303*a* and the input/output terminal 303*b* or transmission and reception of data to and from a commercial server apparatus on the Internet 8 through the communication processing section 304 and the external interface 303*a* and input/output terminal 303*b*.

[Example of a Configuration of the HDD Recorder 6(3)]

Figure 29:
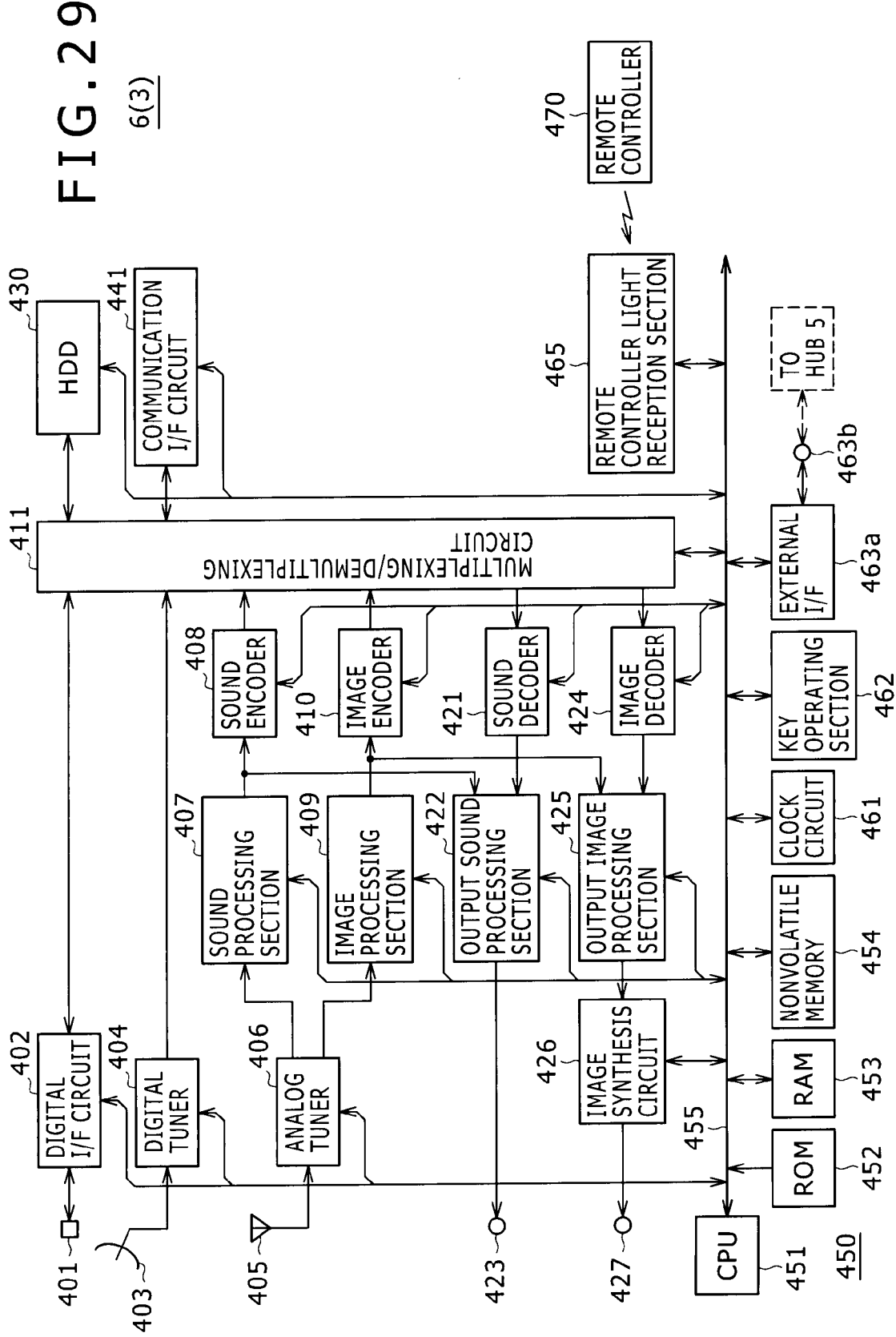
FIG. 29 is a block diagram showing an example of a configuration of a hard disk drive recorder as a home apparatus used in the data communication system of the second embodiment.

FIG. 29 shows an example of a configuration of the HDD recorder 6(3) used in the data communication system of the second embodiment. Referring to FIG. 29, the HDD recorder 6(3) used in the data communication system of the present second embodiment includes, as an input/output system, a digital input/output terminal 401 and a digital interface circuit 402.

Further, the HDD recorder 6(3) includes, as an input system, a reception antenna 403 and a digital tuner 404 for a digital broadcast, and a reception antenna 405 and an analog tuner 406 for an analog broadcast. The HDD recorder 6(3) further includes, for the analog tuner 406, a sound processing section 407, a sound encoder 408, an image processing section 409 and an image encoder 410.

Further, the HDD recorder 6(3) includes, as an output system, a sound decoder 421, an output sound processing section 422, a sound output terminal 423, an image decoder 424, an output image processing section 425, an image synthesis section 426 and an image output terminal 427. The HDD recorder 6(3) further includes a multiplexing/demultiplexing circuit 411 for carrying out multiplexing/demultiplexing processes of data and a hard disk drive (HDD) 430 including a hard disk of a storage capacity higher than, for example, several hundreds gigabytes.

The HDD recorder 6(3) further includes a communication interface (I/F) circuit 441 for connecting the HDD recorder 6(3) to a wide area network such as, for example, the Internet such that it can access the Internet through an external interface 463*a* and an input/output terminal 463*b* to carry out transmission and reception of data to and from a commercial server apparatus on the Internet.

The HDD recorder 6(3) further includes a control section 450 for controlling the components of the HDD recorder 6(3). The control section 450 is a microcomputer which includes a CPU 451, a ROM 452, a RAM 453 and a nonvolatile memory 454 connected to each other through a CPU bus 455 as seen in FIG. 29.

The CPU 451 serves as a core of control which executes a program stored in the ROM 452 to form and supply control signals to pertaining components of the HDD recorder 6(3) and accepts and processes data from the components. The ROM 452 stores and retains programs to be executed by the CPU 451 as described above and various data and so forth required for various processes.

The RAM 453 is used as a working area principally for temporarily storing midway results of various processes and so forth. The nonvolatile memory 454 may be formed from an EEPROM, a flash memory or the like and stores and retains data to be retained even if power supply to the HDD recorder 6(3) is turned off such as, for example, various setting parameters and additional programs for additional provision of functions, newly provided through the network and so forth.

Further, a clock circuit 461, a key operation section 462, an external interface 463a and a remote controller light reception section 465 are connected to the control section 450. The clock circuit 461 includes a calendar function and provides the year, month and day at present and the time at present. Further, the clock circuit 461 can measure or count a period. The key operation section 462 includes various operation keys, operation switches and operation knobs, and accepts various operation inputs or instruction inputs from the user and can convert an accepted operation input into an electric signal and supply the electric signal to the control section 450.

The external interface 463a and the input/output terminal 463b form a connection terminal portion to an external apparatus. The HDD recorder 6(3) is connected to the network hub 5 as seen in FIG. 23 through the external interface 463a and the input/output terminal 463b and can transmit and receive various data to and from an external apparatus such as the server apparatus 2 connected to the network hub 5.

The remote controller light reception section 465 can receive a remote control signal in the form of, for example, infrared rays from a remote commander 470, convert the received remote control signal into an electric signal and supply the electric signal to the control section 450. It is to be noted that the remote commander 470 includes various operation keys and produces and signals a remote control signal, for example, in the form of infrared rays in response to an operation of the user.

[Operation Upon Recording]

Now, basic operation of the HDD recorder 6(3) shown in FIG. 29 is described. First, operation of the HDD recorder 6(3) upon recording of a content is described. As described above, the HDD recorder 6(3) can record (1) a digital content accepted through the digital input/output terminal 401 and the digital interface circuit 402, (2) a digital broadcasting program received and selected through the digital tuner 404 and (3) an analog broadcasting program received and selected through the analog tuner 406.

[(1) Operation where the Digital Interface Circuit 402 is Used]

First, operation of the HDD recorder 6(3) where (1) the digital interface circuit 402 is used is described. The digital input/output terminal 401 and the digital interface circuit 402 conform to, for example, the IEEE (Institute of Electrical and Electronics Engineers, Inc.) 1394 standards, the USB (Universal Serial Bus) standards or the like. To the digital input/output terminal 401 and the digital interface circuit 402, an external apparatus having an interface of the same standards such as, for example, a digital still camera or a digital video camera can be connected.

The HDD recorder 6(3) can accept content data from an external apparatus connected to the digital input/output terminal 401 through the digital input/output terminal 401 and the digital interface circuit 402 and record the content data on the hard disk of the HDD 430 or form and output an analog video signal and an analog audio signal. It is to be noted that the content data is still image data, moving image data, sound data, AV data composed of sound data and image data to be reproduced in synchronism with each other or the like.

Here, an example of operation of the HDD recorder 6(3) wherein it receives and processes AV data from an external apparatus is described. The AV data supplied to digital input/output terminal 401 is supplied to the digital interface circuit 402. The digital interface circuit 402 carries out such processes as format conversion for the AV data supplied thereto so that the format of the AV data may become compatible with that used in the HDD recorder 6(3) to produce a TS (Transport Stream) signal wherein necessary data are packetized and multiplexed. The TS signal is supplied to the multiplexing/demultiplexing circuit 411.

The multiplexing/demultiplexing circuit 411 carries out an analysis and production of a control signal to form a TS signal to be used for recording and supplies the TS signal to the HDD 430 so that the TS signal can be recorded on the hard disk built in the HDD 430. It is to be noted that, as a particular example of the TS signal, if the content data is AV data, then sound data, image data and additional data such as control data are packetized and multiplexed.

Further, the multiplexing/demultiplexing circuit 411 extracts audio packets and video packets from the TS signal supplied thereto from the digital interface circuit 402, and forms an audio ES (Elementary Stream) from the extracted audio packets and forms a video ES from the video packets. The audio ES formed by the multiplexing/demultiplexing circuit 411 is supplied to the sound decoder 421 while the video ES is supplied to the image decoder 424. It is to be noted that each packet has an identifier (ID) added thereto such that sound data, image data and other control data can be distinguished and extracted based on the identifier as described above.

The sound decoder 421 carries out a decoding process for the audio ES supplied thereto to obtain sound data of a baseband and supplies the sound data to the output sound processing section 422. The output sound processing section 422 carries out, for example, a filtering process, a fading process, a talking speed conversion process, a D/A conversion process and so forth for the sound data supplied thereto to form an analog sound signal to be used for outputting. The analog sound signal is supplied to the sound output terminal 423.

Consequently, the sound signal corresponding to the sound ES demultiplexed from the TS signal supplied from the digital interface circuit 402 by the multiplexing/demultiplexing circuit 411 is outputted through the sound output terminal 423. Then, sound corresponding to the sound signal is emitted from the speaker connected to the sound output terminal 423.

Meanwhile, the image decoder 424 carries out a decoding process for the video ES supplied thereto to obtain image data of the baseband and supplies the image data to the output image processing section 425. The output image processing section 425 carries out necessary processes such as a filtering process for the image data supplied thereto and then supplies the processed image data to the image synthesis circuit 426.

The image synthesis circuit 426 carries out a process of synthesizing, if information such as character information is supplied from the control section 450 to the image synthesis circuit 426, the information with the image data from the output image processing section 425. Further, the image synthesis circuit 426 carries out a conversion process into YC data (color difference signal), a D/A conversion process and so forth of the synthesized data to form an analog image signal used for outputting. The analog image signal formed is supplied to the image output terminal 427.

Consequently, an image signal corresponding to the video ES demultiplexed from the TS signal supplied from the digital interface circuit 402 by the multiplexing/demultiplexing circuit 411 is outputted through the image output terminal 427. Further, an image corresponding to the image signal is displayed on the display screen of a monitor receiver connected to the image output terminal 427.

In short, content data such as AV data accepted through the digital input/output terminal 401 and the digital interface circuit 402 is recorded on the hard disk of the HDD 430, and an analog sound signal for reproduction and an analog image signal for reproduction are formed from the content data. The analog sound signal and the analog image signal are supplied to an external apparatus through the sound output terminal 423 and the image output terminal 427 such that sound and an image corresponding thereto can be reproduced, respectively.

[(2) Operation where the Digital Tuner 404 is Used]

Now, operation of the HDD recorder 6(3) where content data received and selected through the digital tuner 404 is recorded or reproduced is described. The digital tuner 404 in the present second embodiment is a digital BS/CS tuner and can receive and selects a BS digital broadcasting signal or a CS digital broadcasting signal.

It is to be noted that also it is naturally possible to provide a tuner section for ground wave digital television broadcasting so that also a ground wave digital television broadcasting signal can be received and selected. However, operation in this instance involves processes substantially similar to those where a BS digital broadcasting signal and a CS digital broadcasting signal are received and selected, and therefore, description of the operation is omitted herein to avoid redundancy.

A digital broadcasting signal from a satellite received by the reception antenna 403 is supplied to the digital tuner 404. The digital tuner 404 receives and selects an object digital broadcasting signal based on a channel selection control signal corresponding to a channel selection instruction from the user supplied from the control section 450. Then, the digital tuner 404 supplies the digital broadcasting signal of the selected channel to the multiplexing/demultiplexing circuit 411.

The digital broadcasting signal is broadcast in the form of a TS signal wherein, for each channel as a program transmission line, image data, sound data and other various data which form a broadcasting program together with various control data such as channel selection information called PSI (Program Specific Information) and EPG (Electronic Program Guide) data for forming an electronic program guide table are packetized and multiplexed.

Further, each packet has an identifier (ID) added thereto such that it can be used to extract PSI data or EPG data or extract video packets and audio packets which form the same program.

The multiplexing/demultiplexing circuit 411 extracts PSI data and EPG data from the TS signal supplied from the digital tuner 404 and supplies the extracted data to the control section 450 to allow selection of the program. Further, the multiplexing/demultiplexing circuit 411 forms and outputs an electronic program guide table to be displayed in response to an instruction from the user and to allow program selection or recording reservation to be carried out. It is to be noted that also it is possible to store and retain the PSI data and the EPG data, for example, into the nonvolatile memory 454 or, as occasion demands, into a predetermined region of the hard disk of the HDD 430 such that it can be read out as occasion demands and utilized on the control section 450.

Further, where recording of a selected program is designated, the multiplexing/demultiplexing circuit 411 extracts video packets and audio packets of an object program selected by the user from the TS signal of the digital tuner 404 to form a new TS signal composed of the video packets and audio packets and necessary control data. The new TS signal is supplied to the HDD 430 and recorded on the hard disk of the HDD 430.

Simultaneously, the multiplexing/demultiplexing circuit 411 forms an audio ES from audio packets of the object program extracted from the TS signal from the digital tuner 404 and supplies the audio ES to the sound decoder 421. Further, the multiplexing/demultiplexing circuit 411 forms a video ES from video packets of the object program extracted from the TS signal and supplies the video ES to the image decoder 424.

In later processing, the audio ES is decoded to obtain sound data of the baseband by the sound decoder 421 as described above. The sound data is subjected to necessary processes such as a filtering process and D/A conversion by the sound decoder 421 to form an analog sound signal to be outputted. The analog signal is outputted through the sound output terminal 423.

Meanwhile, the video ES is decoded by the image decoder 424 to obtain image data of the baseband, and the image data is subjected to necessary processes such as a filtering process by the output image processing section 425. Thereafter, the image data processed by the output image processing section 425 is synthesized with data for display such as character information from the control section 450 by the image synthesis circuit 426. Then, the image data after the synthesis is converted into YC data and then D/A converted to form an analog image signal to be outputted. The analog signal is outputted through the image output terminal 427.

In this manner, in the present HDD recorder 6(3), image data and sound data of an object program are extracted from a digital broadcasting signal of a selected channel and are recorded on the hard disk of the HDD 430. Simultaneously, an analog image signal and an analog sound signal are formed such that they can be outputted. In short, while an object program to be provided as a digital broadcasting signal is recorded on the hard disk of the HDD 430, the user can enjoy the program.

Also it is possible to supply a TS signal formed newly by the multiplexing/demultiplexing circuit 411 as described above to another apparatus through the digital interface circuit 402 and the digital input/output terminal 401.

[Operation where the Analog Tuner 406 is Used]

Now, operation of the HDD recorder 6(3) where an input of an analog signal is accepted through the analog tuner 406 and recorded on the hard disk of the HDD 430 or outputted as an analog signal is described. It is to be noted that the analog tuner may be of a type which receives and selects an analog television broadcasting signal of a ground wave or of another type which receives and selects a radio broadcasting signal of an AM (Amplitude Modulation) broadcast or an FM (Frequency Modulation) broadcast of a ground wave. In the present HDD recorder 6(3), it is assumed that the analog tuner 406 receives and selects an analog television broadcasting signal of a ground wave.

In particular, the analog tuner 406 receives, selects and decodes an analog television broadcasting signal of a ground wave to obtain an analog sound signal and an analog image signal. The analog sound signal is supplied to the sound processing section 407 and the analog image signal is supplied to the image processing section 409.

The sound processing section 407 converts the analog sound signal supplied thereto into sound data in the form of a digital signal and supplies the sound data to the sound encoder 408 and the output sound processing section 422. The sound encoder 408 carries out a predetermined data compression process for the sound data supplied thereto, for example, in accordance with a predetermined compression system, for example, in accordance with the MPEG system to form an audio ES. The audio ES is supplied to the multiplexing/demultiplexing circuit 411.

Meanwhile, the image processing section 409 carries out a YC demultiplexing process for the image signal supplied thereto to obtain a luminance signal Y and a color difference signal C and carries out such processes as A/D conversion and chroma decoding for the luminance signal Y and the color difference signal C to convert them into digital component video data (image data). Further, the image processing section 409 carries out various image signal processes such as a filtering process for the image data and supplies the image data after the processes to the image encoder 410 and the output image processing section 425.

It is to be noted that the image processing section 409 has a function of producing clock signals and synchronizing signals for providing necessary timings for the individual circuit blocks based on a horizontal synchronizing signal, a vertical synchronizing signal and a field decision signal obtained by synchronous demultiplexing from the image signal supplied thereto and supplying the produced signals to the circuit blocks.

The image encoder 410 carries out a data compression process for the image data from the image processing section 409 in accordance with a predetermined data compression system, for example, the MPEG system to produce a video ES and supplies the video ES to the multiplexing/demultiplexing circuit 411.

Upon recording, the multiplexing/demultiplexing circuit 411 carries out a multiplexing process of the audio ES from the sound encoder 408, the video ES from the image encoder 410 and various control signals. In particular, the multiplexing/demultiplexing circuit 411 carries out a multiplexing process of the MPEG audio ES, MPEG video ES and various control signals inputted thereto to produce a TS signal, for example, of the MPEG system. The TS signal produced by the multiplexing/demultiplexing circuit 411 is supplied to the HDD 430 and recorded on the hard disk of the HDD 430.

Meanwhile, as described above, the sound data from the sound processing section 407 is supplied also to the output sound processing section 422 while the image data from the image processing section 409 is supplied also to the output image processing section 425. The output sound processing section 422 carries out D/A conversion and so forth for the sound data supplied thereto to form an analog sound signal to be outputted as described above and outputs the formed analog sound signal. Meanwhile, the output image processing section 425 can form an analog image signal used for outputting as described above and output the analog image signal through the image synthesis circuit 426.

In particular, also it is possible to reproduce and output the sound data and the image data of the recording object in parallel to the process of converting an analog signal supplied through the analog tuner 406 into a digital signal and recording the digital signal on the hard disk of the HDD 430.

Naturally, also a TS signal formed by the multiplexing/demultiplexing circuit 411 from a signal acquired through the analog tuner 406 and converted into a digital signal or a like signal can be outputted through the digital interface circuit 402 and the digital input/output terminal 401.

[Reproduction from the Hard Disk]

Now, operation of the HDD recorder 6(3) where image data and sound data recorded on the hard disk of the HDD 430 in such a manner as described above are reproduced is described. An object TS signal to be reproduced is read out from the hard disk of the HDD 430 and supplied to the multiplexing/demultiplexing circuit 411 under the control of the control section 450.

Upon reproduction, the multiplexing/demultiplexing circuit 411 carries out a demultiplexing process of a video ES and an audio ES from a TS signal read out from the hard disk of the HDD 430. The demultiplexed audio ES is supplied to the sound decoder 421 while the video ES is supplied to the image decoder 424.

Later processes by the sound decoder 421 and so forth and later processes by the image decoder 424 are such as those described above, for example, in connection with the case of recording of a signal from the digital tuner 404. In particular, the sound decoder 421 carries out a decoding process for the audio ES supplied thereto to form sound data of the baseband and supplies the sound data to the output sound processing section 422. Then, the sound data are subjected to necessary process such as a filtering process by the output sound processing section 422 and then D/A converted to form an analog sound signal to be outputted. The analog sound signal is supplied to the sound output terminal 423.

Meanwhile, the image decoder 424 carries out a decoding process for the video ES supplied thereto to form image data of the baseband and supplies the image data to the output image processing section 425. The image data is subjected to necessary processes such as a filtering process by the output image processing section 425 and then supplied to the image synthesis circuit 426. The image synthesis circuit 426 synthesizes the image data supplied thereto with display information from the control section 450 and then carries out conversion into YC data and D/A conversion to form an analog image signal to be outputted. The analog image signal is supplied to the image output terminal 427.

Consequently, an image and sound according to the image data and the sound data read out from the hard disk of the HDD 430 are outputted through the speaker and the monitor receiver connected to the sound output terminal 423 and the image output terminal 427, respectively, or through a TV set including a speaker and a monitor receiver such that they can be enjoyed by the user.

Naturally, it is possible to output the image data and the sound data read out from the hard disk of the HDD 430 through the digital interface circuit 402 and the digital input/output terminal 401.

[Utilization of the Communication Interface]

Further, as described above, the HDD recorder 6(3) includes the communication interface 441 such that it can be connected to the network router 7 through the external interface 463a and the input/output terminal 463b, for example, to the Internet 8 through a telephone network or the like to acquire various data from various commercial server apparatus on the Internet 8.

Here, the various data which can be downloaded include, in addition to image data and sound data, various programs, text data and so forth. Image data or sound data can be recorded on the hard disk of the HDD 430 through the multiplexing/demultiplexing circuit 411.

Further, if the reproduction system for a sound signal including the multiplexing/demultiplexing circuit 411, sound decoder 421, output sound processing section 422 and sound output terminal 423 and the reproduction system for an image signal including the image decoder 424, output image processing section 425, image synthesis circuit 426 and image output terminal 427 are used, then image data and sound data acquired through the communication network can be reproduced and utilized.

Also it is possible to output image data and sound data acquired by the function of the communication interface 441 through the digital interface circuit 402 and the digital input/output terminal 401.

Furthermore, it is also possible to receive a program or control data to be used in the HDD recorder 6(3) through the network and record and retain the program or control data into the nonvolatile memory 454 or the like such that the program or the control data can be utilized as occasion demands.

For example, it is possible to enhance a function of the HDD recorder 6(3) or acquire EPG data or the like in advance to produce an electronic program guide table in advance.

It is to be noted that, in the HDD recorder 6(3) in the present second embodiment, the sound encoder and the image encoder carry out a data compression process of sound data and image data in accordance with a data compression system of, for example, the MPEG system. Meanwhile, the sound decoder 421 and the image decoder 424 carry out a decoding process of an audio ES and a video ES compressed in accordance with the MPEG system.

Although the data compression method used in the HDD recorder 6(3) in the present second embodiment is the MPEG system in this manner, also any other compression system may be used, or naturally it is possible to use data in a non-compressed state without compressing the same.

[Other Processes, Etc.]

As described above, the clock circuit 463 has a calendar function and provides the year, month and day at present and the time at present. Further the clock circuit 463 can cooperate with the control section 450 to implement a reservation recording function of an object broadcasting program.

In particular, if recording reservation information of an object broadcasting program, which is information of the broadcasting date and time, broadcasting channel and so forth of the object broadcasting program, is inputted through the key operation section 464 or the remote controller 470, then the control section 450 supervises the time at present provided by the clock circuit 463. Then, when the recording starting time of the recording reservation information comes, the control section 450 controls pertaining components of the HDD recorder 6(3) such that the reserved broadcasting program can be recorded on the hard disk of the HDD 430.

The key operation section 464 is provided on the HDD recorder 6(3) used in the data communication system of the present second embodiment. The key operation section 464 includes various operation keys such as a power supply on/off key, a broadcasting channel selection key, a recording start key, a stop key, a reproduction start key, a fast feed key, a rewind key and a pause key.

Further, as seen in FIG. 29, the external interface 463*a* and the input/output terminal 463*b* are connected to the control section 450. As described above, the external interface 463*a* and the input/output terminal 463*b* form a connection terminal portion to an external apparatus such that transmission and reception of various data to and from a different apparatus connected to the network hub 5 can be carried out.

Although the detailed substance is hereinafter described, for example, a television broadcasting program recorded on the hard disk of the HDD 430 of the HDD recorder 6(3) is read out by the control section 450 and outputted to the outside through the external interface 463*a* and the input/output terminal 463*b* such that it can be supplied to the server apparatus 2 or the like through the network hub 5.

[Example of a Configuration of the Network Attached Storage 6(4)]

Figure 30:
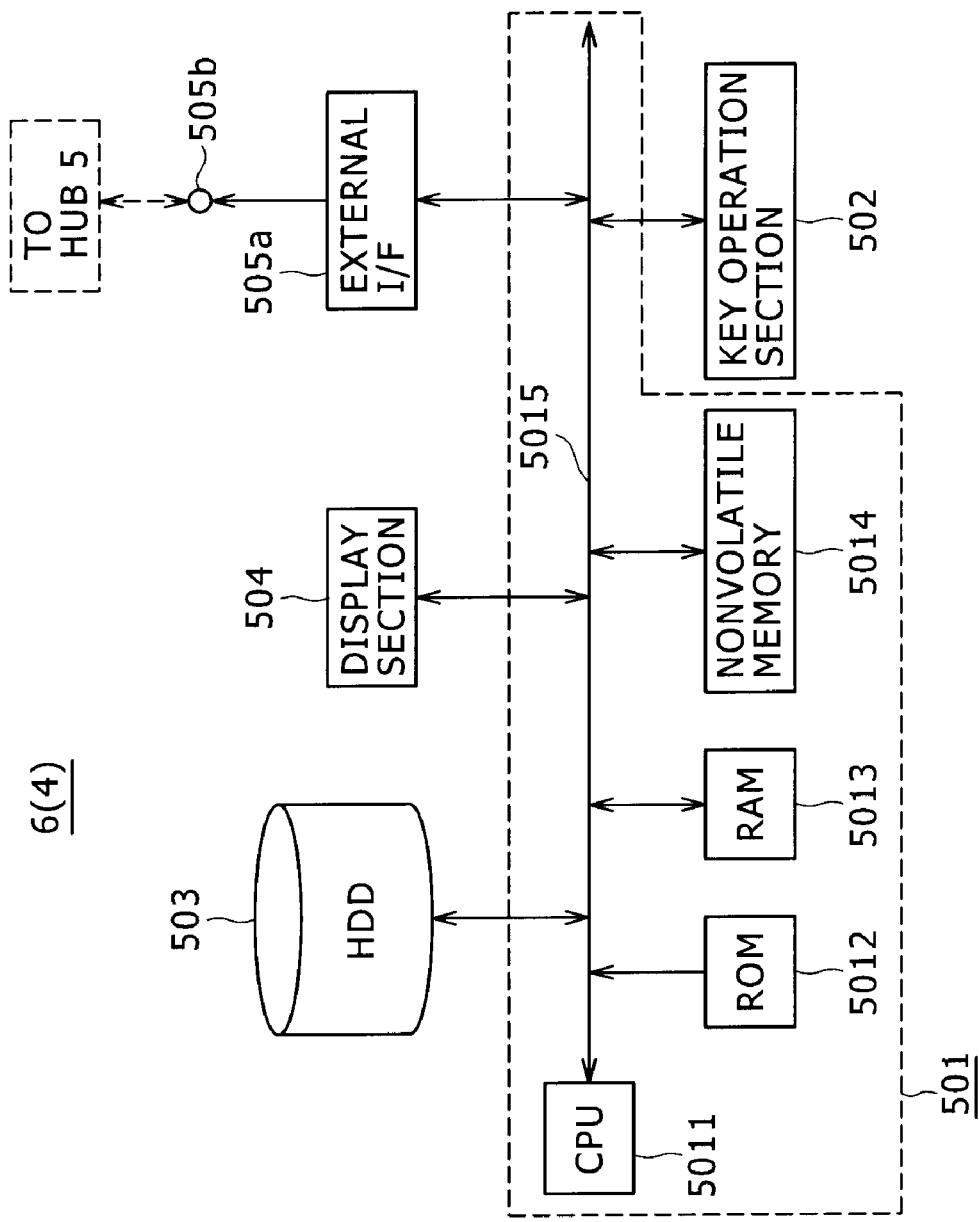
FIG. 30 is a block diagram showing an example of a configuration of a network attached storage as a home apparatus used in the data communication system of the second embodiment.

FIG. 30 shows an example of a configuration of the network attached storage 6(4) used in the data communication system of the present second embodiment. The network attached storage 6(4) is a storage apparatus which can be connected directly to a network. In other words, the network attached storage 6(4) is a storage apparatus shared by different apparatus connected to the network.

Referring to FIG. 30, the network attached storage 6(4) includes a control section 501, an operation section 502, a hard disk drive (HDD) 503, a display section 504, an external interface 505*a* and an input/output terminal 505*b*.

The control section 501 controls the components of the network attached storage 6(4) used in the present second embodiment and is a microcomputer which includes a CPU 5011, a ROM 5012, a RAM 5013 and a nonvolatile memory 5014 connected to each other through a CPU bus 5015.

The CPU 5011 serves as a core of control which executes a program stored and retained in the ROM 5012 or the like to form and supply control signals to pertaining components of the network attached storage 6(4) and accept and process signals from the components. The ROM 5012 stores and retains various programs to be executed by the CPU 5011 as described above and various data required for various processes therein.

The RAM 5013 is used as a working area principally for temporarily storing midway results of various processes and so forth. The nonvolatile memory 5014 may be formed from an EEPROM, a flash memory or the like and stores and retains information to be retained even if the power supply to the network attached storage 6(4) is turned off such as, for example, various setting parameters and additional programs for additional provision of functions.

The operation section 502 is connected to the control section 501. The operation section 502 includes various operation keys such as a power supply on/off key and various function keys and accepts an operation input from the user. The power supply to the network attached storage 6(4) can be switched on/off by operating the power supply on/off key of the operation section 502.

An operation input from the user accepted through the operation section 502 is converted into an electric signal and supplied to the control section 501. Consequently, the control section 501 controls the components of the network attached storage 6(4) in response to an instruction from the user so that a process in accordance with the instruction of the user, for example, a configuration process, can be carried out.

Further, the HDD 503, display section 504 and external interface 505*a* are connected to the control section 501. The HDD 503 includes a hard disk of a large capacity as a recording medium and a hard disk drive which records data on the hard disk or reads out data from the hard disk. The HDD 503 can record data from the control section 501 on the hard disk and read out and supply object data from the hard disk to the control section 501 under the control of the control section 501.

The display section 504 includes a slim type display device such as an LCD panel or an organic EL panel and a controller circuit for the display device, and displays an operation state of the network attached storage 6(4) to notify the user under the control of the control section 501. Further, an LED (Light Emitting Diode) is provided on the display section 504 and controlled among a light emitting state, a no-light emitting state and a flickering state by the control section 501 such that the user can know the operation state from the state of the LED.

Further, the input/output terminal 505b is provided for the external interface 505a such that a connection terminal portion to an external apparatus is formed from the external interface 505a and the input/output terminal 505b. In the present second embodiment, various external apparatus such as the server apparatus 2 can be connected to the external interface 505a and the input/output terminal 505b of the network attached storage 6(4) through the network hub 5 as seen in FIG. 23.

In the data communication system of the present second embodiment, the network attached storage 6(4) accepts various data through the external interface 505a and the input/output terminal 505b, and the control section 501 thereof supplies the accepted data to the HDD 503 to be recorded on the hard disk of the HDD 503. Further, the control section 501 reads out object data from the hard disk of the HDD 503 and outputs the data through the external interface 505a and the input/output terminal 505b so that the data can be supplied to an object external apparatus.

[Basic Functions of the Data Communication System of the Second Embodiment]

In the data communication system of the present second embodiment, the cradle 1 has the configuration described above with reference to FIG. 2. The cradle 1 can receive thereon image pickup apparatus such as the portable telephone terminal 4(1) shown in FIG. 25 and the digital still camera 4(2) shown in FIG. 4, the portable audio player 4(3) shown in FIG. 26, the portable video player 4(4) shown in FIG. 27 and so forth.

The cradle 1 is connected to the server apparatus 2 having the configuration described above with reference to FIG. 24. Meanwhile, the server apparatus 2 can be connected, through the network hub 5, to the PCs 6(1) and 6(2) having the configuration described above with reference to FIG. 28, the HDD recorder 6(3) having the configuration described above with reference to FIG. 29 and the network attached storage 6(4) having the configuration described above with reference to FIG. 30 such that it can transmit and receive data to and from the home apparatus.

The server apparatus 2 and the PCs 6(1) and 6(2) can establish connection to the Internet 8 through the network hub 5 and the network router 7 and access a commercial server apparatus or the like on the Internet 8 to download object data or upload data retained by the server apparatus 2 or the PCs 6(1) and 6(2).

As a basic function of the data communication system of the present second embodiment, data can be transmitted and received between any of various mobile apparatus placed on the cradle 1 and a home apparatus 6 connected to the network hub 5 or a commercial server apparatus on the Internet 8 which can be connected through the network router 7.

Figure 31:
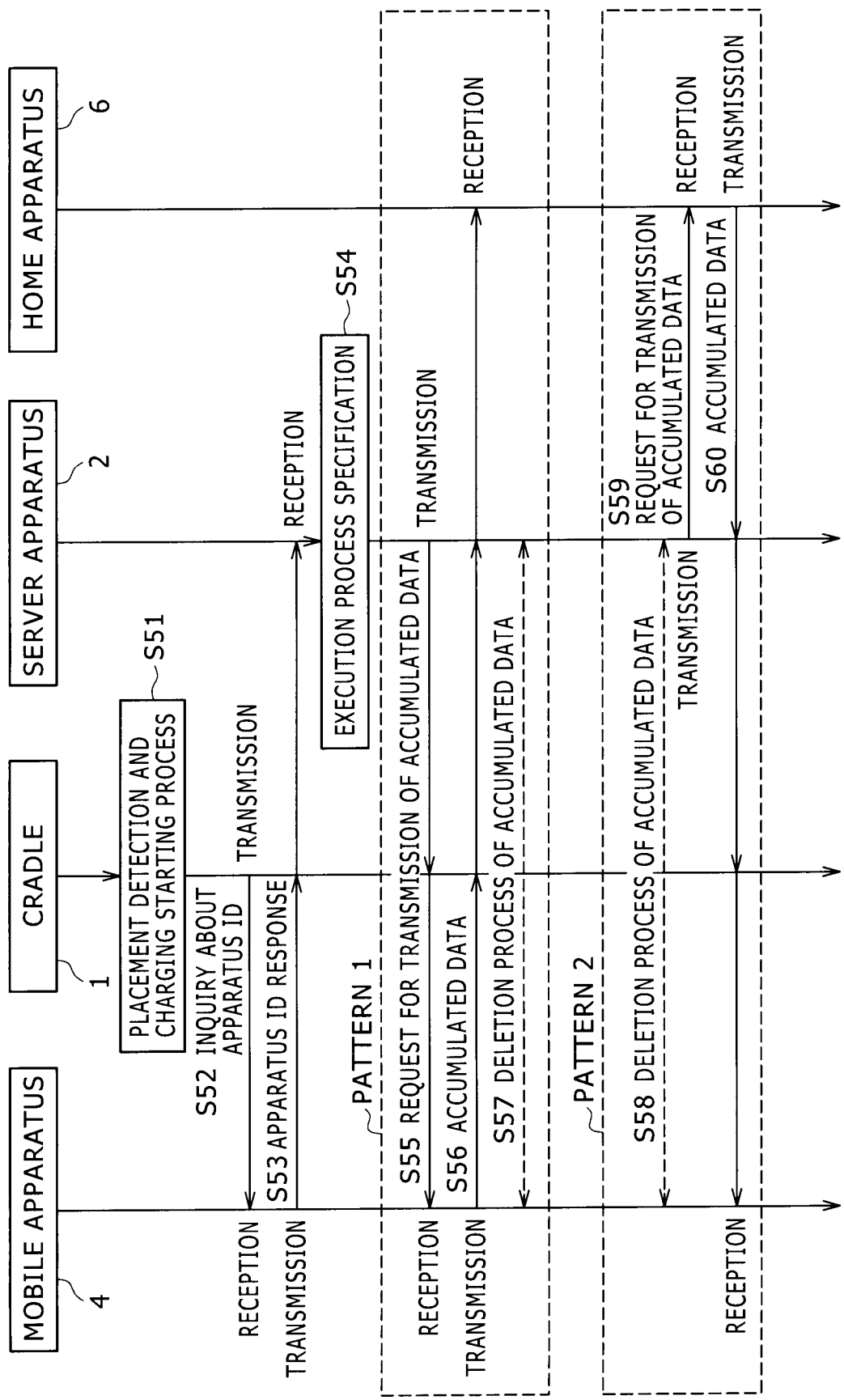
FIG. 31 is a sequence diagram illustrating a basic process pattern of the data communication system of the second embodiment.

FIG. 31 illustrates a basic processing pattern carried out in the data communication system of the present second embodiment. Although details are hereinafter described, the cradle 1 can detect placement of a mobile apparatus 4 thereon and starts a process of carrying out charging of the mobile apparatus 4 when it detects placement of the mobile apparatus 4 thereon (step S51).

Then, the cradle 1 issues an inquiry about an apparatus ID to the mobile apparatus 4 placed thereon (step S52). Since an apparatus ID response is transmitted from the mobile apparatus 4 of the destination of the inquiry in response to the inquiry (step S53), the cradle 1 repeats the apparatus ID response to the server apparatus 2.

Then, the server apparatus 2 specifies, based on information of the apparatus ID included in the apparatus ID response from the mobile apparatus 4 transmitted through the cradle 1, what process should be carried out between the mobile apparatus 4 and the object home apparatus 6. In particular, the server apparatus 2 specifies an execution process (step S54). It is to be noted that the home apparatus 6 may be any of various apparatus installed in the home such as the PCs 6(1) and 6(2), HDD recorder 6(3) and network attached storage 6(4) or any of commercial server apparatus or the like on the Internet 8.

A process which can be executed between the mobile apparatus 4 on the cradle 1 and the home apparatus has one of two patterns including a pattern 1 and a pattern 2 described below. The pattern 1 is a process of uploading accumulated data of the mobile apparatus 4 into the home apparatus 6. In particular, if the server apparatus 2 specifies, based on the apparatus ID response, a process of uploading accumulated data of the mobile apparatus 4 into the home apparatus 6 as a process to be executed, then the server apparatus 2 produces a transmission request for accumulated data to the mobile apparatus 4 and transmits the transmission request to the mobile apparatus 4 through the cradle 1 (step S55).

In response to the transmission request, the mobile apparatus 4 transmits requested accumulated data. Consequently, the cradle 1 and the server apparatus 2 carry out a repeating process of transmitting the accumulated data from the mobile apparatus 4 to the object home apparatus 6 (step S56). Consequently, the accumulated data transmitted from the mobile apparatus 4 is received by the object home apparatus 6 such that it can be recorded on a predetermined recording medium and utilized in various manners.

Then, after the accumulated data is uploaded into the home apparatus 6, it is possible to carry out a process of erasing the accumulated data in the mobile apparatus 4 to recover the storage capacity of the recording medium (step S57). The process of the pattern 1 is a process of uploading accumulated data of the mobile apparatus 4 into a home apparatus 6 in this manner.

Meanwhile, the pattern 2 is a process of downloading data accumulated in the home apparatus 6 into the mobile apparatus 4. In particular, if the server apparatus 2 specifies a process of downloading data in the home apparatus 6 into the mobile apparatus 4 as a process to be executed based on the apparatus ID response, then the server apparatus 2 carries out a process of erasing the storage data of the mobile apparatus 4 to assure the storage capacity for data (step S58). It is to be noted that the process at step S58 need not be carried out where the mobile apparatus 4 has a sufficient free capacity or where overwriting of data is to be carried out.

Then, the server apparatus 2 produces a request for transmission of accumulated data to the object home apparatus 6 and transmits the request to the home apparatus 6 (step S59). In response to the request for transmission of accumulate data, requested data is transmitted from the home apparatus 6. Therefore, the cradle 1 and the server apparatus 2 carry out a repeating process of transmitting the data from the home apparatus 6 to the object mobile apparatus 4 (step S60).

Consequently, the accumulated data transmitted from the home apparatus 6 is received by the object mobile apparatus 4 such that it can be recorded on a predetermined recording medium and can be utilized in various manners. The process of downloading the accumulated data of the home apparatus 6 into the mobile apparatus 4 in this manner is the process of the pattern 2.

Then, in order to carry out the process of specifying an execution process to be carried out by the server apparatus 2 at step S54 illustrated in FIG. 31, information for specifying, when any mobile apparatus 4 is placed on the cradle 1, with which home apparatus what process should be carried out is required. Therefore, in the data communication system according to the present second embodiment, an execution process specification table for specifying a process to be carried out between each mobile apparatus 4 and each home apparatus 6 is prepared in advance in the server apparatus 2.

As particular examples of the execution process specification table, (1) an execution process specification table of the type wherein the substance of a process is registered for specification for each type of mobile apparatus and (2) another execution process specification table of the type wherein the substance of a process is registered for each mobile apparatus are available.

With the execution process specification table of the type (1) wherein the substance of a process is registered for specification for each type of mobile apparatus, even if, for example, a plurality of portable telephone terminals are used as mobile apparatus, the same process can be carried out for the mobile apparatus. On the other hand, with the execution process specification table of the type (2) wherein the substance of a process is registered for each mobile apparatus, where a plurality of portable telephone terminals are used as mobile apparatus, different processes can be carried out individually for the portable telephone terminals.

Whichever one of the execution process specification tables of the types (1) and (2) described above is used, it is possible to specify data to be transmitted and received taking flag information added to accumulated data of mobile apparatus and home apparatus into consideration.

In the following description, the execution process specification table of the type (1) wherein the substance of a process is registered for specification for each type of mobile apparatus and the execution process specification table of the type (2) wherein the substance of a process is registered for each mobile apparatus are described as particular examples of the execution process specification table are described as particular examples of the execution process specification table. Also the case wherein it is made possible to specify data to be transmitted and received taking flag information added to accumulated data of mobile apparatus and home apparatus into consideration is described particularly.

[Particular Example of the Execution Process Specification Table of the Type (1) Wherein the Substance of a Process is Registered for Specification for Each Type of a Mobile Apparatus]

FIG. 32 illustrates a particular example of an execution process specification table wherein the substance of a process is registered for each type of mobile apparatus. The execution process specification table illustrated in FIG. 32 includes, as component items or components thereof, five different types of information including "mobile apparatus type", "deletion condition of accumulated data", "transfer direction", "home apparatus of object of data conversion" and "transfer condition, etc.".

The "mobile apparatus type" is information representative of the type of a mobile apparatus such as a portable video player, a portable audio player, a digital still camera or the like as seen in FIG. 32, and does not allow overlapping entries of the same apparatus type. Accordingly, also where a plurality of portable video players are used, the same process is carried out for the individual portable video players.

The "deletion condition of accumulated data" is information representing whether or not accumulated data accumulated in the mobile apparatus should be deleted or erased under the control of the server apparatus 2 and representing, where the accumulated data should be deleted or erased, conditions for and a timing of deletion or erasure. In the example illustrated in FIG. 32, where the mobile apparatus is a portable video player, the server apparatus 2 can control the portable video player such that accumulated data enjoyed already are deleted or erased. The timing of deletion in this instance is defined as a timing after accumulated data after enjoyed is transferred from the substance of a process.

It is to be noted that, in this instance, an enjoyment flag is set to accumulated data in the form of AV data of the portable video player if the accumulated data is reproduced and utilized to the last end, and it can be decided based on the enjoyment flag whether or not the accumulated data is enjoyed already. Further, in FIG. 32, it is registered that, for the portable audio player and the digital still camera, deletion or erasure of accumulated data should not be carried out.

The "transfer direction" is information representative of the direction of transfer of accumulated data and represents whether accumulated data should be transferred from the home apparatus to the mobile apparatus or from the mobile apparatus to the home apparatus. In the case of the portable video player and the portable audio player illustrated in FIG. 32, it is registered that data should be provided from the home apparatus to the mobile apparatus. Further, it is registered that, in the case of the digital still camera, data should be provided from the mobile apparatus to the home apparatus, that is, uploading of data from the mobile apparatus to the home apparatus should be carried out.

The "home apparatus of object of data conversion" is information which specifies a home apparatus of the opposite party with which the mobile apparatus should exchange data. In the execution process specification table illustrated in FIG. 32, it is registered that the portable video player should carry out data exchange with the HDD recorder; the portable audio player should carry out data exchange with the PC1 (personal computer 1); and the digital still camera should carry out data exchange with the PC2 (personal computer 2).

The "transfer condition, etc." is information which defines the particular substance regarding a transfer process of accumulated data. In particular, in the case of the execution process specification table illustrated in FIG. 32, it is registered that, for the portable video player, a process of transferring a non-transferred recording content or contents of the HDD recorder until they are stored to the full storage capacity of the portable video player should be carried out.

Further, in the execution process specification table illustrated in FIG. 32, it is registered that, for the portable audio player, a process of synchronizing the substance of the PC1 and the substance of the portable audio player with each other should be carried out. In particular, a process of transferring audio data which are not accumulated in the portable audio player but are accumulated in the PC1 to the portable audio player is carried out.

Further, in the execution process specification table illustrated in FIG. 32, it is registered that the digital still camera should carry out a process of transferring non-transferred image data to the PC2. It is to be noted that, in this instance, for example, a transfer flag is provided for the image data accumulated in the digital still camera. Thus, upon transfer of image data to the home apparatus, the transfer flag of transferred image data is set for the home apparatus. Consequently, transferred image data and non-transferred image data can be decided based on the transfer flag.

Where such an execution process specification table as described above is registered, for example, in the nonvolatile memory 214 of the server apparatus 2 in advance, if the server apparatus 2 specifies, from the information included in the apparatus ID response transmitted through the cradle 1, the type of the mobile apparatus placed on the cradle 1 and refers to the execution process specification table illustrated in FIG. 32 based on the specified type of the mobile apparatus, then it can specify what process should be carried out for the mobile apparatus and carry out the specified process.

[(2) Particular Example of an Execution Process Specification Table Wherein the Substance of a Process is Registered for Specification for Each Mobile Apparatus]

FIGS. 33A and 33B illustrate particular examples of an execution process specification table wherein the substance of a process is registered for each mobile apparatus. In particular, FIG. 33A illustrates an execution process specification table regarding a transfer process of data from the server apparatus to the mobile apparatus, that is, a downloading process of data from the home apparatus to the mobile apparatus. Meanwhile, FIG. 33B illustrates an execution process specification table regarding a transfer process of data from the mobile apparatus to the home apparatus, that is, an uploading process of data from the mobile apparatus to the home apparatus.

The execution process specification table illustrated in FIG. 33A includes, as component items or components thereof, four different items of information including "mobile apparatus type", "deletion condition of accumulated data", "home apparatus of transfer source" and "transfer condition, etc.". Meanwhile, the execution process specification table illustrated in FIG. 33B includes, as component items or components thereof, four different items of information including "mobile apparatus type", "deletion condition of accumulated data", "home apparatus of transfer destination" and "transfer condition, etc.".

In FIGS. 33A and 33B, the "mobile apparatus" is information which can specify each mobile apparatus and is unique to each mobile apparatus such as, for example, an apparatus ID and a production number. Accordingly, where a plurality of mobile apparatus of the same type like a portable video player-1 and a portable video player-2 exist as seen in FIG. 33A, each mobile apparatus can be specified based on the mobile information.

Further, in FIGS. 33A and 33B, the two items of the "deletion condition of accumulated data" and the "transfer condition, etc." have the same significance as the corresponding items of the execution process specification table described above with reference to FIG. 32. Accordingly, the "deletion condition of accumulated data" is information which represents whether or not accumulated data accumulated in the mobile apparatus should be deleted or erased under the control of the server apparatus 2 and further represents, where such accumulated data should be deleted, a condition and a timing of the deletion or erasure. Further, the "transfer condition, etc." is information which defines the particular substance regarding a transfer process of accumulated data.

Then, in the execution process specification table illustrated in FIG. 33A, the "home apparatus of transfer source" is information for specifying the home apparatus of the providing source or downloading source of data from which the mobile apparatus receives data. Further, in FIG. 33B, the "home apparatus of transfer destination" is information for specifying the home apparatus of the destination of uploading of accumulated data from the mobile apparatus.

Then, in the case of the execution process specification table shown in FIG. 33A, it is registered that the portable video player-1 should carry out a process of deleting accumulated data enjoyed already and transferring non-transferred recorded contents from the HDD recorder to the portable video player-1 until they are stored to the full storage capacity of the portable video player-1 should be carried out.

Further, in the case of the execution process specification table shown in FIG. 33A, it is registered that the portable video player-2 should carry out a process of transferring non-transferred "comedy programs", if any, from the PC1 to the portable video player-2 without carrying out automatic deletion of accumulated data.

Further, in the case of the execution process specification table shown in FIG. 33B, it is registered that the digital still camera should carry out a process of deleting, after all of accumulated still image data accumulated in the digital still camera are transferred to the PC2, the transferred still image data. Further, in the case of the execution process specification table shown in FIG. 33B, it is registered that the digital video camera should carry out a process of transferring non-transferred moving image data of the digital video camera to the network attached storage without carrying out automatic deletion of accumulated data.

In this manner, in the execution process specification table registered in advance in the server apparatus 2, it is possible to register the substance of a process for each type of mobile apparatus as described above with reference to FIG. 32. Also it is possible to register the substance of a process for each mobile apparatus as described above with reference to FIGS. 33A and 33B.

The former is suitable for a case wherein a plurality of mobile apparatus of the same type are not used or another case wherein, even if a plurality of mobile apparatus of the same type are used, the same process should be carried out for the plural mobile apparatus. Meanwhile, the latter is suitable for a case wherein a plurality of mobile apparatus of different types are used and different processes should be carried out individually for the plural mobile apparatus. In recent years, different members of a family frequently use different mobile apparatus such as portable telephone terminals, and in such a situation, the latter is suitable in that different processes can be carried out individually among the different mobile apparatus.

Further, while the execution process specification table of FIG. 32 includes also the information for specifying the transfer direction, it is also possible to provide different tables corresponding to different transfer directions like the execution process specification tables described above with reference to FIGS. 33A and 33B. On the contrary, also it is possible to merge the two tables illustrated in FIGS. 33A and 33B into such a single table as in the table illustrated in FIG. 32 by providing information for specifying the transfer direction.

Also it is possible to add flag information conforming to an object to accumulated data accumulated in a mobile apparatus or in a home apparatus as described above to define a process using the flag information.

FIG. 34 illustrates an execution process specification table wherein the substance of a process is registered for each type of mobile apparatus similarly to that described above with reference to FIG. 32 but additionally uses flag information for accumulated data. Referring to FIG. 34, the items "mobile apparatus type", "deletion condition of accumulated data", "transfer direction", "home apparatus of object of data conversion" and "transfer condition, etc." which form the execution process specification table are similar to those described above with reference to FIG. 32.

In the execution process specification table shown in FIG. 34, the substance of the "transfer condition, etc." takes the flag information of accumulated data into consideration. In particular, the first set of registration information in the execution process specification table shown in FIG. 34 represents that a process of deleting enjoyed accumulated information of the portable video player and transferring those contents whose transfer flag is in a set state from the HDD recorder to the portable video player should be carried out.

Meanwhile, the second set of registration information in the execution process specification table shown in FIG. 34 represents that a process of uploading image data of the digital still camera whose sharing flag is in a set state to a predetermined photograph sharing service server apparatus (commercial server apparatus) on the Internet without deleting accumulated data of the digital still camera should be carried out. It is to be noted that the photograph sharing service server apparatus of the uploading destination can be specified from a URL (Uniform Resource Locator) indicated in the column of the home apparatus with which data exchange should be carried out.

In this instance, the flag information is added to the accumulated data accumulated in the mobile apparatus or the home apparatus. FIGS. 35A and 35B illustrate examples of a layout of accumulated data having flag information. In particular, FIG. 35A illustrates a registration program information table or accumulated data table of the HDD recorder which is one of home apparatus. Meanwhile, FIG. 35B illustrates a picked up image information table or accumulated data table of the digital still camera which is one of mobile apparatus.

As seen in FIG. 35A, the recorded program information table of the HDD recorder indicates table information regarding recorded programs accumulated in the HDD recorder and includes a data ID, a program name, recording information and a transfer flag. The data ID is information which can uniquely specify recorded information as content data and corresponds here, for example, to a file ID of a file in which a recorded program is recorded. The program name is the name of the recorded program and is derived from information of, for example, an EPG or the like. The recording information is information acquired from the control section 450 or the clock circuit 461 upon recording and represents the time and the channel of broadcasting of the recorded program. The transfer flag is information representing of whether or not transfer to a mobile apparatus should be permitted, and indicates inhibition of transfer when it is "No", but indicates permission of transfer when it is "Yes".

Accordingly, when a process defined by the information registered in the first set of the execution process specification table illustrated in FIG. 34 should be carried out, a recorded program whose transfer flag is in a set state, that is, whose transfer flag is "Yes", in FIG. 35A is specified, and a process of transferring or downloading the specified recorded information to the portable video player is carried out. It is to be noted that the transfer flag can be set for each recorded program on the HDD recorder by the user. This may be set upon recording based on information determined in advance or set or changed after recording.

Meanwhile, the picked up image information table illustrated in FIG. 34 is table information of image data accumulated in the digital still camera and includes a data ID, a data format, an image pickup date and time and a sharing flag. The data ID is information which can uniquely specify image data of an image pickup object obtained by image pickup and corresponds, for example, to a file ID of a file in which the image data is recorded. The data format indicates the format of the data such that, for example, where the data is in a form compressed in accordance with the JPEG (Joint Photographic Experts Group) system, the data format is represented as "JPEG". The image pickup date and time indicates information of the date and time at which each image data was obtained, that is, information of the date and time at which image pickup of the image data was carried out. The sharing flag is information representing of whether or not the image data may be uploaded to a photograph sharing service server apparatus on the Internet and laid open to the public. If the sharing flag is "No", then this signifies that sharing of the image data is not permitted, but if the sharing flag is "Yes", then this signifies that sharing of the image data is permitted.

Accordingly, if a process defined by the information registered in the second set of the execution process specification table illustrated in FIG. 34 is to be carried out, then image data whose sharing flag is in a set state, that is, whose sharing flag is "Yes", in FIG. 35b is specified, and a process of uploading the specified image data to a photograph sharing service server apparatus is carried out. It is to be noted that the sharing flag can be set on the digital still camera by the user. This may be set upon image pickup based on information determined in advance or may be set or changed for each image data after image pickup.

It is to be noted that the execution process specification tables described above with reference to FIGS. 32, 33A, 33B and 34 illustrate an example of them, and it is possible to form and use tables of various forms having various information items. Also the accumulation data tables illustrated in FIGS. 35A and 35B illustrate an example thereof, and it is possible to form and use various accumulated data tables having various substances having various information items. Also it is possible to add flag information to the header part of accumulated data and use the flag information.

[Particular Example of Processes in the Data Communication System of the Second Embodiment]

Now, a particular example of processes carried out in the data communication system of the second embodiment is described in detail. In the following description, (A) processes where data is transferred from a home apparatus to a mobile apparatus, (B) processes where data is transferred from a mobile apparatus to a home apparatus, (C) processes where data is transferred from a mobile apparatus to a home apparatus and a process is carried out based the data on the home apparatus, and (D) processes where data is uploaded from a mobile apparatus to a predetermined commercial server apparatus on the Internet 8, are described.

[Particular Example of the Execution Process Specification Table]

In order to execute the processes of the types (A) to (D) above, such an execution process specification table as seen in FIG. 36 is formed, for example, in the nonvolatile memory 214 of the server apparatus 2 in the data communication system of the present second embodiment. FIG. 36 illustrates an execution process specification table formed in the nonvolatile memory 214 of the server apparatus 2.

Referring to FIG. 36, in the execution process specification table illustrated, the substance of a process is registered for each mobile apparatus. The execution process specification table includes, as component items thereof, "No.", "mobile apparatus", "user ID", "data type", "deletion condition of accumulated data", "transfer direction", "home apparatus of object of data exchange" and "transfer condition, etc." as seen in FIG. 36.

The "mobile apparatus" is information which can specify each mobile apparatus similarly to the "mobile apparatus" of the execution process specification table described above with reference to FIGS. 33A and 33B. The "deletion condition of accumulated data", "transfer direction", "home apparatus of object of data conversion" and "transfer condition, etc." have the significance same as that of the corresponding component items of the execution process specification table described above with reference to FIG. 32.

In the execution process specification table illustrated in FIG. 36, the "No." indicates a sequence number. The "mobile apparatus" is information for specifying each mobile apparatus. The "user ID" is information for specifying a user of each mobile apparatus. The "data type" is information for specifying the type of data of a transfer object and indicates "still image data", "moving image data", "mail data", "music data" or the like.

The information registered in "No. 1" in FIG. 36 indicates that a process of deleting enjoyed data of the portable video player and transferring non-transferred recorded contents in the form of moving picture data accumulated in the HDD recorder to the portable video player should be carried out. Meanwhile, the information registered in "No. 2" indicates that a process of all of picked up image data in the form of still image data of the digital camera-1 to the network attached storage and then deleting all of the picked up image data of the digital video camera-1 should be carried out.

Meanwhile, the information registered in "No. 3" indicates that a process of transferring picked up image data in the form of still image data and electronic mail data of the portable telephone terminal-1 to the PC1 without carrying out deletion of accumulated data of the portable telephone terminal-1 and updating the address book based on address information of the electronic mail data received by the PC1 should be carried out. Further, the information registered in "No. 4" indicates that a process of transferring all of picked up image data in the form of still image data of the portable telephone terminal-2 to the PC2 and then deleting all of the picked up image data of the portable telephone terminal-2 should be carried out.

Further, the information registered in "No. 5" indicates that a process of transferring all of picked up image data in the form of still image data of the digital still camera-2 to a photograph sharing service server apparatus on the Internet 8 without deleting accumulated data of the digital still camera-2 should be carried out.

In the following, processes of the data communication system of the present second embodiment where processing is carried out using the execution process specification table illustrated in FIG. 36 are described particularly.

[Processes of the Type (A) Wherein Data is Transferred from a Home Apparatus to a Mobile Apparatus]

First, a particular example wherein data is transferred from a home apparatus to a mobile apparatus is described. In the example described, the mobile apparatus is the portable video player 4(4) described above with reference to FIG. 27 and the home apparatus is the HDD recorder 6(3) described above with reference to FIG. 29.

FIGS. 37 and 38 illustrate an outline of operation of the component apparatus of the data communication system. Referring first to FIG. 37, when the cradle 1 is in a state wherein power supply thereto is available, the function of the placement detection section 16 is used to determine whether or not a mobile apparatus 4 is placed on the cradle 1 after every predetermined interval of time (step S61). Also in the present second embodiment, a plurality of mobile apparatus can be placed at a time on the cradle 1 similarly as in the first embodiment, and every time a new mobile apparatus is placed on the cradle 1, it can be detected that a mobile apparatus is placed on the cradle 1.

Then, if it is decided by the decision process at step S61 that a mobile apparatus 4 is not placed on the cradle 1, then the decision process at step S61 is repeated to wait for placement of a mobile apparatus. Then, if it is decided by the decision process at step S61 that a mobile apparatus 4 is placed on the cradle 1, then the cradle 1 carries out a process for starting charging for the mobile apparatus 4 where the battery of the mobile apparatus 4 does not have a sufficient charge capacity as hereinafter described (step S62).

Thereafter, in the cradle 1, the transmission/reception control section 17 controls the radio communication section 15a to issue a request for an inquiry about an apparatus ID to the mobile apparatus 4 newly placed on the cradle 1, in the present example, the portable video player 4(4) as seen in FIG. 37 (step S63).

After the portable video player 4(4) receives the request for an inquiry about an apparatus ID from the cradle 1 through the transmission/reception antenna 210b and the radio communication section 210a, the control section 201 thereof controls the radio communication section 210a to form an apparatus ID response including information of an apparatus ID or the like stored and retained in the nonvolatile memory 2014 of the cradle 1 and transmits the apparatus ID response (step S64). The apparatus ID response is transmitted to the server apparatus 2 through repeating of the cradle 1.

Then, the server apparatus 2 specifies based on information included in the apparatus ID response transmitted thereto through the cradle 1 what mobile apparatus is placed on the cradle 1. Then, the server apparatus 2 refers to the execution process specification table illustrated in FIG. 36 based on the specified information to specify a process to be executed (step S65A).

In the present example, since the mobile apparatus placed on the cradle 1 is the portable video player 4(4), the server apparatus 2 specifies that a process in accordance with the information registered as "No. 1" illustrated in FIG. 36 should be carried out. In particular, the server apparatus 2 specifies that the process of deleting enjoyed moving image data of the portable video player 4(4) placed on the cradle 1 to assure a sufficient storage capacity and then transferring non-transferred recorded contents accumulated in the HDD recorder 6(3) to the portable video player 4(4) should be carried out.

Then, the control section 21 of the server apparatus 2 first forms a request for deletion of enjoyed contents in accordance with the specified process substance, and the transmission/reception control section 27 controls the external interface 26a to transmit the formed request to the portable video player 4(4) (step S66). The request for deletion of enjoyed contents is transmitted to the portable video player 4(4) through the cradle 1.

The control section 201 of the portable video player 4(4) receives the request for deletion of enjoyed contents destined for the portable video player 4(4) through the transmission/reception antenna 210b and the radio communication section 210a and executes a process of deleting those content data whose enjoyment flag is on from among content data stored in the content storage section 205 (step S67). Then, when the deletion process ends, the control section 201 forms and transmits a deletion completion report to the server apparatus 2 through the radio communication section 210a and the transmission/reception antenna 210b (step S68).

Then, the control section 21 of the server apparatus 2 receives the deletion completion report from the portable video player 4(4) transmitted through the cradle 1 through the input/output interface 26b and the external interface 26a. Thereafter, the processing advances to the process illustrated in FIG. 38. Referring now to FIG. 38, the control section 21 of the server apparatus 2 forms a request for transfer of recorded contents for requesting the HDD recorder 6(3) for transfer of non-transferred recoded contents to the portable video player 4(4). Then, the transmission/reception control section 27 transmits the request for transfer of recorded contents to the HDD recorder 6(3) through the external interface 32a and the input/output terminal 32b (step S69). This request for transfer of recorded contents is transmitted to the HDD recorder 6(3) through the network hub 5.

The HDD recorder 6(3) receives the request for transfer of recorded contents through the input/output terminal 463b and the external interface 463a, and the control section 450 of the HDD recorder 6(3) controls the HDD 430 to read out and transmit non-transferred recorded contents to the portable video player 4(4) through the external interface 463a and the input/output terminal 463b (step S70). The transmitted recorded contents are transferred to the portable video player 4(4) through the network hub 5, server apparatus 2 and cradle 1.

The portable video player 4(4) receives the content data through the transmission/reception antenna 210b and the radio communication section 210a, and the control section 201 thereof controls the content storage section 205 to carry out a process of recording the received recorded content (step S71). In this instance, the control section 201 supervises the free capacity of the content storage section 205 (step S72), and if the free capacity is lost, then the control section 201 forms and transmits a request for stopping of transmission through the radio communication section 210a and the transmission/reception antenna 210b (step S73). This request for stopping of transmission is transmitted to the HDD recorder 6(3) through the cradle 1, server apparatus 2 and network hub 5.

The HDD recorder 6(3) receives the request for stopping of transmission through the input/output terminal 463b and the external interface 463a, and the control section 21 thereof controls the components of the HDD recorder 6(3) to end the recorded content transmission process (step S74).

Then, the cradle 1 continues the charging process until after the charging of the battery 203 of the portable video player 4(4) is completed (step S75). Then, when it is determined that the charging is completed, the cradle 1 ends the charging process for the battery 203 of the portable video player 4(4) (step S76).

The transfer process of recorded contents from the HDD recorder 6(3) to the portable video player 4(4) placed on the cradle 1 ends therewith. It is to be noted that, if no recorded content exists in the HDD recorder 6(3), then the processes at steps S70 to S74 illustrated in FIG. 37 are not carried out. Further, if the transfer of recorded contents of the HDD recorder 6(3) is completed before the free capacity of the portable video player 4(4) is lost, then the process at step S74 is carried out, for example, after a transfer completion notification of the recorded contents is transmitted from the HDD recorder 6(3) to the portable video player 4(4).

[Example of a Layout of Accumulated Data]

It is to be noted that, in the case of the present example, where content data stored in the content storage section 205 of the portable video player 4(4), that is, moving image data, have an enjoyment flag added to the header part or the like thereof, a deletion process of enjoyed contents can be carried out under the control of the server apparatus 2.

FIG. 39 illustrates an example of a layout of moving image data as accumulated data stored and retained in the content storage section 205 of the portable video player 4(4). Referring to FIG. 39, an apparatus ID, a data ID, a data attribute, a production date and time, protect, a data size, an enjoyment flag and other information are added to the header part of the moving image data.

The apparatus ID is information for specifying the apparatus in which the accumulated data is accumulated. The data ID is used for unique specification of the accumulated data. The data attribute is information indicative of the type of the data among still image data, moving image data, sound data and forth. The production date and time is information indicative of the date and time at which the accumulated data was acquired and recorded into the content storage section 205.

The protect is information which is, for example, on where the data is protected but is off where the data is not protected. The data cannot be erased unless the protect applied thereto is canceled. The data size is information indicative of the size of the accumulated data.

The enjoyment flag is information which is "off (0)" where the accumulated data has not been reproduced to the last end, but is placed to "on (1)" under the control of the content storage section 205 by the function of the control section 201 of the portable video player 4(4) when reproduction of the accumulated data is carried out to the last end thereof. Thus, by deleting accumulated data whose enjoyment flag is "on (1)", the deleting process of the enjoyed content can be carried out.

Further, in the case of the present example, if each content data in the form of moving image data stored and retained in the HDD 430 of the HDD recorder 6(3) has a transfer flag added to the header part or the like thereof, then it is possible to extract non-transferred content data and transfer the extracted content data to the mobile apparatus under the control of the server apparatus 2.

FIG. 40 illustrates an example of a layout of a recorded content as accumulated data stored and retained in the HDD 430 of the HDD recorder 6(3). Referring to FIG. 40, a data ID, a data attribute, a program name, recording information, a transfer flag and other information are added to the header part of the recorded content or moving image data.

The data ID is used for unique identification of the accumulated data. The data attribute is information indicative of the type of the accumulated data among still image data, moving image data, sound data and so forth. The program name is a program name of the recorded content and is derived from information of, for example, an EPG or the like.

The recording information is information acquired from the control section 450 or the clock circuit 461 and indicative of the channel in which the recorded program was broadcast. The transfer flag is information indicative of whether or not the accumulated data has been transferred to the mobile apparatus, and indicates a non-transferred condition if it is "off (0)" but indicates a transferred condition if it is "on (1)".

Consequently, if accumulated data whose transfer flag is "off (0)" are extracted and transferred, then only non-transferred recorded contents can be transferred to the portable video player 4(4). In this instance, if the transfer of any recorded content is carried out, then the transfer flag is rewritten into "on (1)" under the control of the control section 450.

It is to be noted that, for example, if the apparatus ID of the destination of transfer of each recorded content is retained, for example, like transfer destination 1, transfer destination 2 or transfer destination 3 in place of the transfer flag, then it can be recognized for each mobile apparatus whether a recorded content has been transferred or not transferred. Therefore, it is possible to extract and transfer non-recorded contents for each mobile apparatus.

[Operation of the Cradle 1 in the Case of the Processes of the Type (A)]

Figure 41:
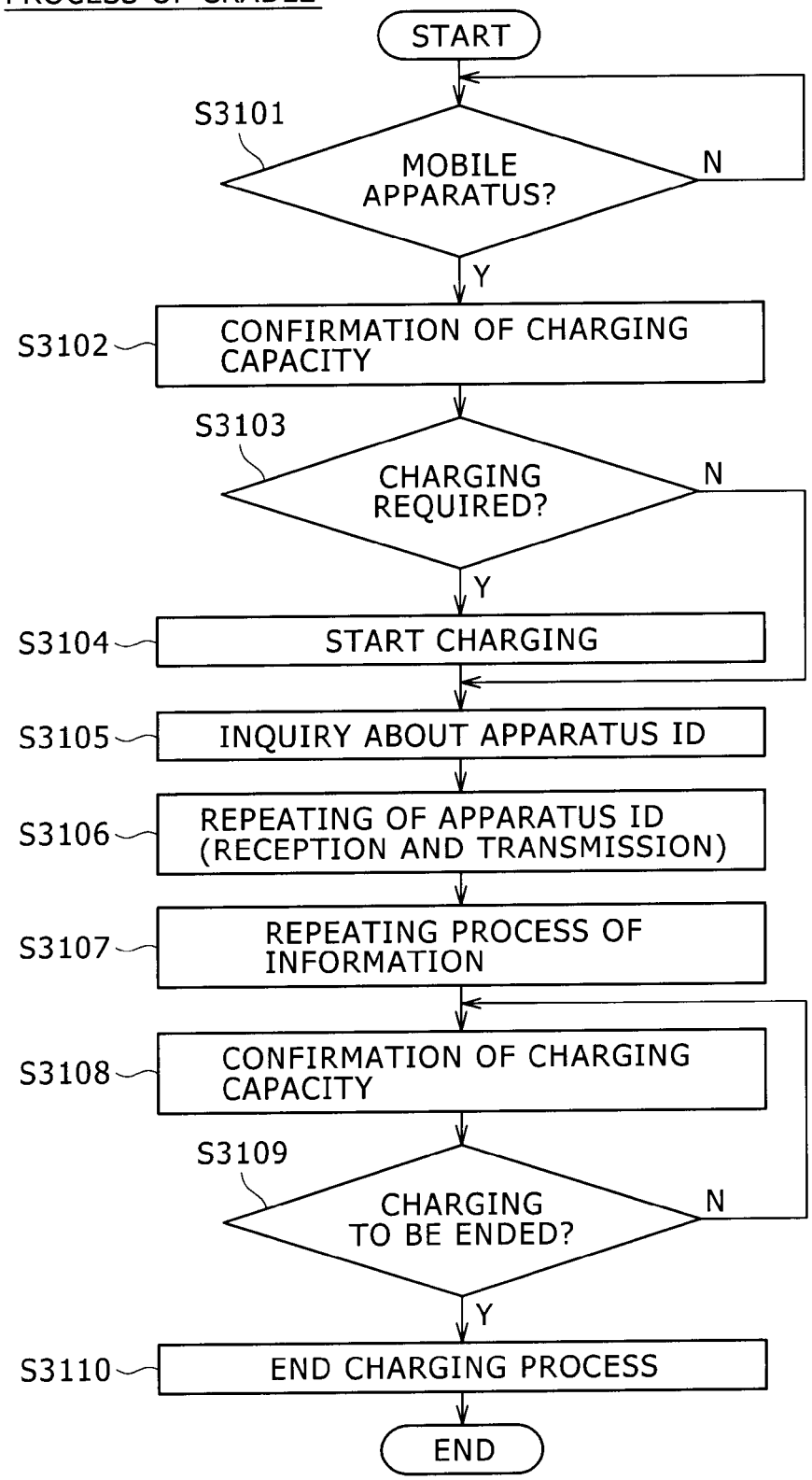
FIG. 41 is a flow chart illustrating a process carried out by the cradle in the data communication system of the first example of the second embodiment.

Now, processes of the cradle 1 in the particular example described above with reference to FIGS. 37 and 38 wherein data is transferred from a home apparatus to a mobile apparatus are described. FIG. 41 illustrates a process carried out by the cradle 1 where data is transferred from a home apparatus to a mobile apparatus.

The process illustrated in FIG. 41 is executed by the control section 11 and the transmission/reception control section 17 when the cradle 1 is in a state wherein the power supply thereto is available. It is to be noted that, also in the present second embodiment, similarly as in the first embodiment, the cradle 1 allows placement of a plurality of mobile apparatus at a time thereon and can execute the process illustrated in FIG. 41 in a multi-task fashion for a maximum number of mobile apparatus which can be placed on the cradle 1.

If the power supply is made available to the cradle 1, then the control section 11 of the cradle 1 controls the placement detection section 16 to start detection of placement of a mobile apparatus to determine whether or not a mobile apparatus is placed on the cradle 1 (step S3101). If it is determined by the decision process at step S3101 that a mobile apparatus is not placed on the cradle 1, then the cradle 1 repeats the placement detection of a mobile apparatus to wait that a mobile apparatus is placed on the cradle 1.

If it is determined by the decision process at step S3101 that a mobile apparatus is placed on the cradle 1, then the control section 11 controls the charging control section 19 to confirm the charging capacity of the battery of the mobile apparatus 4 placed newly on the cradle 1 (step S3102). The process at step S3102 can be carried out by an electric detection process such as to detect a voltage or the like of the battery of the mobile apparatus 4.

Then, the control section 11 determines based on a result of the confirmation at step S3102 whether or not the mobile apparatus 4 placed newly requires charging (step S3103). If it is determined by the decision process at step S3103 that the mobile apparatus 4 requires charging, then the control section 11 controls the charging control section 19 to start charging for the battery of the mobile apparatus 4 placed newly (step S3104). On the other hand, if it is determined by the decision process at step S3103 that the mobile apparatus 4 does not require charging, then the processing advances to step S3105.

Thereafter, the control section 11 forms apparatus ID inquiry command data described above with reference to FIG. 7B, and the transmission/reception control section 17 controls the radio communication section 15a and the transmission/reception antenna 15b to transmit the formed apparatus ID inquiry command data to the mobile apparatus 4 placed newly on the cradle 1, in this instance, the portable video player 4(4) (step S3105). In response to the apparatus ID inquiry command data, an apparatus ID response is transmitted from the mobile apparatus 4 to the cradle 1. Therefore, the transmission/reception control section 17 of the cradle 1 carries out a repeating process of receiving the apparatus ID response described above with reference to FIG. 7C from the mobile apparatus 4 through the transmission/reception antenna 15b and the radio communication section 15a and then transmitting the apparatus ID response to the server apparatus 2 through the external interface 14a and the input/output terminal 14b (step S3106).

Thereafter, the cradle 1 carries out a repeating process of the information between the server apparatus 2 and the mobile apparatus 4 placed on the cradle 1 (step S3107). In particular, at step S3107, the repeating process of information such as requests and data such as an enjoyed content deletion request, a deletion completion report, a recorded content and a transmission stopping request which are transmitted and received between the server apparatus 2 and the portable video player 4(4) as a mobile apparatus as described above with reference to FIGS. 37 and 38.

Then, after the series of information repeating processes comes to an end, the control section 11 of the cradle 1 controls the charging control section 19 to confirm the charging capacity of the battery of the mobile apparatus 4 (step S3108). Then, the control section 11 determines based on a result of the confirmation at step S3108 whether or not the charging is completed (step S3109). If it is determined by the decision process at step S3109 that the charging is not completed, then the processes at the steps beginning with step S3108 are repeated.

If it is determined by the decision process at step S3109 that the charging is completed, then the control section 11 of the cradle 1 controls the charging control section 19 to end the charging process for the mobile apparatus 4 with regard to which it is determined that the charging is completed (step S3110), thereby ending the process illustrated in FIG. 41.

It is to be noted that, if it is determined by the decision process at step S3103 that the mobile apparatus 4 does not require charging and charging is not started at step S3104, then it can be determined through the processes at steps S3108 and S3109 that the mobile apparatus 4 does not require charging. Consequently, the process at step S3110 can be bypassed, and the process illustrated in FIG. 41 can be ended therewith.

In this manner, where the cradle 1 detects that the mobile apparatus 4 is placed on the cradle 1, it acquires an apparatus ID from the mobile apparatus 4 and notifies the server apparatus 2 of the apparatus ID to provide an opportunity to start processing of the server apparatus 2.

[Operation of the Server Apparatus 2 in the Case of the Processes of the Type (A)]

Figure 42:
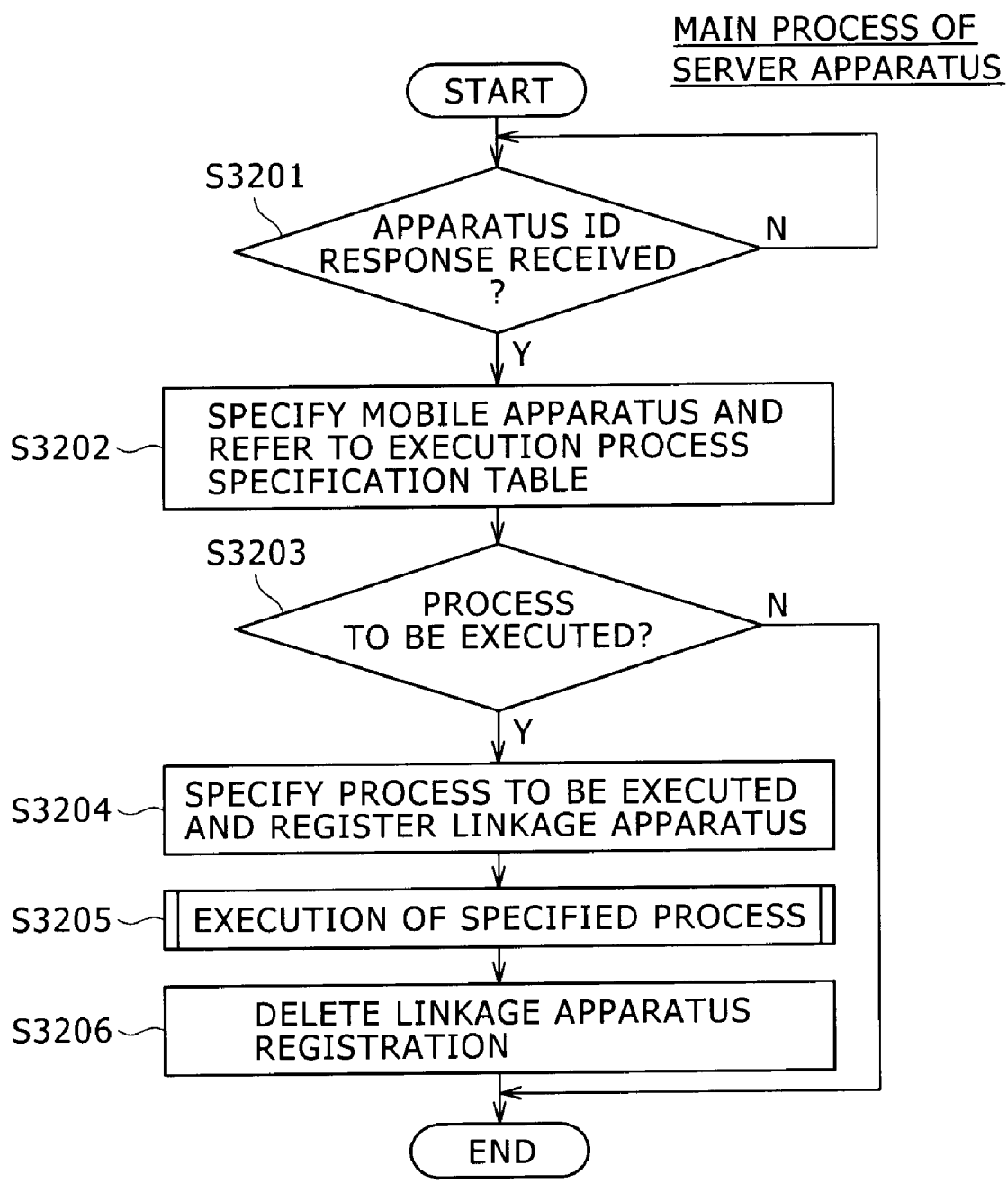
FIG. 42 is a flow chart illustrating a main process carried out by the server apparatus in the data communication system of the first example of the second embodiment.
Figure 43:
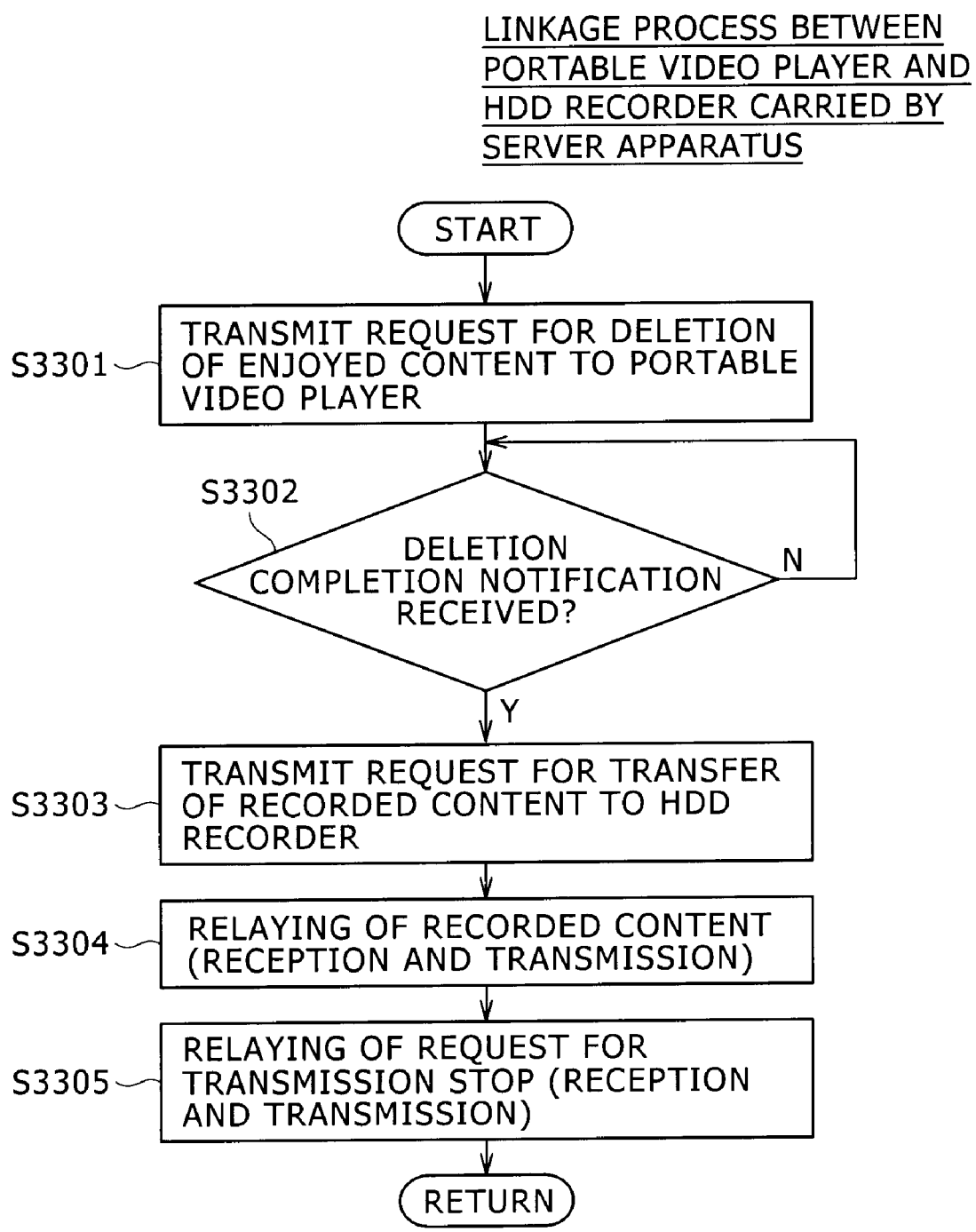
FIG. 43 is a flow chart illustrating a process carried out in the main process illustrated in FIG. 42 by the server apparatus in the data communication system of the first example of the second embodiment.

Now, processes of the server apparatus 2 in the particular example described above with reference to FIGS. 37 and 38 wherein data is transferred from a home apparatus to a mobile apparatus are described. FIG. 42 illustrates a main process carried out by the server apparatus 2 in the data communication system of the present second embodiment. FIG. 43 illustrates a process executed at step S3205 illustrated in FIG. 42 when data is transferred from the home apparatus to the mobile apparatus. The main process illustrated in FIG. 42 is executed by the control section 21 and the transmission/reception control section 27 when the server apparatus 2 is in a state wherein the power supply thereto is available.

After the power supply to the server apparatus 2 is made available, the transmission/reception control section 27 of the server apparatus 2 determines whether or not an apparatus ID report of a mobile apparatus placed on the cradle 1 is received from the cradle 1 through the input/output interface 26b and the external interface 26a (step S3201). If it is determined by the decision process at step S3201 that an apparatus ID report is not received, then the process at step S3201 is repeated to wait for reception of an apparatus ID report of a mobile apparatus placed on the cradle 1.

If it is determined by the decision process at step S3201 that an apparatus ID report is received from the cradle 1, then the control section 21 specifies the mobile apparatus placed on the cradle 1 based on information included in the received apparatus ID report and refers to the execution process specification process described above with reference to FIG. 36 (step S3202).

Then, the control section 21 determines whether or not a process to be executed is registered in the execution process specification table (step S3203). If it is determined by the decision process at step S3203 that a process to be executed is not registered, then the process illustrated in FIG. 42 is ended. Consequently, only the charging process for the mobile apparatus is carried out while a linkage process between the mobile apparatus placed on the cradle 1 and a home apparatus or the like is not carried out.

If it is decided by the decision process at step S3203 that a process to be executed is registered, then the control section 21 specifies the process to be executed based on the registration information and registers an apparatus to be linked (step S3204). In particular, in the example of the present case, the mobile apparatus placed on the cradle 1 is the portable video player 4(4), and the information registered in the "No. 1" of the execution process specification table described above with reference to FIG. 36 is the corresponding information.

Accordingly, the control section 21 of the server apparatus 2 specifies that the process to be executed is a "process of transferring recorded contents of the HDD recorder 6(3) to the portable video player 4(4) after enjoyed contents of portable video player 4(4) are deleted". Then, the control section 21 registers into the nonvolatile memory 214 thereof that the portable video player 4(4) and the HDD recorder 6(3) are the apparatus to be linked.

It is to be noted that the reason why the apparatus to be linked are registered is that, even if a plurality of mobile apparatus can be placed on the cradle 1 and are placed on the cradle 1, the apparatus to be linked can be controlled appropriately.

Then, the control section 21 of the server apparatus 2 executes the process specified at step S3204 (step S3205). In this instance, once a process to be executed is specified, a subroutine to be executed for this can be specified, and the specified subroutine is executed at step S3205.

After the process specified at step S3205 comes to an end, the control section 21 of the server apparatus 2 erases the information for specifying the apparatus to be linked registered in the nonvolatile memory 214 at step S3204, thereby ending the process illustrated in FIG. 42.

Now, a particular process executed at step S3205 of the process illustrated in FIG. 42 is described. FIG. 43 illustrates the process executed at step S3205 of the main process illustrated in FIG. 42 which is executed by the server apparatus 2.

In this instance, the control section 21 of the server apparatus 2 forms a request for erasure of enjoyed contents, and the transmission/reception control section 27 outputs the request for erasure of enjoyed contents through the external interface 26a and the input/output interface 26b (step S5301). The request for erasure of enjoyed contents is transmitted to the portable video player 4(4) as a mobile apparatus placed on the cradle 1 through the cradle 1.

Then, the control section 21 of the server apparatus 2 waits for reception of a deletion completion notification of enjoyed contents from the portable video player 4(4) through the input/output interface 26b and the external interface 26a (step S3302). If it is determined by the decision process at step S3202 that a deletion completion notification is received, then the control section 21 forms a request for transfer of recorded contents, and the transmission/reception control section 27 transmits the request for transfer of recorded contents to the HDD recorder 6(3) through the external interface 32a and the input/output terminal 32b (step S3303).

In response to the request for transfer of recorded contents, recorded contents are transmitted from the HDD recorder 6(3). Consequently, the transmission/reception control section 27 of the server apparatus 2 carries out a repeating process of receiving the recorded contents through the input/output terminal 32b and the external interface 32a and transmitting the recorded contents to the portable video player 4(4) through the external interface 26a and the input/output interface 26b (step S3304). Further, the transmission/reception control section 27 carries out a repeating process of receiving a request for stopping of transmission transmitted from the portable video player 4(4) through the input/output interface 26b and the external interface 26a and transmitting the request for stopping of transmission to the HDD recorder 6(3) through the external interface 32a and the input/output terminal 32b (step S3305), thereby ending the process illustrated in FIG. 43.

Where a mobile apparatus is placed on the cradle 1 in this manner, the server apparatus 2 specifies the mobile apparatus placed and specifies a process to be executed in response to the specified mobile apparatus and then controls the mobile apparatus and the home apparatus to be linked to each other to execute the object process.

[Operation of the Portable Video Player 4(4) in the Case of the Processes of the Type (A)]

Figure 44:
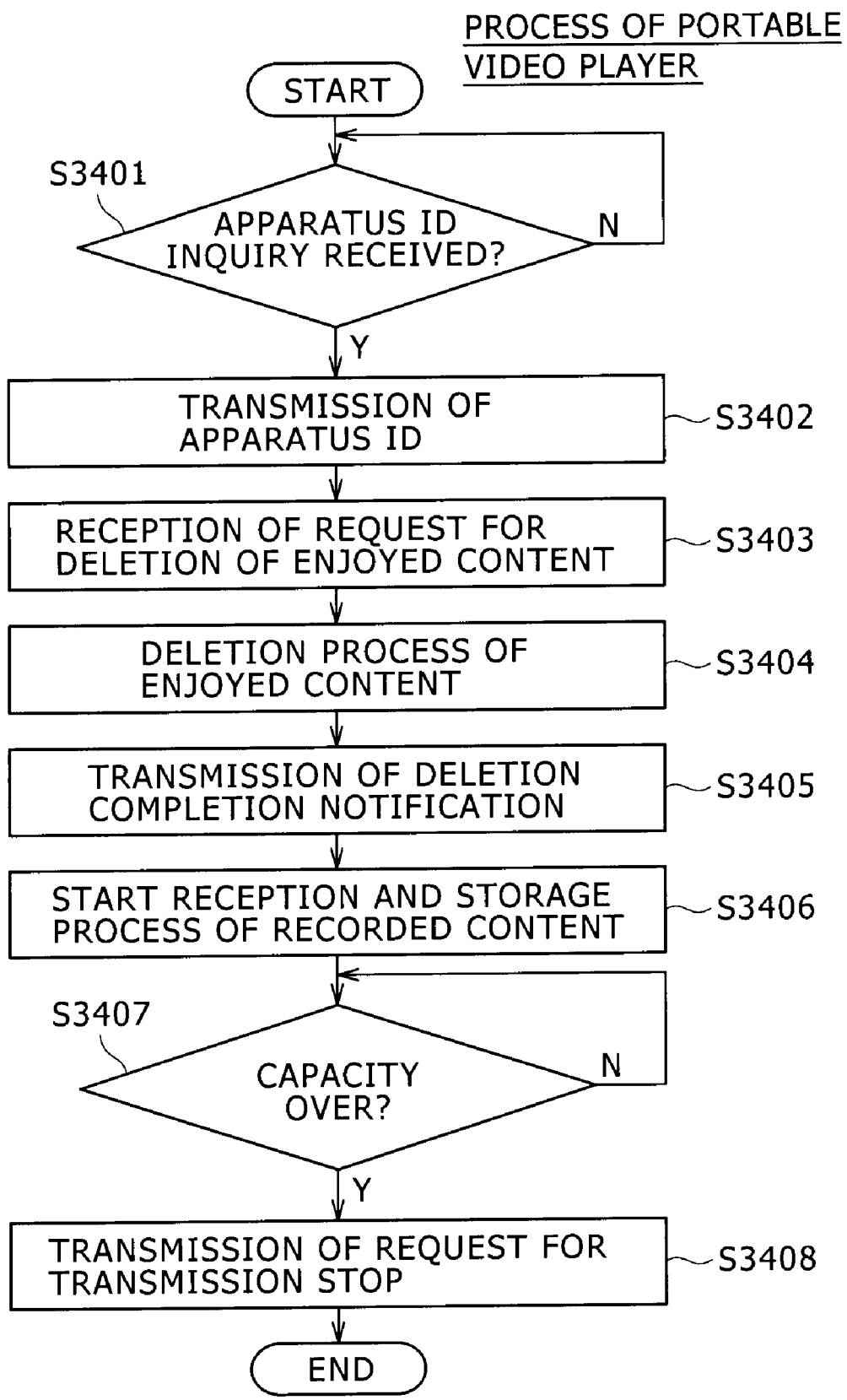
FIG. 44 is a flow chart illustrating a process carried out by the portable video player as a mobile apparatus in the data communication system of the first example of the second embodiment.

Now, processes of the portable video player 4(4) in the particular example described above with reference to FIGS. 37 and 38 wherein data is transferred from a home apparatus to a mobile apparatus are described. FIG. 44 illustrates a process carried out by the portable video player 4(4) where data is transferred from a home apparatus to a mobile apparatus.

The process illustrated in FIG. 44 is carried out principally by the control section 201 of the portable video player 4(4) where the portable video player 4(4) as a mobile apparatus is placed into a predetermined mode in which the portable video player 4(4) is placed on the cradle 1 to carry out data communication and charging processes such as, for example, a charging mode.

First, if the portable video player 4(4) is placed into the predetermined mode, then the control section 201 determines whether or not an inquiry about an apparatus ID from the cradle 1 is received through the transmission/reception antenna 210b and the radio communication section 210a (step S3401). If it is determined by the decision process at step S3401 that an inquiry about an apparatus ID is not received, then the process at step S3401 is repeated to wait for reception of an inquiry about an apparatus ID.

If it is determined by the decision process at step S3401 that an inquiry about an apparatus ID from the cradle 1 is received, then the control section 201 acquires necessary information such as an apparatus ID and an apparatus attribute stored and retained, for example, in the ROM 2012 of the portable video player 4(4). Then, the control section 201 forms such an apparatus ID response as illustrated in FIG. 7C and transmits the apparatus ID response through the radio communication section 210a and the transmission/reception antenna 210b (step S3402). The apparatus ID response is transmitted to the server apparatus 2 through the cradle 1.

Then, the control section 201 receives a request for deletion of enjoyed contents from the server apparatus 2 transmitted through the cradle 1, through the transmission/reception antenna 210b and the radio communication section 210a (step S3403). Then, when a request for deletion of enjoyed contents is received, the control section 201 controls the content storage section 205 to execute a process of deleting the enjoyed accumulated data or content data based on the enjoyment flag provided at the header part of the accumulated data as described above with reference to FIG. 39 (step S3404).

After the deletion process of the enjoyed contents at step S3404 ends, the control section 201 forms and transmits a deletion completion notification through the radio communication section 210a and the transmission/reception antenna 210b (step S3405). The deletion completion notification is transmitted to the server apparatus 2 through the cradle 1.

Thereafter, The control section 201 starts a process of receiving recorded contents transmitted from the HDD recorder 6(3) through the server apparatus 2 and the cradle 1 and destined for the portable video player 4(4) through the transmission/reception antenna 210b and the radio communication section 210a and storing the recorded contents into the content storage section 205 (step S3406). Further, the control section 201 carries out a process of supervising the free capacity of the content storage section 205 (step S3407).

If it is determined by the decision process at step S3407 that recorded contents are stored until the free capacity is lost, then the control section 201 forms and transmits a request for stopping of transmission through the radio communication section 210a and the transmission/reception antenna 210b (step S3408). The request for stopping of transmission transmitted here is transmitted to the HDD recorder 6(3) through the cradle 1 and the server apparatus 2. After the request for stopping of transmission is transmitted at step S3408, the process illustrated in FIG. 44 is ended.

It is to be noted that, if the transmission of recorded contents from the HDD recorder 6(3) comes to an end before the free capacity of the content storage section 205 of the portable video player 4(4) is lost, then the control section 201 confirms that a recorded content is not received for a fixed period of time. Then, when a predetermined interval of time passes, the processes at steps S3407 and 3408 of the process illustrated in FIG. 44 are skipped, and the process illustrated in FIG. 44 ends.

In this manner, only if the portable video player 4(4) in the present example is placed on the cradle 1, then it carries out a deletion process of enjoyed contents and receives supply of recorded contents from the HDD recorder 6(3) and then stores the recorded contents into the content storage section 205 so that the environment in which the recorded contents are utilized on the portable video player 4(4) can be put in order.

[Operation of the HDD Recorder 6(3) in the Case of the Processes of the Type (A)]

Figure 45:
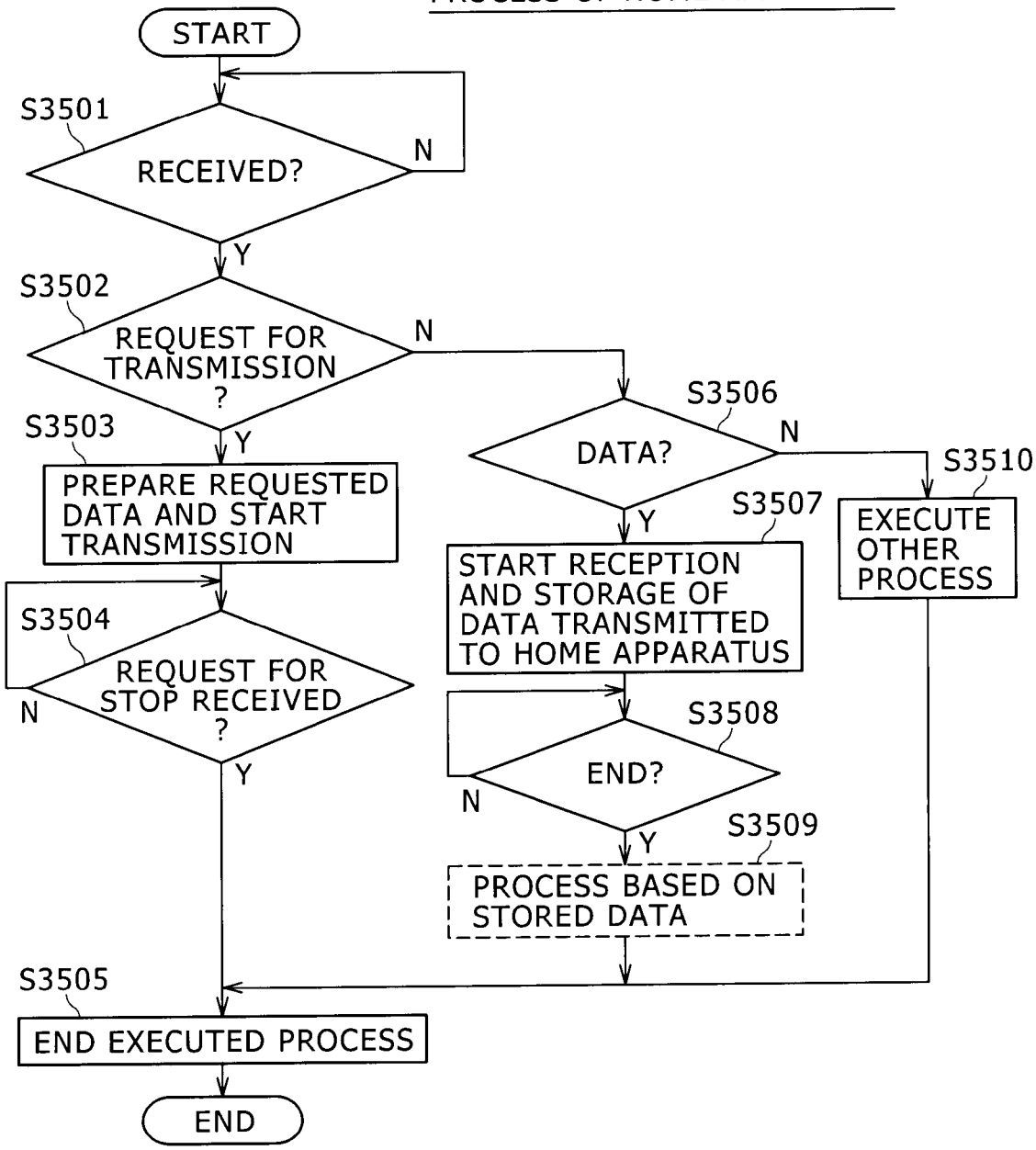
FIG. 45 is a flow chart illustrating a process carried out by the hard disk recorder as a mobile apparatus in the data communication system of the first example of the second embodiment.

Now, processes of the HDD recorder 6(3) in the particular example described above with reference to FIGS. 37 and 38 wherein data is transferred from a home apparatus to a mobile apparatus are described. FIG. 45 illustrates a process carried out by the HDD recorder 6(3) where data is transferred from a home apparatus to a mobile apparatus. The process illustrated in FIG. 45 is one of processes executed principally by the control section 450 when the HDD recorder 6(3) is in a state wherein the power supply is available.

After the power supply is turned on, the control section 450 of the HDD recorder 6(3) supervises information to be received through the input/output terminal 463b and the external interface 463a to determine whether or not a request or data destined for the HDD recorder 6(3) is received (step S3501). If it is determined by the decision process at step S3501 that a request or data destined for the HDD recorder 6(3) is not received, then the control section 450 repeats the process at step S3501 to wait for reception of information destined for the HDD recorder 6(3).

If it is determined by the decision process at step S3501 that information destined for the HDD recorder 6(3) is received, then the control section 450 determines whether or not the received information is a request for transmission of information retained in the HDD recorder 6(3) (step S3502). If it is determined by the decision process at step S3502 that the received information is a request for transmission of information retained in the HDD recorder 6(3), then the control section 450 reads out the requested data from the HDD 430 and makes preparations such as formation of data for transmission and then starts transmission of the requested data to the requesting source (step S3503).

Thereafter, the control section 450 enters a waiting state in which it waits that a request for stopping of transmission is received from the requesting source or transmission of requested data is completed (step S3504). If it is determined at step S3504 that a request for stopping of transmission from the requesting source is received or transmission of the requested data is completed, then the control section 450 ends the executed process, that is, the transmission process started at step S3503 (step S3505), thereby ending the process illustrated in FIG. 45.

On the other hand, if it is determined by the decision process at step S3502 that the received information is not a request for transmission of information retained in the HDD recorder 6(3), then the control section 450 determines whether or not the received information is data to be stored into the HDD recorder 6(3) (step S3506). If it is determined by the decision process at step S3506 that the received information is data to be stored into the HDD recorder 6(3), then the control section 450 starts a process of successively receiving and storing the data into the HDD 430 (step S3507).

Thereafter, the control section 450 enters and then remains in a waiting state until the reception of data destined for the HDD recorder 6(3) is completed, that is, until data destined for the HDD recorder 6(3) is received (step S3508). If it is determined by the decision process at step S3508 that the reception of data destined for the HDD recorder 6(3) is completed, then the control section 450 executes, if a process to be executed exists based on the subject of the data stored in the HDD 430, the process (step S3509). It is to be noted that the process at step S3509 may be carried out in response to a request from the server apparatus 2. Then, after the process at step S3509, the control section 450 ends the executed process, that is, the reception storage process started at step S3507 (step S3505), thereby ending the process illustrated in FIG. 45.

On the other hand, if it is determined by the decision process at step S3506 that the received information is not data to be stored into the HDD recorder 6(3), then the control section 450 executes a different process corresponding to the received information (step S3510). Then, if an ending condition is satisfied, then the control section 450 ends the process (step S3505), thereby ending the process illustrated in FIG. 45.

In this manner, in the present second embodiment, a home apparatus such as, for example, the HDD recorder 6(3) may provide, in response to a request for transmission of data, the requested data or can receive and store, if content data for storage or the like is provided, such content data and then carry out a required process.

Then, in the present example, the HDD recorder 6(3) can provide a recorded content to the portable video player 4(4) in response to a request for transmission from the server apparatus 2.

In this manner, in the example of processes of the type (A) wherein data is transferred from a home apparatus to a mobile apparatus, only if the portable video player 4(4) is placed on the cradle 1, then it is possible to delete enjoyed contents of the portable video player 4(4) to assure a storage region under the control of the server apparatus 2 and then transfer recorded contents retained in the HDD recorder 6(3) to the portable video player 4(4) so that the recorded contents can be utilized on the portable video player 4(4).

[Processes of the Type (B) where Data is Transferred from a Mobile Apparatus to a Home Apparatus]

Now, a particular example of processes where data is transferred from a mobile apparatus to a home apparatus is described. In the example described below, the mobile apparatus is the digital still camera 4(2) described above with reference to FIG. 4 while the home apparatus is the network attached storage 6(4) described above with reference to FIG. 30.

Figure 46:
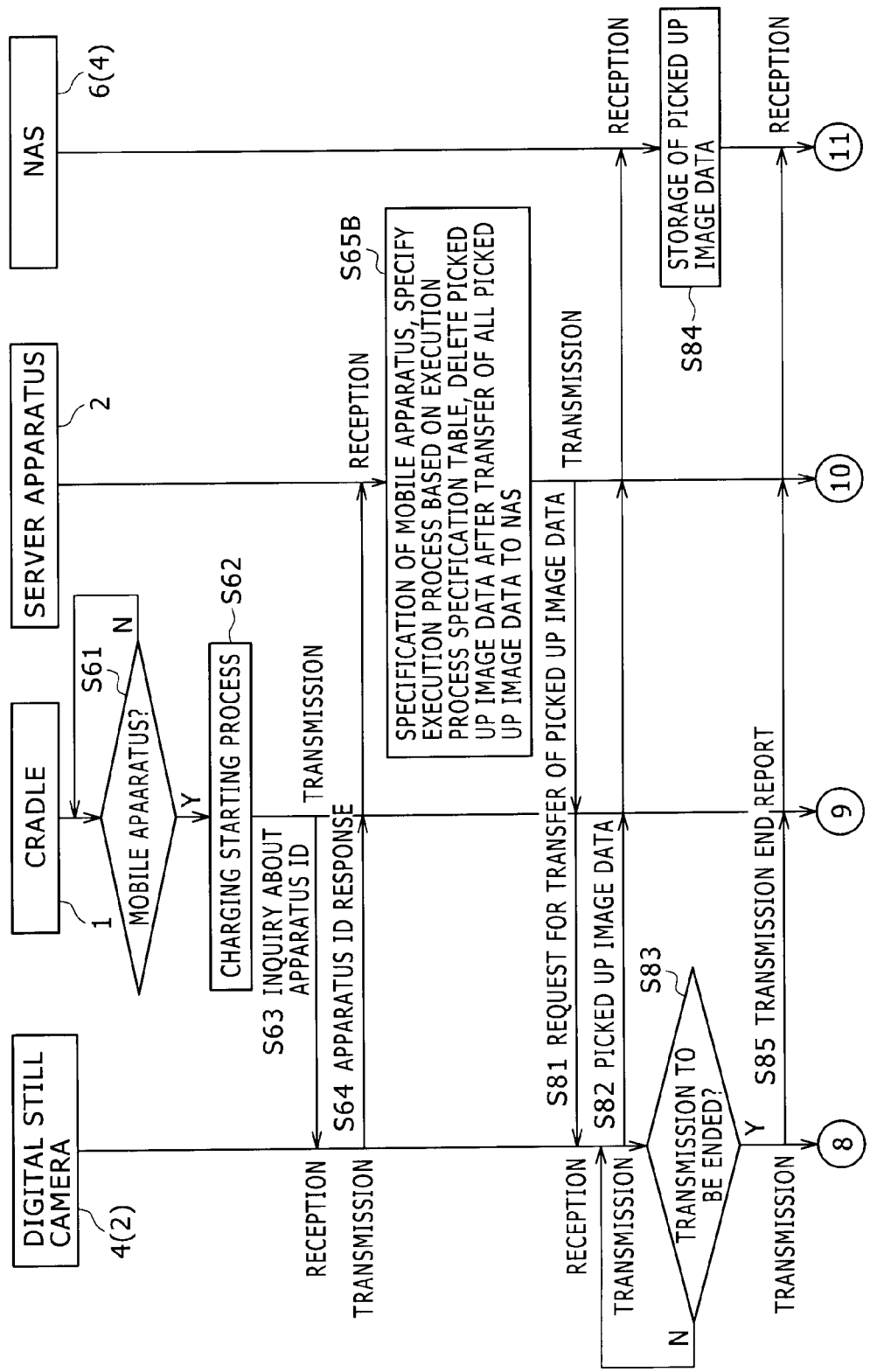
FIGS. 46 and 47 are sequence diagrams illustrating general operation of a data communication system of a second example of the second embodiment of the present invention.
Figure 47:
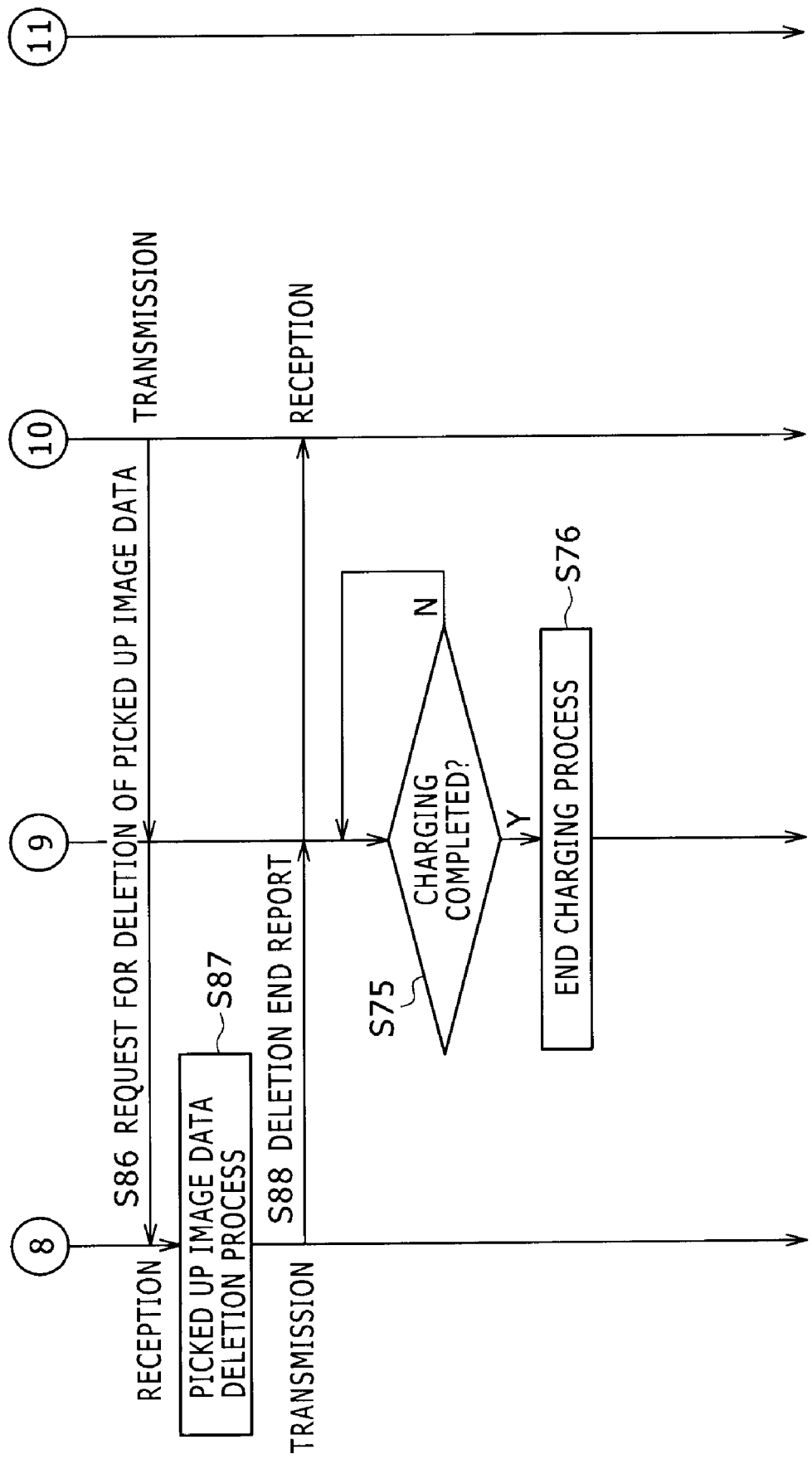

FIGS. 46 and 47 illustrate general operation of the component apparatus of the data communication system. Also the example illustrated in FIGS. 46 and 47 represents processes carried out among a mobile apparatus 4, the cradle 1, the server apparatus 2 and a home apparatus 6 similarly to those in the case of the example of the processes of the type (A) described above with reference to FIGS. 37 and 38. In FIGS. 46 and 47, like items carried out similarly to those described above with reference to FIGS. 37 and 38 are denoted by like reference characters, and since detailed description of the items is same as that given above with reference to FIGS. 37 and 38, it is omitted herein to avoid redundancy.

Referring to FIG. 46, the processes at steps S61 to S64 are carried out similarly to those described above with reference to FIG. 37 and include placement detection and charging starting processes of a mobile apparatus on the cradle 1 and an inquiry process about an apparatus ID.

It is to be noted that, in the example of the processes of the type (B), it is assumed that the mobile apparatus is a digital camera 1 which is a first digital still camera from among a plurality of digital still cameras. Further, in the present example of the operations of the type (B), in order to distinguish the digital still camera-1 from the other mobile apparatus and in order to describe the digital still camera-1 as an apparatus having the configuration shown in FIG. 4, the digital still camera is described as the digital still camera 4(2).

In the present example, if the digital still camera 4(2) receives a request for inquiry about an apparatus ID from the cradle 1 through the transmission/reception antenna 45b and the radio communication section 45a, then the control section 41 controls the radio communication section 45a to form and transmit an apparatus ID response including an apparatus ID and so forth stored and retained in the nonvolatile memory 414 of the digital still camera 4(2) (step S64). This apparatus ID response is transmitted to the server apparatus 2 by repeating of the cradle 1.

The server apparatus 2 specifies based on information included in the apparatus ID response transmitted through the cradle 1 what mobile apparatus is placed on the cradle 1. Then, the server apparatus 2 refers to the execution process specification table illustrated in FIG. 36 based on the specified information to specify also a process to be executed (step S65B).

In the present example, since the mobile apparatus placed on the cradle 1 is the digital still camera-1 as described above, the server apparatus 2 specifies that a process according to the information registered in "No. 2" illustrated in FIG. 36 should be carried out. In particular, the server apparatus 2 specifies that a process of transferring all of picked up image data accumulated in the digital still camera 4(2) to the network attached storage 6(4) and then deleting the transferred picked up image data accumulated in the digital still camera 4(2) should be carried out.

Then, the control section 21 of the server apparatus 2 first forms a request for transfer of picked up image data in accordance with the substance of the specified process, and then the transmission/reception control section 27 controls the external interface 26a to transmit the request for transfer of picked up image data to the digital still camera 4(2) (step S81). This request for transfer of picked up image data is transmitted to the digital still camera 4(2) through the cradle 1.

The control section 41 of the digital still camera 4(2) receives the request for transfer of picked up image data destined for the digital still camera 4(2) through the transmission/reception antenna 45b and the radio communication section 45a. Then, the control section 41 controls the image storage section 44 to read out picked up image data, and the transmission/reception control section 47 is controlled to transmit the picked up image data to the network attached storage 6(4) through the radio communication section 45a and the transmission/reception antenna 45b (step S82). Then, the control section 41 of the digital still camera 4(2) supervises whether or not transmission of all picked up image data is completed (step S83), and the transmission of picked up image data is carried out until all of the picked up image data are transmitted.

In this manner, picked up image data transmitted from the digital still camera 4(2) are transmitted to the network attached storage 6(4) through the cradle 1 and the server apparatus 2. The network attached storage 6(4) receives the picked up image data from the digital still camera 4(2) through the input/output terminal 505b and the external interface 505a and stores the picked up image data into a predetermined storage region of the HDD 503 (step S84).

Then, in the digital still camera 4(2), if it is determined at step S83 that all of the picked up image data are transmitted, then the control section 41 forms a transmission end report and transmits the transmission end report to the network attached storage 6(4) through the radio communication section 45a and the transmission/reception antenna 45b under the control of the transmission/reception control section 47 (step S85). The transmission end report is transmitted to the network attached storage 6(4) through the cradle 1 and the server apparatus 2.

Thereafter, the process of FIG. 47 is entered. Referring to FIG. 47, the control section 21 of the server apparatus 2 having relayed the transmission end report forms a request for deletion of a picked up image and transmits the request for deletion of a picked up image to the digital still camera 4(2) through the external interface 26a and the input/output interface 26b under the control of the transmission/reception control section 27 (step S86). This request for deletion of a picked up image is transmitted to the digital still camera 4(2) through the cradle 1.

The control section 41 of the digital still camera 4(2) receives the request for deletion of a picked up image destined for the digital still camera 4(2) through the transmission/reception antenna 45b and the radio communication section 45a. Then, the control section 41 controls the image storage section 44 to execute a process of deleting the picked up image data retained in the image storage section 44 (step S87). Then, after the deletion process comes to an end, the control section 41 forms a deletion end report and transmits the deletion end report to the server apparatus 2 through the radio communication section 45a and the transmission/reception antenna 45b under the control of the transmission/reception control section 47 (step S82).

Then, the cradle 1 continues the charging process until the charging for the battery 50 of the digital still camera 4(2) is completed similarly as in the process illustrated in FIG. 38 (step S75). Then, if it is determined that the charging is completed, then the cradle 1 ends the charging process for the battery 50 of the digital still camera 4(2) (step S76).

Consequently, after all of picked up image data stored and retained in the digital still camera 4(2) are backed up into the network attached storage 6(4), the picked up image data of the digital still camera 4(2) are deleted and then image pickup is carried out newly so that an environment wherein new picked up image data can be accumulated can be produced automatically.

[Operation of the Cradle 1 in the Case of the Processes of the Type (B)]

Processes of the cradle 1 in the particular example described above with reference to FIGS. 46 and 47 wherein data is transferred from a mobile apparatus to a home apparatus are carried out substantially similarly to the processes of the cradle 1 in the particular example described above with reference to FIG. 41 wherein data is transferred from a home apparatus to a mobile apparatus.

In particular, also in the particular example of the case wherein data is transferred from a mobile apparatus to a home apparatus in the example of the processes of the type (B), the cradle 1 detects a mobile apparatus placed thereon. Then, if a mobile apparatus placed on the cradle 1 is detected, the cradle 1 starts charging and issues an inquiry about an apparatus ID to the mobile apparatus. Then, the cradle 1 repeats an apparatus ID response transmitted thereto from the mobile apparatus in response to the inquiry to the server apparatus 2 and then carries out repeating of communication between the mobile apparatus and the server apparatus 2. Then, after the series of repeating processes ends, the cradle 1 carries out an end confirmation of the charging process to end the charging process.

[Operation of the Server Apparatus 2 in the Case of the Processes of the Type (B)]

As processes of the server apparatus 2 in the particular example described above with reference to FIGS. 46 and 47 wherein data is transferred from a mobile apparatus to a home apparatus, the main process of the server apparatus in the particular example described above with reference to FIG. 42 wherein data is transferred from a home apparatus to a mobile apparatus is carried out. However, the processes in this instance are different in processes carried out at step S3205 of the main process illustrated in FIG. 42.

In particular, as described above with reference to FIG. 42, the server apparatus 2 specifies a mobile apparatus based on information included in an apparatus ID response from the mobile apparatus. Then, the server apparatus 2 refers to the execution process specification table described above with reference to FIG. 36 based on the specified mobile apparatus to specify a process to be executed, and registers the apparatus to be linked. After such processes as described above are executed, the server apparatus 2 executes the specified process.

Figure 48:
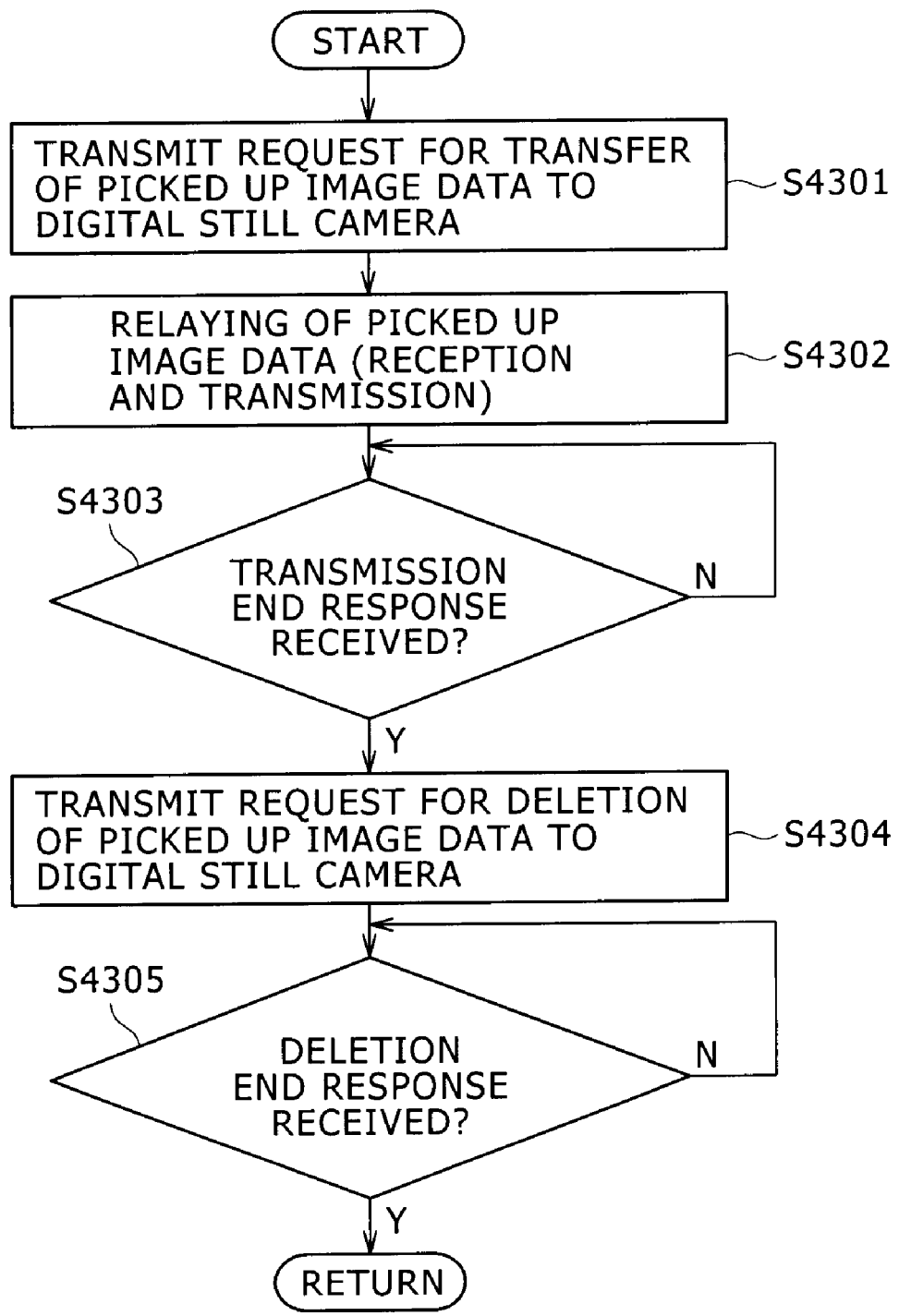
FIG. 48 is a flow chart illustrating a process executed in the main process illustrated in FIG. 43 by the server apparatus in the data communication system of the second example of the second embodiment.

Then, in the case of the processes of the type (B), for example, a process illustrated in FIG. 48 is executed at step S3205 illustrated in FIG. 42. In particular, in the example of the processes of the type (B), since the mobile apparatus is the digital still camera-1, the information registered in "No. 2" of the execution process specification table illustrated in FIG. 36 is indicative of a process to be executed. In particular, it is specified that a process of deleting, after picked up image data accumulated in the digital still camera 4(2) placed on the cradle 1 are all transferred to the network attached storage 6(4), the transferred picked up image data accumulated in the digital still camera 4(2) should be carried out.

In this instance, the control section 21 of the server apparatus 2 forms a request for transmission of picked up image data, and the transmission/reception control section 27 transmits the request for transmission of picked up image data to the digital still camera 4(2) through the external interface 26a and the input/output interface 26b (step S4301). Then, the transmission/reception control section 27 carries out a repeating process of receiving picked up image data transmitted from the digital still camera 4(2) through the input/output interface 26b and the external interface 26a and then transmitting the picked up image data to the network attached storage 6(4) through the external interface 32a and the input/output terminal 32b (step S4302).

Then, the control section 21 of the server apparatus 2 enters a waiting state wherein it waits for reception of a transmission end report from the digital still camera 4(2) (step S4303). Then, when it is determined that a transmission end report is received, the control section 21 forms a request for deletion of picked up image data, and the transmission/reception control section 27 transmits the request for deletion of picked up image data to the digital still camera 4(2) through the external interface 26a and the input/output interface 26b (step S4304).

Thereafter, the control section 21 of the server apparatus 2 enters a state wherein it waits for reception of a deletion end report from the digital still camera 4(2) (step S4305). Then, when it is determined that a transmission end request is received, the process illustrated in FIG. 48 is ended.

In this manner, also the server apparatus 2 in the example of the processes of the type (B) specifies, when a mobile apparatus is placed on the cradle 1, the thus placed mobile apparatus and specifies a process to be executed in response to the specified mobile apparatus. Then, the mobile apparatus and the home apparatus to be linked are controlled to execute the object process.

[Operation of the Digital Still Camera 4(2) in the Case of the Processes of the Type (B)]

Figure 49:
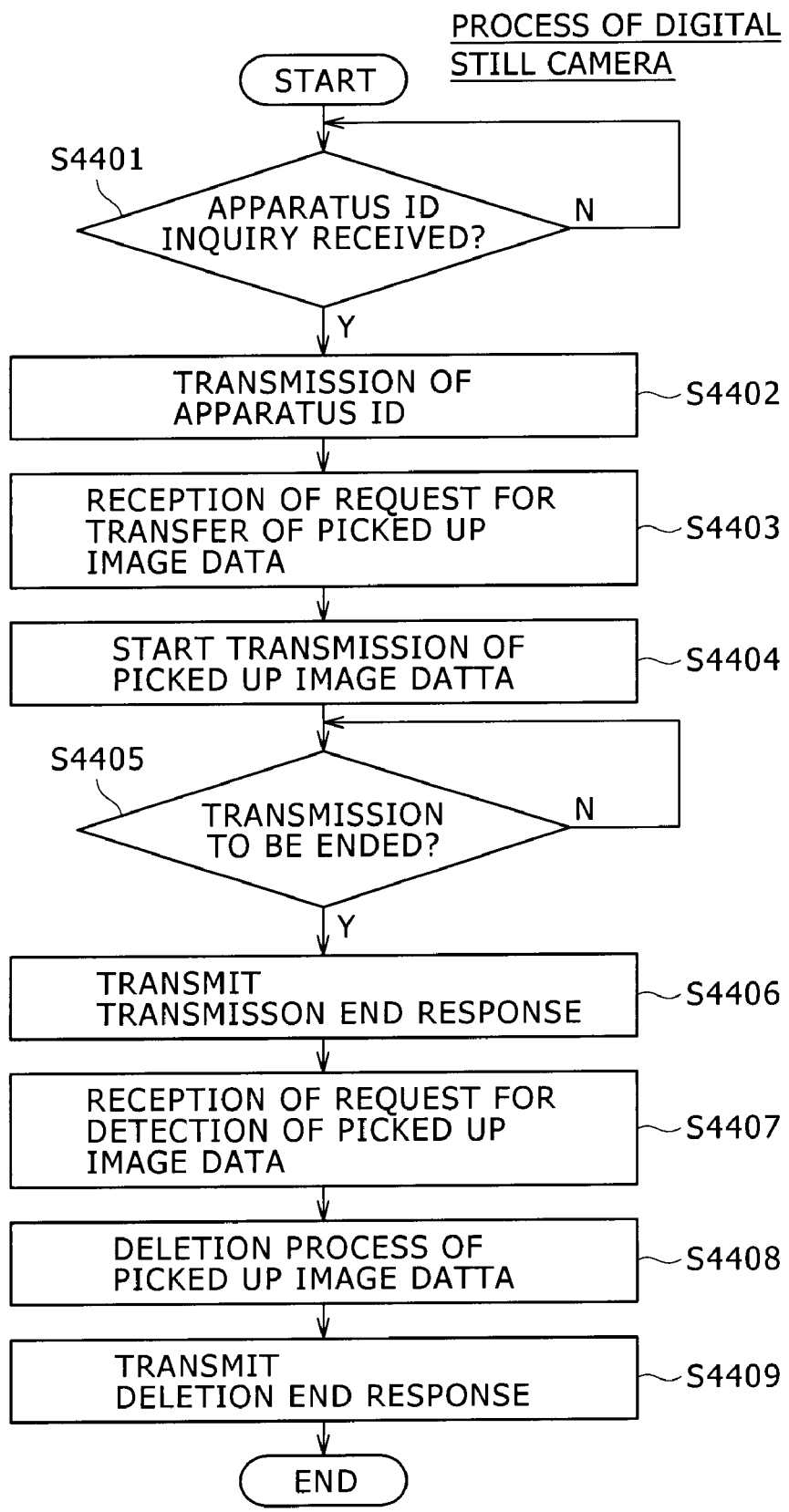
FIG. 49 is a flow chart illustrating a process carried out by the digital still camera as a mobile apparatus in the data communication system of the second example of the second embodiment.

Now, processes of the digital still camera 4(2) in the particular example described above with reference to FIGS. 46 and 47 wherein data is transferred from a mobile apparatus to a home apparatus are described. FIG. 49 illustrates a process of the digital still camera 4(2) in the particular example wherein data is transferred from a mobile apparatus to a home apparatus.

The process illustrated in FIG. 49 is carried out principally by the control section 41 and the transmission/reception control section 47 of the digital still camera 4(2) where the digital still camera 4(2) as a mobile apparatus is placed into a predetermined mode in which the digital still camera 4(2) is placed on the cradle 1 to carry out data communication and charging processes such as, for example, a charging mode.

First, after the mode of the digital still camera 4(2) is changed over to the predetermined process, the transmission/reception control section 47 determines whether or not an inquiry about an apparatus ID is received from the cradle 1 through the transmission/reception antenna 45b and the radio communication section 45a (step S4401). If it is determined by the decision process at step S4401 that an inquiry about an apparatus ID is not received, then the process at step S4401 is repeated to wait for reception of an inquiry about an apparatus ID.

If it is determined by the decision process at step S4401 that an inquiry about an apparatus ID from the cradle 1 is received, then the control section 201 acquires necessary information such as an apparatus ID and an apparatus attribute stored and retained, for example, in the ROM 2012 of the digital still camera 4(2). Further, the control section 201 forms such an apparatus ID response as described above with reference to FIG. 7C. Then, the control section 201 transmits the apparatus ID response through the radio communication section 45a and the transmission/reception antenna 45b under the control of the transmission/reception control section 47 (step S4402). This apparatus ID response is transmitted to the server apparatus 2 through the cradle 1.

Then, the transmission/reception control section 47 receives a request for transfer of picked up image data from the server apparatus 2 transmitted through the cradle 1, through the transmission/reception antenna 45b and the radio communication section 45a (step S4403). Then, when a request for transfer of picked up image data is received, the control section 201 starts a process of reading out picked up image data from the image storage section 44 and transmitting the picked up image data through the radio communication section 45a and the transmission/reception antenna 45b under the control of the transmission/reception control section 47 (step S4404).

Then, the control section 41 of the digital still camera 4(2) enters and remains in a waiting state wherein it waits that all of the picked up image data stored in the image storage section 44 are transmitted (step S4405). Then, if it is determined that all of the picked up image data are transmitted, then the control section 41 forms a transmission end report. Then, the control section 41 transmits the transmission end report through the radio communication section 45a and the transmission/reception antenna 45b under the control of the transmission/reception control section 47 (step S4406). This transmission end report is transmitted also to the network attached storage 6(4) through the cradle 1 and the server apparatus 2.

Thereafter, the transmission/reception control section 47 of the digital still camera 4(2) receives a request for deletion of picked up image data from the server apparatus 2 transmitted through the cradle 1, through the transmission/reception antenna 45b and the radio communication section 45a (step S4407). Then, when a request for deletion of picked up image data is received, the control section 41 carries out a process of deleting the picked up image data stored in the image storage section 44 (step S4408).

After the deletion process of the picked up image data at step S4408, the control section 41 forms a deletion end request and transmits the deletion end request through the radio communication section 45a and the transmission/reception antenna 45b under the control of the transmission/reception control section 47 (step S4409). The process illustrated in FIG. 49 ends therewith. It is to be noted that the deletion end report transmitted at step S4409 is transmitted to the server apparatus 2 through the cradle 1.

In this manner, only if the digital still camera 4(2) of the present example is placed on the cradle 1, it backs up picked up image data into the network attached storage 6(4) and deletes the picked up image data of the image storage section 44 to automatically establish a state wherein picked up image data by a new image pickup process can be stored.

[Operation of the Network Attached Storage 6(4) in the Case of the Processes of the Type (B)]

Processes of the network attached storage 6(4) in the particular example described above with reference to FIGS. 46 and 47 wherein data is transferred from a mobile apparatus to a home apparatus are substantially similar to those of the HDD recorder 6(3) which is one of home apparatus in the particular example described above with reference to FIG. 45 wherein data is transferred from a home apparatus to a mobile apparatus.

In the case of the example of the processes of the type (B), since picked up image data are transmitted from the digital still camera 4(2) to the network attached storage 6(4), processes are executed in the order of step S3501→step S3502→step S3506→step S3507→step S3508 in the process illustrated in FIG. 45 such that picked up image data from the digital still camera 4(2) are transmitted to and accumulated in the network attached storage 6(4).

In the example of the processes of the type (B) wherein data is transferred from a mobile apparatus to a home apparatus in this manner, only if the digital still camera 4(2) is placed on the cradle 1, then after all of the picked up image data of the digital still camera 4(2) are backed up into the network attached storage 6(4) under the control of the server apparatus 2, the picked up image data of the digital still camera 4(2) are deleted so that preparations for new image pickup can be made.

[Processes of the Type (C) where Data is Transferred from a Mobile Apparatus to a Home Apparatus Such that Processing is Carried Out by the Home Apparatus Based on the Data]

Now, a particular example wherein data is transferred from a mobile apparatus to a home apparatus and the home apparatus carries out a process based on the received data is described. Here, the description is given of an example wherein the mobile apparatus is the portable telephone terminal 4(1) with reference to FIG. 25 and the home apparatus is the PC1 described above with reference to FIG. 28, that is, the PC 6(1).

Figure 50:
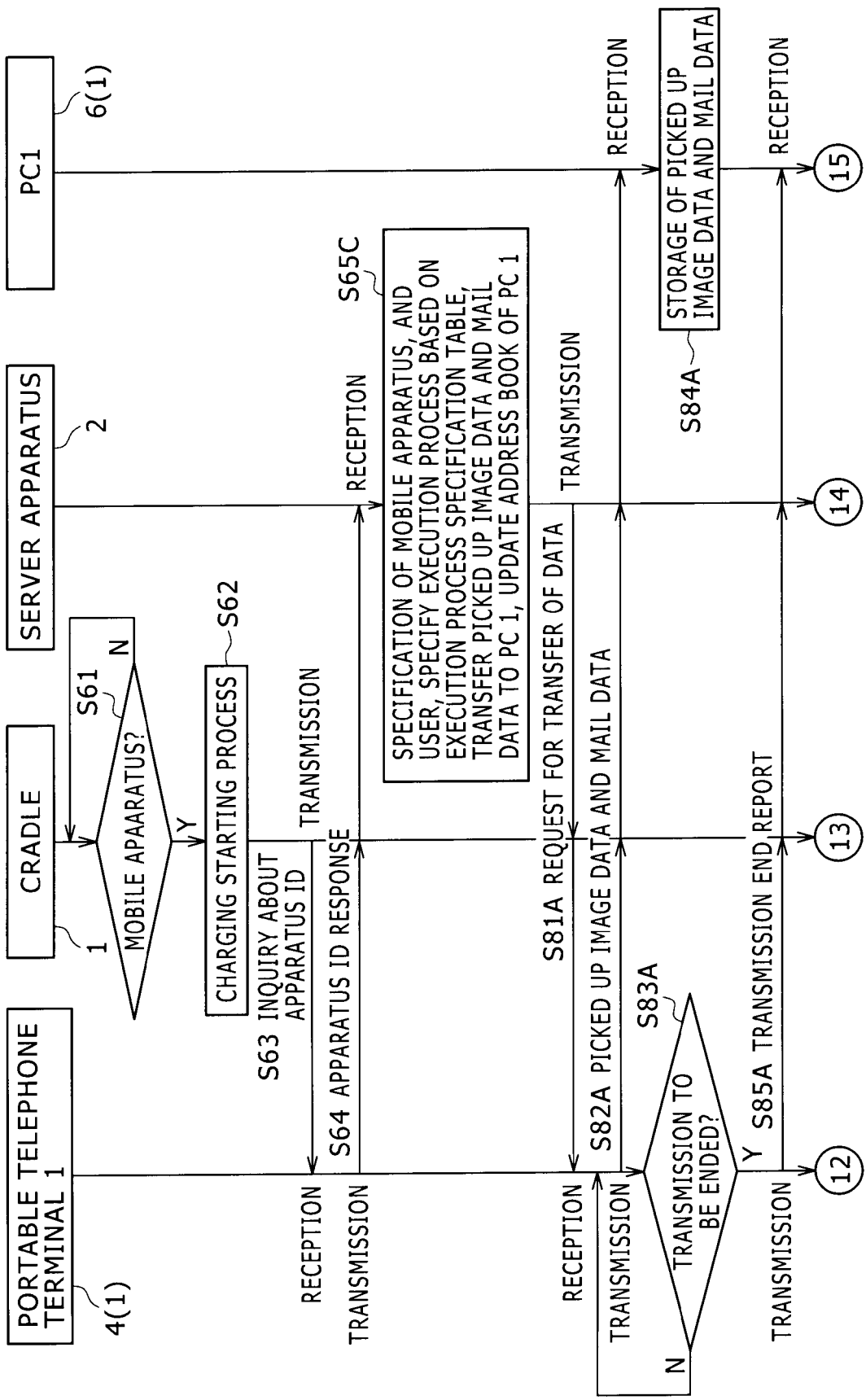
FIGS. 50 and 51 are sequence diagrams illustrating general operation of a data communication system of a third example of the second embodiment of the present invention.
Figure 51:
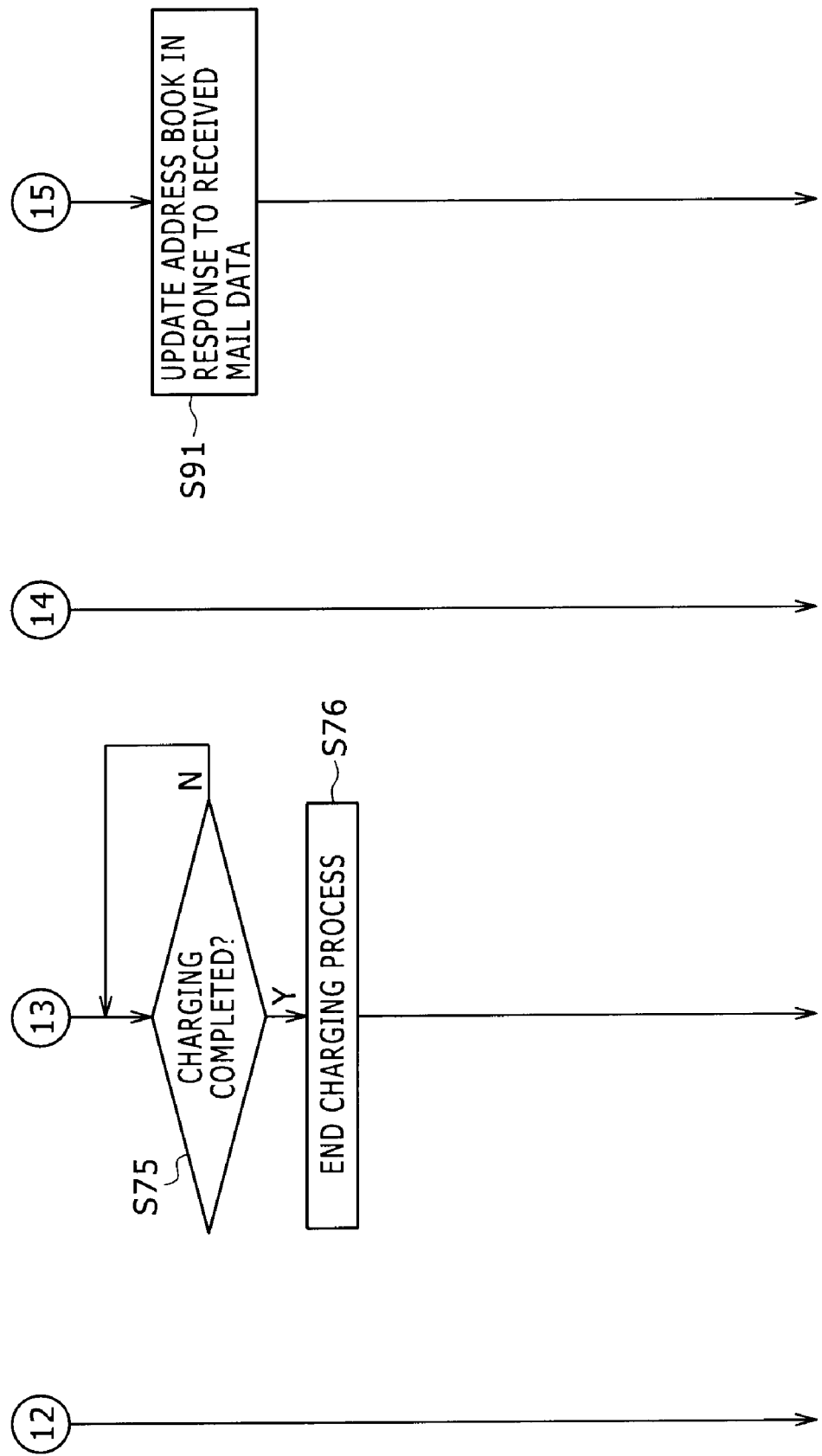

FIGS. 50 and 51 illustrate an outline of operation of the component apparatus of a data communication network. Also in the example illustrated in FIGS. 50 and 51, like items carried out among a mobile apparatus 4, the cradle 1, the server apparatus 2 and a home apparatus 6 similarly to those of the example of the processes of the type (A) described above with reference to FIGS. 37 and 38 are denoted by like reference characters, and since detailed description of the items is same as that given above with reference to FIGS. 37 and 38, description of the common items is described but simply.

Referring first to FIG. 50, the processes at steps S61 to S64 are carried out similarly to those described above with reference to FIG. 37 and include placement detection and charging starting processes of a mobile apparatus on the cradle 1 and an inquiry process about an apparatus ID.

In particular, in the example of the processes of the type (C), if the portable telephone terminal 4(1) receives a request for inquiry about an apparatus ID from the cradle 1 through the transmission/reception antenna 66b and the radio communication section 66a, then the control section 61 controls the radio communication section 66a to form and transmit an apparatus ID response including an apparatus ID and so forth stored and retained in the nonvolatile memory 614 of the portable telephone terminal 4(1) (step S64). This apparatus ID response is transmitted to the server apparatus 2 by repeating of the cradle 1.

The server apparatus 2 specifies based on information included in the apparatus ID response transmitted thereto through the cradle 1 what mobile apparatus is placed on the cradle 1. Then, the server apparatus 2 refers to the execution process specification table described above with reference to FIG. 36 based on the specified information to specify a process to be executed (step S65C).

It is to be noted that, in the present example, a plurality of portable telephone terminals may possibly be placed on the cradle 1, and in order to distinguish such portable telephone terminals from one another, for example, also a user ID may be included in the apparatus ID response such that a process to be executed may be specified from the information of each mobile apparatus and the user of the mobile apparatus. To this end, a column of the "user ID" is provided also in the execution process specification table as seen in FIG. 36.

Accordingly, it is possible to cause, even if mobile apparatus involved are of the same type, different processes to be carried out depending upon the individual users. Naturally, if an apparatus ID is information unique to each mobile apparatus, then different processes can be allocated to different mobile apparatus without using the user ID.

In this instance, since the mobile apparatus placed on the cradle 1 is the portable telephone terminal 4(1) as described above, the server apparatus 2 specifies that a process in accordance with the information registered as "No. 3" in FIG. 36 should be carried out. In other words, the server apparatus 2 specifies that a process of transferring all of picked up image data accumulated in the portable telephone terminal 4(1) placed on the cradle 1 and received electronic mail data destined for the server apparatus 2 to the PC 6(1) and updating the address book stored in the nonvolatile memory 3014 based on the mail data received by the PC 6(1) should be carried out.

Then, the control section 21 of the cradle 1 first forms a request for transfer of picked up image data and electronic mail data, that is, a request for data transfer, in accordance with the specified substance of the process. Then, the transmission/reception control section 27 controls the external interface 26a to transmit the request for data transfer to the portable telephone terminal 4(1) (step S81A). The request for transfer of the picked up image data is transmitted to the portable telephone terminal 4(1) through the cradle 1.

The control section 61 of the portable telephone terminal 4(1) receives the request for data transfer destined for the portable telephone terminal 4(1) through the transmission/reception antenna 66b and the radio communication section 66a. Then, the control section 61 reads out the picked up image data stored and retained in the content storage section 62 and the received electronic mail data stored and retained, for example, in the nonvolatile memory 614. Then, the control section 61 transmits the read out picked up image data and electronic mail data to the PC 6(1) through the radio communication section 66a and the transmission/reception antenna 66b (step S82A).

Then, the control section 61 of the portable telephone terminal 4(1) supervises whether or not the picked up image data and the received electronic mail data are all transmitted (step S83A). The control section 61 carries out transmission of the picked up image data and electronic mail data until all of them are transmitted.

The picked up image data and the electronic mail data transmitted from the portable telephone terminal 4(1) in this manner are transmitted to the PC 6(1) through the cradle 1 and the server apparatus 2. The PC 6(1) receives and stores the picked up image data and electronic mail data from the portable telephone terminal 4(1) into a predetermined region of the HDD 305 (step S84A).

Then, if the portable telephone terminal 4(1) determines at step S83A that all of the picked up image data and electronic mail data are transmitted, then the control section 61 forms and transmits a transmission end report to the PC 6(1) through the radio communication section 66a and the transmission/reception antenna 66b (step S85A). This transmission end report is transmitted to the PC 6(1) through the cradle 1 and the server apparatus 2.

Thereafter, the processing advances to the process illustrated in FIG. 51. Referring now to FIG. 51, the PC 6(1) receives the transmission end report from the portable telephone terminal 4(1) and updates the address book produced in the nonvolatile memory 3014 based on the electronic mail data from the portable telephone terminal 4(1) received already. In particular, the portable telephone terminal 4(1) carries out a process of adding the name and the electronic mail address of each of the opposite parties of the communication.

It is to be noted that, if electronic mail data having a name same as one of names registered already but having a different electronic mail address exists, then the PC 6(1) issues an inquiry about whether or not address book data existing already should be replaced such that the address book data can be rewritten or new data can be added while the old address book data is maintained as it is. Further, an analysis of characters may be carried out such that, if information of an address or a telephone number exists, then also the information is displayed such that the information is registered into the address book after confirmation by the user.

Then, the cradle 1 continues the charging process for the battery 50 of the digital still camera 4(2) until the charging is completed similarly as in the process described above with reference to FIG. 38 (step S75). Then, if it is determined that the charging is completed, then the cradle 1 ends the charging process for the battery 50 of the digital still camera 4(2) (step S76).

Consequently, after picked up image data and electronic mail data stored and retained in the portable telephone terminal 4(1) are backed up into the PC 6(1), the PC 6(1) can update the address book therein based on the received electronic mail data.

[Operation of the Cradle 1 in the Processes of the Type (C)]

Processes of the cradle 1 in the particular example described above with reference to FIGS. 50 and 51 wherein data is transferred from a mobile apparatus to a home apparatus and the home apparatus carries out processes based on the received data substantially similarly to those of the cradle 1 in the particular example described above with reference to FIG. 41 wherein data is transferred from a home apparatus to a mobile apparatus.

In particular, also in the particular example of the processes of the type (C) wherein data is transferred from a mobile apparatus to a home apparatus and the home apparatus carries out processes based on the received data, the cradle 1 detects a mobile apparatus placed thereon. Then, if a mobile apparatus placed on the cradle 1 is detected, the cradle 1 starts charging and issues an inquiry about an apparatus ID to the mobile apparatus. Then, after the cradle 1 relays an apparatus ID response received from the mobile apparatus placed thereon in response to the inquiry about an apparatus ID, it carries out relaying of communication between the mobile apparatus and the server apparatus 2. Then, after the series of processes comes to an end, the cradle 1 carries out an end confirmation of the charging process and then ends the charging process.

[Operation of the Server Apparatus 2 in the Processes of the Type (C)]

Processes of the server apparatus 2 in the particular example described above with reference to FIGS. 50 and 51 wherein data is transferred from a mobile apparatus to a home apparatus and the home apparatus carries out processes based on the received data as a main process of the server apparatus 2 in the particular example described above with reference to FIG. 42 wherein data is transferred from a home apparatus to a mobile apparatus. However, a different process is carried out at step S3205 of the main process illustrated in FIG. 42.

In particular, as described above with reference to FIG. 42, the server apparatus 2 specifies a mobile apparatus based on information included in an apparatus ID response from the mobile apparatus and then refers the execution process specification table described above with reference to FIG. 36 to specify a process to be executed and registers apparatus to be linked to each other. Then, the server apparatus 2 executes the specified process.

Figure 52:
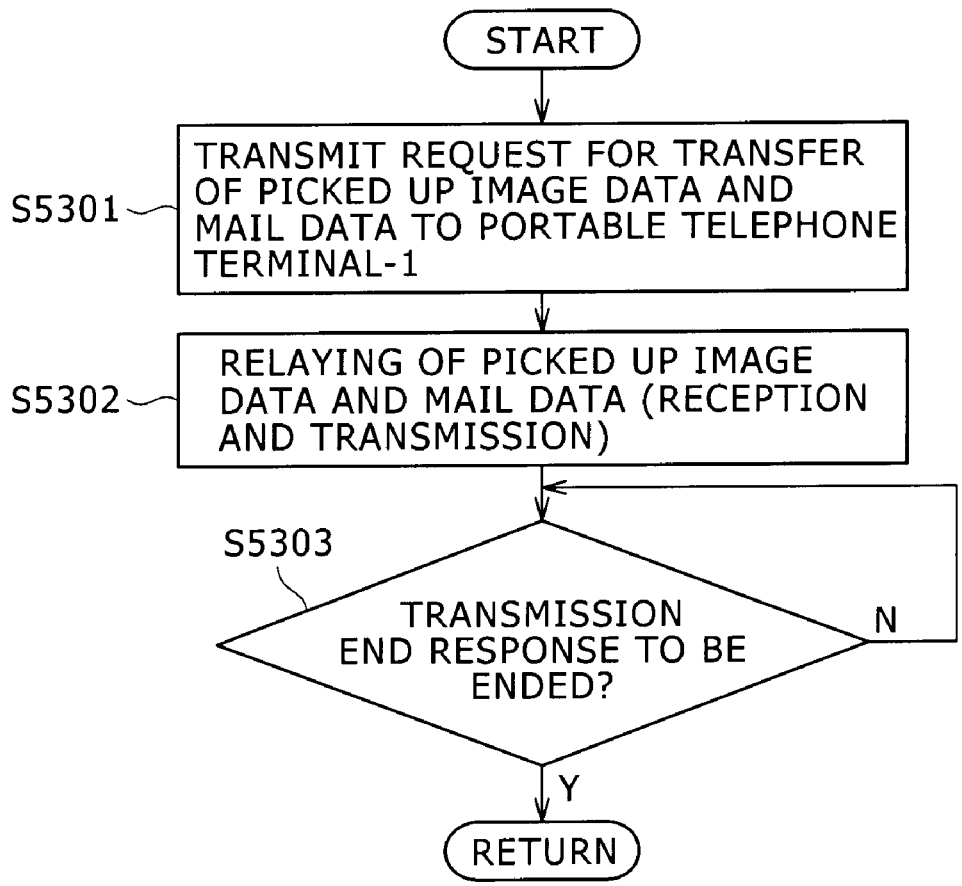
FIG. 52 is a flow chart illustrating a process carried out in the main process illustrated in FIG. 43 by the server apparatus in the data communication system of the third example of the second embodiment.

Then, in the example of the processes of the type (C), a process illustrated in FIG. 52 is executed at step S3205 illustrated in FIG. 42. In particular, in the example of the processes of the type (C), since the mobile apparatus is the portable telephone terminal 4(1), information registered in "No. 3" of the execution process specification table illustrated in FIG. 36 is specified as information indicative of a process to be executed. In particular, the server apparatus 2 specifies that a process of updating the address book stored in the nonvolatile memory 3014 should be carried out based on picked up image data accumulated in the portable telephone terminal 4(1) placed on the cradle 1 and mail data received by the PC1 when all of electronic mail data destined for the PC 6(1) are transferred to the PC 6(1).

In this instance, the control section 21 of the server apparatus 2 forms a request for transfer of picked up image data and received electronic mail data destined for the digital still camera 4(2), and the transmission/reception control section 27 transmits the request to the portable telephone terminal 4(1) through the external interface 26a and the input/output terminal 26b (step S5301). Then, the transmission/reception control section 27 carries out a relaying process of receiving picked up image data and electronic mail data transmitted from the digital still camera 4(2) through the input/output terminal 26b and the external interface 26a and transmitting the received data to the PC 6(1) through the external interface 32a and the input/output terminal 32b (step S5302).

Then, the control section 21 of the server apparatus 2 enters in waiting state for reception of the transmission end report transferred from the portable telephone terminal 4(1) (step S5303). If it is determined that the transmission end report is received, the control section 21 ends the process shown in FIG. 52.

In this manner, also in the server apparatus 2 of the example of the processes of the type (C), when a mobile apparatus is placed on the cradle 1, the mobile apparatus is specified, and a process to be executed is specified based on the specified mobile apparatus. Then, the mobile apparatus and a home apparatus to be linked to each other are controlled to execute the object process.

[Operation of the Portable Telephone Terminal 4(1) in the Processes of the Type (C)]

Figure 53:
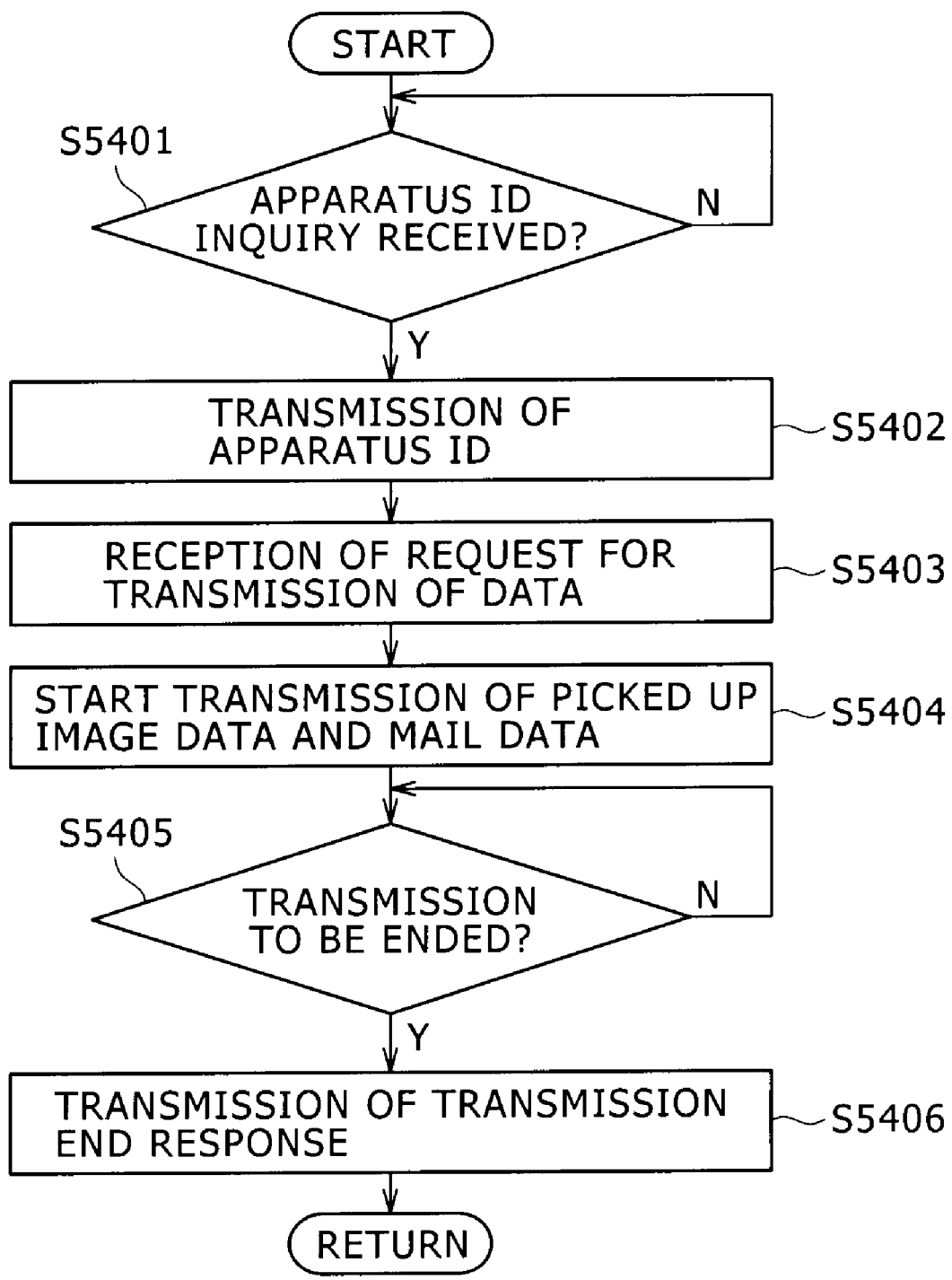
FIG. 53 is a flow chart illustrating a process carried out by the portable telephone terminal as a mobile apparatus in the data communication system of the third example of the second embodiment.

Now, processes of the portable telephone terminal 4(1) in the particular example described above with reference to FIGS. 50 and 51 wherein data is transferred from a mobile apparatus to a home apparatus and the home apparatus carries out processes based on the received data are described. FIG. 53 illustrates operation of the portable telephone terminal 4(1) in the case of the processes of the type (C).

The process illustrated in FIG. 53 is executed principally by the control section 61 of the portable telephone terminal 4(1) where the portable telephone terminal 4(1) which is one of mobile apparatus is placed into a predetermined mode in which the portable telephone terminal 4(1) is placed on the cradle 1 to carry out data communication and charging processes such as, for example, a charging mode.

First, after the mode of the portable telephone terminal 4(1) is changed over to the predetermined process, the control section 61 decides whether or not an inquiry about an apparatus ID from the cradle 1 is received through the transmission/reception antenna 66b and the radio communication section 66a (step S5401). If it is decided by the decision process at step S5401 that an inquiry about an apparatus ID is not received, then the process at step S5401 is repeated to wait for reception of an inquiry about an apparatus ID.

Then, if it is determined by the decision process at step S5401 that an inquiry about an apparatus ID is received, then the control section 61 acquires necessary information such as an apparatus ID and an apparatus attribute stored and retained, for example, in the ROM 612 of the portable telephone terminal 4(1). Then, the control section 61 forms such an apparatus ID response as described above with reference to FIG. 7c based on the acquired information. The apparatus ID response formed is transmitted through the radio communication section 66a and the transmission/reception antenna 66b under the control of the control section 61 (step S5402). This apparatus ID response is transmitted to the server apparatus 2 through the cradle 1.

Then, the control section 61 receives a request for transfer of picked up image data and electronic mail data from the server apparatus 2, that is, a request for data transfer, transmitted through the cradle 1 (step S5403). Then, if a request for data transfer is received, then the control section 61 starts a process of reading out picked up image data from the content storage section 62 and reading out received electronic mail data from the nonvolatile memory 614 and then transmitting the read out picked up image data and electronic mail data through the radio communication section 66a and the transmission/reception antenna 66b (step S4504).

Then, the control section 61 of the portable telephone terminal 4(1) enters a state wherein it waits for completion of the transmission of the picked up image data and electronic mail data (step S5405). Then, if it is decided that the transmission of the picked up image data and electronic mail data ends, then the control section 61 forms and transmits a transmission end report through the radio communication section 66a and the transmission/reception antenna 66b (step S5406), thereby ending the process illustrated in FIG. 53. It is to be noted that the transmission end report transmitted at step S5406 is transmitted also to the PC 6(1) through the cradle 1 and the server apparatus 2.

In this manner, only if the portable telephone terminal 4(1) in this example is placed on the cradle 1, then picked up image data and electronic mail data can be backed up into the PC 6(1). Further, the PC 6(1) can update the address book therein based on the electronic mail data from the portable telephone terminal 4(1).

[Operation of the PC 6(1) in the Processes of the Type (C)]

Processes of the PC 6(1) in the particular example described above with reference to FIGS. 50 and 51 wherein data is transferred from a mobile apparatus to a home apparatus and the home apparatus carries out processes based on the received data substantially similarly to those of the HDD recorder 6(3) in the particular example described above with reference to FIG. 45 wherein data is transferred from a home apparatus to a mobile apparatus.

In the case of the example of the processes of the type (C), since picked up image data are transmitted from the portable telephone terminal 4(1) to the PC 6(1), processes are executed in the order of step S3501→step S3502→step S3506→step S3507 step S3508→step S3509 in the process illustrated in FIG. 45 such that picked up image data and electronic mail data from the portable telephone terminal 4(1) are transmitted to and accumulated in the PC 6(1). Further, the PC1 carries out an updating process of the address book based on the electronic mail data from the portable telephone terminal 4(1) by the process at step S3509.

In the example of the processes of the type (C) wherein data is transferred from a mobile apparatus to a home apparatus and the home apparatus carries out processes based on the data in this manner, only if the portable telephone terminal 4(1) is placed on the cradle 1, then picked up image data and electronic mail data of the portable telephone terminal 4(1) can be backed up into the PC 6(1) under the control of the server apparatus 2. Consequently, the PC 6(1) can update the address book retained therein based on the received electronic mail data.

[Processes of the Type (D) Wherein Data is Uploaded from a Mobile Apparatus into a Predetermined Commercial Server Apparatus 9 on the Internet 8]

Now, particular processes in a case wherein data is uploaded from a mobile apparatus to a commercial server apparatus (photograph sharing service server apparatus) 9 on the Internet 8 are described. Here, processes of an example wherein the mobile apparatus is the digital still camera 4(2) described above with reference to FIG. 4 and the apparatus of the destination of uploading of data is the commercial server apparatus 9 on the Internet 8 are described.

Figure 54:
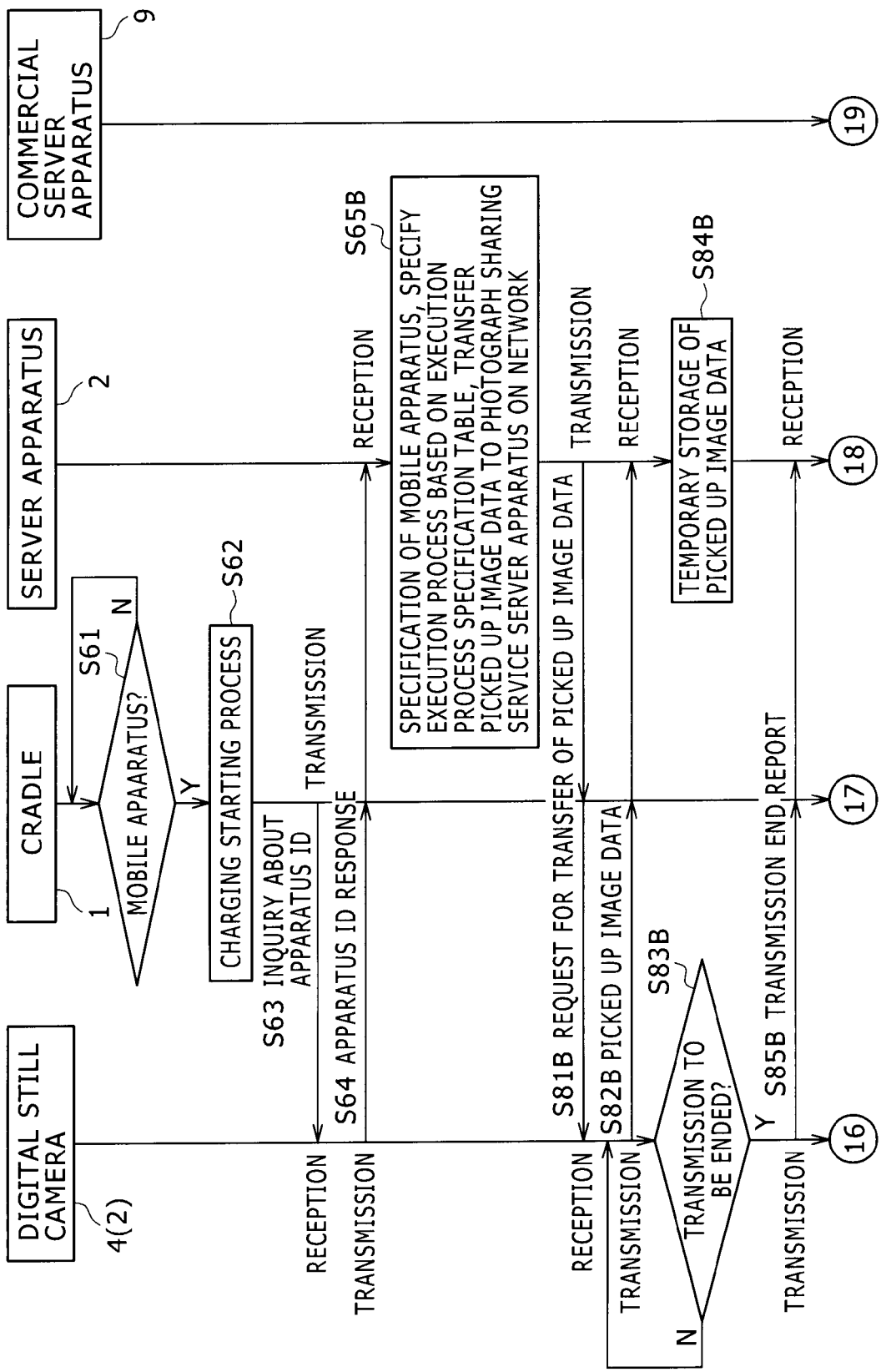
FIGS. 54 and 55 are sequence diagrams illustrating general operation of the data communication system of the third example of the second embodiment of the present invention.
Figure 55:
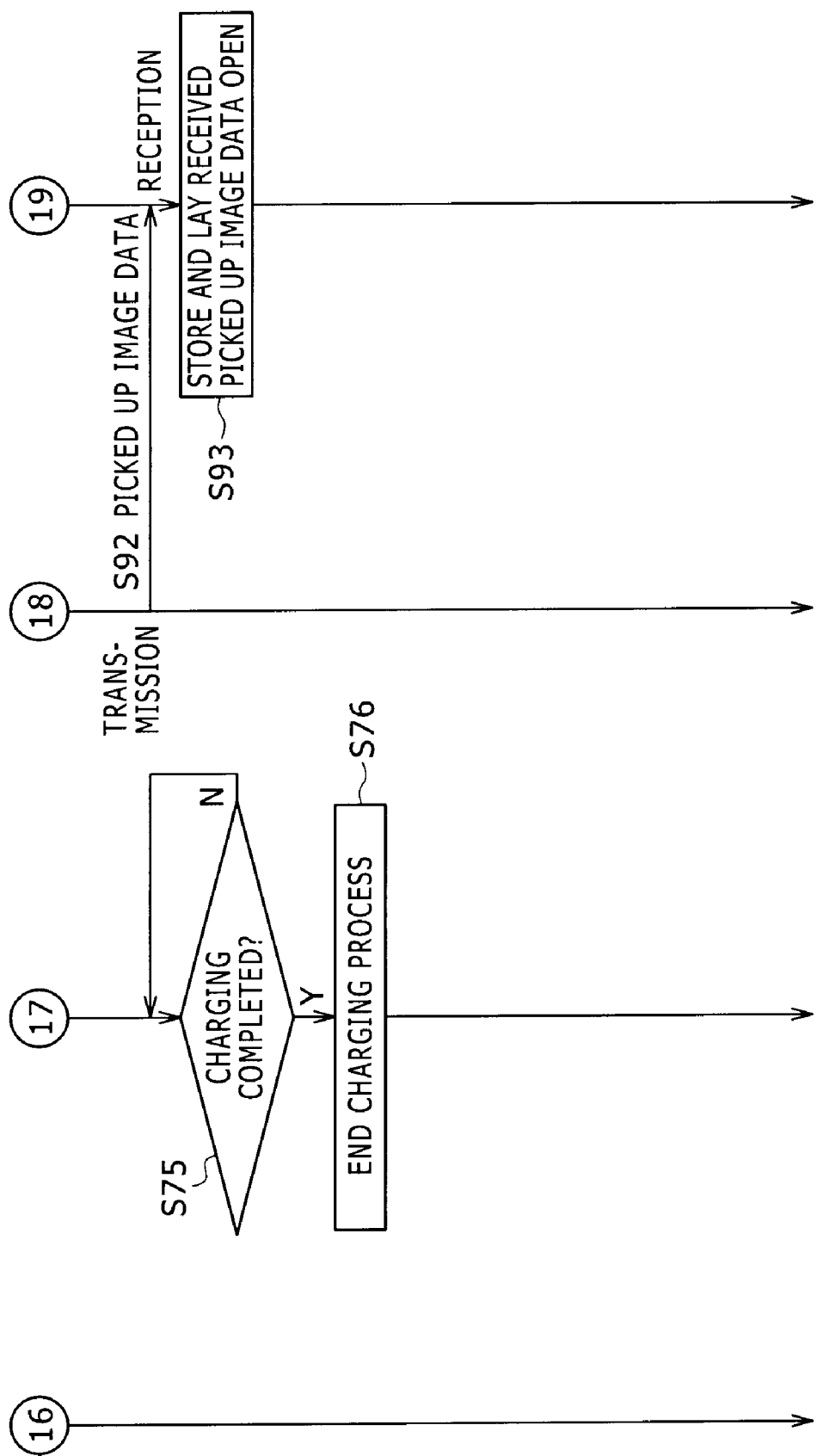

FIGS. 54 and 55 illustrate general operation of the component apparatus of the data communication system in the example of the processes of the type (D). Also the processes in the present example are carried out among a mobile apparatus 4, the cradle 1, the server apparatus 2 and the commercial server apparatus 9 which corresponds to a home apparatus 6 similarly as in the case of the example of the processes of the type (A) described above with reference to FIGS. 37 and 38. In FIGS. 54 and 55, like items carried out similarly to those described above with reference to FIGS. 37 and 38 are denoted by like reference characters, and since detailed description of the items is same as that given above with reference to FIGS. 37 and 38, it is omitted herein to avoid redundancy.

Referring first to FIG. 54, processes at steps S61 to S64 are carried out similarly to corresponding processes described above with reference to FIG. 37 and include placement detection and charging starting processes of a mobile apparatus on the cradle 1 and an inquiry process about an apparatus ID.

It is to be noted that, in the present example of the processes of the type (D), the mobile apparatus is the digital still camera-2 which is a second one of a plurality of digital still cameras. Further, in the example of the processes of the type (D), in order to distinguish the digital still camera-1 from the other mobile apparatus and in order to describe the digital still camera-2 as an apparatus having the configuration shown in FIG. 4, the digital still camera-2 is described as the digital still camera 4(2).

Further, in the present example, if the digital still camera 4(2) receives a request for inquiry about an apparatus ID from the cradle 1 through the transmission/reception antenna 45*b* and the radio communication section 45*a*, then the digital still camera 4(2) forms an apparatus ID response including an apparatus ID and so forth stored and retained in the nonvolatile memory 414 of the digital still camera 4(2). Then, the transmission/reception control section 47 controls the radio communication section 45*a* to transmit the apparatus ID response (step S64). This apparatus ID response is transmitted to the server apparatus 2 by relaying of the cradle 1.

The server apparatus 2 specifies based on information included in the apparatus ID response transmitted thereto through the cradle 1 what mobile apparatus is placed on the cradle 1. Further, the server apparatus 2 refers to the execution process specification table described above with reference to FIG. 36 based on the specified information to specify a process to be executed (step S65D).

In this instance, since the mobile apparatus placed on the cradle 1 is the digital still camera-2, the server apparatus 2 specifies that a process in accordance with information recorded as "No. 5" illustrated in FIG. 36 should be executed. In particular, the server apparatus 2 specifies that a process of transferring or uploading picked up image data accumulated in the digital still camera 4(2) placed on the cradle 1 to the predetermined commercial server apparatus 9 on the Internet 8 should be carried out.

Then, the control section 21 of the server apparatus 2 forms a request for transfer of picked up image data first in accordance with the specified substance of the process. Then, the transmission/reception control section 27 controls the external interface 26*a* to transmit the formed request for transfer of picked up image data to the digital still camera 4(2) (step S81B). The request for transfer of picked up imaged data is transmitted to the digital still camera 4(2) through the cradle 1.

The control section 41 of the digital still camera 4(2) receives the request for transfer of picked up image data destined for the digital still camera 4(2) through the transmission/reception antenna 45*b* and the radio communication section 45*a*. Then, the control section 41 controls the image storage section 44 to read out picked up image data. Then, the picked up image data is transmitted to the commercial server apparatus 9 through the radio communication section 45*a* and the transmission/reception antenna 45*b* under the control of the transmission/reception control section 47 (step S82B). Then, the control section 41 supervises whether or not all of the picked up image data which can be transmitted are transmitted (step S83B). Then, the control section 41 carries out the transmission of the picked up image data until all of the picked up image data which can be transmitted are transmitted.

Picked up image data transmitted from the digital still camera 4(2) in this manner are transmitted to the server apparatus 2 through the cradle 1. The server apparatus 2 receives the picked up image data from the digital still camera 4(2) through the input/output terminal 26*b* and the external interface 26*a* and temporarily stores the picked up image data, for example, into a predetermined region of the HDD 30 (step S84B).

Then, in the digital still camera 4(2), if it is decided at step S83B that all of the picked up image data which can be transmitted are transmitted, then the control section 41 forms a transmission end report. Then, the control section 41 transmits the transmission end report to the server apparatus 2 through the radio communication section 45*a* and the transmission/reception antenna 45*b* under the control of the transmission/reception control section 47 (step S85B). This transmission end report is transmitted to the server apparatus 2 through the cradle 1.

Thereafter, the processing advances to the process illustrated in FIG. 55. Referring now to FIG. 55, the server apparatus 2 receives the transmission end report and accesses the object commercial server apparatus 9 using a URL recorded in the column of the "home apparatus of object of data exchange" of "No. 5" of the execution process specification table" illustrated in FIG. 36 to access the object commercial server apparatus 9 to upload all of the picked up image data from the digital still camera 4(2) temporarily stored at step S84B into the commercial server apparatus 9 (step S92).

The commercial server apparatus 9 receives and stores the uploaded picked up image data into a predetermined storage region in such a state that various users can read the same thereby to lay the image data open to the public (step S93).

Then, the cradle 1 continues the charging process until the charging for the battery 50 of the digital still camera 4(2) is completed similarly as in the process described above with reference to FIG. 38 (step S75). If it is determined that the charging is completed, then the charging process for the battery 50 of the digital still camera 4(2) is ended (step S76).

Consequently, it is possible to upload all picked up image data, which can be transmitted, stored and retained in the digital still camera 4(2) into the commercial server apparatus 9 on the Internet 8 to be laid open to the public.

[Operation of the Cradle 1 in the Case of the Processes of the Type (D)]

Processes of the cradle 1 in the particular example described above with reference to FIGS. 54 and 55 wherein data is transferred from a mobile apparatus to a predetermined server apparatus on the Internet 8 are carried out substantially similarly to the processes of the cradle 1 in the particular example described above with reference to FIG. 1 wherein data is transferred from a home apparatus to a mobile apparatus.

In particular, also in the particular example in the case of the processes of the type (D) wherein data is uploaded from a mobile apparatus to a predetermined server apparatus on the Internet 8, the cradle 1 detects a mobile apparatus placed thereon. Then, if a mobile apparatus placed on the cradle 1 is detected, then the cradle 1 starts charging of the mobile apparatus and issues an inquiry about an apparatus ID to the mobile apparatus. Then, the cradle 1 relays an apparatus ID response transmitted in response to the inquiry to the server apparatus 2 and then relays communication between the mobile apparatus and the server apparatus 2. Then, after the series of relaying processes ends, the cradle 1 carries out end confirmation of the charging process to end the charging process.

[Operation of the Server Apparatus 2 in the Case of the Process of the Type (D)]

Processes of the server apparatus 2 in the particular example described above with reference to FIGS. 54 and 55 where data is uploaded from a mobile apparatus into a predetermined server apparatus on the Internet 8 are carried out as a main process of the server apparatus 2 in the particular example described above with reference to FIG. 42 wherein data is transferred from a home apparatus to a mobile apparatus. However, a different process is carried out at step S3205 of the main process illustrated in FIG. 42.

In particular, as described above with reference to FIG. 42, the server apparatus 2 specifies a mobile apparatus based on information included in an apparatus ID response from the mobile apparatus and then refers to the execution process specification table described above with reference to FIG. 36 to specify a process to be executed and registers apparatus to be linked to each other. Then, the server apparatus 2 executes the specified process.

Figure 56:
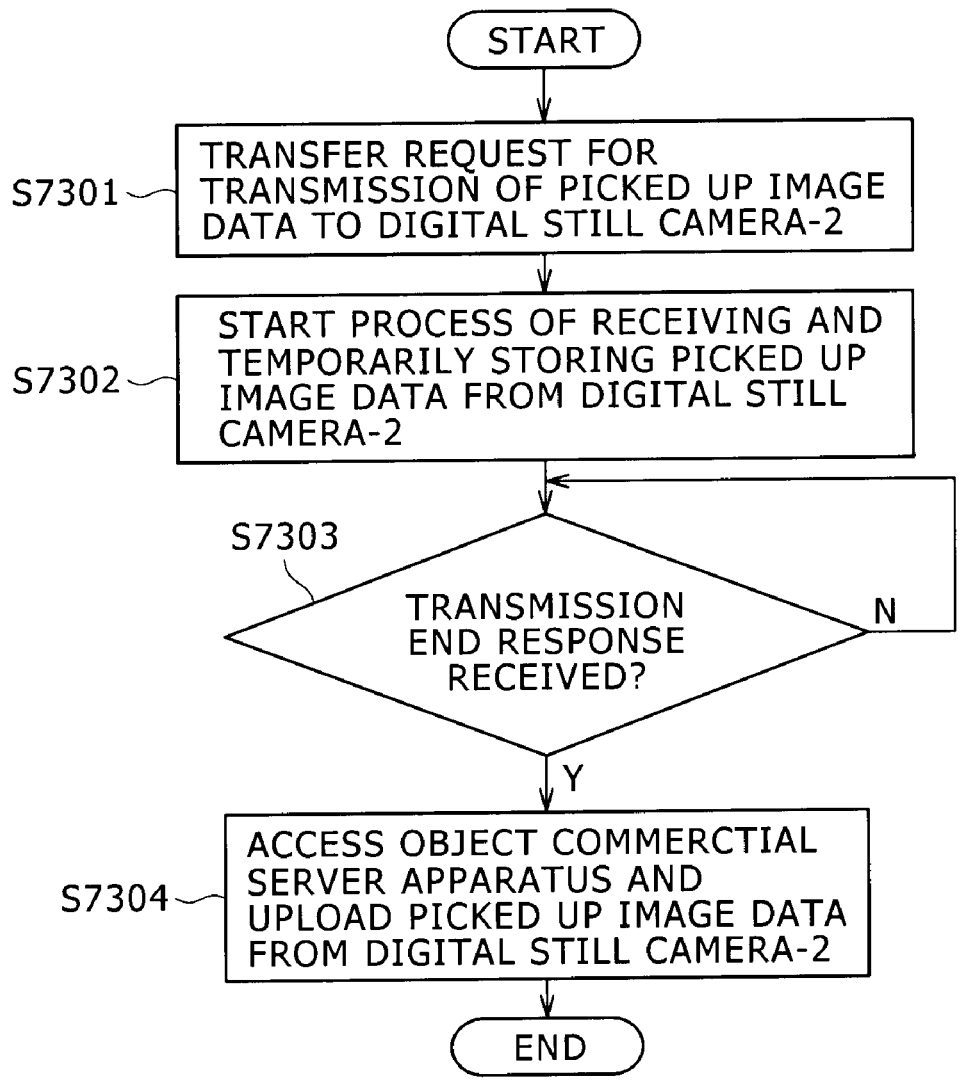
FIG. 56 is a flow chart illustrating a process carried out in the main process illustrated in FIG. 43 by the server apparatus in a data communication system of a fourth example of the second embodiment.

Then, in the example of the processes of the type (D), a process illustrated in FIG. 56 is executed at step S3205 illustrated in FIG. 42. In particular, in the case of the processes of the type (D), since the mobile apparatus is the digital still camera-2, the information registered in "No. 5" of the execution process specification table illustrated in FIG. 36 is information representing of a process to be executed. In particular, the digital still camera-2 specifies that a process of carrying out a process of transferring or uploading picked up image data accumulated in the digital still camera 4(2) placed on the cradle 1 to the commercial server apparatus 9 on the Internet 8 should be carrier out.

Then, in this instance, the control section 21 of the server apparatus 2 forms a request for transmission of picked up image data, and the transmission/reception control section 27 transmits the request for transmission of picked up image data to the digital still camera 4(2) through the external interface 26a and the input/output terminal 26b (step S7301). Then, the transmission/reception control section 27 starts a process of receiving picked up image data transmitted from the digital still camera 4(2) through the input/output terminal 26b and the external interface 26a and temporarily storing the picked up image data into a predetermined storage region of the HDD 30 (step S7302).

Then, the server apparatus 2 waits for reception of a transmission end report from the digital still camera 4(2) (step S7303). If a transmission end report is received through the input/output terminal 26b and the external interface 26a, then the transmission/reception control section 27 notifies the control section 21 of the reception.

The server apparatus 2 accesses the object commercial server apparatus 9 using a URL recorded in the column of "home apparatus of object of data exchange" of "No. 5" of the execution process specification table illustrated in FIG. 36. Then, the server apparatus 2 uploads all of the picked up image data from the digital still camera 4(2) temporarily stored at step S7302 into the commercial server apparatus 9 (step S7304), thereby ending the process illustrated in FIG. 56.

In this manner, also the server apparatus 2 in the example of the processes of the type (D) specifies, when a mobile apparatus is placed on the cradle 1, the mobile apparatus placed on the cradle 1 and then specifies a process to be executed in response to the specified mobile apparatus. Then, the server apparatus 2 controls a mobile apparatus and a home apparatus, which in this instance is the commercial server apparatus 9, to be linked to each other and executes an object process.

[Operation of the Digital Still Camera 4(2) in the Case of the Processes of the Type (D)]

Figure 57:
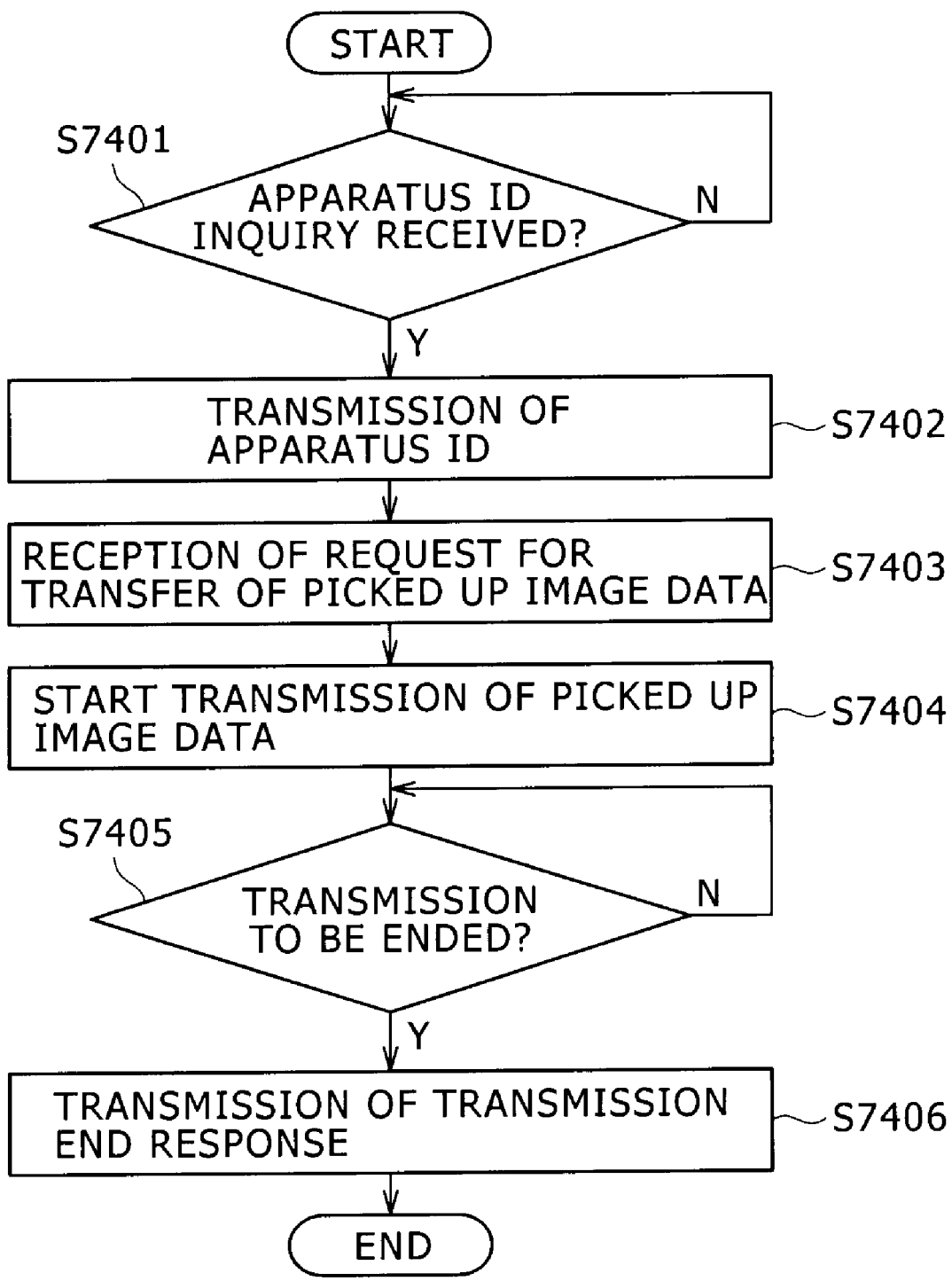
FIG. 57 is a flow chart illustrating a process carried out by the portable telephone terminal as a mobile apparatus in the data communication system of the fourth example of the second embodiment.

Now, processes of the digital still camera 4(2) in the particular example described above with reference to FIGS. 54 and 55 wherein data is uploaded from a mobile apparatus to a home apparatus are described. FIG. 57 illustrates processes of the digital still camera 4(2) in the particular example wherein data is uploaded from a mobile apparatus into a commercial server apparatus on the Internet 8.

FIG. 57 illustrates a process executed principally by the control section 41 and the transmission/reception control section 47 of the digital still camera 4(2) where the digital still camera 4(2) which is one of mobile apparatus is placed into a predetermined mode in which the digital still camera 4(2) is placed on the cradle 1 to carry out data communication and charging processes such as, for example, a charging mode.

First, if the mode of the digital still camera 4(2) is changed over to the predetermined mode, then the transmission/reception control section 47 determines whether or not an inquiry about an apparatus ID from the cradle 1 is received through the transmission/reception antenna 45b and the radio communication section 45a (step S7401). If it is determined by the decision process at step S7401 that an inquiry about an apparatus ID is not received, then the transmission/reception control section 47 repeats the process at step S7401 to wait for reception of an inquiry about an apparatus ID.

On the other hand, if it is determined by the decision process at step S7401 that an inquiry about an apparatus ID from the cradle 1 is received, then the control section 41 acquires necessary information such as an apparatus ID and an apparatus attribute stored and retained, for example, in the ROM 412 of the digital still camera 4(2). Then, the control section 41 forms such an apparatus ID response as described above with reference to FIG. 7C based on the acquired information and transmits the apparatus ID response through the radio communication section 45a and the transmission/reception antenna 45b under the control of the transmission/ reception control section 47 (step S7402). This apparatus ID response is transmitted to the server apparatus 2 through the cradle 1.

Then, the transmission/reception control section 47 receives a request for transfer of picked up image data from the server apparatus 2 transmitted through the cradle 1, through the transmission/reception antenna 45b and the radio communication section 45a (step S7403). Then, when a request for transfer of picked up image data is received, the control section 41 reads out picked up image data from the image storage section 44 and starts a process of transmitting the picked up image data through the radio communication section 45a and the transmission/reception antenna 45b under the control of the transmission/reception control section 47 (step S7404).

Then, the control section 41 of the digital still camera 4(2) enters and remains in a waiting state until those picked up image data stored in the image storage section 44 which can be transmitted are all transmitted (step S7405). If it is determined that all of those picked up image data which can be transmitted are transmitted, then the control section 41 forms and transmits a transmission end report through the radio communication section 45a and the transmission/reception antenna 45b under the control of the transmission/reception control section 47 (step S7406), thereby ending the process illustrated in FIG. 57. It is to be noted that the transmission end report transmitted at step S7406 is transmitted to the server apparatus 2 through the cradle 1.

In this manner, only if the digital still camera 4(2) of the present example is placed on the cradle 1, it uploads picked up image data into the commercial server apparatus 9 such that they can be laid open to the public.

[Operation of the Commercial Server Apparatus 9 in the Case of the Examples of the Type (D)]

Processes of the commercial server apparatus 9 in the particular example described above with reference to FIGS. 54 and 55 where data is uploaded from a mobile apparatus into a predetermined server apparatus on the Internet 8 are carried out substantially similarly to the processes of the HDD recorder 6(3) which is one of home apparatus in the particular example described above with reference to FIG. 45 wherein data is transferred from a home apparatus to a mobile apparatus.

In the example of the processes of the type (D), since picked up image data are transmitted from the digital still camera 4(2) to the commercial server apparatus 9, processes are executed in the order of step S3501→step S3502→step S3506→step S3507→step S3508→step S3509 in the process illustrated in FIG. 45 such that picked up image data from the digital still camera 4(2) are uploaded into the commercial server apparatus 9 so that they can be laid open to the public.

In this manner, in the example of the processes of the type (D) wherein data is uploaded from a mobile apparatus to a predetermined commercial server apparatus 9 on the Internet 8, only if the digital still camera 4(2) is placed on the cradle 1, then picked up image data of the digital still camera 4(2) can be uploaded into the commercial server apparatus 9 under the control of the server apparatus 2 so that they can be laid open to the public.

[Others]

It is to be noted that, in the second embodiment described above, each mobile apparatus can be specified depending upon the apparatus ID or the like as described above with reference to FIG. 36. However, as described above, it is possible to recognize a mobile apparatus and a user of the mobile apparatus to specify a process to be executed by incorporating also a user ID into an apparatus ID response to be transmitted from each mobile apparatus in response to a request from the cradle 1.

In this instance, the execution process specification table provided in the server apparatus 2 may be configured such that the user ID is registered in an associated relationship with a mobile apparatus specified, for example, from the apparatus ID as described above with reference to FIG. 36.

Consequently, the home apparatus to be associated can be changed in response to the user. For example, even where individual members of a family use a portable telephone terminal or a portable audio player, the home apparatus of the storage destination of data or the home apparatus of the providing source of data can be changed among the individual users. Naturally, it is possible for individual users to download data from different commercial server apparatus 9 on the Internet or upload data into different commercial server apparatus 9 on the Internet.

It is to be noted that, in the second embodiment described above, a portable video player handles moving image data including AV data while a digital still camera or a portable telephone terminal with a camera handles still image data.

However, some portable telephone terminals with a camera are capable of picking up moving images, and some digital still cameras are capable of picking up moving images but for a comparatively short period of time. Meanwhile, some digital video cameras are capable of picking up a still image. Naturally, one mobile apparatus may involve still image data and moving image data and may additionally include some other data such as, for example, text data such as mail data or the like.

Therefore, if also a data type is provided in the execution process specification table as described above with reference to FIG. 36, then it is possible to communicate data between different home apparatus or between a home apparatus and a commercial server apparatus on the Internet in response to the type of data to be handled. In other words, it is possible to carry out different processes for different types of data.

For example, if a camera-equipped portable telephone terminal is placed on the cradle 1, then it is possible to upload still image data into a photograph sharing service server apparatus on the Internet and upload moving image data into a moving image sharing service server apparatus on the Internet while mail data is transferred to the PC1 which is one of home apparatus. This can be coped with by varying the substance of the execution process specification table.

Further, while, in the present second embodiment, a case wherein a mobile apparatus and a home apparatus are specified to carry out various operations, various combinations are possible between a mobile apparatus and a home apparatus including a commercial server apparatus on the Internet 8 as described above. Also for data to be transmitted and received, various data can be used depending upon the combination of a mobile apparatus and a home apparatus.

It is to be noted that, as can be recognized apparently from the description of the second embodiment, communication means of a portable electronic apparatus is implemented by the radio communication sections 45a, 66a, 107a and 210a and the transmission/reception antennae 45b, 66b, 107b and 210b, and storage means is implemented by the image storage section 44 and the content storage sections 62, 105 and 205. Further, reception control means is implemented by the control sections 41, 61, 101 and 201 and the transmission/reception control section 47, and utilization control means is implemented by the control sections 41, 61, 101 and 201. Furthermore, deletion means is implemented by the control sections 41, 61, 101 and 201, and preparation means is implement by the control sections 41, 61, 101 and 201 while transmission control means is implemented by the control sections 41, 61, 101 and 201 and the transmission/reception control section 47.

Meanwhile, first communication means of a cradle apparatus is implemented by the radio communication section 15a and the transmission/reception antenna 15b, and second communication means is implemented by the external interface 14a and the input/output terminal 14b. Further, connection detection means is implemented by the placement detection section 16 and notification control means is implemented by the transmission/reception control section 17 while repeating control means is implemented principally by the transmission/reception control section 17.

Further, first communication means of a server apparatus is implemented by the external interface 26a and the input/output terminal 26b, and second communication means is implemented by the external interface 32a and the input/output terminal 32b. Meanwhile, first transmission control means is implemented by the control section 21 and the transmission/reception control section 27, and repeating control means is implemented by the control section 21 and the transmission/reception control section 27. Further, deletion request formation means is implemented by the control section 21, and deletion quest transmission control means is implemented by the control section 21 and the transmission/reception control section 27 while selection means is implemented principally by the control section 21.

Further, communication means of a home apparatus is implemented by the external interfaces 303a, 463a and 505a and the input/output terminals 303b, 463b and 505b of the various home apparatus, and preparation means is implemented by the control sections 301, 450 and 501 and also transmission control means is implemented by the control sections 301, 450 and 501.

Further, a data communication method includes a series of processes described above with reference to FIGS. 31, 37 to 38, 46 to 47, 50 to 51 and 54 to 55, and details thereof correspond to the substance described above with reference to the flow charts which illustrate the second embodiment of the present invention.

Meanwhile, a program executed on the cradle apparatus corresponds to the process described above with reference to the flow chart of FIG. 41, and a program executed on the server apparatus corresponds to the processes described with reference to FIGS. 42, 43, 48 and 53.

It is to be noted that, while the cradle 1 and the server apparatus 2 in the first and second embodiments described above are formed as separate members from each other, the arrangement of them is not limited to this. Not only in the first embodiment but also in the second embodiment, the cradle 1 and the server apparatus 2 may naturally be formed as a unitary member.

Further, while, in the first and second embodiments described above, various mobile apparatus 4 and the cradle 1 can carry out charging and data communication without through mechanical contact between contacts, such contactless configuration is not an essential requirement. For example, contacts for charging and/or contacts for data communication may be provided on both of various mobile apparatus 4 and the cradle 1 such that charging and/or data communication may be carried out when the two apparatus are connected to each other through the contacts. Also it is possible to use a cable to connect the cradle 1 and the various mobile apparatus 4 to each other.

Also it is naturally possible to use optical communication for data communication and use such a contactless configuration as described above for charging.

While preferred embodiments of the present invention have been described using specific terms, such description is for illustrative purpose only, and it is to be understood that changes and variations may be made without departing from the spirit or scope of the following claims.

What is claimed is:

1. A server apparatus for use with a data communication system including a portable electronic apparatus, the server apparatus, a cradle apparatus configured to mediate transmission and reception of data between the portable electronic apparatus and the server apparatus, and a plurality of home apparatuses configured to be connected to the server apparatus, comprising:

a first interface configured to communicate with the cradle apparatus;

a second interface configured to communicate with the plurality of home apparatuses;

a selection unit configured to select one of the plurality of home apparatuses as an opposite party of communication by comparing identification information received from the portable electronic apparatus to stored identification information associating the identification information with the one of the plurality of home apparatuses;

a controller configured to form a request for provision of object information to the one of the plurality of home apparatuses based on the selection and control the second interface to transmit the request for provision to the one of the plurality of home apparatuses; and an interface controller configured to control the second interface to receive information transmitted from the one of the plurality of home apparatuses in response to the request for provision of object information and control the first interface to transmit the received information to be transmitted to the portable electronic apparatus through the cradle apparatus, wherein the controller is configured to form a deletion request for requesting deletion of accumulated data to the portable electronic apparatus, and the interface controller is configured to control the first interface to transmit the deletion request to the portable electronic apparatus.

2. The server apparatus of claim 1, wherein the plurality of home apparatuses which are capable of being connected through the second interface of the server apparatus include a server apparatus provided on a wide area network.

3. A server apparatus for use with a data communication system which includes a portable electronic apparatus, the server apparatus, a cradle apparatus configured to mediate transmission and reception of data between the portable electronic apparatus and the server apparatus, and a plurality of home apparatuses configured to be connected to the server apparatus, comprising:

a first interface configured to communicate with the cradle apparatus;

a second interface configured to communicate with the plurality of home apparatuses;

a selection unit configured to select one of the plurality of home apparatuses as an opposite party of communication by comparing identification information received from the portable electronic apparatus to stored identification information associating the identification information with the one of the plurality of home apparatuses;

a controller configured to form a request for provision of object information to the portable electronic apparatus and control the first interface to transmit the request for provision to the portable electronic apparatus; and an interface controller configured to control the first interface to receive information transmitted from the portable electronic apparatus in response to the request for provision of object information and control the second interface to transmit the received information to be transmitted to the one of the plurality of home apparatuses, wherein the controller is configured to carry out a relaying process of transmitting the provision information from the portable electronic apparatus and form a deletion request for requesting deletion of accumulated data to the portable electronic apparatus, and the interface controller is configured to control the first interface to transmit the deletion request to the portable electronic apparatus.

4. The server apparatus according to claim 3, wherein the plurality of home apparatuses which are capable of being connected through the second interface include a server apparatus provided on a wide area network.

5. A non-transitory computer-readable medium including computer readable instructions, which when executed by a computer incorporated in a server apparatus, cause the server apparatus to perform a method, comprising:

selecting one of a plurality of home apparatuses connected to the server apparatus as an opposite party of communication by comparing identification information received from a portable electronic apparatus to stored identification information associating the identification information with the one of the plurality of home apparatuses;

forming a request for provision of object information to the one of the plurality of home apparatuses;

transmitting the request for provision to the one of the plurality of home apparatuses;

receiving information transmitted from the home apparatus in response to the request for provision of object information;

transmitting the information received from the home apparatus to the portable electronic apparatus;

forming a deletion request for requesting deletion of accumulated data to the portable electronic apparatus; and transmit the deletion request to the portable electronic apparatus.

6. A non-transitory computer-readable medium including computer readable instructions, which when executed by a computer incorporated in a server apparatus, cause the server apparatus to perform a method, comprising:

selecting one of a plurality of home apparatuses connected to the server apparatus as an opposite party of communication by comparing identification information received from a portable electronic apparatus to stored identification information associating the identification information with the one of the plurality of home apparatuses;

forming a request for provision of object information to the portable electronic apparatus connected to the server apparatus;

transmitting the request for provision to the portable electronic apparatus;

receiving information transmitted from the portable electronic apparatus in response to the request for provision of object information;

transmitting the received provision information to the one of the plurality of home apparatuses;

carrying out a relay process of transmitting the provision information from the portable electronic apparatus;

forming a deletion request for requesting deletion of accumulated data to the portable electronic apparatus; and transmitting the deletion request to the portable electronic apparatus.

7. A server apparatus for use with a data communication system including a portable electronic apparatus, the server apparatus, a cradle apparatus configured to mediate transmission and reception of data between the portable electronic apparatus and the server apparatus, and a plurality of home apparatuses configured to be connected to the server apparatus, comprising:

means for communicating with the cradle apparatus;

means for communicating with the plurality of home apparatuses;

means for selecting one of the plurality of home apparatuses as an opposite party of communication by comparing identification information received from the portable electronic apparatus to stored identification information associating the identification information with the one of the plurality of home apparatuses;

means for forming a request for provision of object information to the one of the plurality of home apparatuses;

means for controlling the means for communicating with the one of the plurality of home apparatuses to transmit the request for provision to the one of the plurality of home apparatuses; and means for controlling the means for communicating with the one of the plurality of home apparatuses to receive information transmitted from the one of the plurality of home apparatuses in response to the request for provision of object information;

means for controlling the means for communicating with the cradle apparatus to transmit the received information to be transmitted to the portable electronic apparatus through the cradle apparatus;

means for forming a deletion request for requesting deletion of accumulated data to the portable electronic apparatus; and means for controlling the first interface to transmit the deletion request to the portable electronic apparatus.

8. A server apparatus for use with a data communication system which includes a portable electronic apparatus, the server apparatus, a cradle apparatus configured to mediate transmission and reception of data between the portable electronic apparatus and the server apparatus, and a plurality of home apparatuses configured to be connected to the server apparatus, comprising:

means for communicating with the cradle apparatus;

means for communicating with the plurality of home apparatuses;

means for selecting one of the plurality of home apparatuses as an opposite party of communication by comparing identification information received from the portable electronic apparatus to stored identification information associating the identification information with the one of the plurality of home apparatuses;

means for forming a request for provision of object information to the portable electronic apparatus;

means for controlling the means for communicating with the cradle apparatus to transmit the request for provision to the portable electronic apparatus;

means for controlling the means for communicating with the cradle apparatus to receive information transmitted from the portable electronic apparatus in response to the request for provision of object information;

means for controlling the means for communicating with the one of the plurality of home apparatuses to transmit the received information to be transmitted to the one of the plurality of home apparatuses;

means for carrying out a relay process of transmitting the provision information from the portable electronic apparatus;

means for forming a deletion request for requesting deletion of accumulated data to the portable electronic apparatus, and means for controlling the first interface to transmit the deletion request to the portable electronic apparatus.

9. A data communication system comprising:
a portable electronic apparatus;
a server apparatus;
a cradle apparatus configured to mediate transmission and reception of data between the portable electronic apparatus and the server apparatus; and
a plurality of home apparatuses configured to be connected to the server apparatus;
the portable electronic apparatus including
a portable electronic apparatus interface configured to communicate with the cradle apparatus,
a portable electronic apparatus interface controller configured to control the portable electronic apparatus interface to receive provision information from the server apparatus transmitted to the portable electronic apparatus,
a portable electronic apparatus memory configured to store the provision information destined for the portable electronic apparatus and received through the portable electronic apparatus interface, and
a portable electronic apparatus controller configured to control utilization of the provision information stored in the memory,
the cradle apparatus including
a cradle apparatus interface configured to communicate with the portable electronic apparatus connected to the cradle apparatus,
a second cradle apparatus interface configured to communicate with the server apparatus,
a detector configured to detect that the portable electronic apparatus is connected to the cradle apparatus,
a cradle apparatus interface controller configured to control the second cradle apparatus interface to notify the server apparatus that the portable electronic apparatus is connected to the cradle apparatus, and
a cradle apparatus controller configured to control the first and second cradle apparatus interfaces to relay the communication between the portable electronic apparatus and the server apparatus,
the server apparatus including
a first server apparatus interface configured to communicate with the cradle apparatus,
a second server apparatus interface configured to communicate with the plurality of home apparatuses,
a selection unit configured to select one of the plurality of home apparatuses as an opposite party of communication by comparing identification information received from the portable electronic apparatus to stored identification information associating the identification information with the one of the plurality of home apparatuses,
a server apparatus interface controller configured to form a request for provision of object information to the one of the plurality of home apparatuses and control the second server apparatus interface to transmit the request for provision to the one of the plurality of home apparatuses, and
a server apparatus controller configured to control the second server apparatus interface to receive information transmitted from the one of the plurality of home apparatuses in response to the request for provision of object information and control the first server apparatus interface to transmit the received information to the portable electronic apparatus through the cradle apparatus, wherein
the server apparatus controller is configured to form a deletion request for requesting deletion of accumulated data to the portable electronic apparatus, and control the first server apparatus interface to transmit the deletion request to the portable electronic apparatus,
the plurality of home apparatuses each including
a home apparatus interface configured to communicate with the server apparatus,
a first home apparatus controller configured to prepare information in accordance with the request for provision, and
a second home apparatus controller configured to control the home apparatus interface to transmit the information prepared by the first home apparatus controller to the portable electronic apparatus through the home apparatus interface.

10. The data communication system of claim 9, wherein:
the portable electronic apparatus includes
the portable electronic apparatus interface controller configured to delete accumulated data stored in a storage unit in accordance with the deletion request.

11. The data communication system according to claim 7, wherein the plurality of home apparatuses which are capable of being connected through the second server apparatus interface include a server apparatus provided on a wide area network.

12. A data communication system comprising:
a portable electronic apparatus;
a server apparatus;
a cradle apparatus configured to mediate transmission and reception of data between the portable electronic apparatus and the server apparatus; and
a plurality of home apparatuses configured to be connected to the server apparatus,
the portable electronic apparatus including
a portable electronic apparatus interface configured to communicate with the cradle apparatus,
a portable electronic apparatus interface controller configured to control the portable electronic apparatus interface to receive provision information from the server apparatus transmitted to the portable electronic apparatus,
a portable electronic apparatus controller configured to prepare transmission information to be transmitted to a requesting source in accordance with a request for provision, and
the portable electronic apparatus interface controller configured to control the portable electronic apparatus interface to transmit the transmission to the requesting source,
the cradle apparatus including
a first cradle apparatus interface configured to communicate with the portable electronic apparatus connected to the cradle apparatus, a second cradle apparatus interface configured to communicate with the server apparatus, a cradle apparatus detector configured to detect that the portable electronic apparatus is connected to the cradle apparatus, a cradle apparatus interface controller configured to control the second cradle apparatus interface to notify the server apparatus that the portable electronic apparatus is connected to the cradle apparatus, and a cradle apparatus controller configured to control the first and second cradle apparatus interfaces to repeat the communication between the portable electronic apparatus and the server apparatus, the server apparatus including a first server apparatus interface configured to communicate with the cradle apparatus, a second server apparatus interface configured to communicate with the plurality of home apparatuses, a selection unit configured to select one of the plurality of home apparatuses as an opposite party of communication by comparing identification information received from the portable electronic apparatus to stored identification information associating the identification information with the one of the plurality of home apparatuses, a server apparatus controller configured to form a request for provision of object information to the portable electronic apparatus and control the first server apparatus interface to transmit a request for provision to the portable electronic apparatus, and the server apparatus controller configured to control the first server apparatus interface to receive information transmitted from the portable electronic apparatus in response to the request for provision of object information and control the second server apparatus interface to transmit the received information so as to be transmitted to the one of the plurality of home apparatuses, wherein the server apparatus controller is configured to form a deletion request for requesting deletion of accumulated data to the portable electronic apparatus, and control the first server apparatus interface to transmit the deletion request to the portable electronic apparatus, the plurality of home apparatuses each including a home apparatus interface configured to communicate with the server apparatus, and a home apparatus memory configured to store the provision information received via the interface.

13. The data communication system of claim 12, wherein:
the portable electronic apparatus includes
the portable electronic apparatus controller configured to delete accumulated data stored in accordance with the deletion request.

14. The data communication system according to claim 12, wherein each of the plurality of home apparatuses include a home apparatus controller configured to carry out a process in accordance with the provision information provided from the portable electronic apparatus and stored in the home apparatus memory.

15. The data communication system according to claim 12, wherein the plurality of home apparatuses which are capable of being connected through the second server apparatus interface include a server apparatus provided on a wide area network.

* * * * *